(12) United States Patent
Ravi et al.

(10) Patent No.: US 12,229,566 B2
(45) Date of Patent: Feb. 18, 2025

(54) APPLICATION PROGRAMMING INTERFACE TO INDICATE ACCELERATOR ERROR HANDLERS

(71) Applicant: NVIDIA Corporation, Santa Clara, CA (US)

(72) Inventors: Karthik Raghavan Ravi, Bangalore (IN); Ashutosh Jain, Bengaluru (IN); Rahul Suresh, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/070,148

(22) Filed: Nov. 28, 2022

(65) Prior Publication Data
US 2024/0176622 A1 May 30, 2024

(51) Int. Cl.
*G06F 11/00* (2006.01)
*G06F 9/38* (2018.01)
*G06F 9/54* (2006.01)

(52) U.S. Cl.
CPC .......... *G06F 9/3861* (2013.01); *G06F 9/3836* (2013.01); *G06F 9/3877* (2013.01); *G06F 9/541* (2013.01)

(58) Field of Classification Search
CPC .... G06F 9/3861; G06F 9/3836; G06F 9/3877; G06F 9/541

USPC ........................................................ 714/1–57
See application file for complete search history.

(56) References Cited

U.S. PATENT DOCUMENTS

| | | | |
|---|---|---|---|
| 10,819,680 B1* | 10/2020 | Santan | H04L 63/0209 |
| 2009/0119677 A1* | 5/2009 | Stefansson | G06F 9/5072 |
| | | | 719/313 |
| 2014/0146062 A1* | 5/2014 | Kiel | G06F 11/362 |
| | | | 345/522 |
| 2021/0182132 A1* | 6/2021 | Chen | G06F 11/0793 |
| 2021/0390033 A1* | 12/2021 | Singhal | G06F 11/3664 |

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.

* cited by examiner

*Primary Examiner* — Sarai E Butler
(74) *Attorney, Agent, or Firm* — Davis Wright Tremaine LLP

(57) ABSTRACT

Apparatuses, systems, and techniques to execute one or more application programming interfaces (APIs) to perform one or more operations for one or more accelerators within a heterogeneous processor. In at least one embodiment, one or more processors are to perform one or more instructions in response to one or more APIs to indicate one or more functions to be performed in response to one or more errors from one or more accelerators within a heterogeneous processor.

20 Claims, 46 Drawing Sheets

APPLICATION PROGRAMMING INTERFACE TO INDICATE ACCELERATOR ERROR HANDLERS

FIELD

At least one embodiment pertains to processing resources used to execute one or more application programming interfaces (APIs) to perform one or more operations for one or more accelerators within a heterogeneous processor. For example, at least one embodiment pertains to processors or computer systems used to execute one or more application programming interfaces that cause various accelerator functionality to be performed as described herein.

BACKGROUND

Parallel computing environments, such as compute uniform device architecture (CUDA), allow software programmers to develop software programs that wholly or partially run on one or more parallel processing units (PPUs), such as graphics processing units (GPUs). Increasingly, software programmers utilize accelerators within heterogeneous processors to further increase performance. When software programmers develop software programs that use PPUs in conjunction with accelerators within a heterogeneous processor, such as a deep learning accelerator (DLA), various expensive techniques are involved to interface those PPUs with those accelerators.

DETAILED DESCRIPTION

Figure 1:
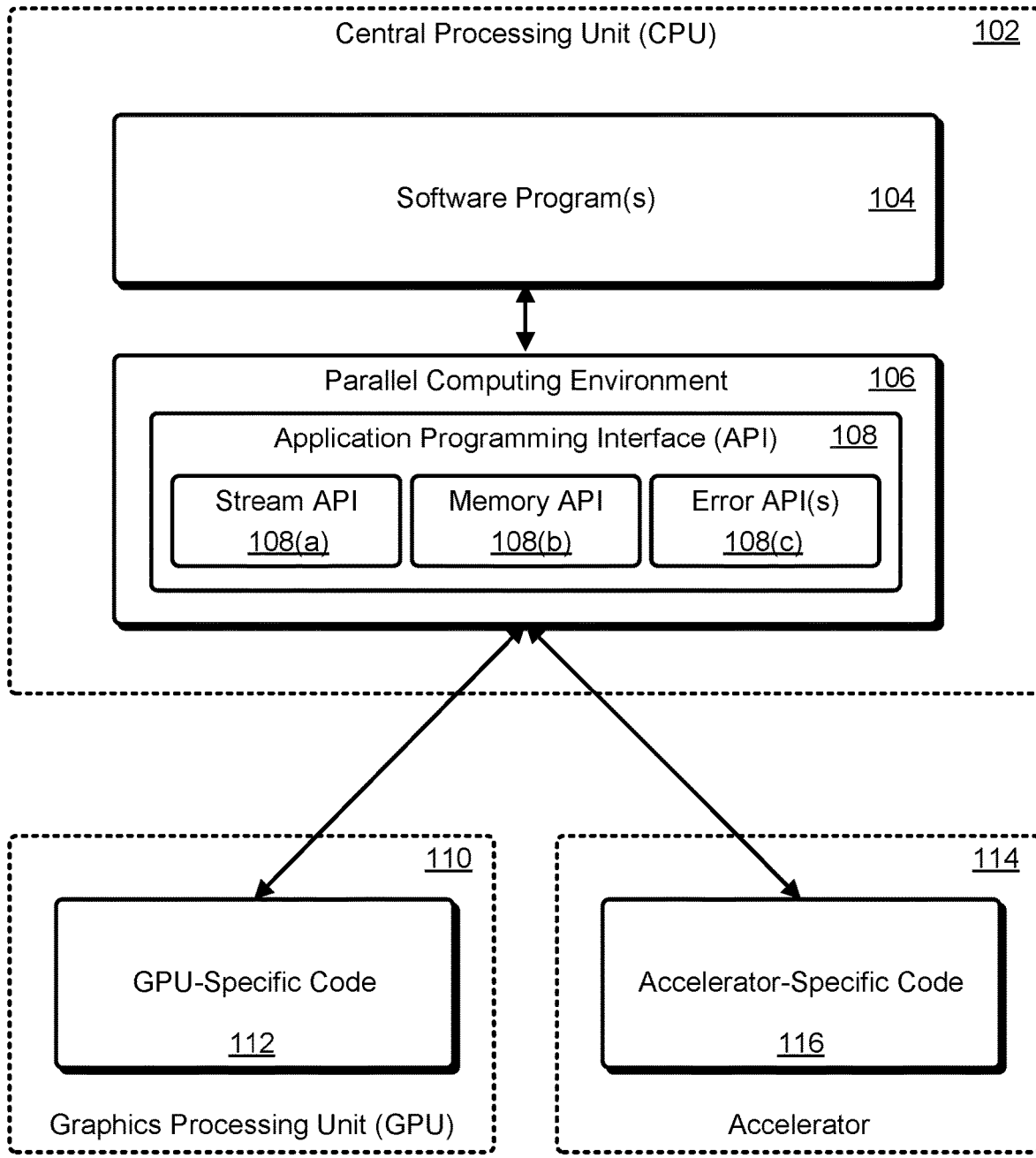
FIG. 1 is a block diagram illustrating a software program to be performed by a processor, such as a central processing unit (CPU) as well as a graphics processing unit (GPU) and an accelerator within a heterogeneous processor, in accordance with at least one embodiment.

FIG. 1 is a block diagram illustrating a software program 104 to be performed by a processor, such as a central processing unit (CPU) 102 as well as a graphics processing unit (GPU) 110 and an accelerator 114 within a heterogeneous processor, in accordance with at least one embodiment. In at least one embodiment, a CPU 102 is any processor with any architecture further described herein. In at least one embodiment, a CPU 102 is any general processor with any architecture further described herein. In at least one embodiment, a processor, such as a CPU 102, comprises circuits to perform one or more computing operations. In at least one embodiment, a processor, such as a CPU 102, comprises any configuration of circuits to perform one or more computing operations further described herein.

In at least one embodiment, a processor, such as a central processing unit (CPU) 102, performs a parallel computing environment 106. In at least one embodiment, a processor, such as a CPU 102, is In at least one embodiment, a processor, such as a CPU, performs a parallel computing environment 106, such as compute uniform device architecture (CUDA). In at least one embodiment, a parallel computing environment 106 is instructions that, if performed by one or more processors, such as CPUs 102, facilitate execution of one or more software programs by one or more CPUs 102, one or more parallel processing units (PPUs), such as GPUs 110, and/or one or more accelerators 114 within a heterogeneous processor.

In at least one embodiment, one or more PPUs are processors comprising one or more circuits to perform parallel computational operations, such as GPUs 110 and any other parallel processor further described herein. In at least one embodiment, a GPU 110 is hardware comprising circuits to perform one or more computational operations, as further described below in conjunction with various embodiments. In at least one embodiment, a GPU 110 comprises one or more processing cores to each perform one or more computational operations. In at least one embodiment, a GPU 110 comprises one or more processing cores to perform one or more parallel computational operations. In at least one embodiment, a GPU 110 is packaged together with a CPU 102 or other processors as a system-on-chip (SoC). In at least one embodiment, a GPU 110 is packaged on a shared die or other substrate with a CPU 102 or other processors as a system-on-chip (SoC).

In at least one embodiment, one or more accelerators 114 within heterogeneous processors are hardware comprising one or more circuits to perform specific computational operations, such as a deep learning accelerator (DLA), programmable vision accelerator (PVA), field-programmable gate array (FPGA), or any other accelerator further described herein. In at least one embodiment, one or more accelerators 114 within heterogeneous processors are one or more accelerators 114 within a heterogeneous processor. In at least one embodiment, one or more accelerators 114 within heterogeneous processors are one or more system comprising one or more processors. In at least one embodiment, one or more accelerators 114 within heterogeneous processors are one or more systems comprising a GPU and other accelerators, such as those accelerators described above and/or any other accelerator further described herein.

In at least one embodiment, an accelerator 114 within a heterogeneous processor is packaged together with a CPU 102 or other processors as a system-on-chip (SoC). In at least one embodiment, an accelerator 114 within a heterogeneous processor is packaged on a shared die or other substrate with a CPU 102 or other processors as a system-on-chip (SoC). In at least one embodiment, one or more CPUs 102, one or more GPUs 110 or other PPUs, and/or accelerators 114 within heterogeneous processors are packaged as a as a system-on-chip (SoC). In at least one embodiment, one or more CPUs 102, one or more GPUs 110 or other PPUs, and/or accelerators 114 within heterogeneous processors are packaged on a shared die or other substrate as a system-on-chip (SoC)

In at least one embodiment, a parallel computing environment 106, such as CUDA, comprises libraries and other software programs to perform one or more computing operations using one or more PPUs, such as GPUs 110, and/or one or more accelerators 114 within a heterogeneous processor. In at least one embodiment, a parallel computing environment 106 comprises libraries and other software programs that, if performed by one or more processors, such as one or more CPUs 102, cause one or more PPUs, such as GPUs 110, and/or one or more accelerators 114 within a heterogeneous processor, to perform one or more computational operations. In at least one embodiment, a parallel computing environment 106 comprises libraries that, if performed, cause one or more PPUs, such as GPUs 110, and/or one or more accelerators 114 within heterogeneous processors, to perform mathematical operations. In at least one embodiment, a parallel computing environment 106 comprises libraries that, if performed, cause one or more PPUs, such as GPUs 110, and/or one or more accelerators 114 within heterogeneous processors, to perform any other operation further described herein.

In at least one embodiment, one or more PPUs, such as GPUs 110, and/or one or more accelerators 114 within heterogeneous processors, perform one or more computational operations in response to one or more application programming interfaces (APIs). In at least one embodiment, an API is a set of software instructions that, if performed by one or more processors, such as CPUs 102, cause one or more PPUs, such as GPUs 110 and/or one or more accelerators 114 within heterogeneous processors to perform one or more computational operations. In at least one embodiment, a parallel computing environment 106 comprises one or more APIs 108 that, if performed by one or more processors, such as CPUs 102, cause one or more PPUs, such as GPUs 110 and/or one or more accelerators 114 within heterogeneous processors to perform one or more computational operations. In at least one embodiment, one or more APIs 108 comprise one or more functions or APIs 108(a), 108(b), 108(c) that, if performed, cause one or more processors, such as CPUs 102, to perform one or more operations, such as computational operations, error reporting, scheduling of other operations to be performed by GPUs 110 and/or accelerators 114 within heterogeneous processors, or any other operation further described herein. In at least one embodiment, one or more APIs 108 comprise one or more functions or APIs 108(a), 108(b), 108(c) that, if performed, cause one or more PPUs, such as GPUs 110, to perform one or more operations, such as computational operations, error reporting, or any other operation further described herein. In at least one embodiment, one or more APIs 108 comprise one or more functions or APIs 108(a), 108(b), 108(c), such as those described below in conjunction with FIGS. 2-7, that, if performed, cause one or more accelerators 114 within heterogeneous processors to perform one or more operations, such as computational operations, error reporting, or any other operation further described herein. In at least one embodiment, one or more APIs 108 comprise one or more functions or APIs 108(a), 108(b), 108(c) to cause a CPU 102 to perform one or more computational operations in response to information or events generated by one or more PPUs, such as GPUs 110, and/or one or more accelerators 114 within heterogeneous processors. In at least one embodiment, one or more APIs 108 comprise one or more functions or APIs 108(a), 108(b), 108(c) that, if invoked, cause a CPU 102 to perform one or more computational operations in response to information or events generated by one or more PPUs, such as GPUs 110, and/or one or more accelerators 114 within heterogeneous processors. In at least one embodiment, one or more APIs 108 comprise one or more functions or APIs 108(a), 108(b), 108(c) such as a socket API 108(a), as described below in conjunction with FIG. 2. In at least one embodiment, one or more APIs 108 comprise one or more functions or APIs 108(a), 108(b), 108(c) such as a memory API 108(b), as described below in conjunction with FIG. 3. In at least one embodiment, one or more APIs 108 comprise one or more functions or APIs 108(a), 108(b), 108(c) such as one or more error APIs 108(c), as described below in conjunction with FIGS. 4-7.

In at least one embodiment, a processor, such as a CPU 102, performs one or more software programs 104. In at least one embodiment, one or more software programs are sets of instructions that, if performed, cause one or more processors, such as CPUs 102, PPUs such as GPUs 110, and/or accelerators 114 in heterogeneous processors, to perform computational operations. In at least one embodiment, software programs 104 comprise instructions and/or operations to be performed by one or more PPUs, such as GPUs 110. In at least one embodiment, one or more software programs 104 comprise GPU-specific code 112 and/or accelerator-specific code 116. In at least one embodiment, instructions and/or operations to be performed by one or more PPUs, such as GPUs 110, are PPU-specific or GPU-specific code 112. In at least one embodiment, GPU-specific code 110 is a set of software instructions and/or other operations, as further described herein, to be performed by one or more GPUs 110. In at least one embodiment, software programs 104 comprise instructions and/or operations to be performed by one or more accelerators 114 in heterogeneous processors. In at least one embodiment, instructions and/or operations to be performed by one or more accelerators 114 in heterogeneous processors are accelerator-specific code 116. In at least one embodiment, accelerator-specific code 116 is a set of software instructions and/or other operations, as further described herein, to be performed by one or more accelerators 116. In at least one embodiment, PPU-specific or GPU-specific code 112 and/or accelerator-specific code 116 is to be performed in response to one or more APIs 108, as described below in conjunction with FIGS. 2-7.

Figure 2:
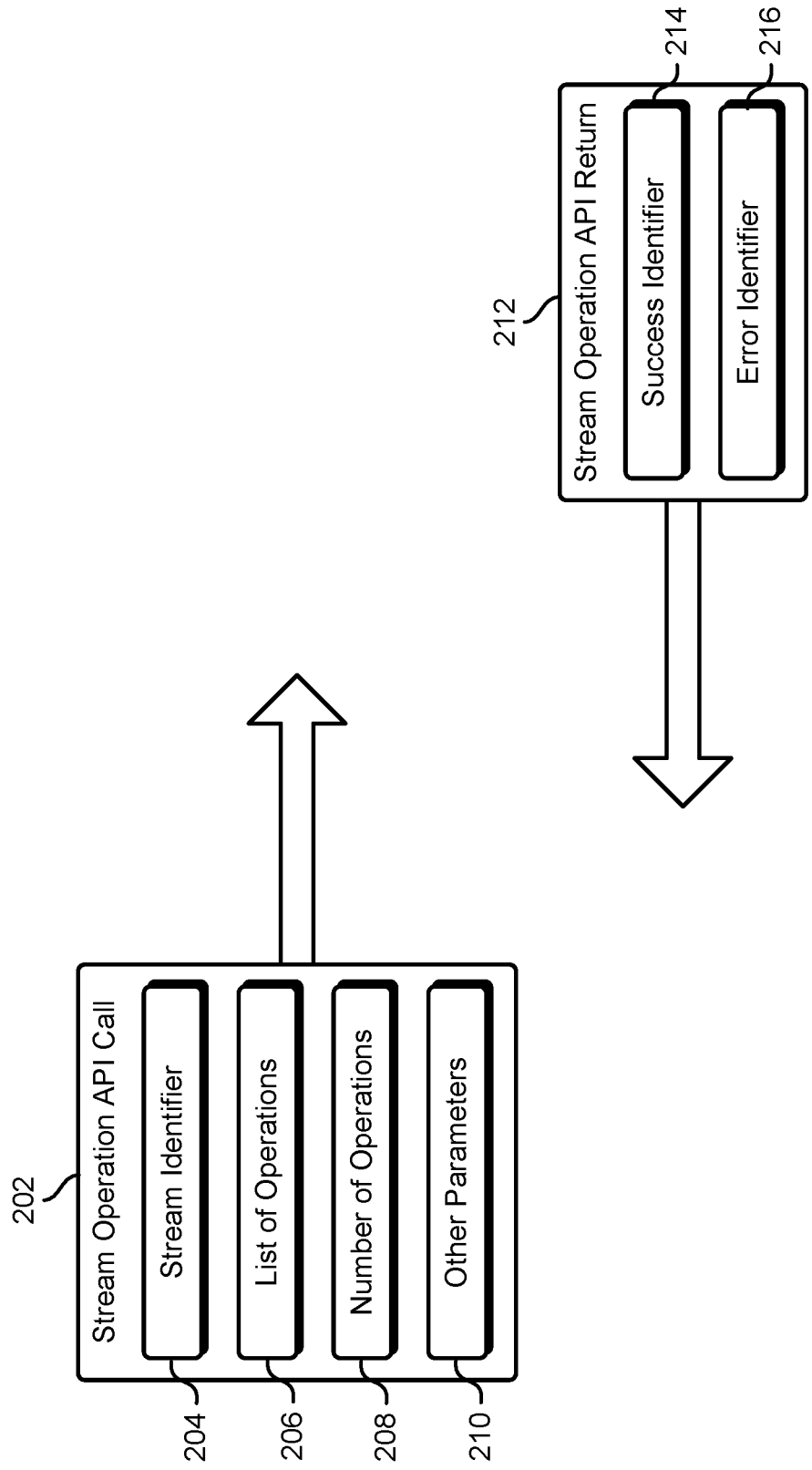
FIG. 2 illustrates an application programming interface (API) to indicate one or more operations in a sequence of operations to be performed by one or more accelerators within a heterogeneous processor, in accordance with at least one embodiment.

FIG. 2 illustrates an application programming interface (API) 202 to indicate one or more operations 206 in a stream 204 or sequence of operations to be performed by one or more accelerators within a heterogeneous processor, in accordance with at least one embodiment. In at least one embodiment, an API 202 is a set of instructions that, if performed, cause one or more processors to perform one or more functions in response to one or more API calls 202. In at least one embodiment, an API call 202 is a set of instructions that, if performed, cause one or more processors to perform an API 202. In at least one embodiment, an API call 202 is a function call. In at least one embodiment, an API call 202 is a software function that is to be invoked by one or more software programs. In at least one embodiment, in response to an API call 202, one or more processors are to perform a set of instructions and then return 212. In at least one embodiment, a return 212 is a change of control flow from an API 202 to a software program after invocation of said API 202. In at least one embodiment, a return 212 causes one or more data values 214, 216 to be transmitted to memory accessible by one or more software programs.

In at least one embodiment, an API call is a stream operation API call 202. In at least one embodiment, a stream operation API call 202 is a set of software instructions that, if performed by one or more processors, cause one or more operations in a stream of operations to be performed by one or more accelerators within a heterogeneous processor. In at least one embodiment, a stream operation API call 202 is a set of software instructions that, if performed by one or more processors, cause one or more other instructions to be performed by one or more accelerators within a heterogeneous processor to be added to a set of other instructions to be performed. In at least one embodiment, a stream operation API call 202 is a set of software instructions that, if performed by one or more processors, cause one or more other instructions to be performed by one or more accelerators within a heterogeneous processor to be added to a set of other instructions to be performed by a parallel processing unit (PPU), such as a graphics processing unit (GPU).

In at least one embodiment, a stream operation API call 202, if invoked by one or more software programs, causes an API to indicate one or more accelerators within a heterogeneous processor to perform one or more operations. In at least one embodiment, a stream operation API call 202, if invoked by one or more software programs, causes an API to indicate one or more accelerators within a heterogeneous processor to perform one or more operations in a stream. In at least one embodiment, a stream operation API call 202, if invoked by one or more software programs, causes an API to indicate one or more accelerators within a heterogeneous processor to perform one or more instructions. In at least one embodiment, a stream operation API call 202, if invoked by one or more software programs, causes an API to indicate one or more accelerators within a heterogeneous processor to perform one or more instructions from a set of instructions to be performed by one or more PPUs, such as GPUs.

In at least one embodiment, a stream operation API call 202, if invoked, causes an API to enqueue one or more operations into a stream to be performed, in part, by one or more accelerators within a heterogeneous processor and, in part, by one or more GPUs. In at least one embodiment, a stream operation API call 202, if invoked, causes an API to enqueue one or more instructions into a set of instructions to be performed, in part, by one or more accelerators within a heterogeneous processor and, in part, by one or more GPUs.

In at least one embodiment, a stream operation API call 202 is to cause one or more circuits in a processor to perform an API to indicate one or more accelerators within a heterogeneous processor to perform one or more instructions. In at least one embodiment, one or more circuits of a processor are to perform an API, in response to a stream operation API call 202, to indicate one or more accelerators within a heterogeneous processor to perform one or more instructions. In at least one embodiment, a stream operation API call 202 is to cause one or more circuits in a processor to perform an API to indicate one or more accelerators within a heterogeneous processor to perform one or more operations in a stream. In at least one embodiment, one or more circuits of a processor are to perform an API, in response to a stream operation API call 202, to indicate one or more accelerators within a heterogeneous processor to perform one or more stream operations and/or portions of a stream.

In at least one embodiment, a stream operation API call 202 is to cause one or more processors in a system to perform an API to indicate one or more accelerators within a heterogeneous processor to perform one or more instructions. In at least one embodiment, one or more processors in a system are to perform an API, in response to a stream operation API call 202, to indicate one or more accelerators within a heterogeneous processor to perform one or more instructions. In at least one embodiment, a stream operation API call 202 is to cause one or more processors in a system to perform an API to indicate one or more accelerators within a heterogeneous processor to perform one or more operations in a stream. In at least one embodiment, one or more processors in a system are to perform an API, in response to a stream operation API call 202, to indicate one or more accelerators within a heterogeneous processor to perform one or more stream operations and/or portions of a stream.

In at least one embodiment, a stream operation API call 202 receives, when invoked, one or more parameters 204, 206, 208, 210 to indicate information about operations to be performed. In at least one embodiment, a stream operation API call 202 receives, when invoked, one or more parameters 204, 206, 208, 210 to indicate information about instructions to be performed.

In at least one embodiment, a stream operation API call 202 receives, as input, parameters 204, 206, 208, 210 comprising a stream identifier 204. In at least one embodiment, a stream identifier 204 is a data value comprising information usable to identify a set of operations to be performed by a PPU, such as a GPU, and/or one or more accelerators within a heterogeneous processor. In at least one embodiment, a stream identifier 204 is a data value comprising information usable to identify a set of instructions to be performed by a PPU, such as a GPU, and/or one or more accelerators within a heterogeneous processor. In at least one embodiment, a stream identifier 204 is a data value to indicate, to an API, a set of operations or instructions to be performed by one or more PPUs, such as GPUs, and/or one or more accelerators within a heterogeneous processor. In at least one embodiment, a stream identifier 204 is a pointer to a stream. In at least one embodiment, a stream identifier 204 is a data structure to identify a stream, such as described below. In at least one embodiment, a stream identifier 204 is a pointer to a data structure to identify a stream. In at least one embodiment, a stream identifier 204 is a CUStream defined as follows:

CUstream usrStream

In at least one embodiment, a stream identifier 204 is any other data or type of data usable to identify a stream or other sequence of computational operations described herein.

In at least one embodiment, a stream operation API call 202 receives, as input, parameters 204, 206, 208, 210 comprising a list of operations 206. In at least one embodiment, a list of operations 206 parameter is a data value comprising information to indicate one or more operations to be performed by one or more accelerators within a heterogeneous processor. In at least one embodiment, a list of operations 206 parameter is a data value comprising information to indicate one or more instructions to be performed by one or more accelerators within a heterogeneous processor. In at least one embodiment, a list of operations 206 is a set of data values to indicate, to an API, a set of operations or instructions to be performed by one or more accelerators within a heterogeneous processor. In at least one embodiment, a list of operations 206 is a pointer to a set of operations to be performed. In at least one embodiment, a list of operations 206 is a data structure to identify one or more operations to be performed and/or characteristics of operations to be performed, such as described below. In at least one embodiment, a list of operations 206 is a pointer to a data structure to identify one or more operations to be performed and/or characteristics of operations to be performed. In at least one embodiment, a list of operations is a cuSocketStreamOp as described below. In at least one embodiment, a stream identifier 204 is any other data or type of data usable to identify a stream or other sequence of computational operations described herein.

In at least one embodiment, a stream operation API call 202 receives, as input, parameters 204, 206, 208, 210 comprising a number of operations 208. In at least one embodiment, a number of operations 208 parameter is a data value comprising information to indicate a quantity of operations indicated by a list of operations 206 parameter. In at least one embodiment, a number of operations 208 parameter is a data value comprising information to indicate a quantity of instructions indicated by a list of operations 206 parameter. In at least one embodiment, a number of operations 208 parameter is a positive integer value. In at least one embodiment, a number of operations 208 parameter is any other type of numerical value.

In at least one embodiment, a stream operation API call 202 receives, as input, parameters 204, 206, 208, 210 comprising other parameters 210. In at least one embodiment, other parameters 210 are data comprising information to indicate any other information usable by an API in response to a stream operation API call 202.

In at least one embodiment, a stream operation API call 202, if invoked, causes an API 108 to add one or more operations or instructions indicated by a list of operations 206 parameter to be added, inserted, or otherwise included in a stream or set of instructions to be performed by one or more accelerators within a heterogenous processor. In at least one embodiment, a stream operation API call 202, if invoked, causes an API 108 in a parallel computing environment 106, such as compute uniform device architecture (CUDA), to add one or more operations or instructions indicated by a list of operations 206 parameter to be added, inserted, or otherwise included in a stream or set of instructions to be performed by one or more accelerators within a heterogenous processor.

In at least one embodiment, in response to a stream operation API call 202, an API 108, if performed, is to cause one or more processors to perform a stream operation API return 212. In at least one embodiment, a stream operation API return 212 is a set of instructions that, if performed, generate and/or indicate one or more data values in response to a stream operation API call 202. In at least one embodiment, a stream operation API return 212 indicates a success identifier 214. In at least one embodiment, a success identifier 214 is data comprising any value to indicate success of a stream operation API call 202. In at least one embodiment, a stream operation API return 212 indicates an error identifier 216. In at least one embodiment, an error identifier 216 is data comprising any value to indicate failure of a stream operation API call 202. In at least one embodiment, an error identifier 216 comprises information indicating one or more specific types of errors generated as a result of a stream operation API call 202. In at least one embodiment, an error identifier 216 comprises information indicating one or more other data values generated as a result of a stream operation API call 202.

In at least one embodiment, a parallel computing environment 106 comprising an API 108 including a stream operation API 202 adds various operations of various types to a stream to be performed by one or more accelerators within a heterogeneous processor. In at least one embodiment, stream operations comprise an acquire semaphore operation. In at least one embodiment, stream operations comprise a release semaphore operation. In at least one embodiment, stream operations comprise one or more operations to flush and/or invalidate cache memory, such as L2 cache memory of a PPU, such as a GPU, and/or cache memory of one or more accelerators within a heterogeneous processor. In at least one embodiment, stream operations comprise one or more operations to indicate submission of an operation to an external device, such as one or more accelerators within a heterogeneous processor. In at least one embodiment, example software code indicating stream operation types is as follows:

```
/**
 * Types of stream operations
 */
typedef enum
{
  /**< Acquire semaphore */
  CUSOCKET_STREAM_OP_SEMA_ACQ,
  /**< Release semaphore */
  CUSOCKET_STREAM_OP_SEMA_REL,
  /**< Flush GPU L2 cache */
  CUSOCKET_STREAM_OP_GPU_L2_FLUSH,
  /**< Invalidate GPU L2 cache */
  CUSOCKET_STREAM_OP_GPU_L2_INVALIDATE,
  /**< Submitting an operation to an external device */
  CUSOCKET_STREAM_OP_EXTERNAL_DEVICE_SUBMIT
} cuSocketStreamOpType;
```

In at least one embodiment, a parallel computing environment 106 comprising an API 108 including a stream operation API 202 comprises one or more function signatures usable to indicate one or more callback functions for operations to be performed by one or more accelerators within heterogeneous processors. In at least one embodiment, one or more operations in a list of operations 206 cause one or more callback functions to be performed. In at least one embodiment, example software code indicating a function signature for a callback function is as follows:

```
/**
 * Callback function signature for submitting to an external device.
 */
typedef unsigned int (*cuSocketExternalDeviceSubmitCallback)(void *submitArgs);
```

In at least one embodiment, in order to specify one or more accelerators within heterogeneous processors to perform a list of operations 206 indicated by a stream operation API call 202 to an API 108, a data structure of an API 108 is usable to specify one or more external devices for which said API 108 is to submit said list of operations. In at least one embodiment, example software code indicating a data structure representing a device node for one or more accelerators within heterogeneous processors is as follows:

```
/**
 * Struct representing the external device node that captures the information
 * about a particular task submit for an external device.
 */
typedef struct
{
    void *submitArgs;
    cuSocketExternalDeviceSubmitCallback callback;
} cuSocketExternalDeviceNodeParams;
```

In at least one embodiment, in order to specify type and data of one or more operations indicated by a list of operations 206 to be performed by one or more accelerators within heterogeneous processors, a data structure of an API 108 is to be used. In at least one embodiment, example software code indicating a data structure to specify type and data of one or more operations to be performed by one or more accelerators within heterogeneous processors is as follows:

```
/**
 * Struct tracking the type and data for stream operations. The \p data is populated
 * with semaphore address and payload for types
 * ::CUSOCKET_STREAM_OP_SEMA_ACQ and
 * ::CUSOCKET_STREAM_OP_SEMA_REL
 */
typedef struct
{
    /**
     * Type of stream operation
     */
    cuSocketStreamOpType type;
    union {
        /**
         * Parameters for semaphore
         */
        struct {
            /**
             * Address of semaphore to be acquired or released.
             */
            void *semaAddr;
            /**
             * Payload value of semaphore.
             */
            unsigned int payload;
        } sema;
        /**
         * The particular task that needs to be submitted to the external device.
         */
        cuSocketExternalDeviceNodeParams task;
    } data;
} cuSocketStreamOp;
```

In at least one embodiment, an API 108 comprises instructions that, if performed, cause one or more operations or instructions to be added to a stream or other set of instructions to be performed by one or more accelerators within heterogeneous processors. In at least one embodiment, instructions to cause one or more operations or instructions to be added to a stream or other set of instructions are to be performed in response to a stream operation API call 202, as described above. In at least one embodiment, example software code indicating a stream operation API call in a parallel computing environment 106, such as CUDA, is as follows:

```
/**
 * Submit a list of operations to a CUDA stream.
 *
 * - param[in] usrStream - The stream into which the operations are submitted.
 *
 * - param[in] streamOp - The list of operations to be submitted.
 *
 * - param[in] count - The number of operations to be submitted.
 *
```

-continued

```
* - Returns CUDA_SUCCESS on success, otherwise it returns an appropriate error.
*/
CUresult cuSocketStreamOps(
  CUstream usrStream,
  cuSocketStreamOp *streamOp,
  unsigned int count,
  unsigned int flags
);
```

In at least one embodiment, an API 108 comprises instructions that, if performed, cause one or more operations or instructions to be performed by one or more accelerators within heterogeneous processors to be added to one or more executable graphs similar to how one or more operations or instructions to be performed by one or more accelerators within heterogeneous processors are to be added to one or more streams or sets of instructions in response to a stream operation API call 202. In at least one embodiment, an API 108 comprises instructions that, if performed, cause one or more operations or instructions to be performed by one or more accelerators within heterogeneous processors to be added to one or more executable graphs to be submitted to one or more streams or sets of instructions for execution in response to a stream operation API call 202. In at least one embodiment, example software code indicating addition of one or more operations or instructions to one or more executable graphs by an API 108 of a parallel computing environment 106 is as follows:

```
/**
* Submit a task for an external device on a CUDA stream.
*
* - param[in] graphNode - The newly created node.
*
* - param[in] graph - The graph in which this node should be added..
*
* - param[in] dependencies - The dependencies that need to be met before this node can
*      be executed.
* - param[in] numDependencies - The number of dependencies.
* - param [in] nodeParams - The execution parameters of the node.
*
* - Returns CUDA_SUCCESS on success, otherwise it returns an appropriate error.
*/
  CUresult cuSocketAddExternalDeviceNode (
  CUgraphNode* graphNode,
  CUgraph graph,
  CUgraphNode* dependencies,
  unsigned int numDependencies,
  cuSocketExternalDeviceNodeParams* nodeParams
);
```

Figure 3:
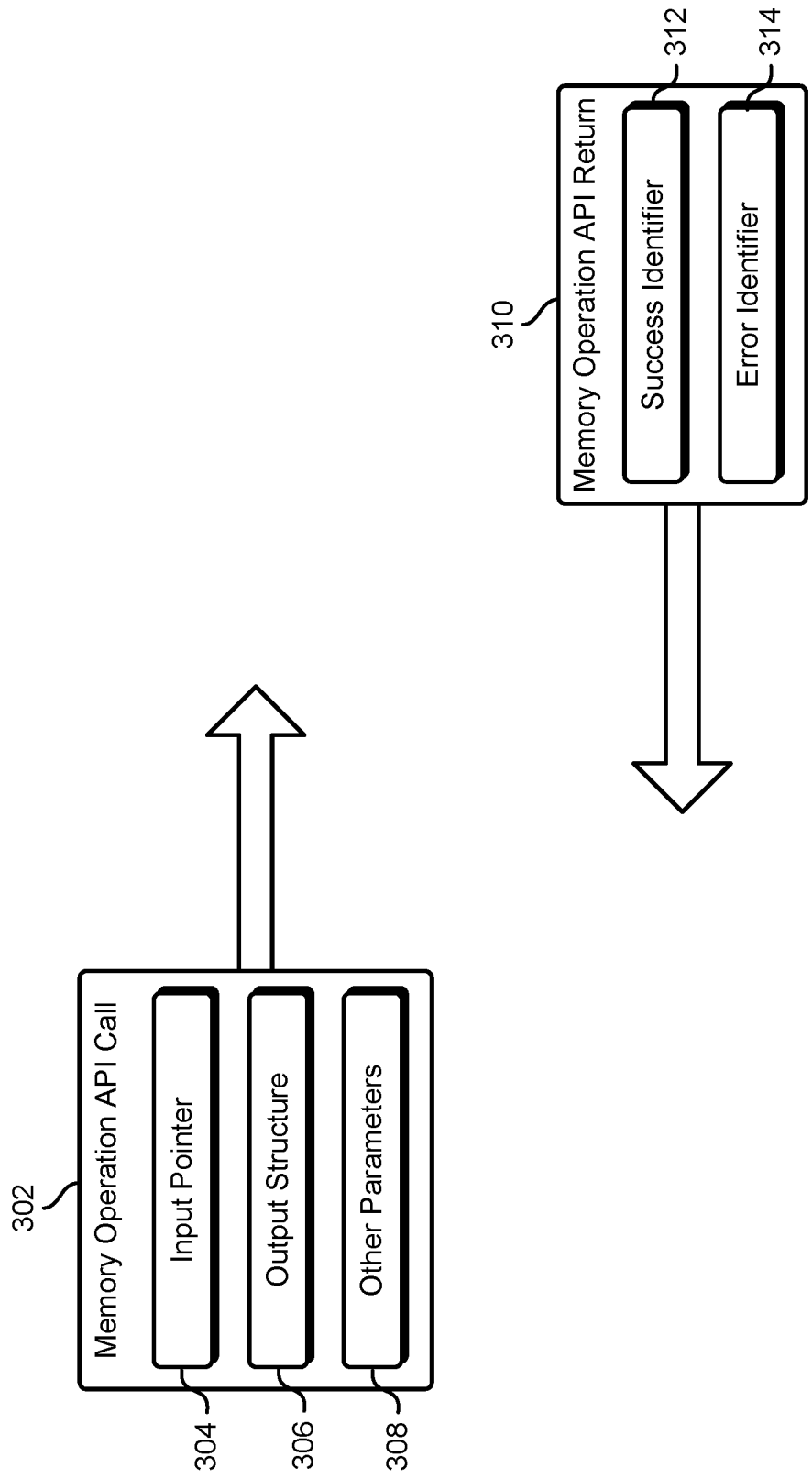
FIG. 3 illustrates an API to indicate memory to be transferred between one or more parallel processing units (PPUs), such as GPUs, and one or more accelerators within a heterogeneous processor, in accordance with at least one embodiment.

FIG. 3 illustrates an application programming interface (API) to perform a memory operation 302 to indicate memory to be transferred between one or more parallel processing units (PPUs), such as graphics processing units (GPUs), and one or more accelerators within a heterogeneous processor as described above, in accordance with at least one embodiment. In at least one embodiment, an API 302 is a set of instructions that, if performed, cause one or more processors to perform one or more functions in response to one or more API calls 302. In at least one embodiment, an API call 302 is a set of instructions that, if performed, cause one or more processors to perform an API. In at least one embodiment, an API call 302 is a function call. In at least one embodiment, an API call 302 is a software function that is to be invoked by one or more software programs. In at least one embodiment, in response to an API call 302, one or more processors are to perform a set of instructions and then return 310. In at least one embodiment, a return 310 is a change of control flow from an API 302 to a software program after invocation of said API 302. In at least one embodiment, a return 310 causes one or more data values 312, 314 to be transmitted to memory accessible by one or more software programs.

In at least one embodiment, an API and/or API call 302 is a memory operation API call 302. In at least one embodiment, a memory operation API call 302 is a set of software instructions that, if performed by one or more processors, cause one or more processors to indicate data stored in memory of one or more first accelerators to be copied between one or more first accelerators and memory of one or more second accelerators, such as GPUs and/or accelerators within a heterogeneous processor. In at least one embodiment, a memory operation API call 302 is a set of software instructions that, if performed by one or more processors, cause one or more processors to indicate data stored at one or more sets of memory addresses to be copied between one or more first accelerators and one or more second accelerators, such as GPUs and/or accelerators within a heterogeneous processor. In at least one embodiment, a memory operation API call 302 is a set of software instructions that, if performed by one or more processors, cause one or more processors to indicate one or more sets of memory addresses to be copied between one or more first accelerators and one or more second accelerators, such as GPUs and/or accelerators within a heterogeneous processor. In at least one embodiment, a memory operation API call 302 is a set of software instructions that, if performed by one or more processors, cause one or more processors to transfer data between memory of one or more first accelerators and memory of one or more second accelerators, such as GPUs and/or accelerators within a heterogeneous processor. In at least one embodiment, a memory operation API call 302 is a set of software instructions that, if performed by one or more processors, cause one or more processors to transfer any other information between memory of one or more first accelerators and memory of one or more second accelerators, such as GPUs and/or accelerators within a heterogeneous processor.

In at least one embodiment, a memory operation API call 302 is a set of software instructions that, if performed by one or more processors, cause one or more processors to indicate a pointer usable to access data to be transferred between memory of one or more first accelerators and memory of one or more second accelerators, such as GPUs and/or accelerators within a heterogeneous processor. In at least one embodiment, a memory operation API call 302 is a set of software instructions that, if performed by one or more processors, cause one or more processors to generate and/or indicate data structure comprising one or more memory addresses usable to access data to be transferred between memory of one or more first accelerators and memory of one or more second accelerators, such as GPUs and/or accelerators within a heterogeneous processor.

In at least one embodiment, a memory operation API call 302, if invoked by one or more software programs, causes an API to indicate one or more regions of memory to be transferred from one or more first accelerators to one or more second accelerators. In at least one embodiment, a memory operation API call 302, if invoked by one or more software programs, causes an API to indicate one or more sets of data to be transferred from one or more first accelerators to one or more second accelerators. In at least one embodiment, a memory operation API call 302, if invoked by one or more software programs, causes an API to indicate one or more memory addresses at which data is stored and to be transferred from one or more first accelerators to one or more second accelerators. In at least one embodiment, a memory operation API call 302, if invoked by one or more software programs, causes an API to indicate one or more accelerators within a heterogeneous processor comprising memory storing data to be transferred, copied, or otherwise moved to memory of one or more other accelerators, such as GPUs and/or accelerators within heterogeneous processors.

In at least one embodiment, a memory operation API call 302 is to cause one or more circuits in a processor to cause or otherwise perform an API to transfer data between memory of one or more first accelerators and memory of one or more second accelerators, such as GPUs and/or accelerators within heterogenous processors. In at least one embodiment, one or more circuits of a processor are to perform an API, in response to a memory operation API call 302, to indicate one or more regions of memory of one or more first accelerators to be copied to memory of one or more second accelerators. In at least one embodiment, a memory operation API call 302 is to cause one or more circuits in a processor to cause or otherwise perform an API to indicate data stored at one or more sets of memory addresses to be copied between one or more first accelerators and one or more second accelerators, such as GPUs and/or accelerators within a heterogeneous processor. In at least one embodiment, a memory operation API call 302 is to cause one or more circuits in a processor to cause or otherwise perform an API to indicate one or more sets of memory addresses to be copied between one or more first accelerators and one or more second accelerators, such as GPUs and/or accelerators within a heterogeneous processor. In at least one embodiment, a memory operation API call 302 is to cause one or more circuits in a processor to cause or otherwise perform an API to transfer data between memory of one or more first accelerators and memory of one or more second accelerators, such as GPUs and/or accelerators within a heterogeneous processor. In at least one embodiment, a memory operation API call 302 is to cause one or more circuits in a processor to cause or otherwise perform an API to transfer any other information between memory of one or more first accelerators and memory of one or more second accelerators, such as GPUs and/or accelerators within a heterogeneous processor. In at least one embodiment, a memory operation API call 302 is to cause one or more circuits in a processor to cause or otherwise perform an API to indicate a pointer usable to access data to be transferred between memory of one or more first accelerators and memory of one or more second accelerators, such as GPUs and/or accelerators within a heterogeneous processor. In at least one embodiment, a memory operation API call 302 is to cause one or more circuits in a processor to cause or otherwise perform an API to generate and/or indicate data structure comprising one or more memory addresses usable to access data to be transferred between memory of one or more first accelerators and memory of one or more second accelerators, such as GPUs and/or accelerators within a heterogeneous processor.

In at least one embodiment, a memory operation API call 302 is to cause one or more processors in a system to perform an API to transfer data between memory of one or more first accelerators and memory of one or more second accelerators, such as GPUs and/or accelerators within heterogenous processors. In at least one embodiment, one or more processors in a system are to perform an API, in response to a memory operation API call 302, to transfer data between memory of one or more first accelerators and memory of one or more second accelerators, such as GPUs and/or accelerators within heterogenous processors. In at least one embodiment, a memory operation API call 302 is to cause one or more processors in a system to perform an API to indicate one or more regions of memory of one or more first accelerators to be copied to memory of one or more second accelerators. In at least one embodiment, a memory operation API call 302 is to cause one or more processors in a system to perform an API to indicate data stored at one or more sets of memory addresses to be copied between one or more first accelerators and one or more second accelerators, such as GPUs and/or accelerators within a heterogeneous processor. In at least one embodiment, a memory operation API call 302 is to cause one or more processors in a system to perform an API to indicate one or more sets of memory addresses to be copied between one or more first accelerators and one or more second accelerators, such as GPUs and/or accelerators within a heterogeneous processor. In at least one embodiment, a memory operation API call 302 is to cause one or more processors in a system to perform an API to transfer data between memory of one or more first accelerators and memory of one or more second accelerators, such as GPUs and/or accelerators within a heterogeneous processor. In at least one embodiment, a memory operation API call 302 is to cause one or more processors in a system to perform an API to transfer any other information between memory of one or more first accelerators and memory of one or more second accelerators, such as GPUs and/or accelerators within a heterogeneous processor. In at least one embodiment, a memory operation API call 302 is to cause one or more processors in a system to perform an API to indicate a pointer usable to access data to be transferred between memory of one or more first accelerators and memory of one or more second accelerators, such as GPUs and/or accelerators within a heterogeneous processor. In at least one embodiment, a memory operation API call 302 is to cause one or more processors in a system to perform an API to generate and/or indicate data structure comprising one or more memory addresses usable to access data to be transferred between memory of one or more first accelerators and memory of one or more second accelerators, such as GPUs and/or accelerators within a heterogeneous processor.

In at least one embodiment, a memory operation API call 302 receives, when invoked, one or more parameters 304, 306, 308 to indicate information about operations to be performed. In at least one embodiment, a memory operation API call 302 receives, when invoked, one or more parameters 304, 306, 308 to indicate information about instructions to be performed.

In at least one embodiment, a memory operation API call 202 receives, as input, parameters 304, 306, 308 comprising an input pointer 304. In at least one embodiment, an input pointer 304 is data comprising information usable to identify a device comprising memory to be transferred, such as a GPU and/or one or more accelerators within a heterogeneous processor. In at least one embodiment, an input pointer 304 is data comprising one or more memory addresses to indicate information to be transferred from one or more first accelerators to one or more second accelerators. In at least one embodiment, an input pointer 304 is data comprising one or more memory addresses to indicate information to be transferred from memory of one or more first accelerators to memory of one or more second accelerators. In at least one embodiment, an input pointer 304 is data to indicate a pointer for which memory information is to be determined. In at least one embodiment, an input pointer 304 is data to indicate memory of one or more accelerators within heterogeneous processors. In at least one embodiment, an input pointer 304 is a compute uniform device architecture (CUDA) pointer or any other type of pointer further described herein. In at least one embodiment, an input pointer 304 is a pointer. In at least one embodiment, an input pointer 304 is a data structure comprising one or more pointers to memory. In at least one embodiment, an input pointer 304 is a pointer to a data structure to identify one or more locations in memory and/or data at one or more locations in memory, such as described below. In at least one embodiment, an input pointer 304 is any other data or type of data usable to identify data in memory and/or one or more locations in memory comprising data as further described herein.

In at least one embodiment, a memory operation API call 302 receives, as input, parameters 304, 306, 308 comprising an output structure 306 parameter. In at least one embodiment, an output structure 306 parameter is data comprising information to indicate a data structure comprising handle and offset information about one or more data values in memory. In at least one embodiment, an output structure 306 parameter is data comprising information to indicate a data structure comprising handle and offset information about one or more data values in memory of one or more accelerators within heterogeneous processors. In at least one embodiment, handle information is one or more memory addresses, such as pointers. In at least one embodiment, offset information is one or more numerical values to indicate a location in memory. In at least one embodiment, handle information is one or more memory addresses, such as pointers, to locations in memory of one or more accelerators within heterogenous processors. In at least one embodiment, offset information is one or more numerical values to indicate a location in memory of one or more accelerators within heterogenous processors. In at least one embodiment, an output structure 306 parameter is a data structure comprising one or more data values to indicate handle and offset information about one or more locations in memory. In at least one embodiment, an output structure 306 parameter is a data structure comprising one or more data values to indicate any other information about memory. In at least one embodiment, an output structure 306 parameter is a data structure comprising one or more data values to indicate any other information about memory of one or more accelerators in heterogeneous processors. In at least one embodiment, an output structure 306 parameter is a pointer. In at least one embodiment, an output structure 306 parameter is a data structure comprising one or more pointers to memory. In at least one embodiment, an output structure 306 parameter is a pointer to a data structure to identify one or more locations in memory and/or data at one or more locations in memory, such as described below. In at least one embodiment, an output structure 306 parameter is any other data or type of data usable to identify data in memory and/or one or more locations in memory comprising data as further described herein.

In at least one embodiment, a memory operation API call 302 receives, as input, parameters 304, 306, 308 comprising other parameters 308. In at least one embodiment, other parameters 308 are data comprising information to indicate any other information usable by an API in response to a memory operation API call 302. In at least one embodiment, other parameters 308 comprise information to indicate one or more flags usable to configure one or more operations in response to a memory operation API call 302. In at least one embodiment, other parameters 308 comprise information to indicate any other information usable to perform and/or configure to be performed one or more operations in response to a memory operation API call 302.

In at least one embodiment, a memory operation API call 302, if invoked, causes an API 108 to transfer information between memory of one or more first accelerators and memory of one or more second accelerators, such as GPUs and/or accelerators within a heterogenous processor. In at least one embodiment, a memory operation API call 302, if invoked, causes an API 108 in a parallel computing environment 106, such as compute uniform device architecture (CUDA), to transfer information between memory of one or more first accelerators and memory of one or more second accelerators, such as GPUs and/or accelerators within a heterogenous processor.

In at least one embodiment, in response to a memory operation API call 302, an API 108, if performed, is to cause one or more processors to perform a memory operation API return 310. In at least one embodiment, a memory operation API return 310 is a set of instructions that, if performed, generate and/or indicate one or more data values in response to a memory operation API call 302. In at least one embodiment, a memory operation API return 310 indicates a success identifier 312. In at least one embodiment, a success identifier 312 is data comprising any value to indicate success or successful operation of a memory operation API call 302. In at least one embodiment, a memory operation API return 310 indicates an error identifier 314. In at least one embodiment, an error identifier 314 is data comprising any value to indicate failure or failed operation of a memory operation API call 302. In at least one embodiment, an error identifier 314 comprises information indicating one or more specific types of errors generated as a result of or in response to a memory operation API call 302. In at least one embodiment, an error identifier 314 comprises information indicating one or more other data values generated in response to or as a result of a memory operation API call 302.

In at least one embodiment, an output structure 306 is a data structure comprising information to indicate one or more memory locations and/or contents of one or more memory locations. In at least one embodiment, an output structure 306 is a data structure comprising information to indicate one or more memory locations and/or contents of one or more memory locations of one or more accelerators within heterogeneous processors. In at least one embodiment, example software code indicating a data structure indicate one or more memory locations and/or contents of one or more memory locations of one or more accelerators within heterogeneous processors is as follows:

```
typedef struct cuSocketMemPtrInfo_t
{
    void *ptr;
    unsigned int memHandle;
    unsigned long long offsetInHandle;
    unsigned int gpuCached;
} cuSocketMemPtrInfo;
```

In at least one embodiment, an API 108 comprises instructions that, if performed, cause information to be transferred between memory of one or more first accelerators and memory of one or more second accelerators, such as accelerators within heterogeneous processors. In at least one embodiment, instructions to cause information to be transferred between memory of one or more first accelerators and memory of one or more second accelerators are to be performed in response to a memory operation API call 302, as described above. In at least one embodiment, example software code indicating a memory operation API call 302 in a parallel computing environment 106, such as CUDA, is as follows:

```
/**
 * Get memory information for a CUDA pointer.
 *
 * - param[in] ptr - The input CUDA pointer for which the memory information is being
 *      requested.
 * - param[out] memPtrInfo - Output structure where the handle and offset information
 *      would be available.
 *
 * - Returns CUDA_SUCCESS on success, otherwise it returns an appropriate error.
 */
CUresult cuSocketMemPtrGetInfo(
    void *ptr,
    cuSocketMemPtrInfo *memPtrInfo,
    unsigned int flags
);
```

Figure 4:
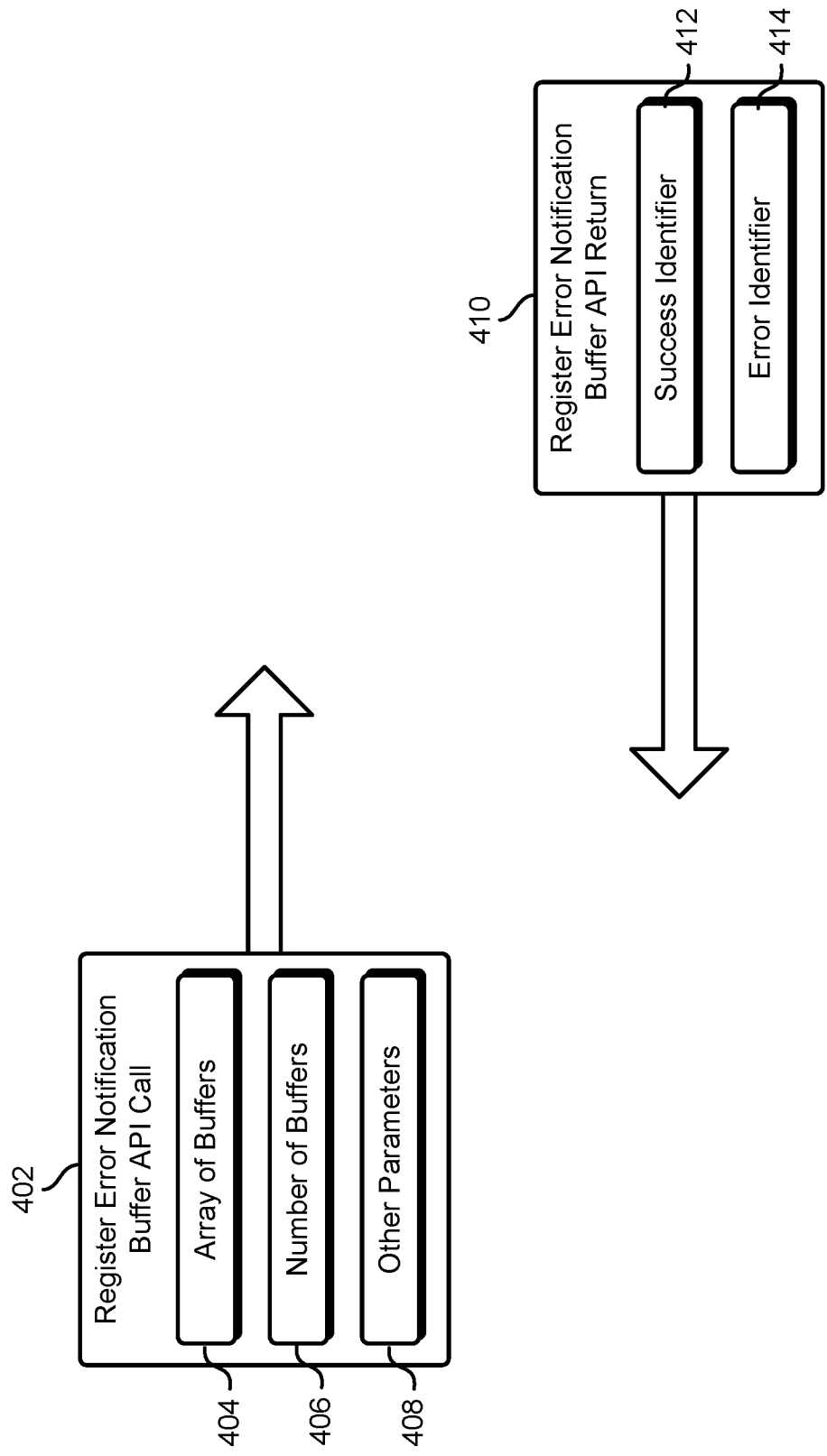
FIG. 4 illustrates an API to indicate one or more memory regions to be usable to store error information generated by one or more accelerators within a heterogeneous processor, in accordance with at least one embodiment.

FIG. 4 illustrates an application programming interface (API) 402 to indicate one or more memory regions to be usable to store error information generated by one or more accelerators within a heterogeneous processor, in accordance with at least one embodiment. In at least one embodiment, an API 402, if performed, is to cause one or more processors to poll for one or more errors from one or more accelerators within a heterogeneous processor by checking for error information generated by said one or more accelerators within a heterogenous processor in one or more memory regions indicated in response to said API 402. In at least one embodiment, an API 402, if performed, is to cause one or more processors to poll for one or more errors from one or more accelerators within a heterogeneous processor by checking for error information generated by said one or more accelerators within a heterogenous processor in one or more memory regions indicated using said API 402. In at least one embodiment, an API 402, if performed, is to cause one or more processors to indicate one or more memory regions to be polled for error information indicating one or more errors from one or more accelerators within a heterogeneous processor.

In at least one embodiment, an API 402 is a set of instructions that, if performed, cause one or more processors to perform one or more functions in response to one or more API calls 402. In at least one embodiment, an API call 402 is a set of instructions that, if performed, cause one or more processors to perform an API. In at least one embodiment, an API call 402 is a function call. In at least one embodiment, an API call 402 is a software function that is to be invoked by one or more software programs. In at least one embodiment, in response to an API call 402, one or more processors are to perform a set of instructions and then return 410. In at least one embodiment, a return 410 is a change of control flow from an API 402 to a software program after invocation of said API 402, such as by an API call 402. In at least one embodiment, a return 410 causes one or more data values 412, 414 to be transmitted to memory accessible by one or more software programs.

In at least one embodiment, an API and/or API call 402 is a register error notification buffer API call 402. In at least one embodiment, a register error notification buffer API call 402 is a set of software instructions that, if performed, cause an API to poll one or more errors from one or more accelerators within a heterogeneous processor. In at least one embodiment, a register error notification buffer API call 402 is a set of software instructions that, if performed, cause an API to poll for one or more errors from one or more accelerators within a heterogeneous processor. In at least one embodiment, a register error notification buffer API call 402 is a set of software instructions that, if performed, cause an API to poll for one or more errors from one or more accelerators within a heterogeneous processor by checking for error information generated by said one or more accelerators within a heterogenous processor in one or more memory regions indicated in response to said register error notification buffer API call 402. In at least one embodiment, a register error notification buffer API call 402 is a set of software instructions that, if performed, cause an API to indicate one or more memory regions to be polled for error information indicating one or more errors from one or more accelerators within a heterogeneous processor. In at least one embodiment, a register error notification buffer API call 402 is a set of software instructions that, if performed, cause an API to indicate one or more buffers in memory to be polled for error information indicating one or more errors from one or more accelerators within a heterogeneous processor. In at least one embodiment, a register error notification buffer API call 402 is a set of software instructions that, if performed, cause an API to indicate one or more buffers in memory of a central processing unit (CPU) to be polled for error information indicating one or more errors from one or more accelerators within a heterogeneous processor. In at least one embodiment, a register error notification buffer API call 402 is a set of software instructions that, if performed, cause an API to indicate one or more buffers in memory of one or more parallel processing units (PPUs), such as graphics processing units (GPUs), to be polled for error information indicating one or more errors from one or more accelerators within a heterogeneous processor.

In at least one embodiment, a register error notification buffer API call 402 is a set of software instructions that, if performed by one or more processors, cause said one or more processors to perform an API to poll one or more errors from one or more accelerators within a heterogeneous processor. In at least one embodiment, a register error notification buffer API call 402 is a set of software instructions that, if performed by one or more processors, cause said one or more processors to perform an API to poll for one or more errors from one or more accelerators within a heterogeneous processor. In at least one embodiment, a register error notification buffer API call 402 is a set of software instructions that, if performed by one or more processors, cause said one or more processors to perform an API to poll for one or more errors from one or more accelerators within a heterogeneous processor by checking for error information generated by said one or more accelerators within a heterogenous processor in one or more memory regions indicated in response to said register error notification buffer API call 402. In at least one embodiment, a register error notification buffer API call 402 is a set of software instructions that, if performed by one or more processors, cause said one or more processors to perform an API to indicate one or more memory regions to be polled for error information indicating one or more errors from one or more accelerators within a heterogeneous processor. In at least one embodiment, a register error notification buffer API call 402 is a set of software instructions that, if performed by one or more processors, cause said one or more processors to perform an API to indicate one or more buffers in memory to be polled for error information indicating one or more errors from one or more accelerators within a heterogeneous processor. In at least one embodiment, a register error notification buffer API call 402 is a set of software instructions that, if performed by one or more processors, cause said one or more processors to perform an API to indicate one or more buffers in memory of a central processing unit (CPU) to be polled for error information indicating one or more errors from one or more accelerators within a heterogeneous processor. In at least one embodiment, a register error notification buffer API call 402 is a set of software instructions that, if performed by one or more processors, cause said one or more processors to perform an API to indicate one or more buffers in memory of one or more parallel processing units (PPUs), such as graphics processing units (GPUs), to be polled for error information indicating one or more errors from one or more accelerators within a heterogeneous processor.

In at least one embodiment, a register error notification buffer API call 402, if invoked by one or more software programs, causes an API to poll one or more errors from one or more accelerators within a heterogeneous processor. In at least one embodiment, a register error notification buffer API call 402, if invoked by one or more software programs, causes an API to poll for one or more errors from one or more accelerators within a heterogeneous processor. In at least one embodiment, a register error notification buffer API call 402, if invoked by one or more software programs, causes an API to poll for one or more errors from one or more accelerators within a heterogeneous processor by checking for error information generated by said one or more accelerators within a heterogenous processor in one or more memory regions indicated in response to said register error notification buffer API call 402. In at least one embodiment, a register error notification buffer API call 402, if invoked by one or more software programs, causes an API to indicate one or more memory regions to be polled for error information indicating one or more errors from one or more accelerators within a heterogeneous processor. In at least one embodiment, a register error notification buffer API call 402, if invoked by one or more software programs, causes an API to indicate one or more buffers in memory to be polled for error information indicating one or more errors from one or more accelerators within a heterogeneous processor. In at least one embodiment, a register error notification buffer API call 402, if invoked by one or more software programs, causes an API to indicate one or more buffers in memory of a central processing unit (CPU) to be polled for error information indicating one or more errors from one or more accelerators within a heterogeneous processor. In at least one embodiment, a register error notification buffer API call 402, if invoked by one or more software programs, causes an API to indicate one or more buffers in memory of one or more parallel processing units (PPUs), such as graphics processing units (GPUs), to be polled for error information indicating one or more errors from one or more accelerators within a heterogeneous processor.

In at least one embodiment, a register error notification buffer API call 402 is to cause one or more circuits in a processor to cause or otherwise perform an API to poll one or more errors from one or more accelerators within a heterogeneous processor. In at least one embodiment, a register error notification buffer API call 402 is to cause one or more circuits in a processor to cause or otherwise perform an API to poll for one or more errors from one or more accelerators within a heterogeneous processor. In at least one embodiment, a register error notification buffer API call 402 is to cause one or more circuits in a processor to cause or otherwise perform an API to poll for one or more errors from one or more accelerators within a heterogeneous processor by checking for error information generated by said one or more accelerators within a heterogenous processor in one or more memory regions indicated in response to said register error notification buffer API call 402. In at least one embodiment, a register error notification buffer API call 402 is to cause one or more circuits in a processor to cause or otherwise perform an API to indicate one or more memory regions to be polled for error information indicating one or more errors from one or more accelerators within a heterogeneous processor. In at least one embodiment, a register error notification buffer API call 402 is to cause one or more circuits in a processor to cause or otherwise perform an API to indicate one or more buffers in memory to be polled for error information indicating one or more errors from one or more accelerators within a heterogeneous processor. In at least one embodiment, a register error notification buffer API call 402 is to cause one or more circuits in a processor to cause or otherwise perform an API to indicate one or more buffers in memory of a central processing unit (CPU) to be polled for error information indicating one or more errors from one or more accelerators within a heterogeneous processor. In at least one embodiment, a register error notification buffer API call 402 is to cause one or more circuits in a processor to cause or otherwise perform an API to indicate one or more buffers in memory of one or more parallel processing units (PPUs), such as graphics processing units (GPUs), to be polled for error information indicating one or more errors from one or more accelerators within a heterogeneous processor.

In at least one embodiment, a register error notification buffer API call 402 is to cause one or more processors in a system to perform an API to poll one or more errors from one or more accelerators within a heterogeneous processor. In at least one embodiment, a register error notification buffer API call 402 is to cause one or more processors in a system to perform an API to poll for one or more errors from one or more accelerators within a heterogeneous processor. In at least one embodiment, a register error notification buffer API call 402 is to cause one or more processors in a system to perform an API to poll for one or more errors from one or more accelerators within a heterogeneous processor by checking for error information generated by said one or more accelerators within a heterogenous processor in one or more memory regions indicated in response to said register error notification buffer API call 402. In at least one embodiment, a register error notification buffer API call 402 is to cause one or more processors in a system to perform an API to indicate one or more memory regions to be polled for error information indicating one or more errors from one or more accelerators within a heterogeneous processor. In at least one embodiment, a register error notification buffer API call 402 is to cause one or more processors in a system to perform an API to indicate one or more buffers in memory to be polled for error information indicating one or more errors from one or more accelerators within a heterogeneous processor. In at least one embodiment, a register error notification buffer API call 402 is to cause one or more processors in a system to perform an API to indicate one or more buffers in memory of a central processing unit (CPU) to be polled for error information indicating one or more errors from one or more accelerators within a heterogeneous processor. In at least one embodiment, a register error notification buffer API call 402 is to cause one or more processors in a system to perform an API to indicate one or more buffers in memory of one or more parallel processing units (PPUs), such as graphics processing units (GPUs), to be polled for error information indicating one or more errors from one or more accelerators within a heterogeneous processor.

In at least one embodiment, a register error notification buffer API call 402 receives, when invoked, one or more parameters 404, 406, 408 to indicate information about operations to be performed. In at least one embodiment, a register error notification buffer API call 402 receives, when invoked, one or more parameters 404, 406, 408 to indicate information about instructions to be performed. In at least one embodiment, a register error notification buffer API call 402 receives, when invoked, one or more parameters 404, 406, 408 to indicate information about memory to be polled. In at least one embodiment, a register error notification buffer API call 402 receives, when invoked, one or more parameters 404, 406, 408 to indicate information about memory to be polled for one or more errors from one or more accelerators within a heterogeneous processor.

In at least one embodiment, a register error notification buffer API call 402 receives, as input, parameters 404, 406, 408 comprising an array of buffers 404. In at least one embodiment, an array of buffers 404 is a set comprising one or more indicators of one or more buffers in memory, as described above. In at least one embodiment, an array of buffers 404 is data comprising information indicating memory to store error information, such as a CPU and/or GPU memory. In at least one embodiment, an array of buffers 404 is data comprising information indicating memory to store error information about one or more accelerators within a heterogeneous processor, such as a CPU and/or GPU memory. In at least one embodiment, an array of buffers 404 is data comprising information indicating memory to store one or more errors generated by one or more accelerators within a heterogeneous processor, such as a CPU and/or GPU memory. In at least one embodiment, an array of buffers 404 is data comprising information indicating one or more buffers in memory to be polled for one or more errors from one or more accelerators within a heterogeneous processor. In at least one embodiment, an array of buffers 404 is data comprising an array of memory locations to store error information generated by one or more accelerators within a heterogeneous processor. In at least one embodiment, an array of buffers 404 is data comprising an array of memory locations to be polled to identify one or more errors generated by one or more accelerators within a heterogeneous processor. In at least one embodiment, an array of buffers 404 parameter is a pointer. In at least one embodiment, an array of buffers 404 parameter is a data structure comprising one or more buffers. In at least one embodiment, an array of buffers 404 parameter is a pointer to a data structure, such as described below. In at least one embodiment, an array of buffers 404 parameter is any other data or type of data usable to identify one or more buffers as further described herein.

In at least one embodiment, a register error notification buffer API call 402 receives, as input, parameters 404, 406, 408 comprising a number of buffers 406 parameter. In at least one embodiment, a number of buffers 406 parameter is data comprising information to indicate a number of elements indicated by an array of buffers 404 parameter described above. In at least one embodiment, a number of buffers 406 parameter is data comprising information to indicate a quantity of buffers indicated by an array of buffers 404 parameter. In at least one embodiment, a number of buffers 406 parameter is data comprising information to indicate a quantity of buffers to be polled for error information. In at least one embodiment, a number of buffers 406 parameter is data comprising information to indicate a quantity of buffers to be polled for error information generated by one or more accelerators within a heterogeneous processor.

In at least one embodiment, a register error notification buffer API call 402 receives, as input, parameters 404, 406, 408 comprising other parameters 408. In at least one embodiment, other parameters 408 are data comprising information to indicate any other information usable by an API in response to a register error notification buffer API call 402. In at least one embodiment, other parameters 408 comprise information to indicate any other information usable to perform and/or configure to be performed one or more operations in response to a register error notification buffer API call 402.

In at least one embodiment, a register error notification buffer API call 402, if invoked, causes an API 108 to poll one or more errors from one or more accelerators within a heterogeneous processor. In at least one embodiment, a register error notification buffer API call 402, if invoked, causes an API 108 to indicate memory to be polled for one or more errors from one or more accelerators within a heterogeneous processor. In at least one embodiment, a register error notification buffer API call 402, if invoked, causes an API 108 to indicate one or more buffers in memory to be polled for one or more errors from one or more accelerators within a heterogeneous processor. In at least one embodiment, a register error notification buffer API call 402, if invoked, causes an API 108 in a parallel computing environment 106, such as compute uniform device architecture (CUDA), to poll one or more errors from one or more accelerators within a heterogeneous processor. In at least one embodiment, a register error notification buffer API call 402, if invoked, causes an API 108 in a parallel computing environment 106, such as CUDA, to indicate memory to be polled for one or more errors from one or more accelerators within a heterogeneous processor. In at least one embodiment, a register error notification buffer API call 402, if invoked, causes an API 108 in a parallel computing environment 106, such as CUDA, to indicate one or more buffers in memory to be polled for one or more errors from one or more accelerators within a heterogeneous processor.

In at least one embodiment, in response to a register error notification buffer API call 402, an API 108, if performed, is to cause one or more processors to perform a register error notification buffer API return 410. In at least one embodiment, a register error notification buffer API return 410 is a set of instructions that, if performed, generate and/or indicate one or more data values in response to a register error notification buffer API call 402. In at least one embodiment, a register error notification buffer API return 410 indicates a success identifier 412. In at least one embodiment, a success identifier 412 is data comprising any value to indicate success or successful operation of a register error notification buffer API call 402. In at least one embodiment, a register error notification buffer API return 410 indicates an error identifier 414. In at least one embodiment, an error identifier 414 is data comprising any value to indicate failure or failed operation of a register error notification buffer API call 402. In at least one embodiment, an error identifier 414 comprises information indicating one or more specific types of errors generated as a result of or in response to a register error notification buffer API call 402. In at least one embodiment, an error identifier 414 comprises information indicating one or more other data values generated in response to or as a result of a register error notification buffer API call 402.

In at least one embodiment, in order to specify a type of accelerator within a heterogeneous processor to generate errors to be polled for by an API 108, a data type is to be declared. In at least one embodiment, example software code indicating a data type to specify a of accelerator within a heterogeneous processor is as follows:

```
typedef enum
{
    CUSOCKET_EXTERNAL_ERROR_BUFFER_TYPE_DLA = 0
} cuSocketExternalErrorBufferType;
```

In at least one embodiment, in order to specify one or more buffers or other regions of memory to store and be polled for error information generated by one or more accelerators within a heterogeneous processor, a data structure of an API 108 is to be used. In at least one embodiment, example software code indicating a data structure to indicate one or more buffers or other regions of memory to store and be polled for error information generated by one or more accelerators within a heterogeneous processor is as follows:

```
typedef struct
{
    cuSocketExternalErrorBufferType type;
    union {
        void *buf;
    } bufHandle;
} cuSocketExternalErrorBuffer;
```

In at least one embodiment, an API 108 comprises instructions that, if performed, cause one or more buffers to store error information to be generated by one or more accelerators within heterogeneous processors. In at least one embodiment, an API 108 comprises instructions that, if performed, cause one or more buffers to be polled for error information generated by one or more accelerators within heterogeneous processors. In at least one embodiment, instructions to indicate memory to be polled for error information generated by one or more accelerators in a heterogeneous processor are to be performed in response to a register error notification buffer API call 402, as described above. In at least one embodiment, example software code indicating a register error notification buffer API call 402 in a parallel computing environment 106, such as CUDA, is as follows:

```
/**
* Registers external error notification buffers to the current CUDA instance.
*
* - param[in] ptr - Array of buffers to be registered.
*
* - param[in] numBuffers - Number of buffers to be registered.
*
* - Returns CUDA_SUCCESS on success, otherwise it returns an appropriate error.
*/
CUresult cuSocketRegisterExternalErrorNotificationBuffers(
    const cuSocketExternalErrorBuffer *buf,
    unsigned int numBuffers,
    unsigned int flags
);
```

Figure 5:
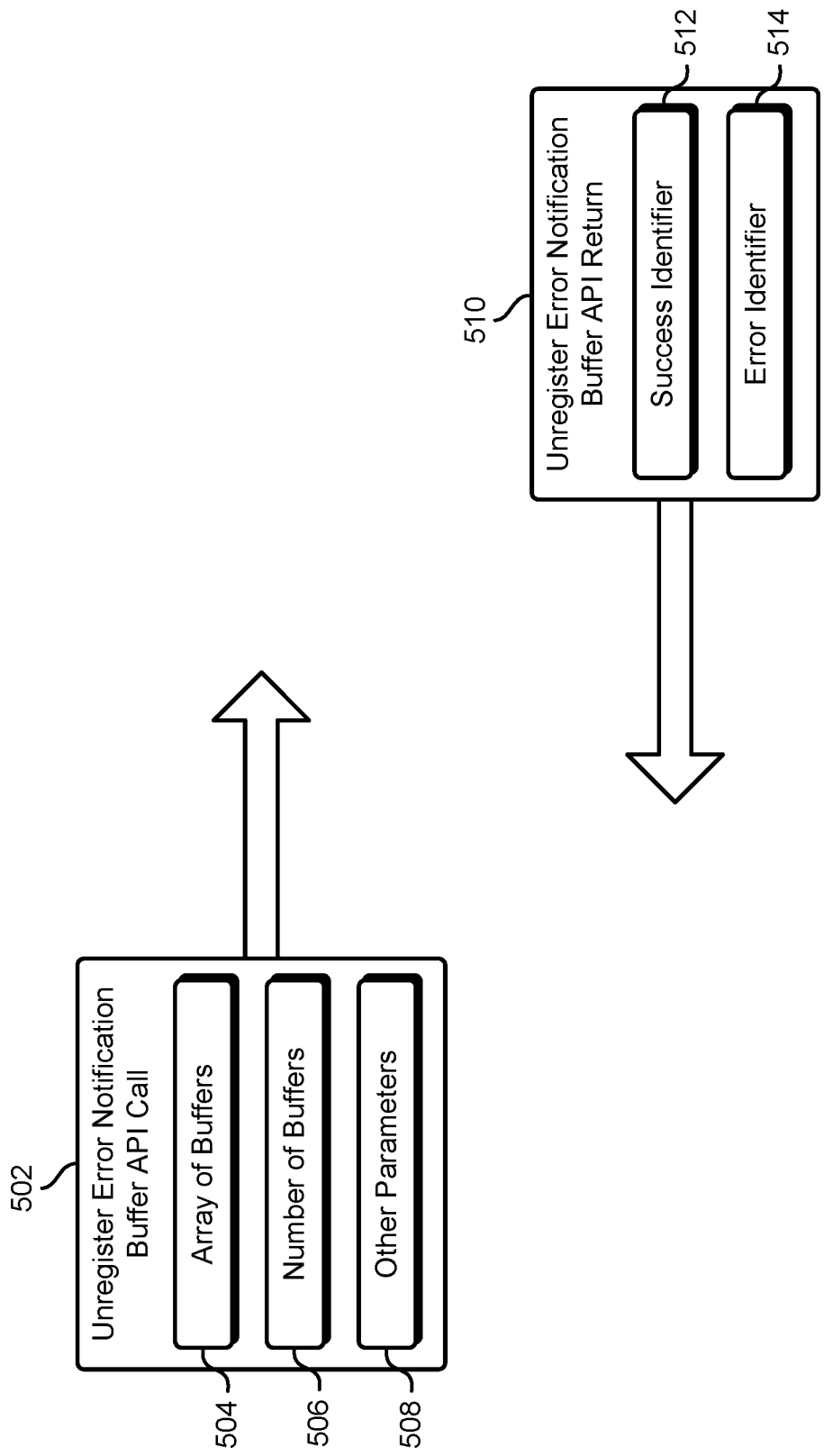
FIG. 5 illustrates an API to indicate one or more memory regions to no longer be usable to store error information generated by one or more accelerators within a heterogeneous processor, in accordance with at least one embodiment.

FIG. 5 illustrates an application programming interface (API) 502 to indicate one or more memory regions to no longer be usable to store error information generated by one or more accelerators within a heterogeneous processor, in accordance with at least one embodiment. In at least one embodiment, an API 502 is to cause one or more processors to unregister or otherwise indicate one or more buffers to no longer be usable to store error information from one or more accelerators within a heterogeneous processor, such as performed in response to an API 402 as described above in conjunction with FIG. 4. In at least one embodiment, an API 502 is to cause one or more processors to no longer poll one or more errors from one or more accelerators within a heterogeneous processor, such as performed in response to an API 402 as described above in conjunction with FIG. 4.

In at least one embodiment, an API 502, if performed, is to cause one or more processors to stop polling for one or more errors from one or more accelerators within a heterogeneous processor by unregistering one or more buffers that store error information generated by said one or more accelerators within a heterogenous processor. In at least one embodiment, an API 502, if performed, is to cause one or more processors to stop polling for one or more errors from one or more accelerators within a heterogeneous processor by unregistering one or more buffers from a parallel computing environment, as described above in conjunction with FIG. 1, where said one or more buffers store error information generated by said one or more accelerators within a heterogenous processor. In at least one embodiment, an API 502, if performed, is to cause one or more processors to indicate one or more memory regions to be unregistered to a parallel computing environment such that said one or more memory regions no longer are to receive error information indicating one or more errors from one or more accelerators within a heterogeneous processor.

In at least one embodiment, an API 502 is a set of instructions that, if performed, cause one or more processors to perform one or more functions in response to one or more API calls 502. In at least one embodiment, an API call 502 is a set of instructions that, if performed, cause one or more processors to perform an API. In at least one embodiment, an API call 502 is a function call. In at least one embodiment, an API call 502 is a software function that is to be invoked by one or more software programs. In at least one embodiment, in response to an API call 502, one or more processors are to perform a set of instructions and then return 510. In at least one embodiment, a return 510 is a change of control flow from an API 502 to a software program after invocation of said API 502, such as by an API call 502. In at least one embodiment, a return 510 causes one or more data values 512, 514 to be transmitted to memory accessible by one or more software programs.

In at least one embodiment, an API and/or API call 502 is an unregister error notification buffer API call 502. In at least one embodiment, an unregister error notification buffer API call 502 is a set of software instructions that, if performed, cause an API to unregister one or more buffers with a parallel computing environment, such as described above in conjunction with FIG. 1, where said one or more buffers are to receive information to indicate one or more errors from one or more accelerators within a heterogeneous processor. In at least one embodiment, an unregister error notification buffer API call 502 is a set of software instructions that, if performed, cause an API to stop polling for one or more errors from one or more accelerators within a heterogeneous processor. In at least one embodiment, an unregister error notification buffer API call 502 is a set of software instructions that, if performed, cause an API to unregister one or more memory regions, such as buffers, usable to poll for one or more errors from one or more accelerators within a heterogeneous processor by checking for error information generated by said one or more accelerators within a heterogenous processor in said one or more memory regions indicated in response to a register error notification buffer API call 402, as described above in conjunction with FIG. 4. In at least one embodiment, an unregister error notification buffer API call 502 is a set of software instructions that, if performed, cause an API to indicate one or more memory regions to no longer be polled for error information indicating one or more errors from one or more accelerators within a heterogeneous processor. In at least one embodiment, an unregister error notification buffer API call 502 is a set of software instructions that, if performed, cause an API to indicate, to a parallel computing environment such as compute uniform device architecture (CUDA), one or more buffers in memory to no longer be polled for error information indicating one or more errors from one or more accelerators within a heterogeneous processor. In at least one embodiment, an unregister error notification buffer API call 502 is a set of software instructions that, if performed, cause an API to indicate one or more buffers in memory of a central processing unit (CPU) to no longer be polled for error information indicating one or more errors from one or more accelerators within a heterogeneous processor. In at least one embodiment, an unregister error notification buffer API call 502 is a set of software instructions that, if performed, cause an API to indicate one or more buffers in memory of one or more parallel processing units (PPUs), such as graphics processing units (GPUs), to no longer be polled for error information indicating one or more errors from one or more accelerators within a heterogeneous processor.

In at least one embodiment, an unregister error notification buffer API call 502 is a set of software instructions that, if performed by one or more processors, cause said one or more processors to perform an API to unregister one or more memory regions, such as buffers, with a parallel computing environment, where said one or more memory regions are usable to poll one or more errors from one or more accelerators within a heterogeneous processor. In at least one embodiment, an unregister error notification buffer API call 502 is a set of software instructions that, if performed by one or more processors, cause said one or more processors to perform an API to stop polling for one or more errors from one or more accelerators within a heterogeneous processor. In at least one embodiment, an unregister error notification buffer API call 502 is a set of software instructions that, if performed by one or more processors, cause said one or more processors to perform an API unregister one or more buffers usable to poll for one or more errors from one or more accelerators within a heterogeneous processor. In at least one embodiment, an unregister error notification buffer API call 502 is a set of software instructions that, if performed by one or more processors, cause said one or more processors to perform an API to indicate one or more memory regions to no longer be polled for error information indicating one or more errors from one or more accelerators within a heterogeneous processor. In at least one embodiment, an unregister error notification buffer API call 502 is a set of software instructions that, if performed by one or more processors, cause said one or more processors to perform an API to indicate one or more buffers in memory to be unregistered from use to poll error information indicating one or more errors from one or more accelerators within a heterogeneous processor. In at least one embodiment, an unregister error notification buffer API call 502 is a set of software instructions that, if performed by one or more processors, cause said one or more processors to perform an API to indicate one or more buffers in memory of a central processing unit (CPU) to no longer be polled for error information indicating one or more errors from one or more accelerators within a heterogeneous processor. In at least one embodiment, an unregister error notification buffer API call 502 is a set of software instructions that, if performed by one or more processors, cause said one or more processors to perform an API to indicate one or more buffers in memory of one or more parallel processing units (PPUs), such as graphics processing units (GPUs), to no longer be polled for error information indicating one or more errors from one or more accelerators within a heterogeneous processor.

In at least one embodiment, an unregister error notification buffer API call 502, if invoked by one or more software programs, causes an API to stop polling one or more errors from one or more accelerators within a heterogeneous processor. In at least one embodiment, an unregister error notification buffer API call 502, if invoked by one or more software programs, causes an API to unregister one or more buffers with a parallel computing environment, as described above in conjunction with FIG. 1, where said one or more buffers are usable to poll one or more errors from one or more accelerators within a heterogeneous processor. In at least one embodiment, an unregister error notification buffer API call 502, if invoked by one or more software programs, causes an API to indicate one or more memory regions to be unregistered from a parallel computing environment to no longer receive and/or store error information indicating one or more errors from one or more accelerators within a heterogeneous processor. In at least one embodiment, an unregister error notification buffer API call 502, if invoked by one or more software programs, causes an API to indicate one or more buffers in memory to no longer be able to be polled for error information indicating one or more errors from one or more accelerators within a heterogeneous processor. In at least one embodiment, an unregister error notification buffer API call 502, if invoked by one or more software programs, causes an API to indicate one or more buffers in memory of a central processing unit (CPU) to no longer be polled for error information indicating one or more errors from one or more accelerators within a heterogeneous processor. In at least one embodiment, an unregister error notification buffer API call 502, if invoked by one or more software programs, causes an API to indicate one or more buffers in memory of one or more parallel processing units (PPUs), such as graphics processing units (GPUs), to no longer be polled for error information indicating one or more errors from one or more accelerators within a heterogeneous processor.

In at least one embodiment, an unregister error notification buffer API call 502 is to cause one or more circuits in a processor to cause or otherwise perform an API to unregister one or more memory regions, such as buffers, from a parallel computing environment. In at least one embodiment, an unregister error notification buffer API call 502 is to cause one or more circuits in a processor to cause or otherwise perform an API to unregister one or more memory regions, such as buffers, from a parallel computing environment, where said one or more memory regions are usable to poll one or more errors from one or more accelerators within a heterogeneous processor. In at least one embodiment, an unregister error notification buffer API call 502 is to cause one or more circuits in a processor to cause or otherwise perform an API to stop a parallel computing environment from polling for one or more errors from one or more accelerators within a heterogeneous processor. In at least one embodiment, an unregister error notification buffer API call 502 is to cause one or more circuits in a processor to cause or otherwise perform an API to no longer poll for one or more errors from one or more accelerators within a heterogeneous processor by stopping checking of error information generated by said one or more accelerators within a heterogenous processor in one or more memory regions indicated in response to a register error notification buffer API call 402, as described above in conjunction with FIG. 4. In at least one embodiment, an unregister error notification buffer API call 502 is to cause one or more circuits in a processor to cause or otherwise perform an API to indicate one or more memory regions to no longer be polled for error information indicating one or more errors from one or more accelerators within a heterogeneous processor. In at least one embodiment, an unregister error notification buffer API call 502 is to cause one or more circuits in a processor to cause or otherwise perform an API to indicate one or more buffers in memory to no longer be polled for error information indicating one or more errors from one or more accelerators within a heterogeneous processor by unregistering said one or more buffers with a parallel computing environment, such as CUDA. In at least one embodiment, an unregister error notification buffer API call 502 is to cause one or more circuits in a processor to cause or otherwise perform an API to indicate one or more buffers in memory of a central processing unit (CPU) to no longer be polled for error information indicating one or more errors from one or more accelerators within a heterogeneous processor. In at least one embodiment, an unregister error notification buffer API call 502 is to cause one or more circuits in a processor to cause or otherwise perform an API to indicate one or more buffers in memory of one or more parallel processing units (PPUs), such as graphics processing units (GPUs), to no longer be polled for error information indicating one or more errors from one or more accelerators within a heterogeneous processor.

In at least one embodiment, an unregister error notification buffer API call 502 is to cause one or more processors in a system to perform an API to no longer poll one or more errors from one or more accelerators within a heterogeneous processor. In at least one embodiment, an unregister error notification buffer API call 502 is to cause one or more processors in a system to perform an API to no longer poll one or more errors from one or more accelerators within a heterogeneous processor by unregistering one or more memory regions, such as buffers, usable to poll said one or more errors by a parallel computing environment, such as CUDA. In at least one embodiment, an unregister error notification buffer API call 502 is to cause one or more processors in a system to perform an API to stop polling for one or more errors from one or more accelerators within a heterogeneous processor. In at least one embodiment, an unregister error notification buffer API call 502 is to cause one or more processors in a system to perform an API to stop polling for one or more errors from one or more accelerators within a heterogeneous processor by unregistering one or more buffers usable for checking error information generated by said one or more accelerators within a heterogenous processor in one or more memory regions, where said one or more buffers are indicated in response to a register error notification buffer API call 402, as described above in conjunction with FIG. 4. In at least one embodiment, an unregister error notification buffer API call 502 is to cause one or more processors in a system to perform an API to indicate one or more memory regions to no longer be polled for error information indicating one or more errors from one or more accelerators within a heterogeneous processor. In at least one embodiment, an unregister error notification buffer API call 502 is to cause one or more processors in a system to perform an API to indicate one or more buffers in memory to no longer be polled for error information indicating one or more errors from one or more accelerators within a heterogeneous processor. In at least one embodiment, an unregister error notification buffer API call 502 is to cause one or more processors in a system to perform an API to indicate one or more buffers in memory of a central processing unit (CPU) to no longer be polled for error information indicating one or more errors from one or more accelerators within a heterogeneous processor. In at least one embodiment, an unregister error notification buffer API call 502 is to cause one or more processors in a system to perform an API to indicate one or more buffers in memory of one or more parallel processing units (PPUs), such as graphics processing units (GPUs), to no longer be polled for error information indicating one or more errors from one or more accelerators within a heterogeneous processor.

In at least one embodiment, an unregister error notification buffer API call 502 receives, when invoked, one or more parameters 504, 506, 508 to indicate information about operations to be performed. In at least one embodiment, an unregister error notification buffer API call 502 receives, when invoked, one or more parameters 504, 506, 508 to indicate information about instructions to be performed. In at least one embodiment, an unregister error notification buffer API call 502 receives, when invoked, one or more parameters 504, 506, 508 to indicate information about memory to be unregistered from a parallel computing environment. In at least one embodiment, an unregister error notification buffer API call 502 receives, when invoked, one or more parameters 504, 506, 508 to indicate information about memory to be unregistered from a parallel computing environment to no longer store error information to be polled for one or more errors from one or more accelerators within a heterogeneous processor.

In at least one embodiment, an unregister error notification buffer API call 502 receives, as input, parameters 504, 506, 508 comprising an array of buffers 504. In at least one embodiment, an array of buffers 504 is a set comprising one or more indicators of one or more buffers in memory, as described above. In at least one embodiment, an array of buffers 504 is data comprising information indicating memory to be unregistered from a parallel computing environment such that said memory is no longer to be usable to store error information, such as a CPU and/or GPU memory. In at least one embodiment, an array of buffers 504 is data comprising information indicating memory to be unregistered from a parallel computing environment such that said memory is no longer to be usable to store error information about one or more accelerators within a heterogeneous processor, such as a CPU and/or GPU memory. In at least one embodiment, an array of buffers 504 is data comprising information indicating memory to no longer store one or more errors generated by one or more accelerators within a heterogeneous processor, such as a CPU and/or GPU memory. In at least one embodiment, an array of buffers 504 is data comprising information indicating one or more buffers in memory to no longer be polled for one or more errors from one or more accelerators within a heterogeneous processor. In at least one embodiment, an array of buffers 504 is data comprising an array of memory locations to no longer store error information generated by one or more accelerators within a heterogeneous processor. In at least one embodiment, an array of buffers 504 is data comprising an array of memory locations to no longer be pollable to identify one or more errors generated by one or more accelerators within a heterogeneous processor. In at least one embodiment, an array of buffers 504 parameter is a pointer. In at least one embodiment, an array of buffers 504 parameter is a data structure comprising one or more buffers. In at least one embodiment, an array of buffers 504 parameter is a pointer to a data structure, such as described below. In at least one embodiment, an array of buffers 504 parameter is any other data or type of data usable to identify one or more buffers as further described herein.

In at least one embodiment, an unregister error notification buffer API call 502 receives, as input, parameters 504, 506, 508 comprising a number of buffers 506 parameter. In at least one embodiment, a number of buffers 506 parameter is data comprising information to indicate a number of elements indicated by an array of buffers 504 parameter described above. In at least one embodiment, a number of buffers 506 parameter is data comprising information to indicate a quantity of buffers indicated by an array of buffers 504 parameter. In at least one embodiment, a number of buffers 506 parameter is data comprising information to indicate a quantity of buffers to be unregistered from a parallel computing environment such that said buffers are to no longer be polled for error information. In at least one embodiment, a number of buffers 506 parameter is data comprising information to indicate a quantity of buffers to be unregistered from a parallel computing environment such that said buffers are no longer pollable for error information generated by one or more accelerators within a heterogeneous processor.

In at least one embodiment, an unregister error notification buffer API call 502 receives, as input, parameters 504, 506, 508 comprising other parameters 508. In at least one embodiment, other parameters 508 are data comprising information to indicate any other information usable by an API in response to an unregister error notification buffer API call 502. In at least one embodiment, other parameters 508 comprise information to indicate any other information usable to perform and/or configure to be performed one or more operations in response to an unregister error notification buffer API call 502.

In at least one embodiment, an unregister error notification buffer API call 502, if invoked, causes an API 108 to unregister one or more memory regions, such as buffers, from a parallel computing environment 106, such that said one or more memory regions are no longer usable to receive and/or store error information. In at least one embodiment, an unregister error notification buffer API call 502, if invoked, causes an API 108 to unregister one or more memory regions, such as buffers, from a parallel computing environment 106, such that said one or more memory regions are no longer usable to receive and/or store error information to be polled one or more errors from one or more accelerators within a heterogeneous processor. In at least one embodiment, an unregister error notification buffer API call 502, if invoked, causes an API 108 to indicate memory to no longer be polled for one or more errors from one or more accelerators within a heterogeneous processor. In at least one embodiment, an unregister error notification buffer API call 502, if invoked, causes an API 108 to indicate one or more buffers in memory to no longer be polled for one or more errors from one or more accelerators within a heterogeneous processor. In at least one embodiment, an unregister error notification buffer API call 502, if invoked, causes an API 108 in a parallel computing environment 106, such as compute uniform device architecture (CUDA), to no longer poll one or more errors from one or more accelerators within a heterogeneous processor. In at least one embodiment, an unregister error notification buffer API call 502, if invoked, causes an API 108 in a parallel computing environment 106, such as CUDA, to indicate memory to no longer be polled for one or more errors from one or more accelerators within a heterogeneous processor. In at least one embodiment, an API 108 comprises instructions that, if performed, cause one or more buffers to be no longer be polled for error information generated by one or more accelerators within heterogeneous processors. In at least one embodiment, instructions to indicate memory to be unregistered and no longer polled for error information generated by one or more accelerators in a heterogeneous processor are to be performed in response to an unregister error notification buffer API call 502, as described above. In at least one embodiment, example software code indicating an unregister error notification buffer API call 502 in a parallel computing environment 106, such as CUDA, is as follows:

```
/**
 * Unregisters external error notification buffers from the current CUDA instance.
 *
 * - param[in] ptr - Array of buffers to be unregistered.
 *
 * - param [in] numBuffers - Number of buffers to be unregistered.
 *
 * - Returns CUDA_SUCCESS on success, otherwise it returns an appropriate error.
 */
CUresult cuSocketUnregisterExternalErrorNotificationBuffers(
    const cuSocketExternalErrorBuffer *buf,
    unsigned int numBuffers,
    unsigned int flags
);
``` longer be polled for one or more errors from one or more accelerators within a heterogeneous processor. In at least one embodiment, an unregister error notification buffer API call 502, if invoked, causes an API 108 in a parallel computing environment 106, such as CUDA, to indicate one or more buffers in memory to no longer be polled for one or more errors from one or more accelerators within a heterogeneous processor.

In at least one embodiment, in response to an unregister error notification buffer API call 502, an API 108, if performed, is to cause one or more processors to perform an unregister error notification buffer API return 510. In at least one embodiment, an unregister error notification buffer API return 510 is a set of instructions that, if performed, generate and/or indicate one or more data values in response to an unregister error notification buffer API call 502. In at least one embodiment, an unregister error notification buffer API return 510 indicates a success identifier 512. In at least one embodiment, a success identifier 512 is data comprising any value to indicate success or successful operation of an unregister error notification buffer API call 502. In at least one embodiment, an unregister error notification buffer API return 510 indicates an error identifier 514. In at least one embodiment, an error identifier 514 is data comprising any value to indicate failure or failed operation of an unregister error notification buffer API call 502. In at least one embodiment, an error identifier 514 comprises information indicating one or more specific types of errors generated as a result of or in response to an unregister error notification buffer API call 502. In at least one embodiment, an error identifier 514 comprises information indicating one or more other data values generated in response to or as a result of an unregister error notification buffer API call 502.

Figure 6:
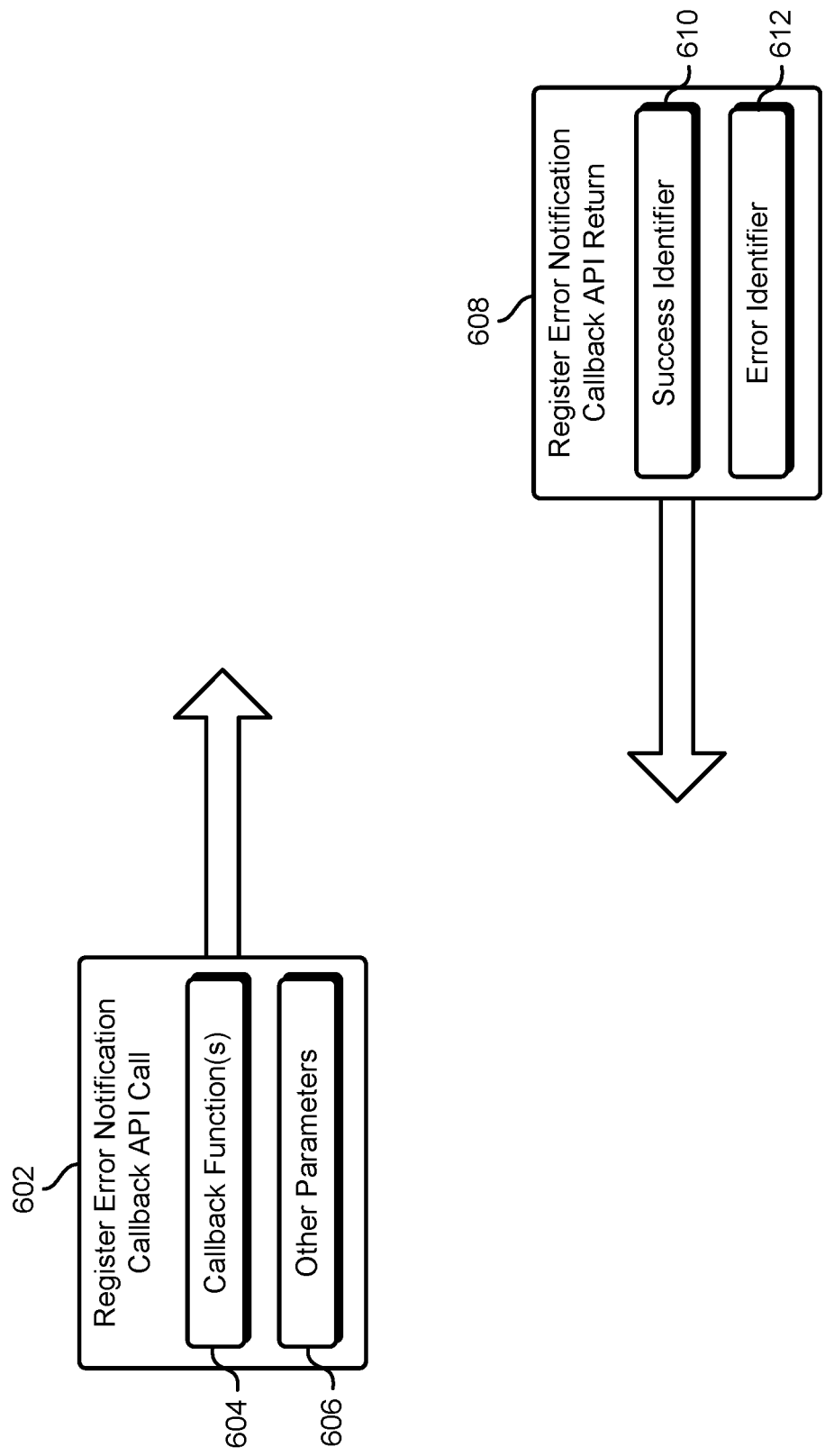
FIG. 6 illustrates an API to indicate one or more sequences of instructions to be performed in response to one or more errors generated by one or more accelerators within a heterogeneous processor, in accordance with at least one embodiment.

In at least one embodiment, an API 108 comprises instructions that, if performed, cause one or more buffers to unregister one or more buffers from a parallel computing environment 106, where said one or more buffers are usable to store error information to be generated by one or more accelerators within heterogeneous processors. In at least one FIG. 6 illustrates an application programming interface (API) 602 to indicate one or more sequences of instructions to be performed in response to one or more errors generated by one or more accelerators within a heterogeneous processor, in accordance with at least one embodiment. In at least one embodiment, an API 602, if performed, is to cause a parallel computing environment 106 to register one or more callback functions to be performed to handle one or more errors from one or more accelerators within a heterogeneous processor. In at least one embodiment, an API 602 is to identify one or more error handlers, such as callback functions, to handle one or more errors from one or more accelerators within a heterogeneous processor. In at least one embodiment, a callback function or callback is a set of instructions that, if performed, cause one or more operations to be performed in response to one or more events, such as detection of errors through polling, as described above in conjunction with FIG. 4.

In at least one embodiment, an API 602 is a set of instructions that, if performed, cause one or more processors to perform one or more functions in response to one or more API calls 602. In at least one embodiment, an API call 602 is a set of instructions that, if performed, cause one or more processors to perform an API. In at least one embodiment, an API call 602 is a function call. In at least one embodiment, an API call 602 is a software function that is to be invoked by one or more software programs. In at least one embodiment, in response to an API call 602, one or more processors are to perform a set of instructions and then return 608. In at least one embodiment, a return 608 is a change of control flow from an API 602 to a software program after invocation of said API 602. In at least one embodiment, a return 608 causes one or more data values 610, 612 to be transmitted to memory accessible by one or more software programs.

In at least one embodiment, an API and/or API call 602 is a register error notification callback API call 602. In at least one embodiment, a register error notification callback API call 602 is a set of software instructions that, if performed by one or more processors, cause one or more processors to indicate one or more sets of instructions, such as those of one or more callback functions, to be performed in response to an event, such as detection of an error through polling or otherwise. In at least one embodiment, a register error notification callback API call 602 is a set of software instructions that, if performed by one or more processors, cause one or more processors to indicate one or more callback functions to be performed in response to one or more errors generated by one or more accelerators within a heterogeneous processor. In at least one embodiment, a register error notification callback API call 602 is a set of software instructions that, if performed by one or more processors, cause one or more processors to use an API to identify one or more error handlers, such as callback functions, to handle one or more errors from one or more accelerators within a heterogeneous processor. In at least one embodiment, a register error notification callback API call 602 is a set of software instructions that, if performed by one or more processors, cause one or more processors to use an API to indicate one or more callback functions to be performed in response to one or more errors from one or more accelerators within a heterogeneous processor. In at least one embodiment, a register error notification callback API call 602 is a set of software instructions that, if performed by one or more processors, cause one or more processors to use an API to indicate to a parallel computing environment, such as compute uniform device architecture (CUDA), one or more callback functions to be performed in response to one or more errors from one or more accelerators within a heterogeneous processor. In at least one embodiment, a register error notification callback API call 602 is a set of software instructions that, if performed by one or more processors, cause one or more processors to use an API to register, to a parallel computing environment, one or more callback functions to be performed in response to one or more errors from one or more accelerators within a heterogeneous processor. In at least one embodiment, a register error notification callback API call 602 is a set of software instructions that, if performed by one or more processors, cause one or more processors to use an API to register, to a parallel computing environment, one or more error handlers to handle one or more errors from one or more accelerators within a heterogeneous processor. In at least one embodiment, a register error notification callback API call 602 is a set of software instructions that, if performed by one or more processors, cause one or more processors to use an API to identify, to a parallel computing environment, one or more callback functions or other error handlers to be performed in response to one or more errors from one or more accelerators within a heterogeneous processor. In at least one embodiment, an error handler is a set of software instructions to be performed in response to one or more errors, such as errors generated by one or more accelerators within a heterogeneous processor.

In at least one embodiment, a register error notification callback API call 602, if invoked by one or more software programs, causes an API to indicate one or more sets of instructions, such as those of one or more callback functions, to be performed in response to an event, such as detection of an error through polling or otherwise. In at least one embodiment, a register error notification callback API call 602, if invoked by one or more software programs, causes an API to indicate one or more callback functions to be performed in response to one or more errors generated by one or more accelerators within a heterogeneous processor. In at least one embodiment, a register error notification callback API call 602, if invoked by one or more software programs, causes an API to identify one or more error handlers, such as callback functions, to handle one or more errors from one or more accelerators within a heterogeneous processor. In at least one embodiment, a register error notification callback API call 602, if invoked by one or more software programs, causes an API to indicate one or more callback functions to be performed in response to one or more errors from one or more accelerators within a heterogeneous processor. In at least one embodiment, a register error notification callback API call 602, if invoked by one or more software programs, causes an API to indicate to a parallel computing environment, such as CUDA, one or more callback functions to be performed in response to one or more errors from one or more accelerators within a heterogeneous processor. In at least one embodiment, a register error notification callback API call 602, if invoked by one or more software programs, causes an API to register, to a parallel computing environment, one or more callback functions to be performed in response to one or more errors from one or more accelerators within a heterogeneous processor. In at least one embodiment, a register error notification callback API call 602, if invoked by one or more software programs, causes an API to register, to a parallel computing environment, one or more error handlers to handle one or more errors from one or more accelerators within a heterogeneous processor. In at least one embodiment, a register error notification callback API call 602, if invoked by one or more software programs, causes an API to identify, to a parallel computing environment, one or more callback functions or other error handlers to be performed in response to one or more errors from one or more accelerators within a heterogeneous processor.

In at least one embodiment, a register error notification callback API call 602 is to cause one or more circuits in a processor to cause or otherwise perform an API to indicate one or more sets of instructions, such as those of one or more callback functions, to be performed in response to an event, such as detection of an error through polling or otherwise. In at least one embodiment, a register error notification callback API call 602 is to cause one or more circuits in a processor to cause or otherwise perform an API to indicate one or more callback functions to be performed in response to one or more errors generated by one or more accelerators within a heterogeneous processor. In at least one embodiment, a register error notification callback API call 602 is to cause one or more circuits in a processor to cause or otherwise perform an API to identify one or more error handlers, such as callback functions, to handle one or more errors from one or more accelerators within a heterogeneous processor. In at least one embodiment, a register error notification callback API call 602 is to cause one or more circuits in a processor to cause or otherwise perform an API to indicate one or more callback functions to be performed in response to one or more errors from one or more accelerators within a heterogeneous processor. In at least one embodiment, a register error notification callback API call 602 is to cause one or more circuits in a processor to cause or otherwise perform an API to indicate to a parallel computing environment, such as CUDA, one or more callback functions to be performed in response to one or more errors from one or more accelerators within a heterogeneous processor. In at least one embodiment, a register error notification callback API call 602 is to cause one or more circuits in a processor to cause or otherwise perform an API to register, to a parallel computing environment, one or more callback functions to be performed in response to one or more errors from one or more accelerators within a heterogeneous processor. In at least one embodiment, a register error notification callback API call 602 is to cause one or more circuits in a processor to cause or otherwise perform an API to register, to a parallel computing environment, one or more error handlers to handle one or more errors from one or more accelerators within a heterogeneous processor. In at least one embodiment, a register error notification callback API call 602 is to cause one or more circuits in a processor to cause or otherwise perform an API to identify, to a parallel computing environment, one or more callback functions or other error handlers to be performed in response to one or more errors from one or more accelerators within a heterogeneous processor.

In at least one embodiment, a register error notification callback API call 602 is to cause one or more processors in a system to perform an API to indicate one or more sets of instructions, such as those of one or more callback functions, to be performed in response to an event, such as detection of an error through polling or otherwise. In at least one embodiment, a register error notification callback API call 602 is to cause one or more processors in a system to perform an API to indicate one or more callback functions to be performed in response to one or more errors generated by one or more accelerators within a heterogeneous processor. In at least one embodiment, a register error notification callback API call 602 is to cause one or more processors in a system to perform an API to identify one or more error handlers, such as callback functions, to handle one or more errors from one or more accelerators within a heterogeneous processor. In at least one embodiment, a register error notification callback API call 602 is to cause one or more processors in a system to perform an API to indicate one or more callback functions to be performed in response to one or more errors from one or more accelerators within a heterogeneous processor. In at least one embodiment, a register error notification callback API call 602 is to cause one or more processors in a system to perform an API to indicate to a parallel computing environment, such as CUDA, one or more callback functions to be performed in response to one or more errors from one or more accelerators within a heterogeneous processor. In at least one embodiment, a register error notification callback API call 602 is to cause one or more processors in a system to perform an API to register, to a parallel computing environment, one or more callback functions to be performed in response to one or more errors from one or more accelerators within a heterogeneous processor. In at least one embodiment, a register error notification callback API call 602 is to cause one or more processors in a system to perform an API to register, to a parallel computing environment, one or more error handlers to handle one or more errors from one or more accelerators within a heterogeneous processor. In at least one embodiment, a register error notification callback API call 602 is to cause one or more processors in a system to perform an API to identify, to a parallel computing environment, one or more callback functions or other error handlers to be performed in response to one or more errors from one or more accelerators within a heterogeneous processor.

In at least one embodiment, a register error notification callback API call 602 receives, when invoked, one or more parameters 604, 606 to indicate information about operations to be performed. In at least one embodiment, a register error notification callback API call 602 receives, when invoked, one or more parameters 604, 606 to indicate information about instructions to be performed.

In at least one embodiment, a register error notification callback API call 602 receives, as input, parameters 604, 606 comprising one or more callback functions 604. In at least one embodiment, one or more callback functions 604 is data comprising information usable to identify one or more error handlers to handle one or more errors from one or more accelerators within a heterogeneous processor. In at least one embodiment, one or more callback functions 604 is data comprising information to indicate one or more sets of instructions to be performed in response to one or more errors from one or more accelerators within a heterogeneous processor. In at least one embodiment, one or more callback functions 604 is data to indicate one or more error handlers. In at least one embodiment, one or more callback functions 604 is data to indicate one or more callback functions. In at least one embodiment, one or more callback functions 604 is data comprising one or more memory addresses. In at least one embodiment, one or more callback functions 604 is data comprising one or more pointers. In at least one embodiment, one or more callback functions 604 is data to indicate any other information about one or more error handlers to handle one or more errors from one or more accelerators within a heterogenous processor, such as various data structures further described herein. In at least one embodiment, one or more callback functions 604 comprise one or more CUDA pointers or any other type of pointer further described herein.

In at least one embodiment, a register error notification callback API call 602 receives, as input, parameters 604, 606 comprising other parameters 606. In at least one embodiment, other parameters 606 are data comprising information to indicate any other information usable by an API in response to a register error notification callback API call 602. In at least one embodiment, other parameters 606 comprise information to indicate one or more flags usable to configure one or more operations in response to a register error notification callback API call 602. In at least one embodiment, other parameters 606 comprise information to indicate any other information usable to perform and/or configure to be performed one or more operations in response to a register error notification callback API call 602.

In at least one embodiment, a register error notification callback API call 602, if invoked, causes an API 108 to register one or more callback functions with a parallel computing environment 106, such as CUDA, to be performed in response to one or more errors. In at least one embodiment, a register error notification callback API call 602, if invoked, causes an API 108 to register one or more callback functions with a parallel computing environment 106, such as CUDA, to be performed in response to one or more errors from one or more accelerators within a heterogeneous processor. In at least one embodiment, a register error notification callback API call 602, if invoked, causes an API 108 to register one or more error handlers with a parallel computing environment 106, such as CUDA, to be performed in response to one or more errors. In at least one embodiment, a register error notification callback API call 602, if invoked, causes an API 108 to register one or more error handlers with a parallel computing environment 106, such as CUDA, to be performed in response to one or more errors from one or more accelerators within a heterogeneous processor.

In at least one embodiment, in response to a register error notification callback API call 602, an API 108, if performed, is to cause one or more processors to perform a register error notification callback API return 608. In at least one embodiment, a register error notification callback API return 608 is a set of instructions that, if performed, generate and/or indicate one or more data values in response to a register error notification callback API call 602. In at least one embodiment, a register error notification callback API return 608 indicates a success identifier 610. In at least one embodiment, a success identifier 610 is data comprising any value to indicate success or successful operation of a register error notification callback API call 602. In at least one embodiment, a register error notification callback API return 608 indicates an error identifier 612. In at least one embodiment, an error identifier 612 is data comprising any value to indicate failure or failed operation of a register error notification callback API call 602. In at least one embodiment, an error identifier 612 comprises information indicating one or more specific types of errors generated as a result of or in response to a register error notification callback API call 602. In at least one embodiment, an error identifier 612 comprises information indicating one or more other data values generated in response to or as a result of a register error notification callback API call 602.

In at least one embodiment, in order to specify one or more callback functions, such as one or more error handlers, to handle one or more errors from one or more accelerators within a heterogeneous processor, a data structure of an API 108 is to be used. In at least one embodiment, in order to specify one or more callback functions, such as one or more error handlers, to handle one or more errors from one or more accelerators within a heterogeneous processor, a function pointer of an API 108 is to be used. In at least one embodiment, in order to specify one or more callback functions, such as one or more error handlers, to handle one or more errors from one or more accelerators within a heterogeneous processor, any other type of data of an API 108 to indicate one or more sets of software instructions is to be used. In at least one embodiment, example software code indicating one or more callback functions, such as one or more error handlers, to be performed in response to one or more errors generated by one or more accelerators within heterogeneous processors is as follows:

```
/**
 * Callback function signature for interpreting error buffers.
 */
typedef CUresult (*cuSocketErrorCallback)(void *data);
```

In at least one embodiment, an API 108 comprises instructions that, if performed, cause one or more operations or instructions to be performed in response to one or more errors from one or more accelerators within a heterogeneous processor. In at least one embodiment, an API 108 comprises instructions that, if performed, register one or more callback functions to be performed in response to one or more errors from one or more accelerators within a heterogeneous processor. In at least one embodiment, an API 108 comprises instructions that, if performed, identify one or more error handlers to handle one or more errors from one or more accelerators within a heterogeneous processor. In at least one embodiment, instructions to cause one or more operations or instructions to be registered with a parallel computing environment 106, such as CUDA, or to be identified to handle one or more errors from one or more accelerators within a heterogeneous processor, are to be performed in response to a register error notification callback API call 602, as described above. In at least one embodiment, example software code indicating a register error notification callback API call 602 in a parallel computing environment 106, such as CUDA, is as follows:

```
/**
 * Registers external error notification callback to the current CUDA instance.
 *
 * - param[in] callback - Callback function to be invoked for checking errors.
 *
 * - Returns CUDA_SUCCESS on success, otherwise it returns an appropriate error.
 */
CUresult cuSocketRegisterExternalErrorNotification(
    cuSocketErrorCallback callback,
    unsigned int flags
);
```

Figure 7:
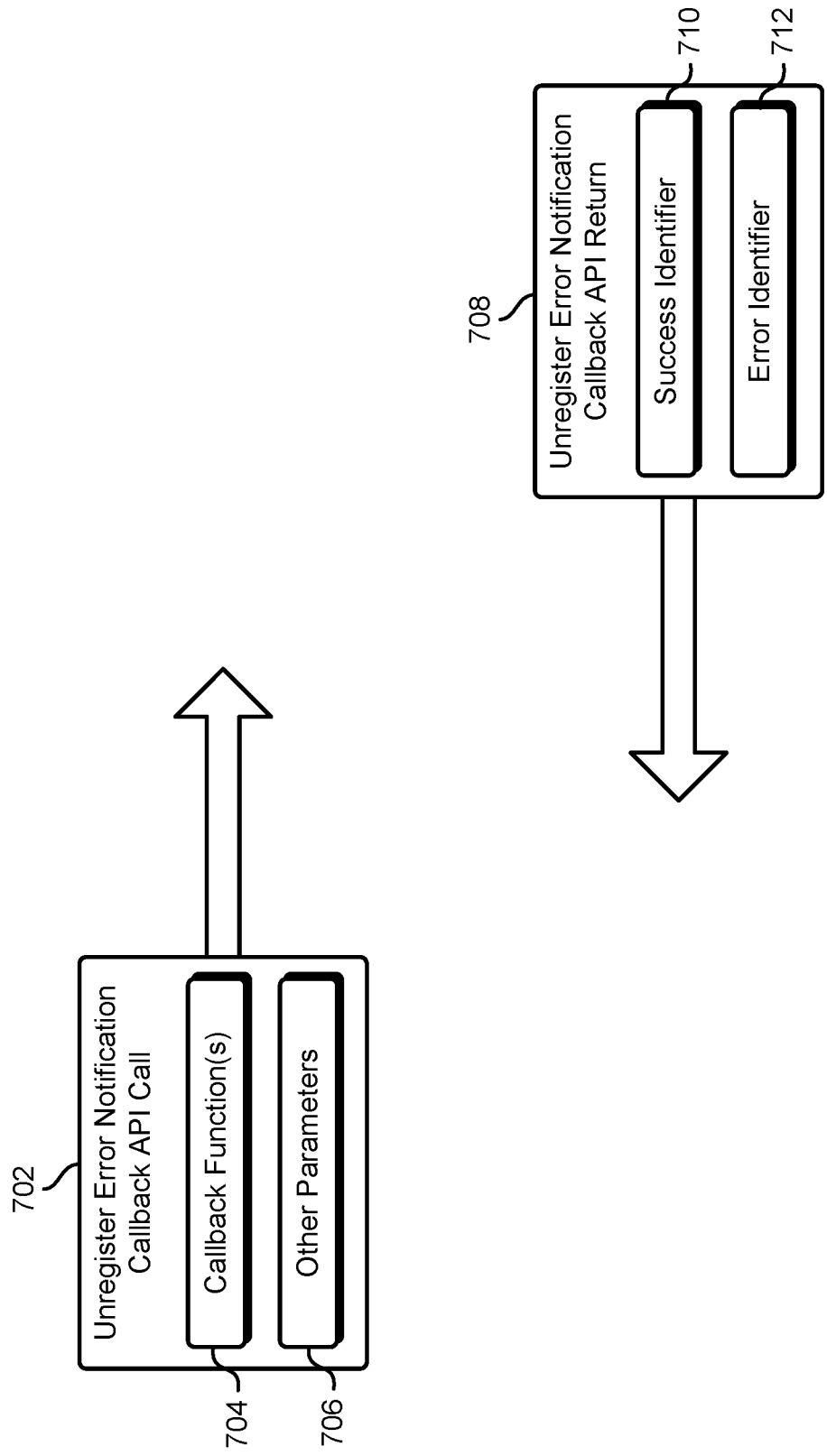
FIG. 7 illustrates an API to indicate one or more sequences of instructions to no longer be performed in response to one or more errors generated by one or more accelerators within a heterogeneous processor, in accordance with at least one embodiment.

FIG. 7 illustrates an application programming interface (API) 702 to indicate one or more sequences of instructions to no longer be performed in response to one or more errors generated by one or more accelerators within a heterogeneous processor, in accordance with at least one embodiment. In at least one embodiment, an API 702, if performed, is to cause a parallel computing environment 106 to unregister one or more callback functions to no longer be performed to handle one or more errors from one or more accelerators within a heterogeneous processor. In at least one embodiment, an API 702 is to cause one or more error handlers, such as callback functions, to no longer handle one or more errors from one or more accelerators within a heterogeneous processor.

In at least one embodiment, an API 702 is a set of instructions that, if performed, cause one or more processors to perform one or more functions in response to one or more API calls 702. In at least one embodiment, an API call 702 is a set of instructions that, if performed, cause one or more processors to perform an API. In at least one embodiment, an API call 702 is a function call. In at least one embodiment, an API call 702 is a software function that is to be invoked by one or more software programs. In at least one embodiment, in response to an API call 702, one or more processors are to perform a set of instructions and then return 708. In at least one embodiment, a return 708 is a change of control flow from an API 702 to a software program after invocation of said API 702. In at least one embodiment, a return 708 causes one or more data values 710, 712 to be transmitted to memory accessible by one or more software programs.

In at least one embodiment, an API and/or API call 702 is an unregister error notification callback API call 702. In at least one embodiment, an unregister error notification callback API call 702 is a set of software instructions that, if performed by one or more processors, cause one or more processors to indicate one or more sets of instructions, such as those of one or more callback functions, to no longer be performed in response to an event, such as detection of an error through polling or otherwise. In at least one embodiment, an unregister error notification callback API call 702 is a set of software instructions that, if performed by one or more processors, cause one or more processors to indicate one or more callback functions to no longer be performed in response to one or more errors generated by one or more accelerators within a heterogeneous processor. In at least one embodiment, an unregister error notification callback API call 702 is a set of software instructions that, if performed by one or more processors, cause one or more processors to use an API to identify one or more error handlers, such as callback functions, to no longer handle one or more errors from one or more accelerators within a heterogeneous processor. In at least one embodiment, an unregister error notification callback API call 702 is a set of software instructions that, if performed by one or more processors, cause one or more processors to use an API to indicate one or more callback functions to no longer be performed in response to one or more errors from one or more accelerators within a heterogeneous processor. In at least one embodiment, an unregister error notification callback API call 702 is a set of software instructions that, if performed by one or more processors, cause one or more processors to use an API to indicate to a parallel computing environment, such as compute uniform device architecture (CUDA), one or more callback functions to no longer be performed in response to one or more errors from one or more accelerators within a heterogeneous processor. In at least one embodiment, an unregister error notification callback API call 702 is a set of software instructions that, if performed by one or more processors, cause one or more processors to use an API to unregister, to a parallel computing environment, one or more callback functions to no longer be performed in response to one or more errors from one or more accelerators within a heterogeneous processor. In at least one embodiment, an unregister error notification callback API call 702 is a set of software instructions that, if performed by one or more processors, cause one or more processors to use an API to unregister, to a parallel computing environment, one or more error handlers to no longer handle one or more errors from one or more accelerators within a heterogeneous processor. In at least one embodiment, an unregister error notification callback API call 702 is a set of software instructions that, if performed by one or more processors, cause one or more processors to use an API to identify, to a parallel computing environment, one or more callback functions or other error handlers to no longer be performed in response to one or more errors from one or more accelerators within a heterogeneous processor. In at least one embodiment, an error handler as described or otherwise referenced in conjunction with FIG. 7 is a set of software instructions to be performed in response to one or more errors, such as errors generated by one or more accelerators within a heterogeneous processor.

In at least one embodiment, an unregister error notification callback API call 702, if invoked by one or more software programs, causes an API to indicate one or more sets of instructions, such as those of one or more callback functions, to no longer be performed in response to an event, such as detection of an error through polling or otherwise. In at least one embodiment, an unregister error notification callback API call 702, if invoked by one or more software programs, causes an API to indicate one or more callback functions to no longer be performed in response to one or more errors generated by one or more accelerators within a heterogeneous processor. In at least one embodiment, an unregister error notification callback API call 702, if invoked by one or more software programs, causes an API to identify one or more error handlers, such as callback functions, to no longer handle one or more errors from one or more accelerators within a heterogeneous processor. In at least one embodiment, an unregister error notification callback API call 702, if invoked by one or more software programs, causes an API to indicate one or more callback functions to no longer be performed in response to one or more errors from one or more accelerators within a heterogeneous processor. In at least one embodiment, an unregister error notification callback API call 702, if invoked by one or more software programs, causes an API to indicate to a parallel computing environment, such as CUDA, one or more callback functions to no longer be performed in response to one or more errors from one or more accelerators within a heterogeneous processor. In at least one embodiment, an unregister error notification callback API call 702, if invoked by one or more software programs, causes an API to unregister, to a parallel computing environment, one or more callback functions to no longer be performed in response to one or more errors from one or more accelerators within a heterogeneous processor. In at least one embodiment, an unregister error notification callback API call 702, if invoked by one or more software programs, causes an API to unregister, to a parallel computing environment, one or more error handlers to no longer handle one or more errors from one or more accelerators within a heterogeneous processor. In at least one embodiment, an unregister error notification callback API call 702, if invoked by one or more software programs, causes an API to identify, to a parallel computing environment, one or more callback functions or other error handlers to no longer be performed in response to one or more errors from one or more accelerators within a heterogeneous processor.

In at least one embodiment, an unregister error notification callback API call 702 is to cause one or more circuits in a processor to cause or otherwise perform an API to indicate one or more sets of instructions, such as those of one or more callback functions, to no longer be performed in response to an event, such as detection of an error through polling or otherwise. In at least one embodiment, an unregister error notification callback API call 702 is to cause one or more circuits in a processor to cause or otherwise perform an API to indicate one or more callback functions to no longer be performed in response to one or more errors generated by one or more accelerators within a heterogeneous processor. In at least one embodiment, an unregister error notification callback API call 702 is to cause one or more circuits in a processor to cause or otherwise perform an API to identify one or more error handlers, such as callback functions, to no longer handle one or more errors from one or more accelerators within a heterogeneous processor. In at least one embodiment, an unregister error notification callback API call 702 is to cause one or more circuits in a processor to cause or otherwise perform an API to indicate one or more callback functions to no longer be performed in response to one or more errors from one or more accelerators within a heterogeneous processor. In at least one embodiment, an unregister error notification callback API call 602 is to cause one or more circuits in a processor to cause or otherwise perform an API to indicate to a parallel computing environment, such as CUDA, one or more callback functions to no longer be performed in response to one or more errors from one or more accelerators within a heterogeneous processor. In at least one embodiment, an unregister error notification callback API call 702 is to cause one or more circuits in a processor to cause or otherwise perform an API to unregister, to a parallel computing environment, one or more callback functions to no longer be performed in response to one or more errors from one or more accelerators within a heterogeneous processor. In at least one embodiment, an unregister error notification callback API call 702 is to cause one or more circuits in a processor to cause or otherwise perform an API to unregister, to a parallel computing environment, one or more error handlers to no longer handle one or more errors from one or more accelerators within a heterogeneous processor. In at least one embodiment, an unregister error notification callback API call 702 is to cause one or more circuits in a processor to cause or otherwise perform an API to identify, to a parallel computing environment, one or more callback functions or other error handlers to no longer be performed in response to one or more errors from one or more accelerators within a heterogeneous processor.

In at least one embodiment, an unregister error notification callback API call 702 is to cause one or more processors in a system to perform an API to indicate one or more sets of instructions, such as those of one or more callback functions, to no longer be performed in response to an event, such as detection of an error through polling or otherwise. In at least one embodiment, an unregister error notification callback API call 702 is to cause one or more processors in a system to perform an API to indicate one or more callback functions to no longer be performed in response to one or more errors generated by one or more accelerators within a heterogeneous processor. In at least one embodiment, an unregister error notification callback API call 702 is to cause one or more processors in a system to perform an API to identify one or more error handlers, such as callback functions, to no longer handle one or more errors from one or more accelerators within a heterogeneous processor. In at least one embodiment, an unregister error notification callback API call 702 is to cause one or more processors in a system to perform an API to indicate one or more callback functions to no longer be performed in response to one or more errors from one or more accelerators within a heterogeneous processor. In at least one embodiment, an unregister error notification callback API call 702 is to cause one or more processors in a system to perform an API to indicate to a parallel computing environment, such as CUDA, one or more callback functions to no longer be performed in response to one or more errors from one or more accelerators within a heterogeneous processor. In at least one embodiment, an unregister error notification callback API call 702 is to cause one or more processors in a system to perform an API to unregister, to a parallel computing environment, one or more callback functions to no longer be performed in response to one or more errors from one or more accelerators within a heterogeneous processor. In at least one embodiment, an unregister error notification callback API call 702 is to cause one or more processors in a system to perform an API to unregister, to a parallel computing environment, one or more error handlers to no longer handle one or more errors from one or more accelerators within a heterogeneous processor. In at least one embodiment, an unregister error notification callback API call 702 is to cause one or more processors in a system to perform an API to identify, to a parallel computing environment, one or more callback functions or other error handlers to no longer be performed in response to one or more errors from one or more accelerators within a heterogeneous processor.

In at least one embodiment, an unregister error notification callback API call 702 receives, when invoked, one or more parameters 704, 706 to indicate information about operations to be performed. In at least one embodiment, an unregister error notification callback API call 702 receives, when invoked, one or more parameters 704, 706 to indicate information about instructions to be performed.

In at least one embodiment, an unregister error notification callback API call 702 receives, as input, parameters 704, 706 comprising one or more callback functions 704. In at least one embodiment, one or more callback functions 704 is data comprising information usable to identify one or more error handlers to no longer handle one or more errors from one or more accelerators within a heterogeneous processor. In at least one embodiment, one or more callback functions 704 is data comprising information to indicate one or more sets of instructions to no longer be performed in response to one or more errors from one or more accelerators within a heterogeneous processor. In at least one embodiment, one or more callback functions 704 is data to indicate one or more error handlers. In at least one embodiment, one or more callback functions 704 is data to indicate one or more callback functions. In at least one embodiment, one or more callback functions 704 is data comprising one or more memory addresses. In at least one embodiment, one or more callback functions 704 is data comprising one or more pointers. In at least one embodiment, one or more callback functions 704 is data to indicate any other information about one or more error handlers to no longer handle one or more errors from one or more accelerators within a heterogenous processor, such as various data structures further described herein. In at least one embodiment, one or more callback functions 704 comprise one or more CUDA pointers or any other type of pointer further described herein.

In at least one embodiment, an unregister error notification callback API call 702 receives, as input, parameters 704, 706 comprising other parameters 706. In at least one embodiment, other parameters 706 are data comprising information to indicate any other information usable by an API in response to an unregister error notification callback API call 702. In at least one embodiment, other parameters 706 comprise information to indicate one or more flags usable to configure one or more operations in response to an unregister error notification callback API call 702. In at least one embodiment, other parameters 706 comprise information to indicate any other information usable to perform and/or configure to be performed one or more operations in response to an unregister error notification callback API call 702.

In at least one embodiment, an unregister error notification callback API call 702, if invoked, causes an API 108 to unregister one or more callback functions with a parallel computing environment 106, such as CUDA, such that said one or more callback functions are not to be performed in response to one or more errors. In at least one embodiment, an unregister error notification callback API call 702, if invoked, causes an API 108 to unregister one or more callback functions with a parallel computing environment 106, such as CUDA, such that said one or more callback functions are not to be performed in response to one or more errors from one or more accelerators within a heterogeneous processor. In at least one embodiment, an unregister error notification callback API call 702, if invoked, causes an API 108 to unregister one or more error handlers with a parallel computing environment 106, such as CUDA, such that said one or more error handlers are not to be performed in response to one or more errors. In at least one embodiment, an unregister error notification callback API call 702, if invoked, causes an API 108 to register one or more error handlers with a parallel computing environment 106, such as CUDA, such that said one or more error handlers are not to be performed in response to one or more errors from one or more accelerators within a heterogeneous processor.

In at least one embodiment, in response to an unregister error notification callback API call 702, an API 108, if performed, is to cause one or more processors to perform an unregister error notification callback API return 708. In at least one embodiment, an unregister error notification callback API return 708 is a set of instructions that, if performed, generate and/or indicate one or more data values in response to an unregister error notification callback API call 702. In at least one embodiment, an unregister error notification callback API return 708 indicates a success identifier 710. In at least one embodiment, a success identifier 710 is data comprising any value to indicate success or successful operation of an unregister error notification callback API call 702. In at least one embodiment, an unregister error notification callback API return 708 indicates an error identifier 712. In at least one embodiment, an error identifier 712 is data comprising any value to indicate failure or failed operation of an unregister error notification callback API call 702. In at least one embodiment, an error identifier 712 comprises information indicating one or more specific types of errors generated as a result of or in response to an unregister error notification callback API call 702. In at least one embodiment, an error identifier 712 comprises information indicating one or more other data values generated in response to or as a result of an unregister error notification callback API call 702.

In at least one embodiment, an API 108 comprises instructions that, if performed, cause one or more operations or instructions to no longer be performed in response to one or more errors from one or more accelerators within a heterogeneous processor. In at least one embodiment, an API 108 comprises instructions that, if performed, unregister one or more callback functions to no longer be performed in response to one or more errors from one or more accelerators within a heterogeneous processor. In at least one embodiment, an API 108 comprises instructions that, if performed, identify one or more error handlers to no longer handle one or more errors from one or more accelerators within a heterogeneous processor. In at least one embodiment, instructions to cause one or more operations or instructions to be unregistered with a parallel computing environment 106, such as CUDA, or to be identified to no longer handle one or more errors from one or more accelerators within a heterogeneous processor, are to be performed in response to an unregister error notification callback API call 702, as described above. In at least one embodiment, example software code indicating an unregister error notification callback API call 702 in a parallel computing environment 106, such as CUDA, is as follows:

more accelerators within a heterogeneous processor by a parallel computing environment, in accordance with at least one embodiment. In at least one embodiment, a process 800 begins 802 by one or more processors performing a software program 804 comprising one or more instructions that, if performed, cause said one or more processors and/or one or more other processors, such as graphics processing units (GPUs) and/or one or more accelerators within a heterogeneous processor or heterogeneous processors, to perform one or more computational operations. In at least one embodiment, a software program to be performed 804 by one or more processors comprises one or more instructions that, if performed, cause one or more APIs 108 of a parallel computing environment 106 to be performed, as described above in conjunction with FIGS. 1-7.

In at least one embodiment, when performing a software program 804, one or more processors perform one or more instructions to cause said one or more processors to perform one or more APIs 806 or API calls 806. In at least one embodiment, if one or more processors are not to perform one or more APIs or API calls 806, a process 800 is to determine if performance of one or more instructions of a software program 804 is complete 808, as described below. In at least one embodiment, if one or more processors are to perform one or more API calls 806, said one or more are to determine if said one or more API calls are stream API calls 812, such as a stream operation API call as described above in conjunction with FIG. 2.

In at least one embodiment, if one or more processors, in response to performing one or more instructions, are to determine that one or more API calls are stream API calls 812, said one or more processors are to perform one or more instructions to cause one or more stream APIs to be performed 814 by said one or more processors and/or one or more other processors, such as GPUs and/or accelerators within a heterogeneous processor, as described above in conjunction with FIG. 2. In at least one embodiment, if one or more processors, in response to performing one or more instructions, are to determine that one or more API calls are not stream API calls 812, said one or more processors are to perform one or more instructions that, if performed, cause said one or more processors to determine whether one or more API calls are memory API calls 816, such as a memory operation API call as described above in conjunction with FIG. 3.

In at least one embodiment, if one or more processors, in response to performing one or more instructions, are to determine that one or more API calls are memory API calls 816, said one or more processors are to perform one or more instructions to cause one or more memory APIs to be performed 818 by said one or more processors and/or one or more other processors, such as GPUs and/or accelerators

```
/**
* Unregisters external error notification callback from the current CUDA instance.
*
* - param[in] callback - Callback function to be invoked for checking errors.
*
* - Returns CUDA_SUCCESS on success, otherwise it returns an appropriate error.
*/
CUresult cuSocketUnregisterExternalErrorNotification(
    cuSocketErrorCallback callback,
    unsigned int flags
);
```

Figure 8:
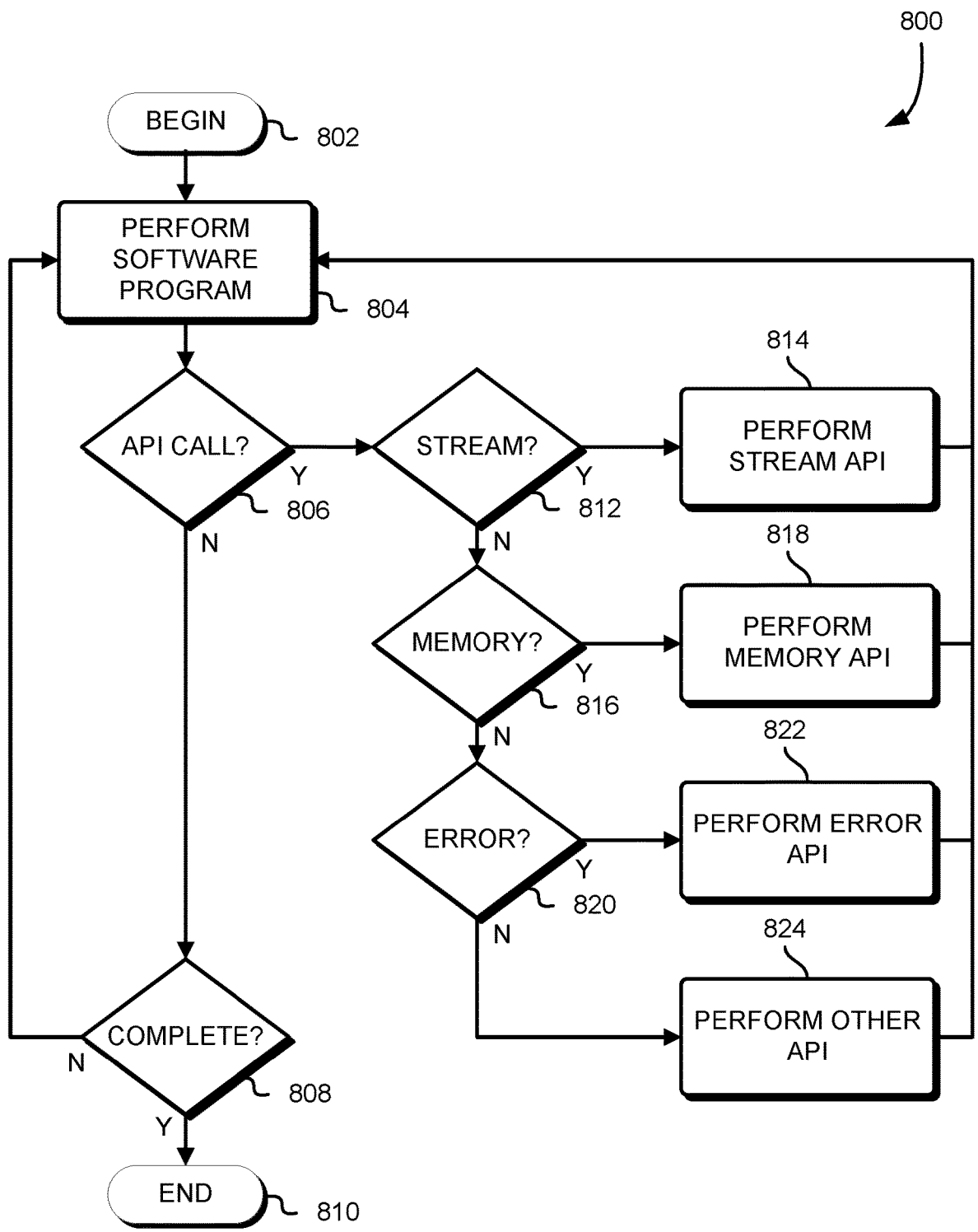
FIG. 8 illustrates a process for performing one or more APIs to one or more accelerators within a heterogeneous processor by a parallel computing environment, in accordance with at least one embodiment.

FIG. 8 illustrates a process 800 for performing one or more application programming interfaces (APIs) to one or within a heterogeneous processor, as described above in conjunction with FIG. 3. In at least one embodiment, if one or more processors, in response to performing one or more instructions, are to determine that one or more API calls are not memory API calls 816, said one or more processors are to perform one or more instructions that, if performed, cause said one or more processors to determine whether one or more API calls are error API calls 820, such as error notification buffer API calls as described above in conjunction with FIGS. 4 and 5, and/or error notification callback API calls as described above in conjunction with FIGS. 6 and 7.

In at least one embodiment, if one or more processors, in response to performing one or more instructions, are to determine that one or more API calls are error API calls 820, said one or more processors are to perform one or more instructions to cause one or more error APIs to be performed 822 by said one or more processors and/or one or more other processors, such as GPUs and/or accelerators within a heterogeneous processor, as described above in conjunction with FIGS. 6 and 7. In at least one embodiment, if one or more processors, in response to performing one or more instructions, are to determine that one or more API calls are not error API calls 820, said one or more processors are to perform one or more instructions that, if performed, cause said one or more processors to perform one or more other APIs 824, such as any API further described herein.

In at least one embodiment, during a process 800 to perform one or more APIs, one or more processors performing a software program 804 are to determine if performance of said software program 804 is complete 808. In at least one embodiment, if one or more processors have completed 808 performing one or more instructions of a software program 804, a process 800 ends 810. In at least one embodiment, if one or more processors have not completed 808 performing one or more instructions of a software program 804, said one or more processors continue performing said one or more instructions and/or one or more other instructions of said software program 804.

In the following description, numerous specific details are set forth to provide a more thorough understanding of at least one embodiment. However, it will be apparent to one skilled in the art that the inventive concepts may be practiced without one or more of these specific details.

Data Center

Figure 9:
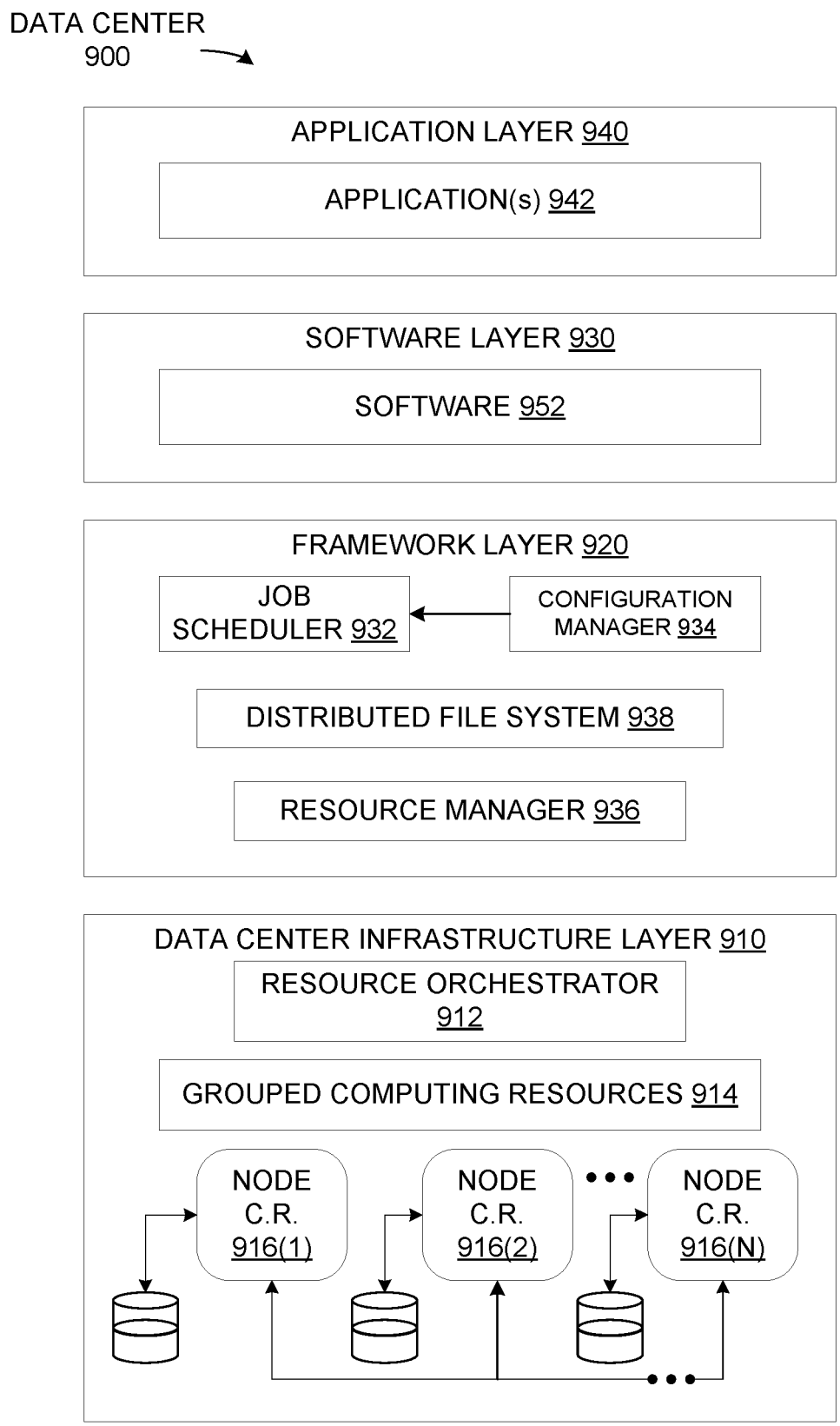
FIG. 9 illustrates an exemplary data center, in accordance with at least one embodiment.

FIG. 9 illustrates an exemplary data center 900, in accordance with at least one embodiment. In at least one embodiment, data center 900 includes, without limitation, a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator 912 may include hardware, software or some combination thereof.

In at least one embodiment, as shown in FIG. 9, framework layer 920 includes, without limitation, a job scheduler 932, a configuration manager 934, a resource manager 936 and a distributed file system 938. In at least one embodiment, framework layer 920 may include a framework to support software 952 of software layer 930 and/or one or more application(s) 942 of application layer 940. In at least one embodiment, software 952 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920, including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 952 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. In at least one or more types of applications may include, without limitation, CUDA applications.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

Computer-Based Systems

The following figures set forth, without limitation, exemplary computer-based systems that can be used to implement at least one embodiment.

Figure 10:
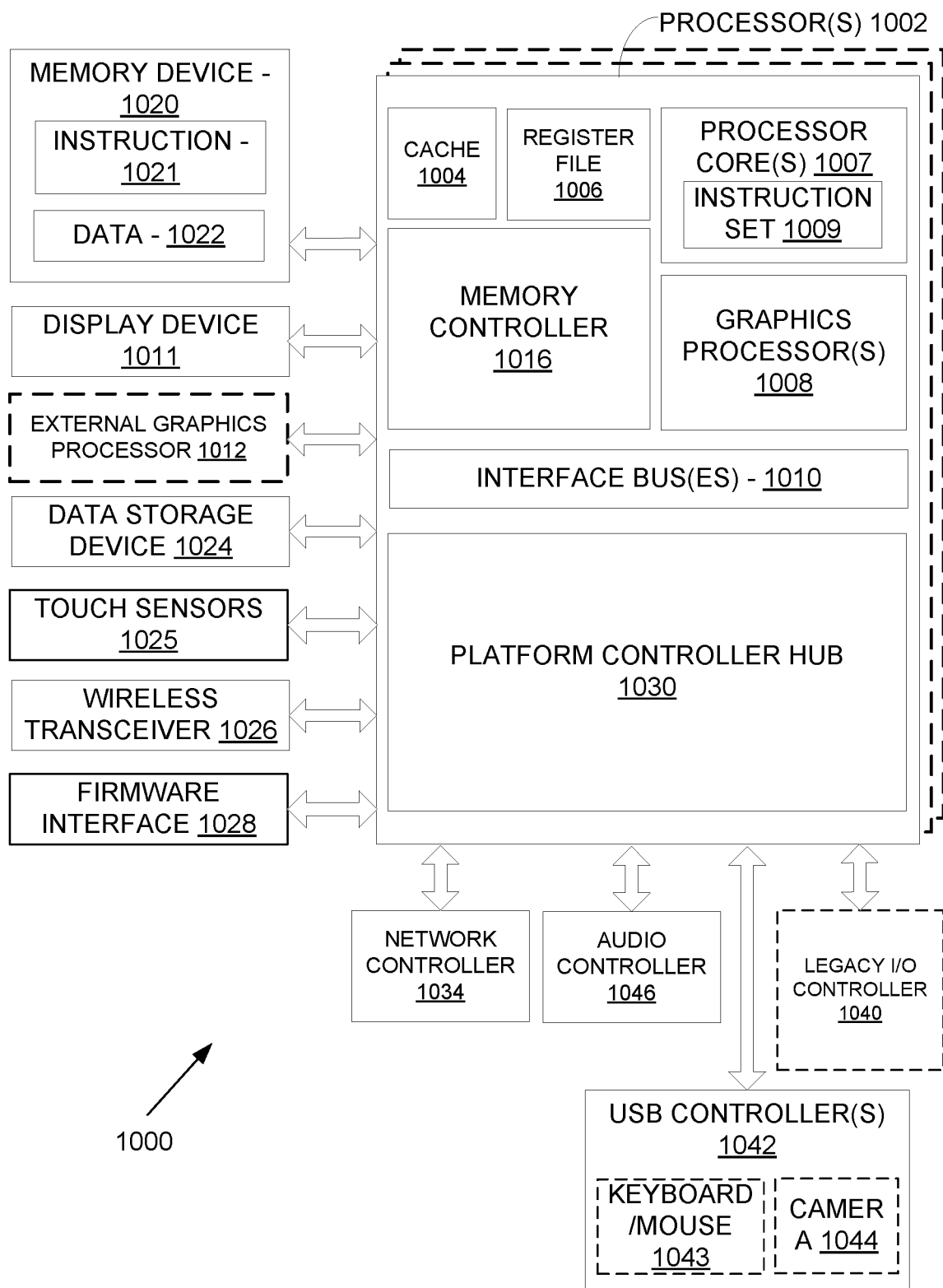
FIG. 10 illustrates a processing system, in accordance with at least one embodiment.

FIG. 10 illustrates a processing system 1000, in accordance with at least one embodiment. In at least one embodiment, processing system 1000 includes one or more processors 1002 and one or more graphics processors 1008, and may be a single processor desktop system, a multiprocessor workstation system, or a server system having a large number of processors 1002 or processor cores 1007. In at least one embodiment, processing system 1000 is a processing platform incorporated within a system-on-a-chip ("SoC") integrated circuit for use in mobile, handheld, or embedded devices.

In at least one embodiment, processing system 1000 is to perform various computational operations, including one or more application programming interfaces (APIs), described above in conjunction with FIGS. 2-7 and/or processes described above in conjunction with FIG. 8. In at least one embodiment, processing system 1000 comprises hardware, including accelerators within heterogeneous processors and/or other components, to perform various computational operations and/or APIs described above in conjunction with FIGS. 2-7 and/or processes described above in conjunction with FIG. 8.

In at least one embodiment, processing system 1000 can include, or be incorporated within a server-based gaming platform, a game console, a media console, a mobile gaming console, a handheld game console, or an online game console. In at least one embodiment, processing system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing ("CISC"), Reduced Instruction Set Computing ("RISC"), or computing via a Very Long Instruction Word ("VLIW"). In at least one embodiment, processor cores 1007 may each process a different instruction set 1009, which may include instructions to facilitate emulation of other instruction sets. In at least one embodiment, processor core 1007 may also include other processing devices, such as a digital signal processor ("DSP").

In at least one embodiment, processor 1002 includes cache memory ('cache") 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level 3 ("L3") cache or Last Level Cache ("LLC")) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in processing system 1000. In at least one embodiment interface bus 1010, in one embodiment, can be a processor bus, such as a version of a Direct Media Interface ("DMI") bus. In at least one embodiment, interface bus 1010 is not limited to a DMI bus, and may include one or more Peripheral Component Interconnect buses (e.g., "PCI," PCI Express ("PCIe")), memory buses, or other types of interface buses. In at least one embodiment processor(s) 1002 include an integrated memory controller 1016 and a platform controller hub 1030. In at least one embodiment, memory controller 1016 facilitates communication between a memory device and other components of processing system 1000, while platform controller hub ("PCH") 1030 provides connections to Input/Output ("I/O") devices via a local I/O bus.

In at least one embodiment, memory device 1020 can be a dynamic random access memory ("DRAM") device, a static random access memory ("SRAM") device, flash memory device, phase-change memory device, or some other memory device having suitable performance to serve as processor memory. In at least one embodiment memory device 1020 can operate as system memory for processing system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display ("HMD") such as a stereoscopic display device for use in virtual reality ("VR") applications or augmented reality ("AR") applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as PCI, or PCIe. In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution ("LTE") transceiver. In at least one embodiment, firmware interface 1028 enables communication with system firmware, and can be, for example, a unified extensible firmware interface ("UEFI"). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, processing system 1000 includes an optional legacy I/O controller 1040 for coupling legacy (e.g., Personal System 2 ("PS/2")) devices to processing system 1000. In at least one embodiment, platform controller hub 1030 can also connect to one or more Universal Serial Bus ("USB") controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, processing system 1000 can include an external memory controller 1016 and platform controller hub 1030, which may be configured as a memory controller hub and peripheral controller hub within a system chipset that is in communication with processor(s) 1002.

Figure 11:
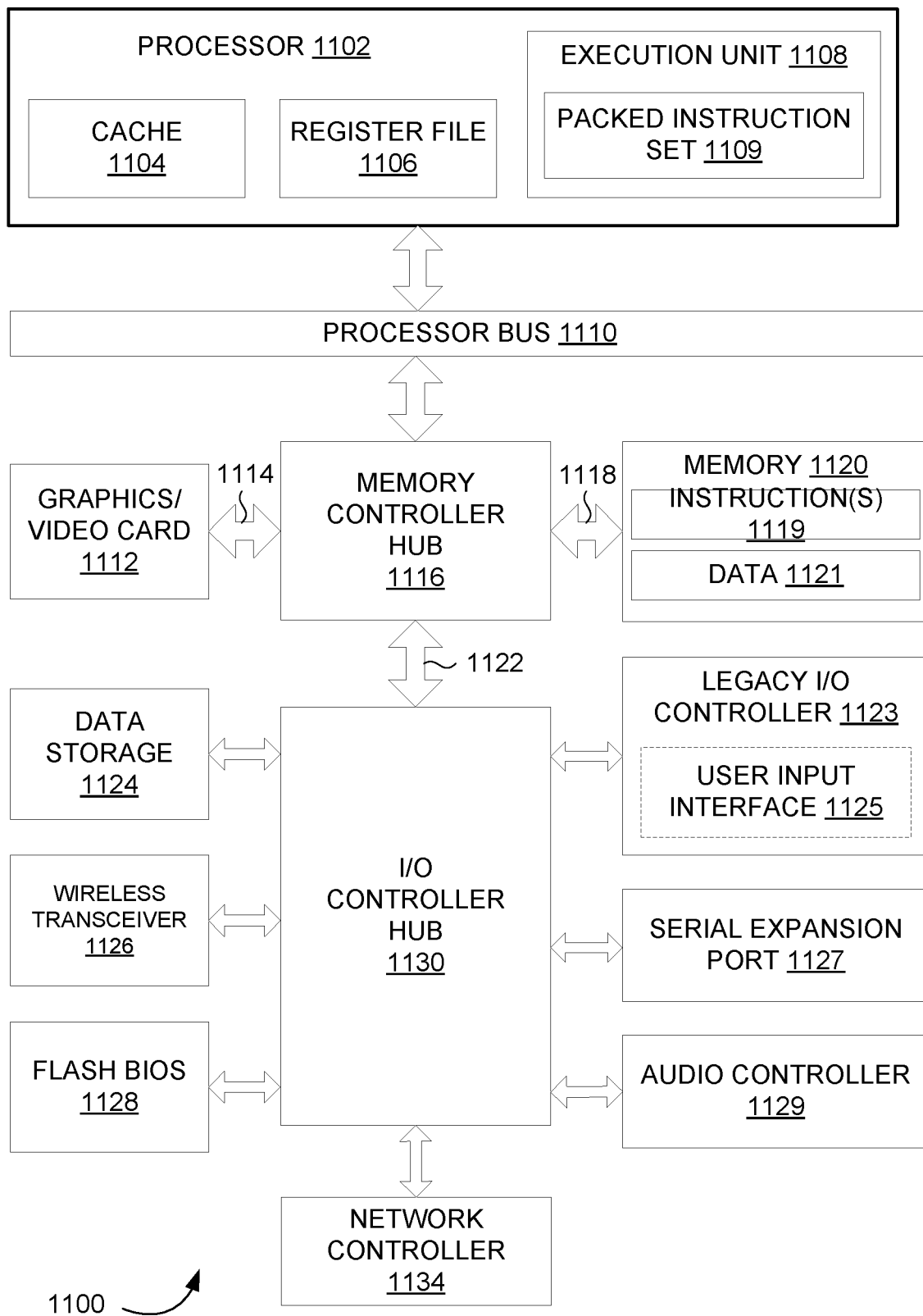
FIG. 11 illustrates a computer system, in accordance with at least one embodiment.

FIG. 11 illustrates a computer system 1100, in accordance with at least one embodiment. In at least one embodiment, computer system 1100 may be a system with interconnected devices and components, an SOC, or some combination. In at least on embodiment, computer system 1100 is formed with a processor 1102 that may include execution units to execute an instruction. In at least one embodiment, computer system 1100 may include, without limitation, a component, such as processor 1102 to employ execution units including logic to perform algorithms for processing data. In at least one embodiment, computer system 1100 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1100 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1100 is to perform various computational operations, including one or more application programming interfaces (APIs), described above in conjunction with FIGS. 2-7 and/or processes described above in conjunction with FIG. 8. In at least one embodiment, computer system 1100 comprises hardware, including accelerators within heterogeneous processors and/or other components, to perform various computational operations and/or APIs described above in conjunction with FIGS. 2-7 and/or processes described above in conjunction with FIG. 8.

In at least one embodiment, computer system 1100 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1100 may include, without limitation, processor 1102 that may include, without limitation, one or more execution units 1108 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1100 is a single processor desktop or server system. In at least one embodiment, computer system 1100 may be a multiprocessor system. In at least one embodiment, processor 1102 may include, without limitation, a CISC microprocessor, a RISC microprocessor, a VLIW microprocessor, a processor implementing a combination of instruction sets, or any other processor device, such as a digital signal processor, for example. In at least one embodiment, processor 1102 may be coupled to a processor bus 1110 that may transmit data signals between processor 1102 and other components in computer system 1100.

In at least one embodiment, processor 1102 may include, without limitation, a Level 1 ("L1") internal cache memory ("cache") 1104. In at least one embodiment, processor 1102 may have a single internal cache or multiple levels of internal cache. In at least one embodiment, cache memory may reside external to processor 1102. In at least one embodiment, processor 1102 may also include a combination of both internal and external caches. In at least one embodiment, a register file 1106 may store different types of data in various registers including, without limitation, integer registers, floating point registers, status registers, and instruction pointer register.

In at least one embodiment, execution unit 1108, including, without limitation, logic to perform integer and floating point operations, also resides in processor 1102. Processor 1102 may also include a microcode ("ucode") read only memory ("ROM") that stores microcode for certain macro instructions. In at least one embodiment, execution unit 1108 may include logic to handle a packed instruction set 1109. In at least one embodiment, by including packed instruction set 1109 in an instruction set of a general-purpose processor 1102, along with associated circuitry to execute instructions, operations used by many multimedia applications may be performed using packed data in a general-purpose processor 1102. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1108 may also be used in microcontrollers, embedded processors, graphics devices, DSPs, and other types of logic circuits. In at least one embodiment, computer system 1100 may include, without limitation, a memory 1120. In at least one embodiment, memory 1120 may be implemented as a DRAM device, an SRAM device, flash memory device, or other memory device. Memory 1120 may store instruction(s) 1119 and/or data 1121 represented by data signals that may be executed by processor 1102.

In at least one embodiment, a system logic chip may be coupled to processor bus 1110 and memory 1120. In at least one embodiment, the system logic chip may include, without limitation, a memory controller hub ("MCH") 1116, and processor 1102 may communicate with MCH 1116 via processor bus 1110. In at least one embodiment, MCH 1116 may provide a high bandwidth memory path 1118 to memory 1120 for instruction and data storage and for storage of graphics commands, data and textures. In at least one embodiment, MCH 1116 may direct data signals between processor 1102, memory 1120, and other components in computer system 1100 and to bridge data signals between processor bus 1110, memory 1120, and a system I/O 1122. In at least one embodiment, system logic chip may provide a graphics port for coupling to a graphics controller. In at least one embodiment, MCH 1116 may be coupled to memory 1120 through high bandwidth memory path 1118 and graphics/video card 1112 may be coupled to MCH 1116 through an Accelerated Graphics Port ("AGP") interconnect 1114.

In at least one embodiment, computer system 1100 may use system I/O 1122 that is a proprietary hub interface bus to couple MCH 1116 to I/O controller hub ("ICH") 1130. In at least one embodiment, ICH 1130 may provide direct connections to some I/O devices via a local I/O bus. In at least one embodiment, local I/O bus may include, without limitation, a high-speed I/O bus for connecting peripherals to memory 1120, a chipset, and processor 1102. Examples may include, without limitation, an audio controller 1129, a firmware hub ("flash BIOS") 1128, a wireless transceiver 1126, a data storage 1124, a legacy I/O controller 1123 containing a user input interface 1125 and a keyboard interface, a serial expansion port 1127, such as a USB, and a network controller 1134. Data storage 1124 may comprise a hard disk drive, a floppy disk drive, a CD-ROM device, a flash memory device, or other mass storage device.

In at least one embodiment, FIG. 11 illustrates a system, which includes interconnected hardware devices or "chips." In at least one embodiment, FIG. 11 may illustrate an exemplary SoC. In at least one embodiment, devices illustrated in FIG. 11 may be interconnected with proprietary interconnects, standardized interconnects (e.g., PCIe), or some combination thereof. In at least one embodiment, one or more components of system 1100 are interconnected using compute express link ("CXL") interconnects.

Figure 12:
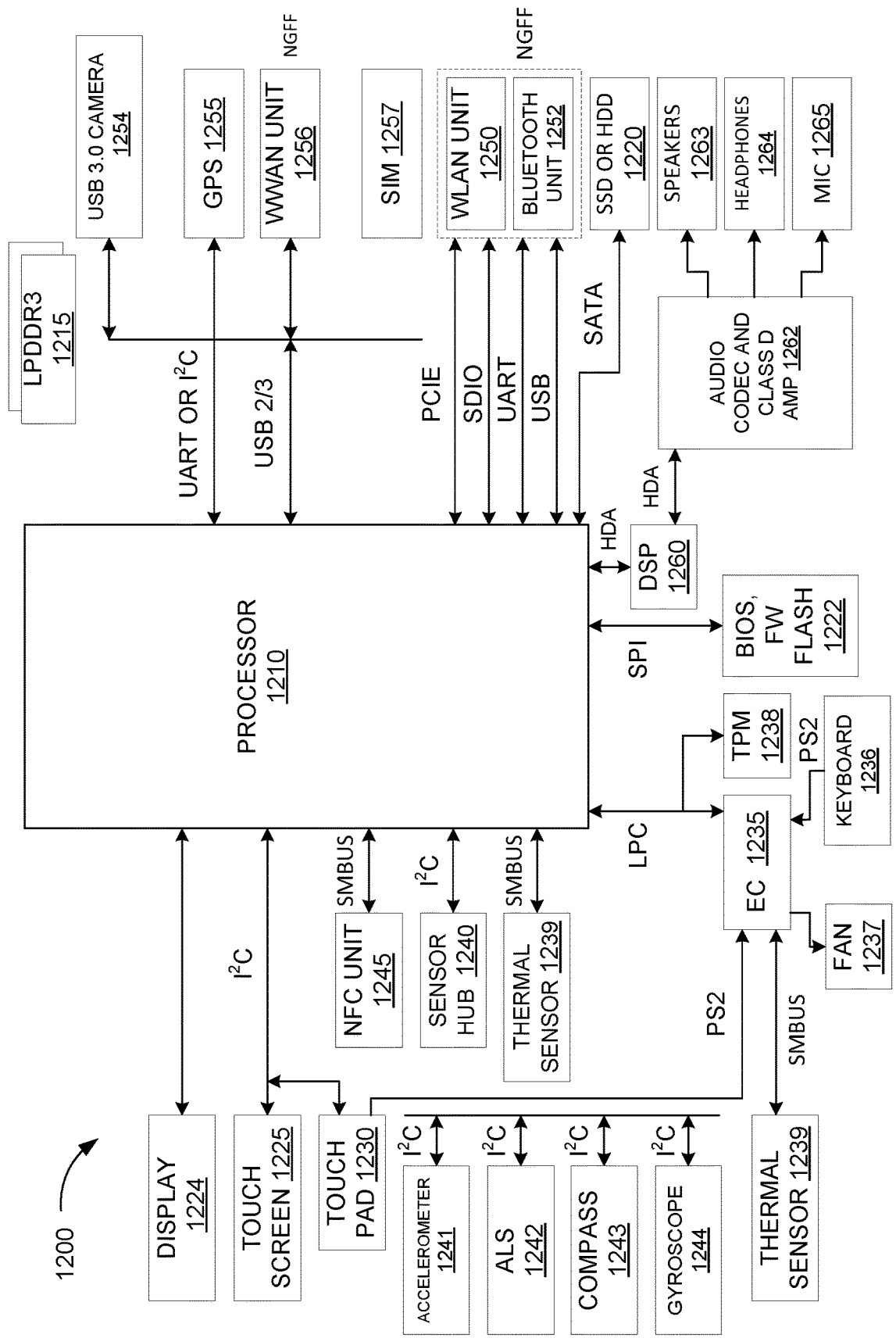
FIG. 12 illustrates a system, in accordance with at least one embodiment.

FIG. 12 illustrates a system 1200, in accordance with at least one embodiment. In at least one embodiment, system 1200 is an electronic device that utilizes a processor 1210. In at least one embodiment, system 1200 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 1200 is to perform various computational operations, including one or more application programming interfaces (APIs), described above in conjunction with FIGS. 2-7 and/or processes described above in conjunction with FIG. 8. In at least one embodiment, system 1200 comprises hardware, including accelerators within heterogeneous processors and/or other components, to perform various computational operations and/or APIs described above in conjunction with FIGS. 2-7 and/or processes described above in conjunction with FIG. 8.

In at least one embodiment, system 1200 may include, without limitation, processor 1210 communicatively coupled to any suitable number or kind of components, peripherals, modules, or devices. In at least one embodiment, processor 1210 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 12 illustrates a system which includes interconnected hardware devices or "chips." In at least one embodiment, FIG. 12 may illustrate an exemplary SoC. In at least one embodiment, devices illustrated in FIG. 12 may be interconnected with proprietary interconnects, standardized interconnects (e.g., PCIe) or some combination thereof. In at least one embodiment, one or more components of FIG. 12 are interconnected using CXL interconnects.

In at least one embodiment, FIG. 12 may include a display 1224, a touch screen 1225, a touch pad 1230, a Near Field Communications unit ("NFC") 1245, a sensor hub 1240, a thermal sensor 1246, an Express Chipset ("EC") 1235, a Trusted Platform Module ("TPM") 1238, BIOS/firmware/flash memory ("BIOS, FW Flash") 1222, a DSP 1260, a Solid State Disk ("SSD") or Hard Disk Drive ("HDD") 1220, a wireless local area network unit ("WLAN") 1250, a Bluetooth unit 1252, a Wireless Wide Area Network unit ("WWAN") 1256, a Global Positioning System ("GPS") 1255, a camera ("USB 3.0 camera") 1254 such as a USB 3.0 camera, or a Low Power Double Data Rate ("LPDDR") memory unit ("LPDDR3") 1215 implemented in, for example, LPDDR3 standard. These components may each be implemented in any suitable manner.

In at least one embodiment, other components may be communicatively coupled to processor 1210 through components discussed above. In at least one embodiment, an accelerometer 1241, an Ambient Light Sensor ("ALS") 1242, a compass 1243, and a gyroscope 1244 may be communicatively coupled to sensor hub 1240. In at least one embodiment, a thermal sensor 1239, a fan 1237, a keyboard 1236, and a touch pad 1230 may be communicatively coupled to EC 1235. In at least one embodiment, a speaker 1263, a headphones 1264, and a microphone ("mic") 1265 may be communicatively coupled to an audio unit ("audio codec and class d amp") 1262, which may in turn be communicatively coupled to DSP 1260. In at least one embodiment, audio unit 1262 may include, for example and without limitation, an audio coder/decoder ("codec") and a class D amplifier. In at least one embodiment, a SIM card ("SIM") 1257 may be communicatively coupled to WWAN unit 1256. In at least one embodiment, components such as WLAN unit 1250 and Bluetooth unit 1252, as well as WWAN unit 1256 may be implemented in a Next Generation Form Factor ("NGFF").

Figure 13:
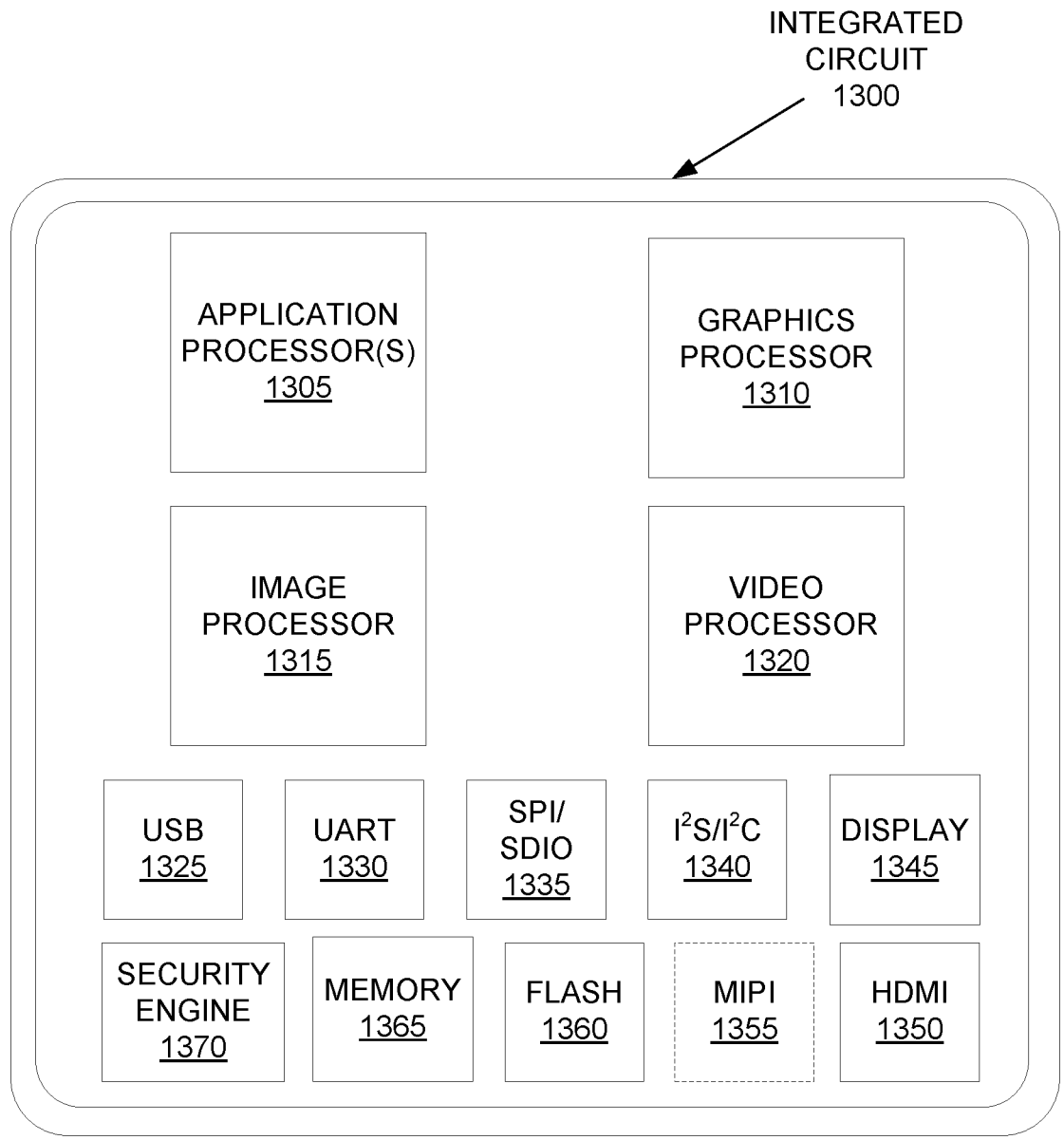
FIG. 13 illustrates an exemplary integrated circuit, in accordance with at least one embodiment.

FIG. 13 illustrates an exemplary integrated circuit 1300, in accordance with at least one embodiment. In at least one embodiment, exemplary integrated circuit 1300 is an SoC that may be fabricated using one or more IP cores. In at least one embodiment, integrated circuit 1300 includes one or more application processor(s) 1305 (e.g., CPUs, DPUs), at least one graphics processor 1310, and may additionally include an image processor 1315 and/or a video processor 1320, any of which may be a modular IP core. In at least one embodiment, integrated circuit 1300 includes peripheral or bus logic including a USB controller 1325, a UART controller 1330, an SPI/SDIO controller 1335, and an I$^2$S/I$^2$C controller 1340. In at least one embodiment, integrated circuit 1300 can include a display device 1345 coupled to one or more of a high-definition multimedia interface ("HDMI") controller 1350 and a mobile industry processor interface ("MIPI") display interface 1355. In at least one embodiment, storage may be provided by a flash memory subsystem 1360 including flash memory and a flash memory controller. In at least one embodiment, a memory interface may be provided via a memory controller 1365 for access to SDRAM or SRAM memory devices. In at least one embodiment, some integrated circuits additionally include an embedded security engine 1370.

In at least one embodiment, exemplary integrated circuit 1300 is to perform various computational operations, including one or more application programming interfaces (APIs), described above in conjunction with FIGS. 2-7 and/or processes described above in conjunction with FIG. 8. In at least one embodiment, exemplary integrated circuit 1300 comprises hardware to perform various computational operations and/or APIs described above in conjunction with FIGS. 2-7 and/or processes described above in conjunction with FIG. 8.

Figure 14:
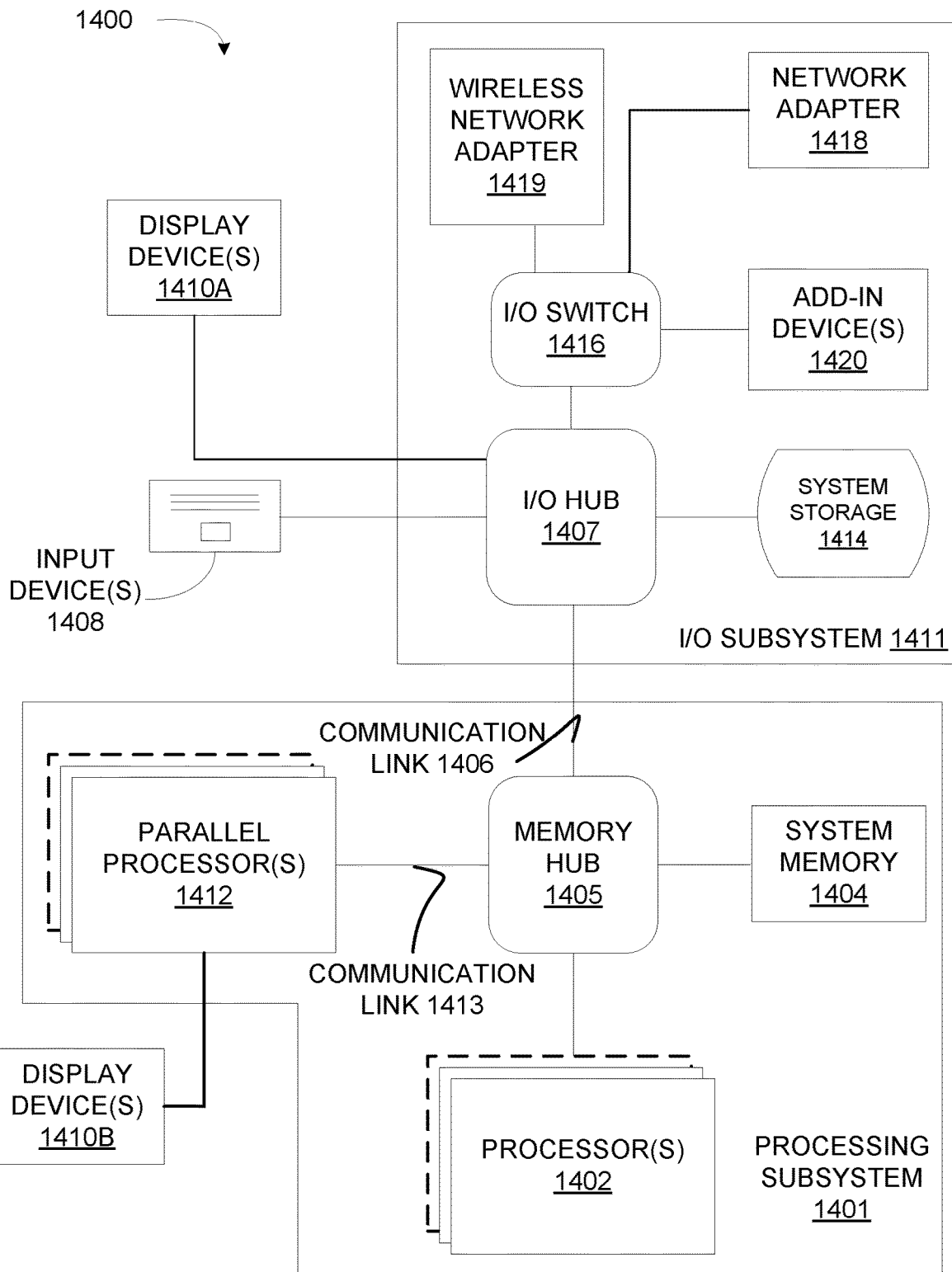
FIG. 14 illustrates a computing system, according to at least one embodiment.

FIG. 14 illustrates a computing system 1400, according to at least one embodiment; In at least one embodiment, computing system 1400 includes a processing subsystem 1401 having one or more processor(s) 1402 and a system memory 1404 communicating via an interconnection path that may include a memory hub 1405. In at least one embodiment, memory hub 1405 may be a separate component within a chipset component or may be integrated within one or more processor(s) 1402. In at least one embodiment, memory hub 1405 couples with an I/O subsystem 1411 via a communication link 1406. In at least one embodiment, I/O subsystem 1411 includes an I/O hub 1407 that can enable computing system 1400 to receive input from one or more input device(s) 1408. In at least one embodiment, I/O hub 1407 can enable a display controller, which may be included in one or more processor(s) 1402, to provide outputs to one or more display device(s) 1410A. In at least one embodiment, one or more display device(s) 1410A coupled with I/O hub 1407 can include a local, internal, or embedded display device.

In at least one embodiment, computing system 1400 is to perform various computational operations, including one or more application programming interfaces (APIs), described above in conjunction with FIGS. 2-7 and/or processes described above in conjunction with FIG. 8. In at least one embodiment, computing system 1400 comprises hardware, including accelerators within heterogeneous processors and/or other components, to perform various computational operations and/or APIs described above in conjunction with FIGS. 2-7 and/or processes described above in conjunction with FIG. 8.

In at least one embodiment, processing subsystem 1401 includes one or more parallel processor(s) 1412 coupled to memory hub 1405 via a bus or other communication link 1413. In at least one embodiment, communication link 1413 may be one of any number of standards based communication link technologies or protocols, such as, but not limited to PCIe, or may be a vendor specific communications interface or communications fabric. In at least one embodiment, one or more parallel processor(s) 1412 form a computationally focused parallel or vector processing system that can include a large number of processing cores and/or processing clusters, such as a many integrated core processor. In at least one embodiment, one or more parallel processor(s) 1412 form a graphics processing subsystem that can output pixels to one of one or more display device(s) 1410A coupled via I/O Hub 1407. In at least one embodiment, one or more parallel processor(s) 1412 can also include a display controller and display interface (not shown) to enable a direct connection to one or more display device(s) 1410B.

In at least one embodiment, a system storage unit 1414 can connect to I/O hub 1407 to provide a storage mechanism for computing system 1400. In at least one embodiment, an I/O switch 1416 can be used to provide an interface mechanism to enable connections between I/O hub 1407 and other components, such as a network adapter 1418 and/or wireless network adapter 1419 that may be integrated into a platform, and various other devices that can be added via one or more add-in device(s) 1420. In at least one embodiment, network adapter 1418 can be an Ethernet adapter or another wired network adapter. In at least one embodiment, wireless network adapter 1419 can include one or more of a Wi-Fi, Bluetooth, NFC, or other network device that includes one or more wireless radios.

In at least one embodiment, computing system 1400 can include other components not explicitly shown, including USB or other port connections, optical storage drives, video capture devices, and the like, that may also be connected to I/O hub 1407. In at least one embodiment, communication paths interconnecting various components in FIG. 14 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1412 incorporate circuitry optimized for graphics and video processing, including, for example, video output circuitry, and constitutes a graphics processing unit ("GPU"). In at least one embodiment, one or more parallel processor(s) 1412 incorporate circuitry optimized for general purpose processing. In at least embodiment, components of computing system 1400 may be integrated with one or more other system elements on a single integrated circuit. For example, in at least one embodiment, one or more parallel processor(s) 1412, memory hub 1405, processor(s) 1402, and I/O hub 1407 can be integrated into an SoC integrated circuit. In at least one embodiment, components of computing system 1400 can be integrated into a single package to form a system in package ("SIP") configuration. In at least one embodiment, at least a portion of the components of computing system 1400 can be integrated into a multi-chip module ("MCM"), which can be interconnected with other multi-chip modules into a modular computing system. In at least one embodiment, I/O subsystem 1411 and display devices 1410B are omitted from computing system 1400.

Processing Systems

The following figures set forth, without limitation, exemplary processing systems that can be used to implement at least one embodiment.

Figure 15:
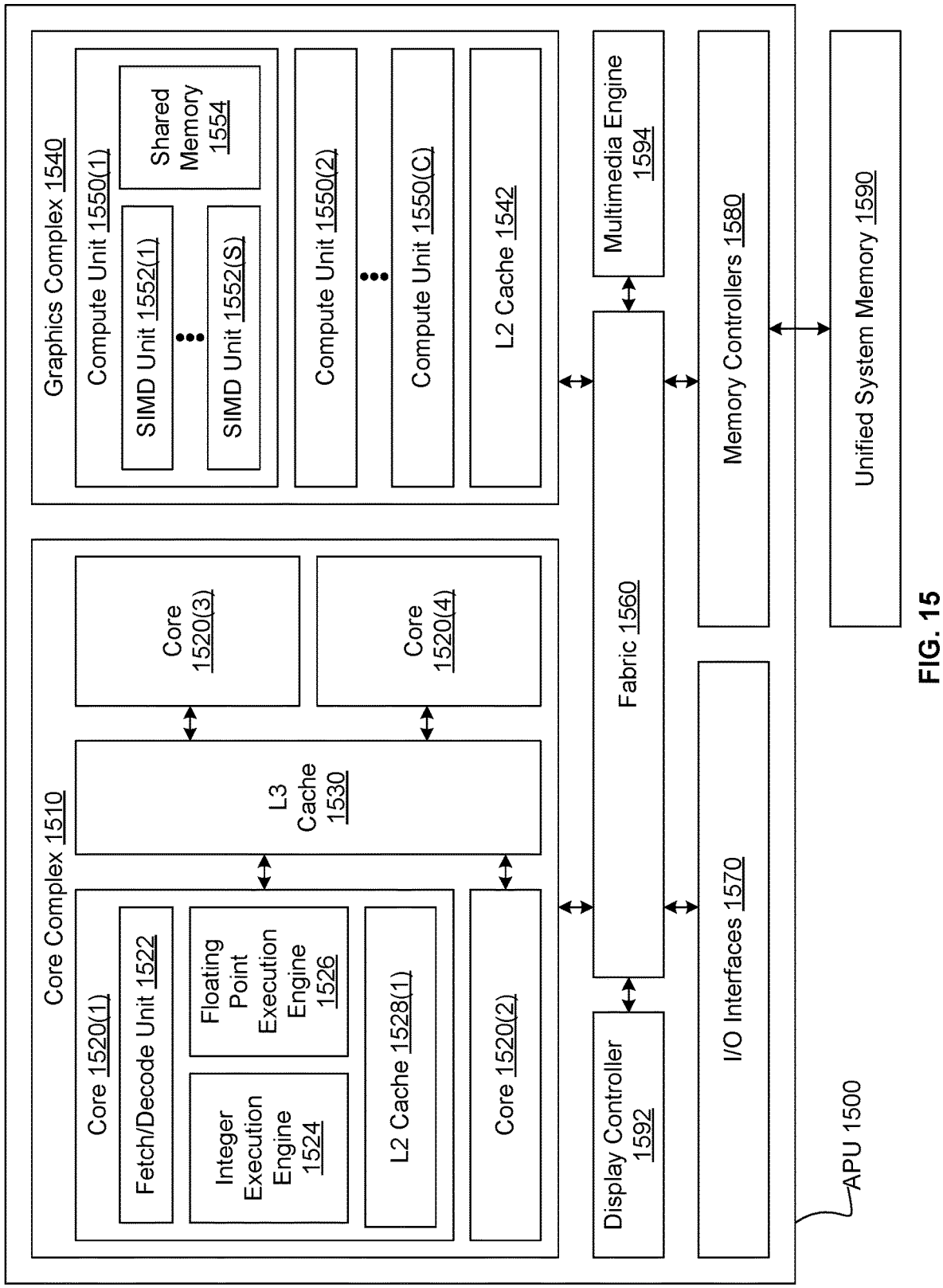
FIG. 15 illustrates an APU, in accordance with at least one embodiment.

FIG. 15 illustrates an accelerated processing unit ("APU") 1500, in accordance with at least one embodiment. In at least one embodiment, APU 1500 is developed by AMD Corporation of Santa Clara, CA. In at least one embodiment, APU 1500 can be configured to execute an application program, such as a CUDA program. In at least one embodiment, APU 1500 includes, without limitation, a core complex 1510, a graphics complex 1540, fabric 1560, I/O interfaces 1570, memory controllers 1580, a display controller 1592, and a multimedia engine 1594. In at least one embodiment, APU 1500 may include, without limitation, any number of core complexes 1510, any number of graphics complexes 1550, any number of display controllers 1592, and any number of multimedia engines 1594 in any combination. For explanatory purposes, multiple instances of like objects are denoted herein with reference numbers identifying the object and parenthetical numbers identifying the instance where needed.

In at least one embodiment, APU 1500 is to perform various computational operations, including one or more application programming interfaces (APIs), described above in conjunction with FIGS. 2-7 and/or processes described above in conjunction with FIG. 8. In at least one embodiment, APU 1500 comprises hardware and/or other components to perform various computational operations and/or APIs described above in conjunction with FIGS. 2-7 and/or processes described above in conjunction with FIG. 8.

In at least one embodiment, core complex 1510 is a CPU, graphics complex 1540 is a GPU, and APU 1500 is a processing unit that integrates, without limitation, 1510 and 1540 onto a single chip. In at least one embodiment, some tasks may be assigned to core complex 1510 and other tasks may be assigned to graphics complex 1540. In at least one embodiment, core complex 1510 is configured to execute main control software associated with APU 1500, such as an operating system. In at least one embodiment, core complex 1510 is the master processor of APU 1500, controlling and coordinating operations of other processors. In at least one embodiment, core complex 1510 issues commands that control the operation of graphics complex 1540. In at least one embodiment, core complex 1510 can be configured to execute host executable code derived from CUDA source code, and graphics complex 1540 can be configured to execute device executable code derived from CUDA source code.

In at least one embodiment, core complex 1510 includes, without limitation, cores 1520(1)-1520(4) and an L3 cache 1530. In at least one embodiment, core complex 1510 may include, without limitation, any number of cores 1520 and any number and type of caches in any combination. In at least one embodiment, cores 1520 are configured to execute instructions of a particular instruction set architecture ("ISA"). In at least one embodiment, each core 1520 is a CPU core.

In at least one embodiment, each core 1520 includes, without limitation, a fetch/decode unit 1522, an integer execution engine 1524, a floating point execution engine 1526, and an L2 cache 1528. In at least one embodiment, fetch/decode unit 1522 fetches instructions, decodes such instructions, generates micro-operations, and dispatches separate micro-instructions to integer execution engine 1524 and floating point execution engine 1526. In at least one embodiment, fetch/decode unit 1522 can concurrently dispatch one micro-instruction to integer execution engine 1524 and another micro-instruction to floating point execution engine 1526. In at least one embodiment, integer execution engine 1524 executes, without limitation, integer and memory operations. In at least one embodiment, floating point engine 1526 executes, without limitation, floating point and vector operations. In at least one embodiment, fetch-decode unit 1522 dispatches micro-instructions to a single execution engine that replaces both integer execution engine 1524 and floating point execution engine 1526.

In at least one embodiment, each core 1520($i$), where i is an integer representing a particular instance of core 1520, may access L2 cache 1528($i$) included in core 1520($i$). In at least one embodiment, each core 1520 included in core complex 1510($j$), where j is an integer representing a particular instance of core complex 1510, is connected to other cores 1520 included in core complex 1510($j$) via L3 cache 1530($j$) included in core complex 1510($j$). In at least one embodiment, cores 1520 included in core complex 1510($j$), where j is an integer representing a particular instance of core complex 1510, can access all of L3 cache 1530($j$) included in core complex 1510($j$). In at least one embodiment, L3 cache 1530 may include, without limitation, any number of slices.

In at least one embodiment, graphics complex 1540 can be configured to perform compute operations in a highly-parallel fashion. In at least one embodiment, graphics complex 1540 is configured to execute graphics pipeline operations such as draw commands, pixel operations, geometric computations, and other operations associated with rendering an image to a display. In at least one embodiment, graphics complex 1540 is configured to execute operations unrelated to graphics. In at least one embodiment, graphics complex 1540 is configured to execute both operations related to graphics and operations unrelated to graphics.

In at least one embodiment, graphics complex 1540 includes, without limitation, any number of compute units 1550 and an L2 cache 1542. In at least one embodiment, compute units 1550 share L2 cache 1542. In at least one embodiment, L2 cache 1542 is partitioned. In at least one embodiment, graphics complex 1540 includes, without limitation, any number of compute units 1550 and any number (including zero) and type of caches. In at least one embodiment, graphics complex 1540 includes, without limitation, any amount of dedicated graphics hardware.

In at least one embodiment, each compute unit 1550 includes, without limitation, any number of SIMD units 1552 and a shared memory 1554. In at least one embodiment, each SIMD unit 1552 implements a STMD architecture and is configured to perform operations in parallel. In at least one embodiment, each compute unit 1550 may execute any number of thread blocks, but each thread block executes on a single compute unit 1550. In at least one embodiment, a thread block includes, without limitation, any number of threads of execution. In at least one embodiment, a workgroup is a thread block. In at least one embodiment, each SIMD unit 1552 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1554.

In at least one embodiment, fabric 1560 is a system interconnect that facilitates data and control transmissions across core complex 1510, graphics complex 1540, I/O interfaces 1570, memory controllers 1580, display controller 1592, and multimedia engine 1594. In at least one embodiment, APU 1500 may include, without limitation, any amount and type of system interconnect in addition to or instead of fabric 1560 that facilitates data and control transmissions across any number and type of directly or indirectly linked components that may be internal or external to APU 1500. In at least one embodiment, I/O interfaces 1570 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1570 In at least one embodiment, peripheral devices that are coupled to I/O interfaces 1570 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 1594 includes, without limitation, any amount and type of circuitry that is related to multimedia, such as a video decoder, a video encoder, an image signal processor, etc. In at least one embodiment, memory controllers 1580 facilitate data transfers between APU 1500 and a unified system memory 1590. In at least one embodiment, core complex 1510 and graphics complex 1540 share unified system memory 1590.

In at least one embodiment, APU 1500 implements a memory subsystem that includes, without limitation, any amount and type of memory controllers 1580 and memory devices (e.g., shared memory 1554) that may be dedicated to one component or shared among multiple components. In at least one embodiment, APU 1500 implements a cache subsystem that includes, without limitation, one or more cache memories (e.g., L2 caches 1628, L3 cache 1530, and L2 cache 1542) that may each be private to or shared between any number of components (e.g., cores 1520, core complex 1510, SIMD units 1552, compute units 1550, and graphics complex 1540).

Figure 16:
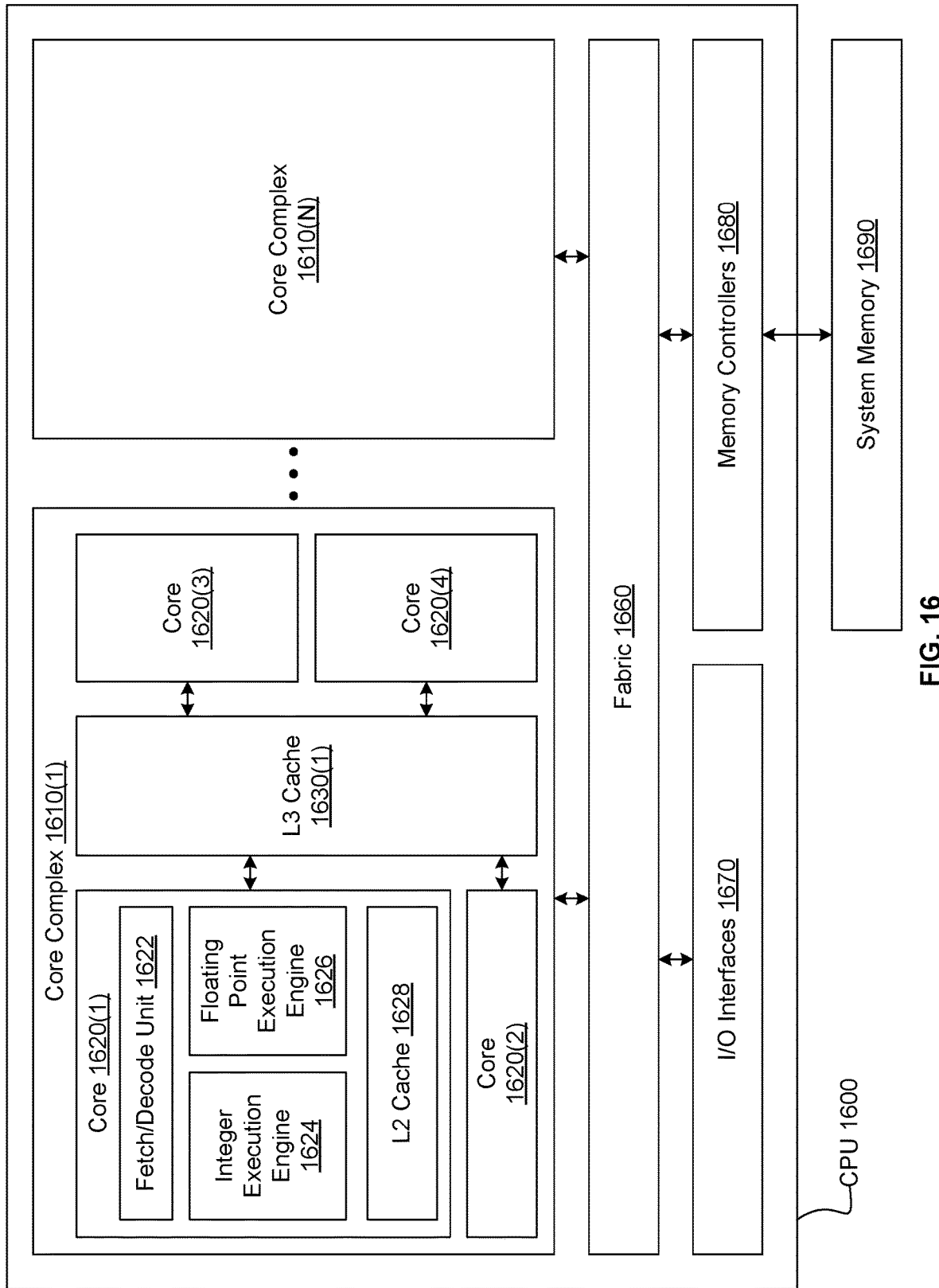
FIG. 16 illustrates a CPU, in accordance with at least one embodiment.

FIG. 16 illustrates a CPU 1600, in accordance with at least one embodiment. In at least one embodiment, CPU 1600 is developed by AMD Corporation of Santa Clara, CA. In at least one embodiment, CPU 1600 can be configured to execute an application program. In at least one embodiment, CPU 1600 is configured to execute main control software, such as an operating system. In at least one embodiment, CPU 1600 issues commands that control the operation of an external GPU (not shown). In at least one embodiment, CPU 1600 can be configured to execute host executable code derived from CUDA source code, and an external GPU can be configured to execute device executable code derived from such CUDA source code. In at least one embodiment, CPU 1600 includes, without limitation, any number of core complexes 1610, fabric 1660, I/O interfaces 1670, and memory controllers 1680.

In at least one embodiment, CPU 1600 is to perform various computational operations, including one or more application programming interfaces (APIs), described above in conjunction with FIGS. 2-7 and/or processes described above in conjunction with FIG. 8. In at least one embodiment, CPU 1600 comprises hardware and/or other components to perform various computational operations and/or APIs described above in conjunction with FIGS. 2-7 and/or processes described above in conjunction with FIG. 8.

In at least one embodiment, core complex 1610 includes, without limitation, cores 1620(1)-1620(4) and an L3 cache 1630. In at least one embodiment, core complex 1610 may include, without limitation, any number of cores 1620 and any number and type of caches in any combination. In at least one embodiment, cores 1620 are configured to execute instructions of a particular ISA. In at least one embodiment, each core 1620 is a CPU core.

In at least one embodiment, each core 1620 includes, without limitation, a fetch/decode unit 1622, an integer execution engine 1624, a floating point execution engine 1626, and an L2 cache 1628. In at least one embodiment, fetch/decode unit 1622 fetches instructions, decodes such instructions, generates micro-operations, and dispatches separate micro-instructions to integer execution engine 1624 and floating point execution engine 1626. In at least one embodiment, fetch/decode unit 1622 can concurrently dispatch one micro-instruction to integer execution engine 1624 and another micro-instruction to floating point execution engine 1626. In at least one embodiment, integer execution engine 1624 executes, without limitation, integer and memory operations. In at least one embodiment, floating point engine 1626 executes, without limitation, floating point and vector operations. In at least one embodiment, fetch-decode unit 1622 dispatches micro-instructions to a single execution engine that replaces both integer execution engine 1624 and floating point execution engine 1626.

In at least one embodiment, each core 1620(i), where i is an integer representing a particular instance of core 1620, may access L2 cache 1628(i) included in core 1620(i). In at least one embodiment, each core 1620 included in core complex 1610(j), where j is an integer representing a particular instance of core complex 1610, is connected to other cores 1620 in core complex 1610(j) via L3 cache 1630(j) included in core complex 1610(j). In at least one embodiment, cores 1620 included in core complex 1610(j), where j is an integer representing a particular instance of core complex 1610, can access all of L3 cache 1630(j) included in core complex 1610(j). In at least one embodiment, L3 cache 1630 may include, without limitation, any number of slices.

In at least one embodiment, fabric 1660 is a system interconnect that facilitates data and control transmissions across core complexes 1610(1)-1610(N) (where N is an integer greater than zero), I/O interfaces 1670, and memory controllers 1680. In at least one embodiment, CPU 1600 may include, without limitation, any amount and type of system interconnect in addition to or instead of fabric 1660 that facilitates data and control transmissions across any number and type of directly or indirectly linked components that may be internal or external to CPU 1600. In at least one embodiment, I/O interfaces 1670 are representative of any number and type of I/O interfaces (e.g., PCI, PCI-X, PCIe, GBE, USB, etc.). In at least one embodiment, various types of peripheral devices are coupled to I/O interfaces 1670 In at least one embodiment, peripheral devices that are coupled to I/O interfaces 1670 may include, without limitation, displays, keyboards, mice, printers, scanners, joysticks or other types of game controllers, media recording devices, external storage devices, network interface cards, and so forth.

In at least one embodiment, memory controllers 1680 facilitate data transfers between CPU 1600 and a system memory 1690. In at least one embodiment, core complex 1610 and graphics complex 1640 share system memory 1690. In at least one embodiment, CPU 1600 implements a memory subsystem that includes, without limitation, any amount and type of memory controllers 1680 and memory devices that may be dedicated to one component or shared among multiple components. In at least one embodiment, CPU 1600 implements a cache subsystem that includes, without limitation, one or more cache memories (e.g., L2 caches 1628 and L3 caches 1630) that may each be private to or shared between any number of components (e.g., cores 1620 and core complexes 1610).

Figure 17:
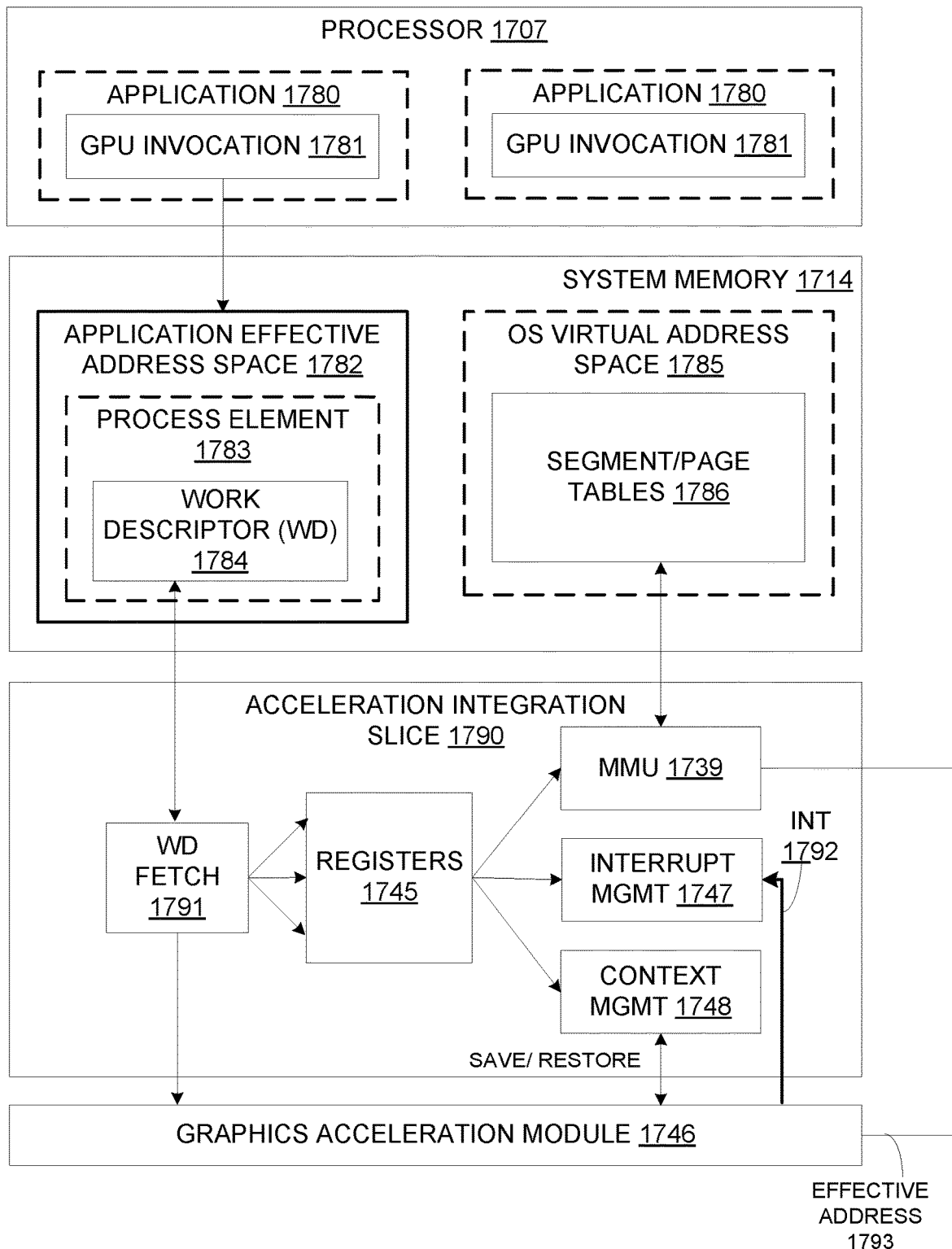
FIG. 17 illustrates an exemplary accelerator integration slice, in accordance with at least one embodiment.

FIG. 17 illustrates an exemplary accelerator integration slice 1790, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

In at least one embodiment, accelerator integration slice 1790 is to perform various computational operations, including one or more application programming interfaces (APIs), described above in conjunction with FIGS. 2-7 and/or processes described above in conjunction with FIG. 8. In at least one embodiment, accelerator integration slice 1790 comprises hardware and/or other components to perform various computational operations and/or APIs described above in conjunction with FIGS. 2-7 and/or processes described above in conjunction with FIG. 8.

An application effective address space 1782 within system memory 1714 stores process elements 1783. In one embodiment, process elements 1783 are stored in response to GPU invocations 1781 from applications 1780 executed on processor 1707. A process element 1783 contains process state for corresponding application 1780. A work descriptor ("WD") 1784 contained in process element 1783 can be a single job requested by an application or may contain a pointer to a queue of jobs. In at least one embodiment, WD 1784 is a pointer to a job request queue in application effective address space 1782.

Graphics acceleration module 1746 and/or individual graphics processing engines can be shared by all or a subset of processes in a system. In at least one embodiment, an infrastructure for setting up process state and sending WD 1784 to graphics acceleration module 1746 to start a job in a virtualized environment may be included.

In at least one embodiment, a dedicated-process programming model is implementation-specific. In this model, a single process owns graphics acceleration module 1746 or an individual graphics processing engine. Because graphics acceleration module 1746 is owned by a single process, a hypervisor initializes an accelerator integration circuit for an owning partition and an operating system initializes accelerator integration circuit for an owning process when graphics acceleration module 1746 is assigned.

In operation, a WD fetch unit 1791 in accelerator integration slice 1790 fetches next WD 1784 which includes an indication of work to be done by one or more graphics processing engines of graphics acceleration module 1746. Data from WD 1784 may be stored in registers 1745 and used by a memory management unit ("MMU") 1739, interrupt management circuit 1747 and/or context management circuit 1748 as illustrated. For example, one embodiment of MMU 1739 includes segment/page walk circuitry for accessing segment/page tables 1786 within OS virtual address space 1785. Interrupt management circuit 1747 may process interrupt events ("INT") 1792 received from graphics acceleration module 1746. When performing graphics operations, an effective address 1793 generated by a graphics processing engine is translated to a real address by MMU 1739.

In one embodiment, a same set of registers 1745 are duplicated for each graphics processing engine and/or graphics acceleration module 1746 and may be initialized by a hypervisor or operating system. Each of these duplicated registers may be included in accelerator integration slice 1790. Exemplary registers that may be initialized by a hypervisor are shown in Table 1.

TABLE 1

| Hypervisor Initialized Registers |
|---|
| 1 Slice Control Register |
| 2 Real Address (RA) Scheduled Processes Area Pointer |
| 3 Authority Mask Override Register |
| 4 Interrupt Vector Table Entry Offset |
| 5 Interrupt Vector Table Entry Limit |
| 6 State Register |
| 7 Logical Partition ID |
| 8 Real address (RA) Hypervisor Accelerator Utilization Record Pointer |
| 9 Storage Description Register |

Exemplary registers that may be initialized by an operating system are shown in Table 2.

TABLE 2

| Operating System Initialized Registers |
|---|
| 1 Process and Thread Identification |
| 2 Effective Address (EA) Context Save/Restore Pointer |
| 3 Virtual Address (VA) Accelerator Utilization Record Pointer |
| 4 Virtual Address (VA) Storage Segment Table Pointer |
| 5 Authority Mask |
| 6 Work descriptor |

In one embodiment, each WD 1784 is specific to a particular graphics acceleration module 1746 and/or a particular graphics processing engine. It contains all information required by a graphics processing engine to do work or it can be a pointer to a memory location where an application has set up a command queue of work to be completed.

Figure 18A:
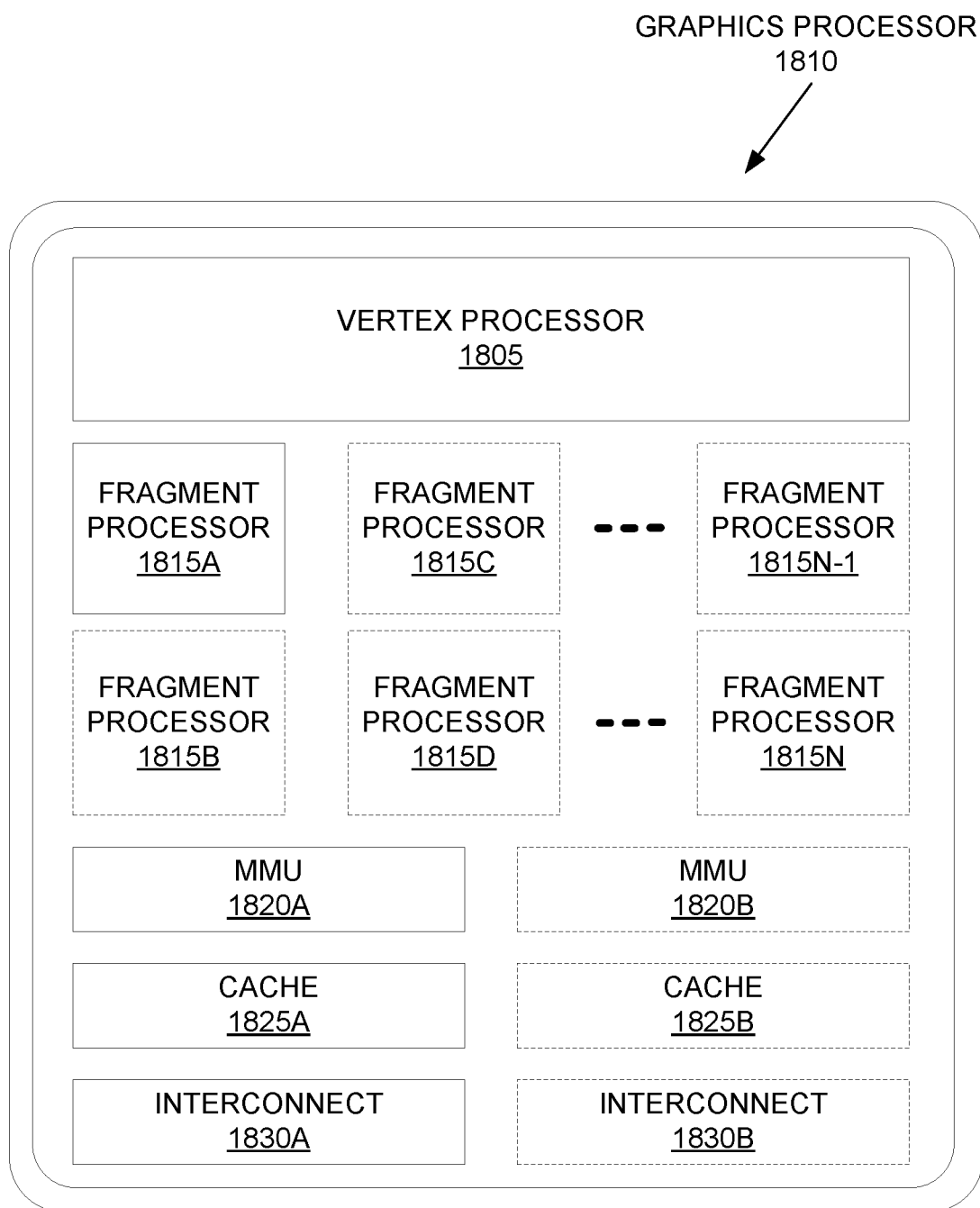
FIGS. 18A-18B illustrate exemplary graphics processors, in accordance with at least one embodiment.
Figure 18B:
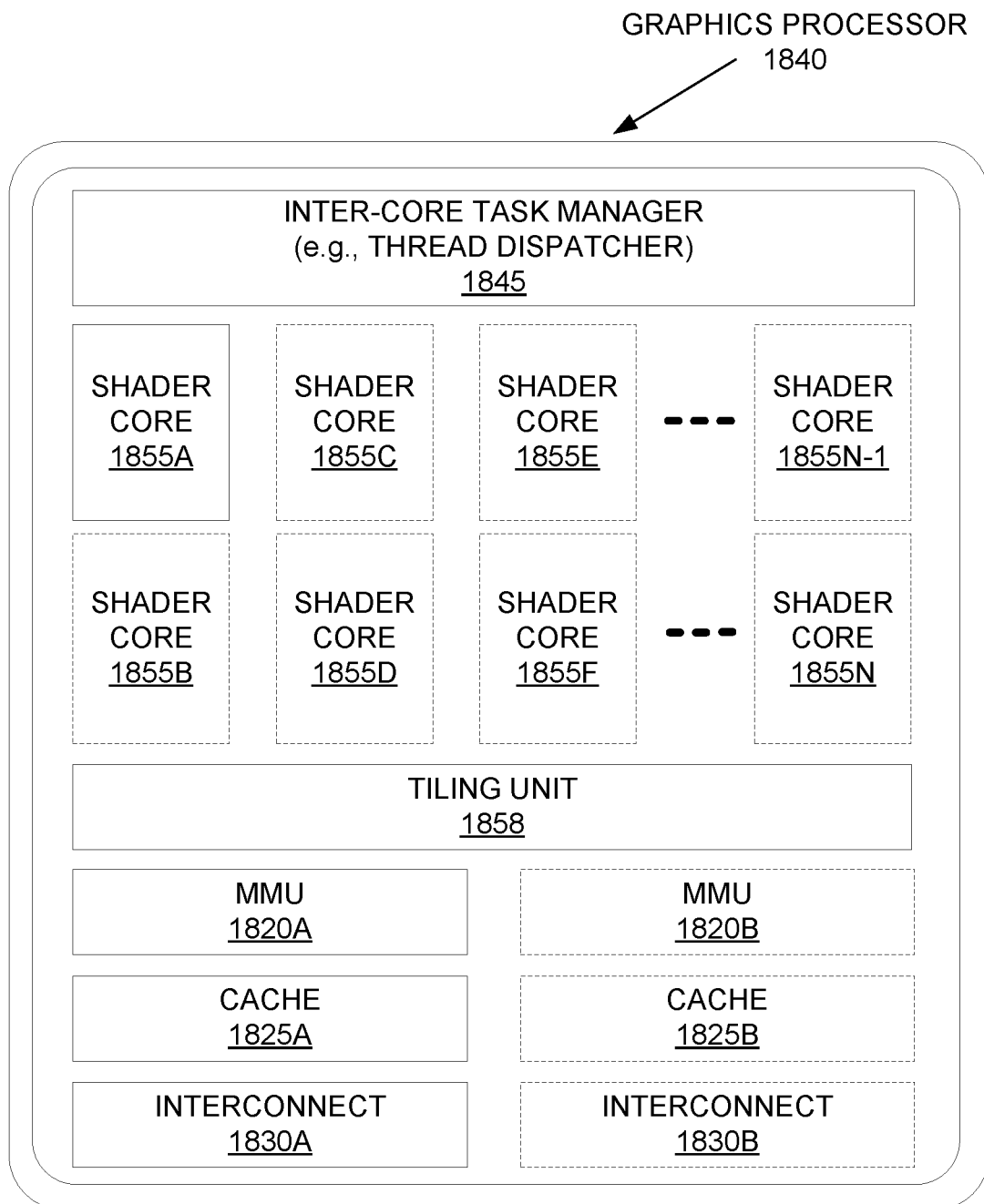

FIGS. 18A-18B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 18A illustrates an exemplary graphics processor 1810 of an SoC integrated circuit that may be fabricated using one or more IP cores, in accordance with at least one embodiment. FIG. 18B illustrates an additional exemplary graphics processor 1840 of an SoC integrated circuit that may be fabricated using one or more IP cores, in accordance with at least one embodiment. In at least one embodiment, graphics processor 1810 of FIG. 18A is a low power graphics processor core. In at least one embodiment, graphics processor 1840 of FIG. 18B is a higher performance graphics processor core. In at least one embodiment, each of graphics processors 1810, 1840 can be variants of graphics processor 1310 of FIG. 13.

In at least one embodiment, graphics processor 1810 is to perform various computational operations, including one or more application programming interfaces (APIs), described above in conjunction with FIGS. 2-7 and/or processes described above in conjunction with FIG. 8. In at least one embodiment, graphics processor 1810 comprises hardware and/or other components to perform various computational operations and/or APIs described above in conjunction with FIGS. 2-7 and/or processes described above in conjunction with FIG. 8.

In at least one embodiment, graphics processor 1810 includes a vertex processor 1805 and one or more fragment processor(s) 1815A-1815N (e.g., 1815A, 1815B, 1815C, 1815D, through 1815N-1, and 1815N). In at least one embodiment, graphics processor 1810 can execute different shader programs via separate logic, such that vertex processor 1805 is optimized to execute operations for vertex shader programs, while one or more fragment processor(s) 1815A-1815N execute fragment (e.g., pixel) shading operations for fragment or pixel shader programs. In at least one embodiment, vertex processor 1805 performs a vertex processing stage of a 3D graphics pipeline and generates primitives and vertex data. In at least one embodiment, fragment processor(s) 1815A-1815N use primitive and vertex data generated by vertex processor 1805 to produce a framebuffer that is displayed on a display device. In at least one embodiment, fragment processor(s) 1815A-1815N are optimized to execute fragment shader programs as provided for in an OpenGL API, which may be used to perform similar operations as a pixel shader program as provided for in a Direct 3D API.

In at least one embodiment, graphics processor 1810 additionally includes one or more MMU(s) 1820A-1820B, cache(s) 1825A-1825B, and circuit interconnect(s) 1830A-1830B. In at least one embodiment, one or more MMU(s) 1820A-1820B provide for virtual to physical address mapping for graphics processor 1810, including for vertex processor 1805 and/or fragment processor(s) 1815A-1815N, which may reference vertex or image/texture data stored in memory, in addition to vertex or image/texture data stored in one or more cache(s) 1825A-1825B. In at least one embodiment, one or more MMU(s) 1820A-1820B may be synchronized with other MMUs within a system, including one or more MMUs associated with one or more application processor(s) 1305, image processors 1315, and/or video processors 1320 of FIG. 13, such that each processor 1305-1320 can participate in a shared or unified virtual memory system. In at least one embodiment, one or more circuit interconnect(s) 1830A-1830B enable graphics processor 1810 to interface with other IP cores within an SoC, either via an internal bus of the SoC or via a direct connection.

In at least one embodiment, graphics processor 1840 includes one or more MMU(s) 1820A-1820B, caches 1825A-1825B, and circuit interconnects 1830A-1830B of graphics processor 1810 of FIG. 18A. In at least one embodiment, graphics processor 1840 includes one or more shader core(s) 1855A-1855N (e.g., 1855A, 1855B, 1855C, 1855D, 1855E, 1855F, through 1855N-1, and 1855N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1840 includes an inter-core task manager 1845, which acts as a thread dispatcher to dispatch execution threads to one or more shader cores 1855A-1855N and a tiling unit 1858 to accelerate tiling operations for tile-based rendering, in which rendering operations for a scene are subdivided in image space, for example to exploit local spatial coherence within a scene or to optimize use of internal caches.

Figure 19A:
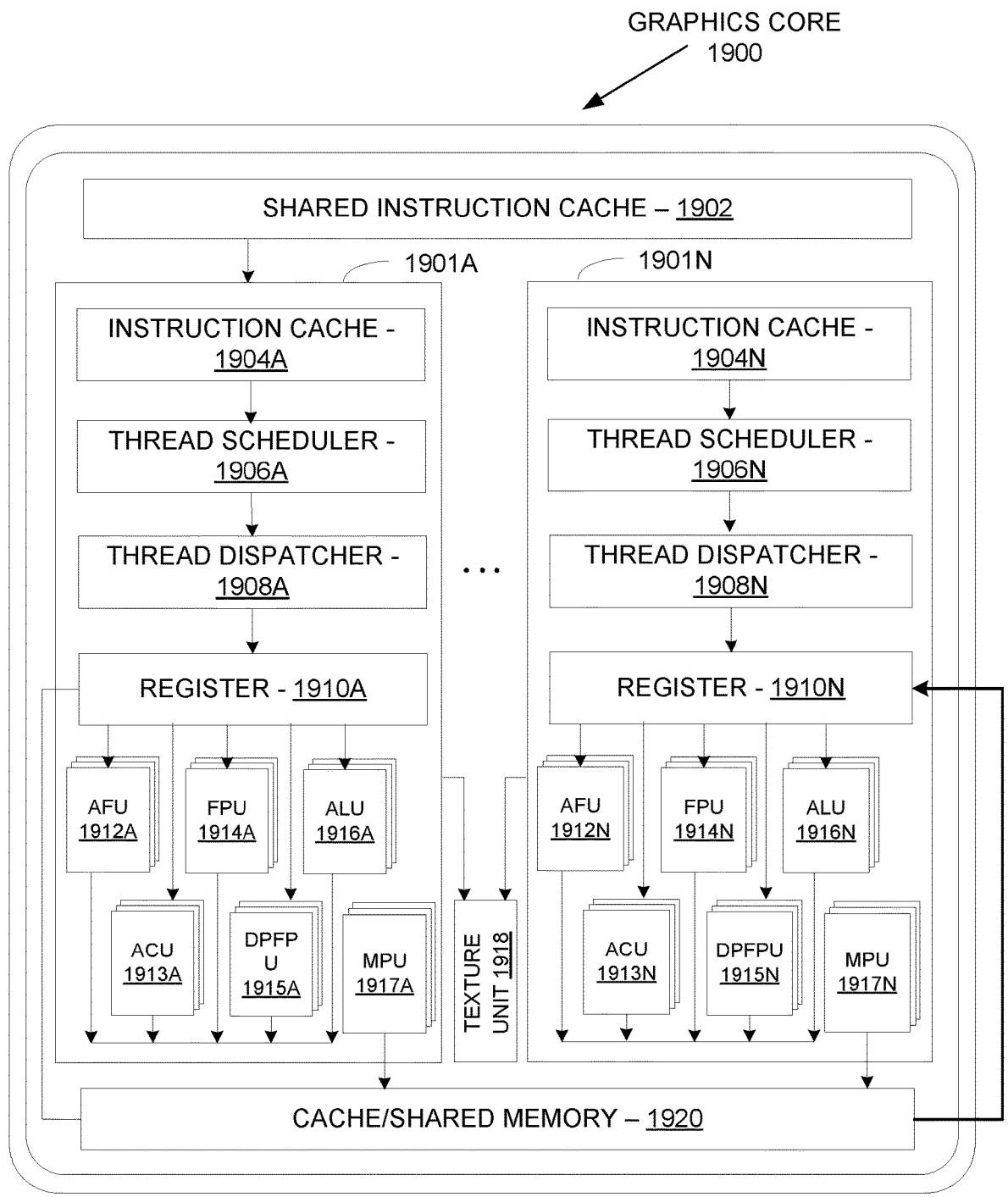
FIG. 19A illustrates a graphics core, in accordance with at least one embodiment.

FIG. 19A illustrates a graphics core 1900, in accordance with at least one embodiment. In at least one embodiment, graphics core 1900 may be included within graphics processor 1310 of FIG. 13. In at least one embodiment, graphics core 1900 may be a unified shader core 1855A-1855N as in FIG. 18B. In at least one embodiment, graphics core 1900 includes a shared instruction cache 1902, a texture unit 1918, and a cache/shared memory 1920 that are common to execution resources within graphics core 1900. In at least one embodiment, graphics core 1900 can include multiple slices 1901A-1901N or partition for each core, and a graphics processor can include multiple instances of graphics core 1900. Slices 1901A-1901N can include support logic including a local instruction cache 1904A-1904N, a thread scheduler 1906A-1906N, a thread dispatcher 1908A-1908N, and a set of registers 1910A-1910N. In at least one embodiment, slices 1901A-1901N can include a set of additional function units ("AFUs") 1912A-1912N, floating-point units ("FPUs") 1914A-1914N, integer arithmetic logic units ("ALUs") 1916-1916N, address computational units ("ACUs") 1913A-1913N, double-precision floating-point units ("DPFPUs") 1915A-1915N, and matrix processing units ("MPUs") 1917A-1917N.

In at least one embodiment, graphics core 1900 is to perform various computational operations, including one or more application programming interfaces (APIs), described above in conjunction with FIGS. 2-7 and/or processes described above in conjunction with FIG. 8. In at least one embodiment, graphics core 1900 comprises hardware and/or other components to perform various computational operations and/or APIs described above in conjunction with FIGS. 2-7 and/or processes described above in conjunction with FIG. 8.

In at least one embodiment, FPUs 1914A-1914N can perform single-precision (32-bit) and half-precision (16-bit) floating point operations, while DPFPUs 1915A-1915N perform double precision (64-bit) floating point operations. In at least one embodiment, ALUs 1916A-1916N can perform variable precision integer operations at 8-bit, 16-bit, and 32-bit precision, and can be configured for mixed precision operations. In at least one embodiment, MPUs 1917A-1917N can also be configured for mixed precision matrix operations, including half-precision floating point and 8-bit integer operations. In at least one embodiment, MPUs 1917-1917N can perform a variety of matrix operations to accelerate CUDA programs, including enabling support for accelerated general matrix to matrix multiplication ("GEMM"). In at least one embodiment, AFUs 1912A-1912N can perform additional logic operations not supported by floating-point or integer units, including trigonometric operations (e.g., Sine, Cosine, etc.).

Figure 19B:
FIG. 19B illustrates a GPGPU, in accordance with at least one embodiment.

FIG. 19B illustrates a general-purpose graphics processing unit ("GPGPU") 1930, in accordance with at least one embodiment. In at least one embodiment, GPGPU 1930 is highly-parallel and suitable for deployment on a multi-chip module. In at least one embodiment, GPGPU 1930 can be configured to enable highly-parallel compute operations to be performed by an array of GPUs. In at least one embodiment, GPGPU 1930 can be linked directly to other instances of GPGPU 1930 to create a multi-GPU cluster to improve execution time for CUDA programs. In at least one embodiment, GPGPU 1930 includes a host interface 1932 to enable a connection with a host processor. In at least one embodiment, host interface 1932 is a PCIe interface. In at least one embodiment, host interface 1932 can be a vendor specific communications interface or communications fabric. In at least one embodiment, GPGPU 1930 receives commands from a host processor and uses a global scheduler 1934 to distribute execution threads associated with those commands to a set of compute clusters 1936A-1936H. In at least one embodiment, compute clusters 1936A-1936H share a cache memory 1938. In at least one embodiment, cache memory 1938 can serve as a higher-level cache for cache memories within compute clusters 1936A-1936H.

In at least one embodiment, GPGPU 1930 is to perform various computational operations, including one or more application programming interfaces (APIs), described above in conjunction with FIGS. 2-7 and/or processes described above in conjunction with FIG. 8. In at least one embodiment, GPGPU 1930 comprises hardware and/or other components to perform various computational operations and/or APIs described above in conjunction with FIGS. 2-7 and/or processes described above in conjunction with FIG. 8.

In at least one embodiment, GPGPU 1930 includes memory 1944A-1944B coupled with compute clusters 1936A-1936H via a set of memory controllers 1942A-1942B. In at least one embodiment, memory 1944A-1944B can include various types of memory devices including DRAM or graphics random access memory, such as synchronous graphics random access memory ("SGRAM"), including graphics double data rate ("GDDR") memory.

In at least one embodiment, compute clusters 1936A-1936H each include a set of graphics cores, such as graphics core 1900 of FIG. 19A, which can include multiple types of integer and floating point logic units that can perform computational operations at a range of precisions including suited for computations associated with CUDA programs. For example, in at least one embodiment, at least a subset of floating point units in each of compute clusters 1936A-1936H can be configured to perform 16-bit or 32-bit floating point operations, while a different subset of floating point units can be configured to perform 64-bit floating point operations.

In at least one embodiment, multiple instances of GPGPU 1930 can be configured to operate as a compute cluster. Compute clusters 1936A-1936H may implement any technically feasible communication techniques for synchronization and data exchange. In at least one embodiment, multiple instances of GPGPU 1930 communicate over host interface 1932. In at least one embodiment, GPGPU 1930 includes an I/O hub 1939 that couples GPGPU 1930 with a GPU link 1940 that enables a direct connection to other instances of GPGPU 1930. In at least one embodiment, GPU link 1940 is coupled to a dedicated GPU-to-GPU bridge that enables communication and synchronization between multiple instances of GPGPU 1930. In at least one embodiment GPU link 1940 couples with a high speed interconnect to transmit and receive data to other GPGPUs 1930 or parallel processors. In at least one embodiment, multiple instances of GPGPU 1930 are located in separate data processing systems and communicate via a network device that is accessible via host interface 1932. In at least one embodiment GPU link 1940 can be configured to enable a connection to a host processor in addition to or as an alternative to host interface 1932. In at least one embodiment, GPGPU 1930 can be configured to execute a CUDA program.

Figure 20A:
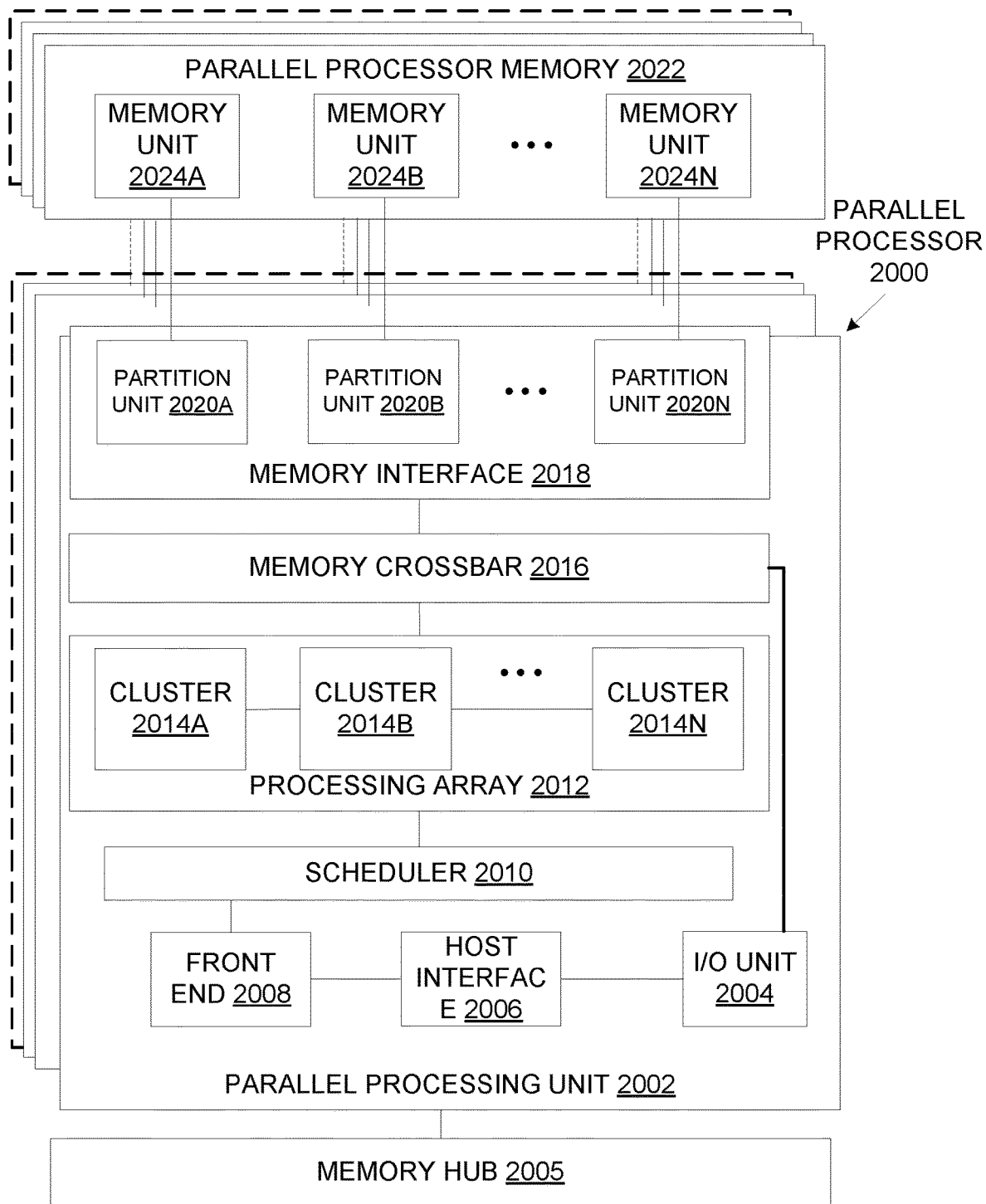
FIG. 20A illustrates a parallel processor, in accordance with at least one embodiment.

FIG. 20A illustrates a parallel processor 2000, in accordance with at least one embodiment. In at least one embodiment, various components of parallel processor 2000 may be implemented using one or more integrated circuit devices, such as programmable processors, application specific integrated circuits ("ASICs"), or FPGAs.

In at least one embodiment, parallel processor 2000 is to perform various computational operations, including one or more application programming interfaces (APIs), described above in conjunction with FIGS. 2-7 and/or processes described above in conjunction with FIG. 8. In at least one embodiment, parallel processor 2000 comprises hardware and/or other components to perform various computational operations and/or APIs described above in conjunction with FIGS. 2-7 and/or processes described above in conjunction with FIG. 8.

In at least one embodiment, parallel processor 2000 includes a parallel processing unit 2002. In at least one embodiment, parallel processing unit 2002 includes an I/O unit 2004 that enables communication with other devices, including other instances of parallel processing unit 2002. In at least one embodiment, I/O unit 2004 may be directly connected to other devices. In at least one embodiment, I/O unit 2004 connects with other devices via use of a hub or switch interface, such as memory hub 2005. In at least one embodiment, connections between memory hub 2005 and I/O unit 2004 form a communication link. In at least one embodiment, I/O unit 2004 connects with a host interface 2006 and a memory crossbar 2016, where host interface 2006 receives commands directed to performing processing operations and memory crossbar 2016 receives commands directed to performing memory operations.

In at least one embodiment, when host interface 2006 receives a command buffer via I/O unit 2004, host interface 2006 can direct work operations to perform those commands to a front end 2008. In at least one embodiment, front end 2008 couples with a scheduler 2010, which is configured to distribute commands or other work items to a processing array 2012. In at least one embodiment, scheduler 2010 ensures that processing array 2012 is properly configured and in a valid state before tasks are distributed to processing array 2012. In at least one embodiment, scheduler 2010 is implemented via firmware logic executing on a microcontroller. In at least one embodiment, microcontroller implemented scheduler 2010 is configurable to perform complex scheduling and work distribution operations at coarse and fine granularity, enabling rapid preemption and context switching of threads executing on processing array 2012. In at least one embodiment, host software can prove workloads for scheduling on processing array 2012 via one of multiple graphics processing doorbells. In at least one embodiment, workloads can then be automatically distributed across processing array 2012 by scheduler 2010 logic within a microcontroller including scheduler 2010.

In at least one embodiment, processing array 2012 can include up to "N" clusters (e.g., cluster 2014A, cluster 2014B, through cluster 2014N). In at least one embodiment, each cluster 2014A-2014N of processing array 2012 can execute a large number of concurrent threads. In at least one embodiment, scheduler 2010 can allocate work to clusters 2014A-2014N of processing array 2012 using various scheduling and/or work distribution algorithms, which may vary depending on the workload arising for each type of program or computation. In at least one embodiment, scheduling can be handled dynamically by scheduler 2010, or can be assisted in part by compiler logic during compilation of program logic configured for execution by processing array 2012. In at least one embodiment, different clusters 2014A-2014N of processing array 2012 can be allocated for processing different types of programs or for performing different types of computations.

In at least one embodiment, processing array 2012 can be configured to perform various types of parallel processing operations. In at least one embodiment, processing array 2012 is configured to perform general-purpose parallel compute operations. For example, in at least one embodiment, processing array 2012 can include logic to execute processing tasks including filtering of video and/or audio data, performing modeling operations, including physics operations, and performing data transformations.

In at least one embodiment, processing array 2012 is configured to perform parallel graphics processing operations. In at least one embodiment, processing array 2012 can include additional logic to support execution of such graphics processing operations, including, but not limited to texture sampling logic to perform texture operations, as well as tessellation logic and other vertex processing logic. In at least one embodiment, processing array 2012 can be configured to execute graphics processing related shader programs such as, but not limited to vertex shaders, tessellation shaders, geometry shaders, and pixel shaders. In at least one embodiment, parallel processing unit 2002 can transfer data from system memory via I/O unit 2004 for processing. In at least one embodiment, during processing, transferred data can be stored to on-chip memory (e.g., a parallel processor memory 2022) during processing, then written back to system memory.

In at least one embodiment, when parallel processing unit 2002 is used to perform graphics processing, scheduler 2010 can be configured to divide a processing workload into approximately equal sized tasks, to better enable distribution of graphics processing operations to multiple clusters 2014A-2014N of processing array 2012. In at least one embodiment, portions of processing array 2012 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2014A-2014N may be stored in buffers to allow intermediate data to be transmitted between clusters 2014A-2014N for further processing.

In at least one embodiment, processing array 2012 can receive processing tasks to be executed via scheduler 2010, which receives commands defining processing tasks from front end 2008. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2010 may be configured to fetch indices corresponding to tasks or may receive indices from front end 2008. In at least one embodiment, front end 2008 can be configured to ensure processing array 2012 is configured to a valid state before a workload specified by incoming command buffers (e.g., batch-buffers, push buffers, etc.) is initiated.

In at least one embodiment, each of one or more instances of parallel processing unit 2002 can couple with parallel processor memory 2022. In at least one embodiment, parallel processor memory 2022 can be accessed via memory crossbar 2016, which can receive memory requests from processing array 2012 as well as I/O unit 2004. In at least one embodiment, memory crossbar 2016 can access parallel processor memory 2022 via a memory interface 2018. In at least one embodiment, memory interface 2018 can include multiple partition units (e.g., a partition unit 2020A, partition unit 2020B, through partition unit 2020N) that can each couple to a portion (e.g., memory unit) of parallel processor memory 2022. In at least one embodiment, a number of partition units 2020A-2020N is configured to be equal to a number of memory units, such that a first partition unit 2020A has a corresponding first memory unit 2024A, a second partition unit 2020B has a corresponding memory unit 2024B, and an Nth partition unit 2020N has a corresponding Nth memory unit 2024N. In at least one embodiment, a number of partition units 2020A-2020N may not be equal to a number of memory devices.

In at least one embodiment, memory units 2024A-2024N can include various types of memory devices, including DRAM or graphics random access memory, such as SGRAM, including GDDR memory. In at least one embodiment, memory units 2024A-2024N may also include 3D stacked memory, including but not limited to high bandwidth memory ("HBM"). In at least one embodiment, render targets, such as frame buffers or texture maps may be stored across memory units 2024A-2024N, allowing partition units 2020A-2020N to write portions of each render target in parallel to efficiently use available bandwidth of parallel processor memory 2022. In at least one embodiment, a local instance of parallel processor memory 2022 may be excluded in favor of a unified memory design that utilizes system memory in conjunction with local cache memory.

In at least one embodiment, any one of clusters 2014A-2014N of processing array 2012 can process data that will be written to any of memory units 2024A-2024N within parallel processor memory 2022. In at least one embodiment, memory crossbar 2016 can be configured to transfer an output of each cluster 2014A-2014N to any partition unit 2020A-2020N or to another cluster 2014A-2014N, which can perform additional processing operations on an output. In at least one embodiment, each cluster 2014A-2014N can communicate with memory interface 2018 through memory crossbar 2016 to read from or write to various external memory devices. In at least one embodiment, memory crossbar 2016 has a connection to memory interface 2018 to communicate with I/O unit 2004, as well as a connection to a local instance of parallel processor memory 2022, enabling processing units within different clusters 2014A-2014N to communicate with system memory or other memory that is not local to parallel processing unit 2002. In at least one embodiment, memory crossbar 2016 can use virtual channels to separate traffic streams between clusters 2014A-2014N and partition units 2020A-2020N.

In at least one embodiment, multiple instances of parallel processing unit 2002 can be provided on a single add-in card, or multiple add-in cards can be interconnected. In at least one embodiment, different instances of parallel processing unit 2002 can be configured to interoperate even if different instances have different numbers of processing cores, different amounts of local parallel processor memory, and/or other configuration differences. For example, in at least one embodiment, some instances of parallel processing unit 2002 can include higher precision floating point units relative to other instances. In at least one embodiment, systems incorporating one or more instances of parallel processing unit 2002 or parallel processor 2000 can be implemented in a variety of configurations and form factors, including but not limited to desktop, laptop, or handheld personal computers, servers, workstations, game consoles, and/or embedded systems.

Figure 20B:
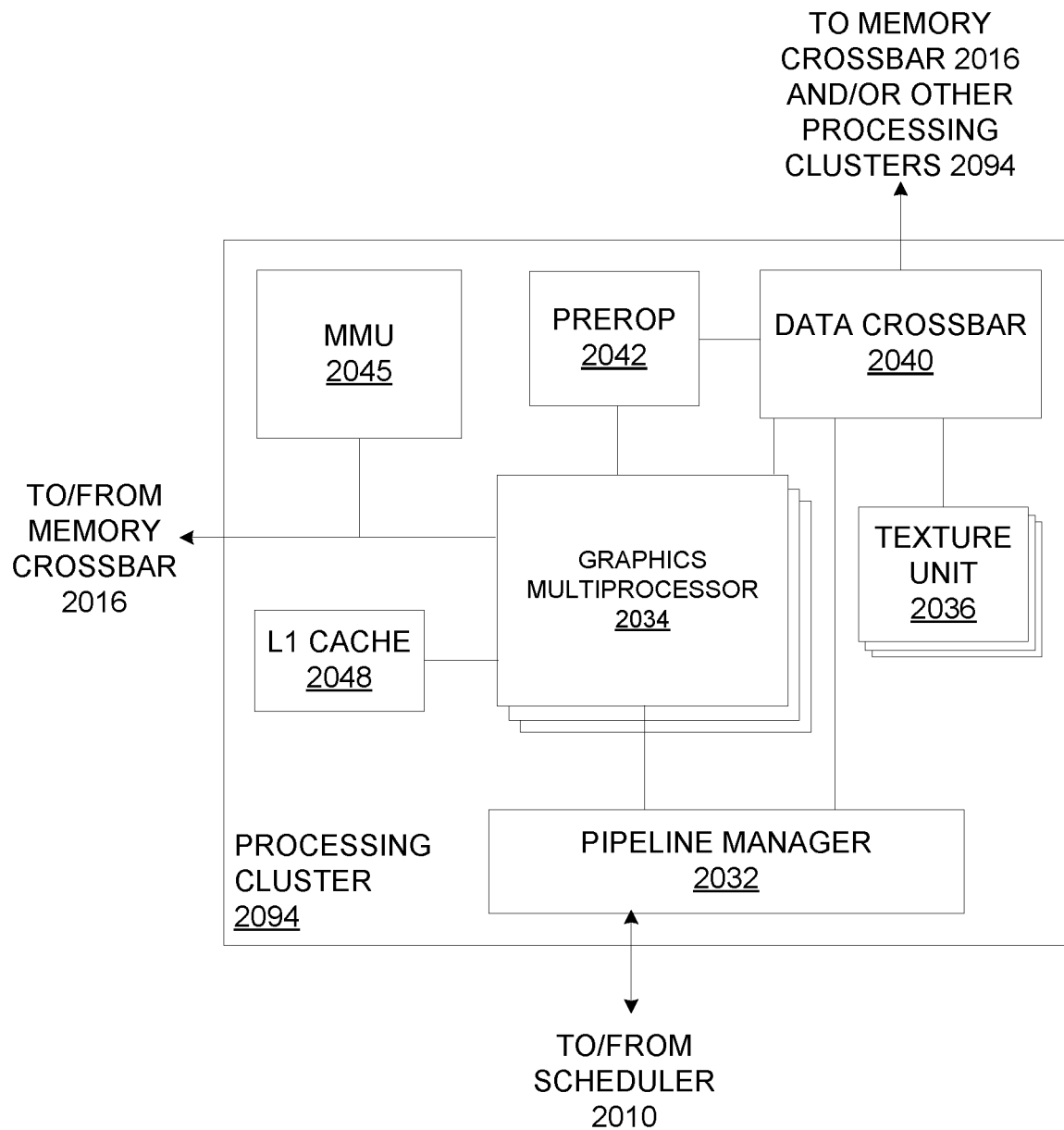
FIG. 20B illustrates a processing cluster, in accordance with at least one embodiment.

FIG. 20B illustrates a processing cluster 2094, in accordance with at least one embodiment. In at least one embodiment, processing cluster 2094 is included within a parallel processing unit. In at least one embodiment, processing cluster 2094 is one of processing clusters 2014A-2014N of FIG. 20. In at least one embodiment, processing cluster 2094 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2094.

In at least one embodiment, processing cluster 2094 is to perform various computational operations, including one or more application programming interfaces (APIs), described above in conjunction with FIGS. 2-7 and/or processes described above in conjunction with FIG. 8. In at least one embodiment, processing cluster 2094 comprises hardware and/or other components to perform various computational operations and/or APIs described above in conjunction with FIGS. 2-7 and/or processes described above in conjunction with FIG. 8.

In at least one embodiment, operation of processing cluster 2094 can be controlled via a pipeline manager 2032 that distributes processing tasks to SIMT parallel processors. In at least one embodiment, pipeline manager 2032 receives instructions from scheduler 2010 of FIG. 20 and manages execution of those instructions via a graphics multiprocessor 2034 and/or a texture unit 2036. In at least one embodiment, graphics multiprocessor 2034 is an exemplary instance of a SIMT parallel processor. However, in at least one embodiment, various types of SIMT parallel processors of differing architectures may be included within processing cluster 2094. In at least one embodiment, one or more instances of graphics multiprocessor 2034 can be included within processing cluster 2094. In at least one embodiment, graphics multiprocessor 2034 can process data and a data crossbar 2040 can be used to distribute processed data to one of multiple possible destinations, including other shader units. In at least one embodiment, pipeline manager 2032 can facilitate distribution of processed data by specifying destinations for processed data to be distributed via data crossbar 2040.

In at least one embodiment, each graphics multiprocessor 2034 within processing cluster 2094 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2094 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2034. In at least one embodiment, a thread group may include fewer threads than a number of processing engines within graphics multiprocessor 2034. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2034. In at least one embodiment, when a thread group includes more threads than the number of processing engines within graphics multiprocessor 2034, processing can be performed over consecutive clock cycles. In at least one embodiment, multiple thread groups can be executed concurrently on graphics multiprocessor 2034.

In at least one embodiment, graphics multiprocessor 2034 includes an internal cache memory to perform load and store operations. In at least one embodiment, graphics multiprocessor 2034 can forego an internal cache and use a cache memory (e.g., L1 cache 2048) within processing cluster 2094. In at least one embodiment, each graphics multiprocessor 2034 also has access to Level 2 ("L2") caches within partition units (e.g., partition units 2020A-2020N of FIG. 20A) that are shared among all processing clusters 2094 and may be used to transfer data between threads. In at least one embodiment, graphics multiprocessor 2034 may also access off-chip global memory, which can include one or more of local parallel processor memory and/or system memory. In at least one embodiment, any memory external to parallel processing unit 2002 may be used as global memory. In at least one embodiment, processing cluster 2094 includes multiple instances of graphics multiprocessor 2034 that can share common instructions and data, which may be stored in L1 cache 2048.

In at least one embodiment, each processing cluster 2094 may include an MMU 2045 that is configured to map virtual addresses into physical addresses. In at least one embodiment, one or more instances of MMU 2045 may reside within memory interface 2018 of FIG. 20. In at least one embodiment, MMU 2045 includes a set of page table entries ("PTEs") used to map a virtual address to a physical address of a tile and optionally a cache line index. In at least one embodiment, MMU 2045 may include address translation lookaside buffers ("TLBs") or caches that may reside within graphics multiprocessor 2034 or L1 cache 2048 or processing cluster 2094. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2094 may be configured such that each graphics multiprocessor 2034 is coupled to a texture unit 2036 for performing texture mapping operations, e.g., determining texture sample positions, reading texture data, and filtering texture data. In at least one embodiment, texture data is read from an internal texture L1 cache (not shown) or from an L1 cache within graphics multiprocessor 2034 and is fetched from an L2 cache, local parallel processor memory, or system memory, as needed. In at least one embodiment, each graphics multiprocessor 2034 outputs a processed task to data crossbar 2040 to provide the processed task to another processing cluster 2094 for further processing or to store the processed task in an L2 cache, a local parallel processor memory, or a system memory via memory crossbar 2016. In at least one embodiment, a pre-raster operations unit ("preROP") 2042 is configured to receive data from graphics multiprocessor 2034, direct data to ROP units, which may be located with partition units as described herein (e.g., partition units 2020A-2020N of FIG. 20). In at least one embodiment, PreROP 2042 can perform optimizations for color blending, organize pixel color data, and perform address translations.

Figure 20C:
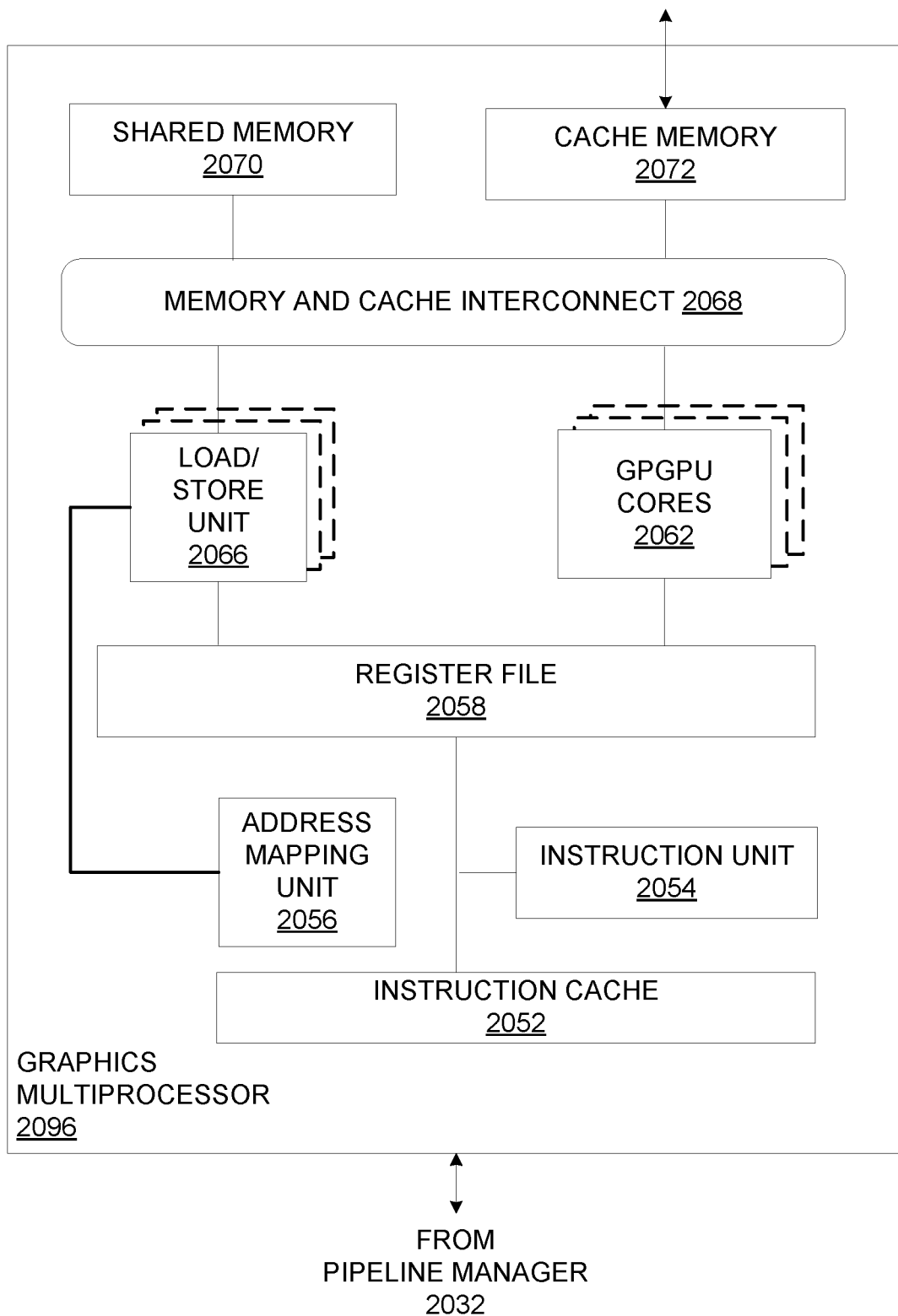
FIG. 20C illustrates a graphics multiprocessor, in accordance with at least one embodiment.

FIG. 20C illustrates a graphics multiprocessor 2096, in accordance with at least one embodiment. In at least one embodiment, graphics multiprocessor 2096 is graphics multiprocessor 2034 of FIG. 20B. In at least one embodiment, graphics multiprocessor 2096 couples with pipeline manager 2032 of processing cluster 2094. In at least one embodiment, graphics multiprocessor 2096 has an execution pipeline including but not limited to an instruction cache 2052, an instruction unit 2054, an address mapping unit 2056, a register file 2058, one or more GPGPU cores 2062, and one or more LSUs 2066. GPGPU cores 2062 and LSUs 2066 are coupled with cache memory 2072 and shared memory 2070 via a memory and cache interconnect 2068.

In at least one embodiment, graphics multiprocessor 2096 is to perform various computational operations, including one or more application programming interfaces (APIs), described above in conjunction with FIGS. 2-7 and/or processes described above in conjunction with FIG. 8. In at least one embodiment, graphics multiprocessor 2096 comprises hardware and/or other components to perform various computational operations and/or APIs described above in conjunction with FIGS. 2-7 and/or processes described above in conjunction with FIG. 8.

In at least one embodiment, instruction cache 2052 receives a stream of instructions to execute from pipeline manager 2032. In at least one embodiment, instructions are cached in instruction cache 2052 and dispatched for execution by instruction unit 2054. In at least one embodiment, instruction unit 2054 can dispatch instructions as thread groups (e.g., warps), with each thread of a thread group assigned to a different execution unit within GPGPU core 2062. In at least one embodiment, an instruction can access any of a local, shared, or global address space by specifying an address within a unified address space. In at least one embodiment, address mapping unit 2056 can be used to translate addresses in a unified address space into a distinct memory address that can be accessed by LSUs 2066.

In at least one embodiment, register file 2058 provides a set of registers for functional units of graphics multiprocessor 2096. In at least one embodiment, register file 2058 provides temporary storage for operands connected to data paths of functional units (e.g., GPGPU cores 2062, LSUs 2066) of graphics multiprocessor 2096. In at least one embodiment, register file 2058 is divided between each of functional units such that each functional unit is allocated a dedicated portion of register file 2058. In at least one embodiment, register file 2058 is divided between different thread groups being executed by graphics multiprocessor 2096.

In at least one embodiment, GPGPU cores 2062 can each include FPUs and/or integer ALUs that are used to execute instructions of graphics multiprocessor 2096. GPGPU cores 2062 can be similar in architecture or can differ in architecture. In at least one embodiment, a first portion of GPGPU cores 2062 include a single precision FPU and an integer ALU while a second portion of GPGPU cores 2062 include a double precision FPU. In at least one embodiment, FPUs can implement IEEE 754-2008 standard for floating point arithmetic or enable variable precision floating point arithmetic. In at least one embodiment, graphics multiprocessor 2096 can additionally include one or more fixed function or special function units to perform specific functions such as copy rectangle or pixel blending operations. In at least one embodiment one or more of GPGPU cores 2062 can also include fixed or special function logic.

In at least one embodiment, GPGPU cores 2062 include SIMD logic capable of performing a single instruction on multiple sets of data. In at least one embodiment GPGPU cores 2062 can physically execute SIMD4, SIMD8, and SIMD16 instructions and logically execute SIMD1, SIMD2, and SIMD32 instructions. In at least one embodiment, SIMD instructions for GPGPU cores 2062 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2068 is an interconnect network that connects each functional unit of graphics multiprocessor 2096 to register file 2058 and to shared memory 2070. In at least one embodiment, memory and cache interconnect 2068 is a crossbar interconnect that allows LSU 2066 to implement load and store operations between shared memory 2070 and register file 2058. In at least one embodiment, register file 2058 can operate at a same frequency as GPGPU cores 2062, thus data transfer between GPGPU cores 2062 and register file 2058 is very low latency. In at least one embodiment, shared memory 2070 can be used to enable communication between threads that execute on functional units within graphics multiprocessor 2096. In at least one embodiment, cache memory 2072 can be used as a data cache for example, to cache texture data communicated between functional units and texture unit 2036. In at least one embodiment, shared memory 2070 can also be used as a program managed cached. In at least one embodiment, threads executing on GPGPU cores 2062 can programmatically store data within shared memory in addition to automatically cached data that is stored within cache memory 2072.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 21:
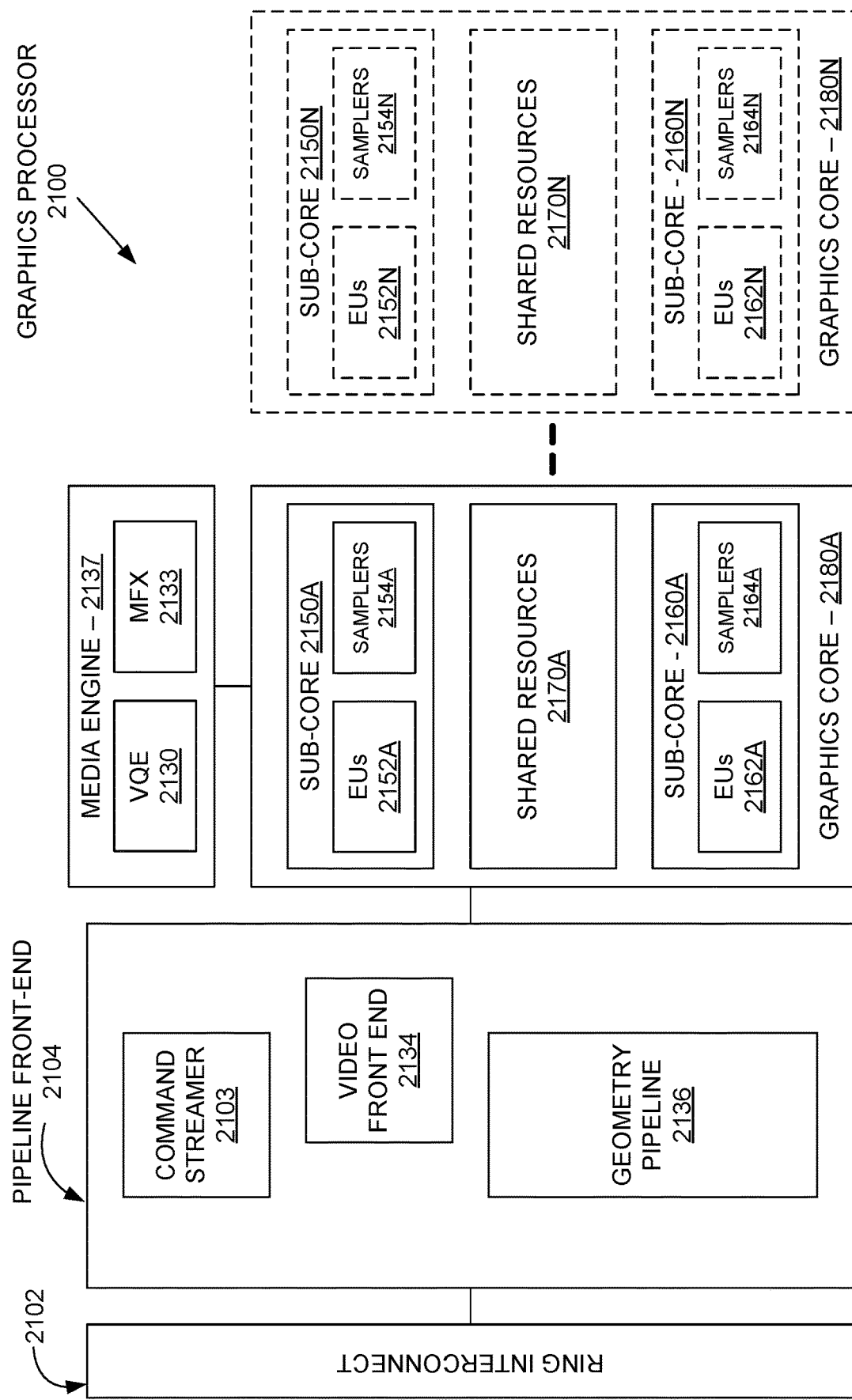
FIG. 21 illustrates a graphics processor, in accordance with at least one embodiment.

FIG. 21 illustrates a graphics processor 2100, in accordance with at least one embodiment. In at least one embodiment, graphics processor 2100 includes a ring interconnect 2102, a pipeline front-end 2104, a media engine 2137, and graphics cores 2180A-2180N. In at least one embodiment, ring interconnect 2102 couples graphics processor 2100 to other processing units, including other graphics processors or one or more general-purpose processor cores. In at least one embodiment, graphics processor 2100 is one of many processors integrated within a multi-core processing system.

In at least one embodiment, graphics processor 2100 is to perform various computational operations, including one or more application programming interfaces (APIs), described above in conjunction with FIGS. 2-7 and/or processes described above in conjunction with FIG. 8. In at least one embodiment, graphics processor 2100 comprises hardware and/or other components to perform various computational operations and/or APIs described above in conjunction with FIGS. 2-7 and/or processes described above in conjunction with FIG. 8.

In at least one embodiment, graphics processor 2100 receives batches of commands via ring interconnect 2102. In at least one embodiment, incoming commands are interpreted by a command streamer 2103 in pipeline front-end 2104. In at least one embodiment, graphics processor 2100 includes scalable execution logic to perform 3D geometry processing and media processing via graphics core(s) 2180A-2180N. In at least one embodiment, for 3D geometry processing commands, command streamer 2103 supplies commands to geometry pipeline 2136. In at least one embodiment, for at least some media processing commands, command streamer 2103 supplies commands to a video front end 2134, which couples with a media engine 2137. In at least one embodiment, media engine 2137 includes a Video Quality Engine ("VQE") 2130 for video and image post-processing and a multi-format encode/decode ("MFX") engine 2133 to provide hardware-accelerated media data encode and decode. In at least one embodiment, geometry pipeline 2136 and media engine 2137 each generate execution threads for thread execution resources provided by at least one graphics core 2180A.

In at least one embodiment, graphics processor 2100 includes scalable thread execution resources featuring modular graphics cores 2180A-2180N (sometimes referred to as core slices), each having multiple sub-cores 2150A-550N, 2160A-2160N (sometimes referred to as core sub-slices). In at least one embodiment, graphics processor 2100 can have any number of graphics cores 2180A through 2180N. In at least one embodiment, graphics processor 2100 includes a graphics core 2180A having at least a first sub-core 2150A and a second sub-core 2160A. In at least one embodiment, graphics processor 2100 is a low power processor with a single sub-core (e.g., sub-core 2150A). In at least one embodiment, graphics processor 2100 includes multiple graphics cores 2180A-2180N, each including a set of first sub-cores 2150A-2150N and a set of second sub-cores 2160A-2160N. In at least one embodiment, each sub-core in first sub-cores 2150A-2150N includes at least a first set of execution units ("EUs") 2152A-2152N and media/texture samplers 2154A-2154N. In at least one embodiment, each sub-core in second sub-cores 2160A-2160N includes at least a second set of execution units 2162A-2162N and samplers 2164A-2164N. In at least one embodiment, each sub-core 2150A-2150N, 2160A-2160N shares a set of shared resources 2170A-2170N. In at least one embodiment, shared resources 2170 include shared cache memory and pixel operation logic.

Figure 22:
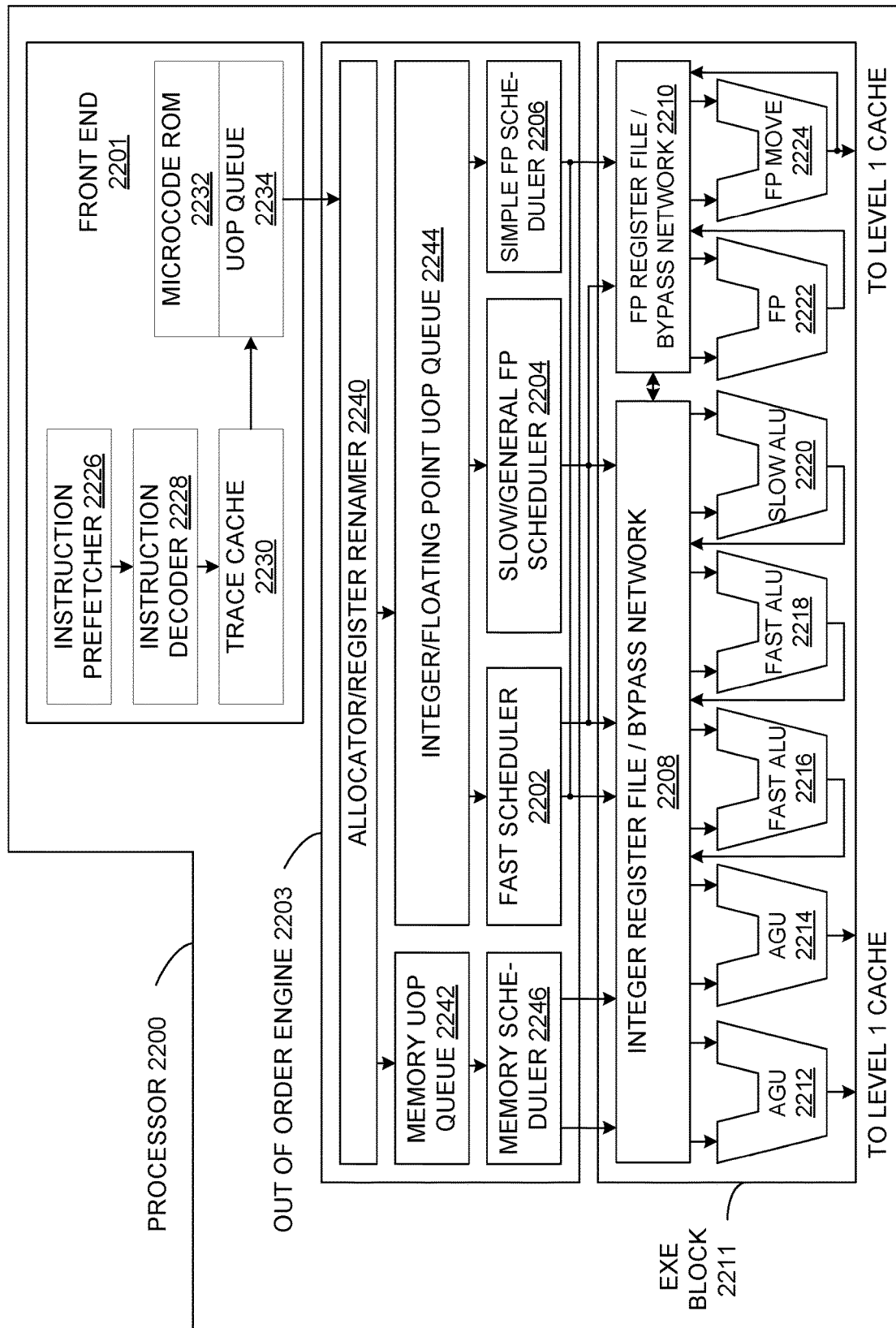
FIG. 22 illustrates a processor, in accordance with at least one embodiment.

FIG. 22 illustrates a processor 2200, in accordance with at least one embodiment. In at least one embodiment, processor 2200 may include, without limitation, logic circuits to perform instructions. In at least one embodiment, processor 2200 may perform instructions, including x86 instructions, ARM instructions, specialized instructions for ASICs, etc. In at least one embodiment, processor 2210 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2210 may perform instructions to accelerate CUDA programs.

In at least one embodiment, processor 2200 is to perform various computational operations, including one or more application programming interfaces (APIs), described above in conjunction with FIGS. 2-7 and/or processes described above in conjunction with FIG. 8. In at least one embodiment, processor 2200 comprises hardware and/or other components to perform various computational operations and/or APIs described above in conjunction with FIGS. 2-7 and/or processes described above in conjunction with FIG. 8.

In at least one embodiment, processor 2200 includes an in-order front end ("front end") 2201 to fetch instructions to be executed and prepare instructions to be used later in processor pipeline. In at least one embodiment, front end 2201 may include several units. In at least one embodiment, an instruction prefetcher 2226 fetches instructions from memory and feeds instructions to an instruction decoder 2228 which in turn decodes or interprets instructions. For example, in at least one embodiment, instruction decoder 2228 decodes a received instruction into one or more operations called "micro-instructions" or "micro-operations" (also called "micro ops" or "uops") for execution. In at least one embodiment, instruction decoder 2228 parses instruction into an opcode and corresponding data and control fields that may be used by micro-architecture to perform operations. In at least one embodiment, a trace cache 2230 may assemble decoded uops into program ordered sequences or traces in a uop queue 2234 for execution. In at least one embodiment, when trace cache 2230 encounters a complex instruction, a microcode ROM 2232 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2228 may access microcode ROM 2232 to perform instruction. In at least one embodiment, an instruction may be decoded into a small number of micro-ops for processing at instruction decoder 2228. In at least one embodiment, an instruction may be stored within microcode ROM 2232 should a number of micro-ops be needed to accomplish operation. In at least one embodiment, trace cache 2230 refers to an entry point programmable logic array ("PLA") to determine a correct micro-instruction pointer for reading microcode sequences to complete one or more instructions from microcode ROM 2232. In at least one embodiment, after microcode ROM 2232 finishes sequencing micro-ops for an instruction, front end 2201 of machine may resume fetching micro-ops from trace cache 2230.

In at least one embodiment, out-of-order execution engine ("out of order engine") 2203 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2203 includes, without limitation, an allocator/register renamer 2240, a memory uop queue 2242, an integer/floating point uop queue 2244, a memory scheduler 2246, a fast scheduler 2202, a slow/general floating point scheduler ("slow/general FP scheduler") 2204, and a simple floating point scheduler ("simple FP scheduler") 2206. In at least one embodiment, fast schedule 2202, slow/general floating point scheduler 2204, and simple floating point scheduler 2206 are also collectively referred to herein as "uop schedulers 2202, 2204, 2206." Allocator/register renamer 2240 allocates machine buffers and resources that each uop needs in order to execute. In at least one embodiment, allocator/register renamer 2240 renames logic registers onto entries in a register file. In at least one embodiment, allocator/register renamer 2240 also allocates an entry for each uop in one of two uop queues, memory uop queue 2242 for memory operations and integer/floating point uop queue 2244 for non-memory operations, in front of memory scheduler 2246 and uop schedulers 2202, 2204, 2206. In at least one embodiment, uop schedulers 2202, 2204, 2206, determine when a uop is ready to execute based on readiness of their dependent input register operand sources and availability of execution resources uops need to complete their operation. In at least one embodiment, fast scheduler 2202 of at least one embodiment may schedule on each half of main clock cycle while slow/general floating point scheduler 2204 and simple floating point scheduler 2206 may schedule once per main processor clock cycle. In at least one embodiment, uop schedulers 2202, 2204, 2206 arbitrate for dispatch ports to schedule uops for execution.

In at least one embodiment, execution block 2211 includes, without limitation, an integer register file/bypass network 2208, a floating point register file/bypass network ("FP register file/bypass network") 2210, address generation units ("AGUs") 2212 and 2214, fast ALUs 2216 and 2218, a slow ALU 2220, a floating point ALU ("FP") 2222, and a floating point move unit ("FP move") 2224. In at least one embodiment, integer register file/bypass network 2208 and floating point register file/bypass network 2210 are also referred to herein as "register files 2208, 2210." In at least one embodiment, AGUSs 2212 and 2214, fast ALUs 2216 and 2218, slow ALU 2220, floating point ALU 2222, and floating point move unit 2224 are also referred to herein as "execution units 2212, 2214, 2216, 2218, 2220, 2222, and 2224." In at least one embodiment, an execution block may include, without limitation, any number (including zero) and type of register files, bypass networks, address generation units, and execution units, in any combination.

In at least one embodiment, register files 2208, 2210 may be arranged between uop schedulers 2202, 2204, 2206, and execution units 2212, 2214, 2216, 2218, 2220, 2222, and 2224. In at least one embodiment, integer register file/bypass network 2208 performs integer operations. In at least one embodiment, floating point register file/bypass network 2210 performs floating point operations. In at least one embodiment, each of register files 2208, 2210 may include, without limitation, a bypass network that may bypass or forward just completed results that have not yet been written into register file to new dependent uops. In at least one embodiment, register files 2208, 2210 may communicate data with each other. In at least one embodiment, integer register file/bypass network 2208 may include, without limitation, two separate register files, one register file for low-order thirty-two bits of data and a second register file for high order thirty-two bits of data. In at least one embodiment, floating point register file/bypass network 2210 may include, without limitation, 128-bit wide entries because floating point instructions typically have operands from 64 to 128 bits in width.

In at least one embodiment, execution units 2212, 2214, 2216, 2218, 2220, 2222, 2224 may execute instructions. In at least one embodiment, register files 2208, 2210 store integer and floating point data operand values that microinstructions need to execute. In at least one embodiment, processor 2200 may include, without limitation, any number and combination of execution units 2212, 2214, 2216, 2218, 2220, 2222, 2224. In at least one embodiment, floating point ALU 2222 and floating point move unit 2224 may execute floating point, MMX, SIMD, AVX and SSE, or other operations. In at least one embodiment, floating point ALU 2222 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2216, 2218. In at least one embodiment, fast ALUS 2216, 2218 may execute fast operations with an effective latency of half a clock cycle. In at least one embodiment, most complex integer operations go to slow ALU 2220 as slow ALU 2220 may include, without limitation, integer execution hardware for long-latency type of operations, such as a multiplier, shifts, flag logic, and branch processing. In at least one embodiment, memory load/store operations may be executed by AGUs 2212, 2214. In at least one embodiment, fast ALU 2216, fast ALU 2218, and slow ALU 2220 may perform integer operations on 64-bit data operands. In at least one embodiment, fast ALU 2216, fast ALU 2218, and slow ALU 2220 may be implemented to support a variety of data bit sizes including sixteen, thirty-two, 128, 256, etc. In at least one embodiment, floating point ALU 2222 and floating point move unit 2224 may be implemented to support a range of operands having bits of various widths. In at least one embodiment, floating point ALU 2222 and floating point move unit 2224 may operate on 128-bit wide packed data operands in conjunction with SIMD and multimedia instructions.

In at least one embodiment, uop schedulers 2202, 2204, 2206 dispatch dependent operations before parent load has finished executing. In at least one embodiment, as uops may be speculatively scheduled and executed in processor 2200, processor 2200 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 23:
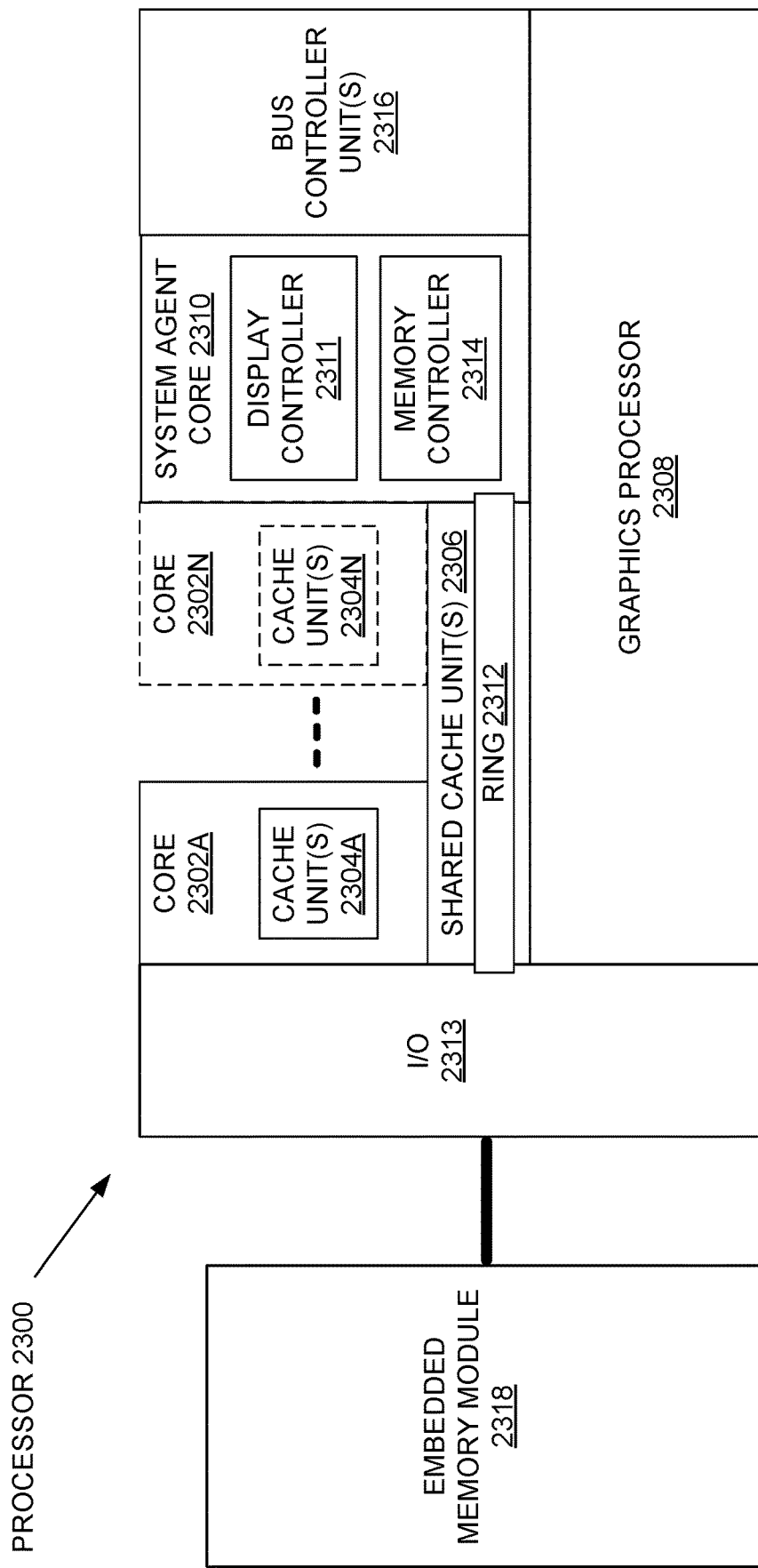
FIG. 23 illustrates a processor, in accordance with at least one embodiment.

FIG. 23 illustrates a processor 2300, in accordance with at least one embodiment. In at least one embodiment, processor 2300 includes, without limitation, one or more processor cores ("cores") 2302A-2302N, an integrated memory controller 2314, and an integrated graphics processor 2308. In at least one embodiment, processor 2300 can include additional cores up to and including additional processor core 2302N represented by dashed lined boxes. In at least one embodiment, each of processor cores 2302A-2302N includes one or more internal cache units 2304A-2304N. In at least one embodiment, each processor core also has access to one or more shared cached units 2306.

In at least one embodiment, processor 2300 is to perform various computational operations, including one or more application programming interfaces (APIs), described above in conjunction with FIGS. 2-7 and/or processes described above in conjunction with FIG. 8. In at least one embodiment, processor 2300 comprises hardware and/or other components to perform various computational operations and/or APIs described above in conjunction with FIGS. 2-7 and/or processes described above in conjunction with FIG. 8.

In at least one embodiment, internal cache units 2304A-2304N and shared cache units 2306 represent a cache memory hierarchy within processor 2300. In at least one embodiment, cache memory units 2304A-2304N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2306 and 2304A-2304N.

In at least one embodiment, processor 2300 may also include a set of one or more bus controller units 2316 and a system agent core 2310. In at least one embodiment, one or more bus controller units 2316 manage a set of peripheral buses, such as one or more PCI or PCI express buses. In at least one embodiment, system agent core 2310 provides management functionality for various processor components. In at least one embodiment, system agent core 2310 includes one or more integrated memory controllers 2314 to manage access to various external memory devices (not shown).

In at least one embodiment, one or more of processor cores 2302A-2302N include support for simultaneous multi-threading. In at least one embodiment, system agent core 2310 includes components for coordinating and operating processor cores 2302A-2302N during multi-threaded processing. In at least one embodiment, system agent core 2310 may additionally include a power control unit ("PCU"), which includes logic and components to regulate one or more power states of processor cores 2302A-2302N and graphics processor 2308.

In at least one embodiment, processor 2300 additionally includes graphics processor 2308 to execute graphics processing operations. In at least one embodiment, graphics processor 2308 couples with shared cache units 2306, and system agent core 2310, including one or more integrated memory controllers 2314. In at least one embodiment, system agent core 2310 also includes a display controller 2311 to drive graphics processor output to one or more coupled displays. In at least one embodiment, display controller 2311 may also be a separate module coupled with graphics processor 2308 via at least one interconnect, or may be integrated within graphics processor 2308.

In at least one embodiment, a ring based interconnect unit 2312 is used to couple internal components of processor 2300. In at least one embodiment, an alternative interconnect unit may be used, such as a point-to-point interconnect, a switched interconnect, or other techniques. In at least one embodiment, graphics processor 2308 couples with ring interconnect 2312 via an I/O link 2313.

In at least one embodiment, I/O link 2313 represents at least one of multiple varieties of I/O interconnects, including an on package I/O interconnect which facilitates communication between various processor components and a high-performance embedded memory module 2318, such as an eDRAM module. In at least one embodiment, each of processor cores 2302A-2302N and graphics processor 2308 use embedded memory modules 2318 as a shared LLC.

In at least one embodiment, processor cores 2302A-2302N are homogeneous cores executing a common instruction set architecture. In at least one embodiment, processor cores 2302A-2302N are heterogeneous in terms of ISA, where one or more of processor cores 2302A-2302N execute a common instruction set, while one or more other cores of processor cores 2302A-23-02N executes a subset of a common instruction set or a different instruction set. In at least one embodiment, processor cores 2302A-2302N are heterogeneous in terms of microarchitecture, where one or more cores having a relatively higher power consumption couple with one or more cores having a lower power consumption. In at least one embodiment, processor 2300 can be implemented on one or more chips or as an SoC integrated circuit.

Figure 24:
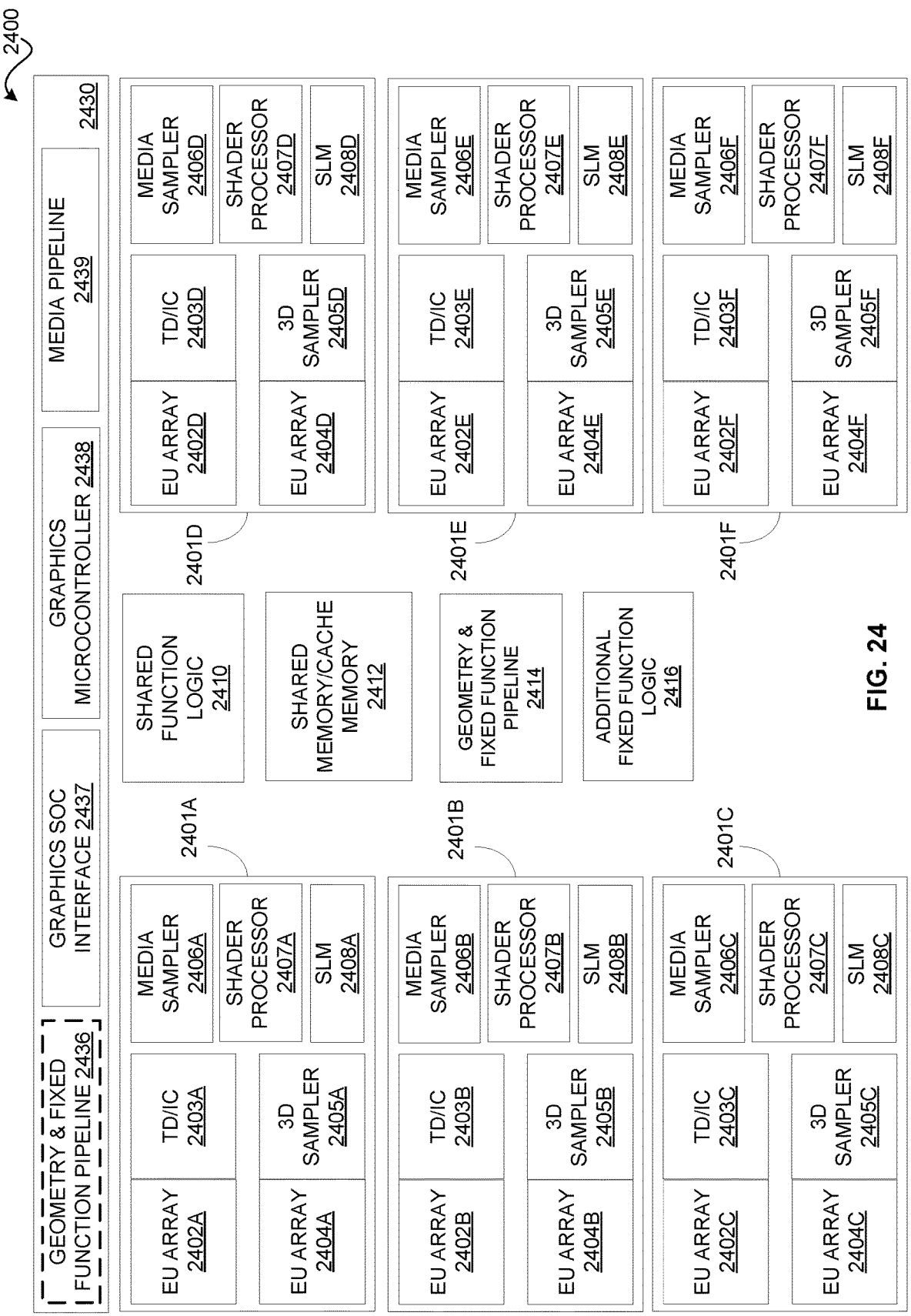
FIG. 24 illustrates a graphics processor core, in accordance with at least one embodiment.

FIG. 24 illustrates a graphics processor core 2400, in accordance with at least one embodiment described. In at least one embodiment, graphics processor core 2400 is included within a graphics core array. In at least one embodiment, graphics processor core 2400, sometimes referred to as a core slice, can be one or multiple graphics cores within a modular graphics processor. In at least one embodiment, graphics processor core 2400 is exemplary of one graphics core slice, and a graphics processor as described herein may include multiple graphics core slices based on target power and performance envelopes. In at least one embodiment, each graphics core 2400 can include a fixed function block 2430 coupled with multiple sub-cores 2401A-2401F, also referred to as sub-slices, that include modular blocks of general-purpose and fixed function logic.

In at least one embodiment, graphics processor core 2400 is to perform various computational operations, including one or more application programming interfaces (APIs), described above in conjunction with FIGS. 2-7 and/or processes described above in conjunction with FIG. 8. In at least one embodiment, graphics processor core 2400 comprises hardware and/or other components to perform various computational operations and/or APIs described above in conjunction with FIGS. 2-7 and/or processes described above in conjunction with FIG. 8.

In at least one embodiment, fixed function block 2430 includes a geometry/fixed function pipeline 2436 that can be shared by all sub-cores in graphics processor 2400, for example, in lower performance and/or lower power graphics processor implementations. In at least one embodiment, geometry/fixed function pipeline 2436 includes a 3D fixed function pipeline, a video front-end unit, a thread spawner and thread dispatcher, and a unified return buffer manager, which manages unified return buffers.

In at least one embodiment, fixed function block 2430 also includes a graphics SoC interface 2437, a graphics microcontroller 2438, and a media pipeline 2439. Graphics SoC interface 2437 provides an interface between graphics core 2400 and other processor cores within an SoC integrated circuit. In at least one embodiment, graphics microcontroller 2438 is a programmable sub-processor that is configurable to manage various functions of graphics processor 2400, including thread dispatch, scheduling, and pre-emption. In at least one embodiment, media pipeline 2439 includes logic to facilitate decoding, encoding, pre-processing, and/or post-processing of multimedia data, including image and video data. In at least one embodiment, media pipeline 2439 implements media operations via requests to compute or sampling logic within sub-cores 2401-2401F.

In at least one embodiment, SoC interface 2437 enables graphics core 2400 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 2437 can also enable communication with fixed function devices within an SoC, such as camera imaging pipelines, and enables use of and/or implements global memory atomics that may be shared between graphics core 2400 and CPUs within an SoC. In at least one embodiment, SoC interface 2437 can also implement power management controls for graphics core 2400 and enable an interface between a clock domain of graphic core 2400 and other clock domains within an SoC. In at least one embodiment, SoC interface 2437 enables receipt of command buffers from a command streamer and global thread dispatcher that are configured to provide commands and instructions to each of one or more graphics cores within a graphics processor. In at least one embodiment, commands and instructions can be dispatched to media pipeline 2439, when media operations are to be performed, or a geometry and fixed function pipeline (e.g., geometry and fixed function pipeline 2436, geometry and fixed function pipeline 2414) when graphics processing operations are to be performed.

In at least one embodiment, graphics microcontroller 2438 can be configured to perform various scheduling and management tasks for graphics core 2400. In at least one embodiment, graphics microcontroller 2438 can perform graphics and/or compute workload scheduling on various graphics parallel engines within execution unit (EU) arrays 2402A-2402F, 2404A-2404F within sub-cores 2401A-2401F. In at least one embodiment, host software executing on a CPU core of an SoC including graphics core 2400 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2438 can also facilitate low-power or idle states for graphics core 2400, providing graphics core 2400 with an ability to save and restore registers within graphics core 2400 across low-power state transitions independently from an operating system and/or graphics driver software on a system.

In at least one embodiment, graphics core 2400 may have greater than or fewer than illustrated sub-cores 2401A-2401F, up to N modular sub-cores. For each set of N sub-cores, in at least one embodiment, graphics core 2400 can also include shared function logic 2410, shared and/or cache memory 2412, a geometry/fixed function pipeline 2414, as well as additional fixed function logic 2416 to accelerate various graphics and compute processing operations. In at least one embodiment, shared function logic 2410 can include logic units (e.g., sampler, math, and/or inter-thread communication logic) that can be shared by each N sub-cores within graphics core 2400. Shared and/or cache memory 2412 can be an LLC for N sub-cores 2401A-2401F within graphics core 2400 and can also serve as shared memory that is accessible by multiple sub-cores. In at least one embodiment, geometry/fixed function pipeline 2414 can be included instead of geometry/fixed function pipeline 2436 within fixed function block 2430 and can include same or similar logic units.

In at least one embodiment, graphics core 2400 includes additional fixed function logic 2416 that can include various fixed function acceleration logic for use by graphics core 2400. In at least one embodiment, additional fixed function logic 2416 includes an additional geometry pipeline for use in position only shading. In position-only shading, at least two geometry pipelines exist, whereas in a full geometry pipeline within geometry/fixed function pipeline 2416, 2436, and a cull pipeline, which is an additional geometry pipeline which may be included within additional fixed function logic 2416. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2416 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2416 can also include general purpose processing acceleration logic, such as fixed function matrix multiplication logic, for accelerating CUDA programs.

In at least one embodiment, each graphics sub-core 2401A-2401F includes a set of execution resources that may be used to perform graphics, media, and compute operations in response to requests by graphics pipeline, media pipeline, or shader programs. In at least one embodiment, graphics sub-cores 2401A-2401F include multiple EU arrays 2402A-2402F, 2404A-2404F, thread dispatch and inter-thread communication ("TD/IC") logic 2403A-2403F, a 3D (e.g., texture) sampler 2405A-2405F, a media sampler 2406A-2406F, a shader processor 2407A-2407F, and shared local memory ("SLM") 2408A-2408F. EU arrays 2402A-2402F, 2404A-2404F each include multiple execution units, which are GPGPUs capable of performing floating-point and integer/fixed-point logic operations in service of a graphics, media, or compute operation, including graphics, media, or compute shader programs. In at least one embodiment, TD/IC logic 2403A-2403F performs local thread dispatch and thread control operations for execution units within a sub-core and facilitate communication between threads executing on execution units of a sub-core. In at least one embodiment, 3D sampler 2405A-2405F can read texture or other 3D graphics related data into memory. In at least one embodiment, 3D sampler can read texture data differently based on a configured sample state and texture format associated with a given texture. In at least one embodiment, media sampler 2406A-2406F can perform similar read operations based on a type and format associated with media data. In at least one embodiment, each graphics sub-core 2401A-2401F can alternately include a unified 3D and media sampler. In at least one embodiment, threads executing on execution units within each of sub-cores 2401A-2401F can make use of shared local memory 2408A-2408F within each sub-core, to enable threads executing within a thread group to execute using a common pool of on-chip memory.

Figure 25:
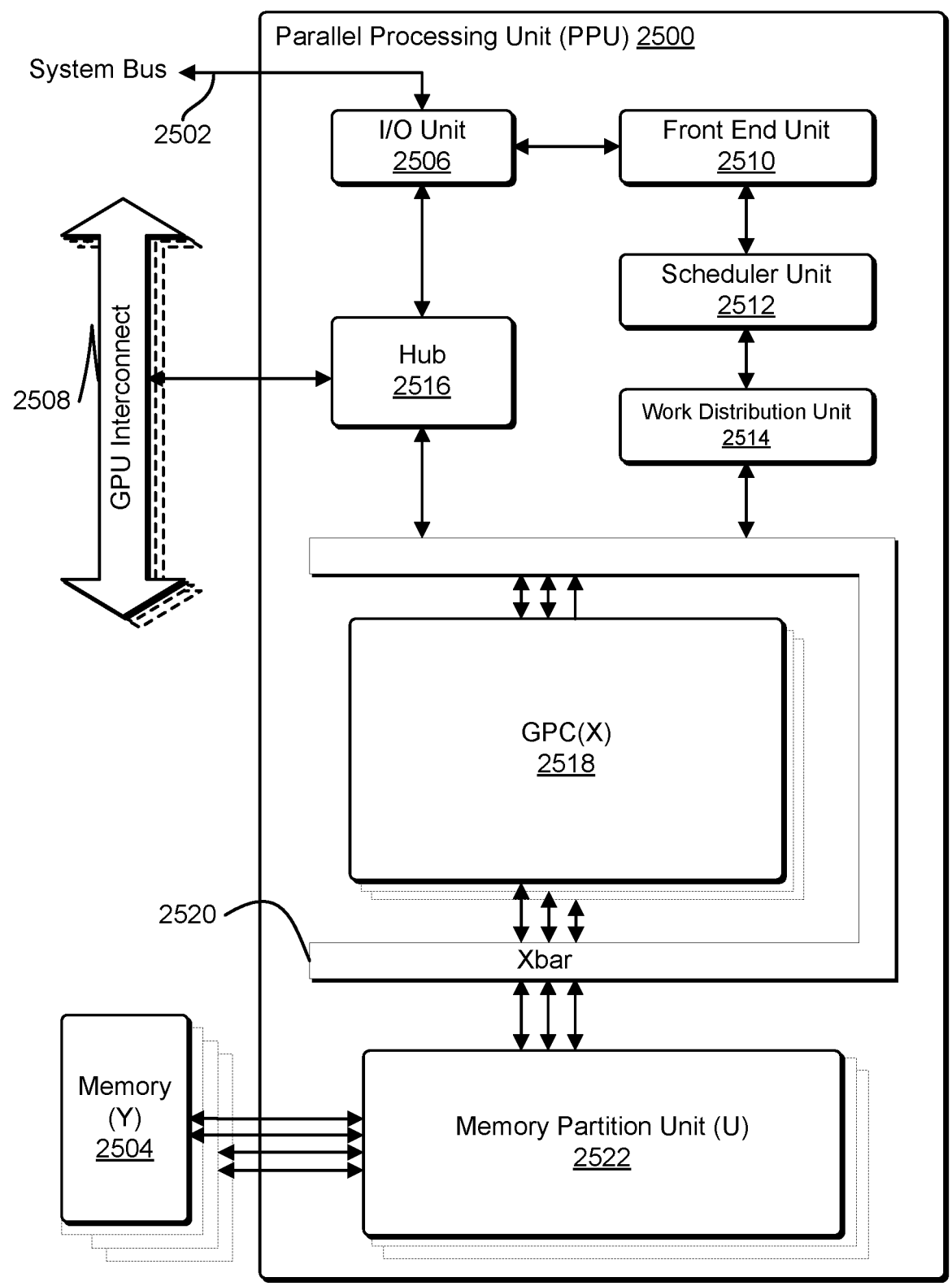
FIG. 25 illustrates a PPU, in accordance with at least one embodiment.

FIG. 25 illustrates a parallel processing unit ("PPU") 2500, in accordance with at least one embodiment. In at least one embodiment, PPU 2500 is configured with machine-readable code that, if executed by PPU 2500, causes PPU 2500 to perform some or all of processes and techniques described herein. In at least one embodiment, PPU 2500 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2500. In at least one embodiment, PPU 2500 is a GPU configured to implement a graphics rendering pipeline for processing three-dimensional ("3D") graphics data in order to generate two-dimensional ("2D") image data for display on a display device such as an LCD device. In at least one embodiment, PPU 2500 is utilized to perform computations such as linear algebra operations and machine-learning operations. FIG. 25 illustrates an example parallel processor for illustrative purposes only and should be construed as a non-limiting example of a processor architecture that may be implemented in at least one embodiment.

In at least one embodiment, PPU 2500 is to perform various computational operations, including one or more application programming interfaces (APIs), described above in conjunction with FIGS. 2-7 and/or processes described above in conjunction with FIG. 8. In at least one embodiment, PPU 2500 comprises hardware and/or other components to perform various computational operations and/or APIs described above in conjunction with FIGS. 2-7 and/or processes described above in conjunction with FIG. 8.

In at least one embodiment, one or more PPUs 2500 are configured to accelerate High Performance Computing ("HPC"), data center, and machine learning applications. In at least one embodiment, one or more PPUs 2500 are configured to accelerate CUDA programs. In at least one embodiment, PPU 2500 includes, without limitation, an I/O unit 2506, a front-end unit 2510, a scheduler unit 2512, a work distribution unit 2514, a hub 2516, a crossbar ("Xbar") 2520, one or more general processing clusters ("GPCs") 2518, and one or more partition units ("memory partition units") 2522. In at least one embodiment, PPU 2500 is connected to a host processor or other PPUs 2500 via one or more high-speed GPU interconnects ("GPU interconnects") 2508. In at least one embodiment, PPU 2500 is connected to a host processor or other peripheral devices via a system bus or interconnect 2502. In at least one embodiment, PPU 2500 is connected to a local memory comprising one or more memory devices ("memory") 2504. In at least one embodiment, memory devices 2504 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2508 may refer to a wire-based multi-lane communications link that is used by systems to scale and include one or more PPUs 2500 combined with one or more CPUs, supports cache coherence between PPUs 2500 and CPUs, and CPU mastering. In at least one embodiment, data and/or commands are transmitted by high-speed GPU interconnect 2508 through hub 2516 to/from other units of PPU 2500 such as one or more copy engines, video encoders, video decoders, power management units, and other components which may not be explicitly illustrated in FIG. 25.

In at least one embodiment, I/O unit 2506 is configured to transmit and receive communications (e.g., commands, data) from a host processor (not illustrated in FIG. 25) over system bus 2502. In at least one embodiment, I/O unit 2506 communicates with host processor directly via system bus 2502 or through one or more intermediate devices such as a memory bridge. In at least one embodiment, I/O unit 2506 may communicate with one or more other processors, such as one or more of PPUs 2500 via system bus 2502. In at least one embodiment, I/O unit 2506 implements a PCIe interface for communications over a PCIe bus. In at least one embodiment, I/O unit 2506 implements interfaces for communicating with external devices.

In at least one embodiment, I/O unit 2506 decodes packets received via system bus 2502. In at least one embodiment, at least some packets represent commands configured to cause PPU 2500 to perform various operations. In at least one embodiment, I/O unit 2506 transmits decoded commands to various other units of PPU 2500 as specified by commands. In at least one embodiment, commands are transmitted to front-end unit 2510 and/or transmitted to hub 2516 or other units of PPU 2500 such as one or more copy engines, a video encoder, a video decoder, a power management unit, etc. (not explicitly illustrated in FIG. 25). In at least one embodiment, I/O unit 2506 is configured to route communications between and among various logical units of PPU 2500.

In at least one embodiment, a program executed by host processor encodes a command stream in a buffer that provides workloads to PPU 2500 for processing. In at least one embodiment, a workload comprises instructions and data to be processed by those instructions. In at least one embodiment, buffer is a region in a memory that is accessible (e.g., read/write) by both a host processor and PPU 2500—a host interface unit may be configured to access buffer in a system memory connected to system bus 2502 via memory requests transmitted over system bus 2502 by I/O unit 2506. In at least one embodiment, a host processor writes a command stream to a buffer and then transmits a pointer to the start of the command stream to PPU 2500 such that front-end unit 2510 receives pointers to one or more command streams and manages one or more command streams, reading commands from command streams and forwarding commands to various units of PPU 2500.

In at least one embodiment, front-end unit 2510 is coupled to scheduler unit 2512 that configures various GPCs 2518 to process tasks defined by one or more command streams. In at least one embodiment, scheduler unit 2512 is configured to track state information related to various tasks managed by scheduler unit 2512 where state information may indicate which of GPCs 2518 a task is assigned to, whether task is active or inactive, a priority level associated with task, and so forth. In at least one embodiment, scheduler unit 2512 manages execution of a plurality of tasks on one or more of GPCs 2518.

In at least one embodiment, scheduler unit 2512 is coupled to work distribution unit 2514 that is configured to dispatch tasks for execution on GPCs 2518. In at least one embodiment, work distribution unit 2514 tracks a number of scheduled tasks received from scheduler unit 2512 and work distribution unit 2514 manages a pending task pool and an active task pool for each of GPCs 2518. In at least one embodiment, pending task pool comprises a number of slots (e.g., 32 slots) that contain tasks assigned to be processed by a particular GPC 2518; active task pool may comprise a number of slots (e.g., 4 slots) for tasks that are actively being processed by GPCs 2518 such that as one of GPCs 2518 completes execution of a task, that task is evicted from active task pool for GPC 2518 and one of other tasks from pending task pool is selected and scheduled for execution on GPC 2518. In at least one embodiment, if an active task is idle on GPC 2518, such as while waiting for a data dependency to be resolved, then the active task is evicted from GPC 2518 and returned to a pending task pool while another task in the pending task pool is selected and scheduled for execution on GPC 2518.

In at least one embodiment, work distribution unit 2514 communicates with one or more GPCs 2518 via XBar 2520. In at least one embodiment, XBar 2520 is an interconnect network that couples many units of PPU 2500 to other units of PPU 2500 and can be configured to couple work distribution unit 2514 to a particular GPC 2518. In at least one embodiment, one or more other units of PPU 2500 may also be connected to XBar 2520 via hub 2516.

In at least one embodiment, tasks are managed by scheduler unit 2512 and dispatched to one of GPCs 2518 by work distribution unit 2514. GPC 2518 is configured to process task and generate results. In at least one embodiment, results may be consumed by other tasks within GPC 2518, routed to a different GPC 2518 via XBar 2520, or stored in memory 2504. In at least one embodiment, results can be written to memory 2504 via partition units 2522, which implement a memory interface for reading and writing data to/from memory 2504. In at least one embodiment, results can be transmitted to another PPU 2504 or CPU via high-speed GPU interconnect 2508. In at least one embodiment, PPU 2500 includes, without limitation, a number U of partition units 2522 that is equal to number of separate and distinct memory devices 2504 coupled to PPU 2500.

In at least one embodiment, a host processor executes a driver kernel that implements an application programming interface ("API") that enables one or more applications executing on host processor to schedule operations for execution on PPU 2500. In at least one embodiment, multiple compute applications are simultaneously executed by PPU 2500 and PPU 2500 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2500 and the driver kernel outputs tasks to one or more streams being processed by PPU 2500. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 26:
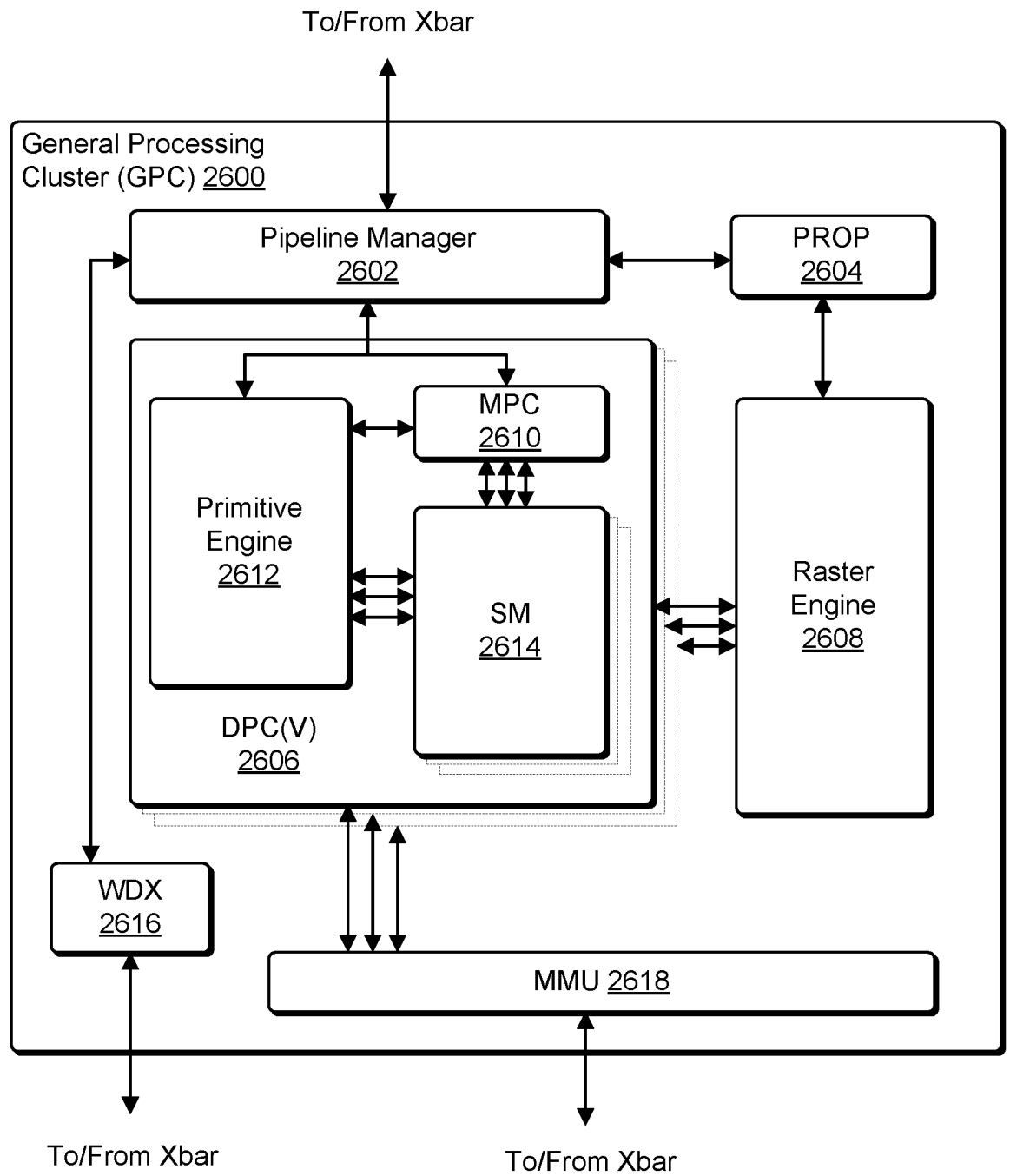
FIG. 26 illustrates a GPC, in accordance with at least one embodiment.

FIG. 26 illustrates a GPC 2600, in accordance with at least one embodiment. In at least one embodiment, GPC 2600 is GPC 2518 of FIG. 25. In at least one embodiment, each GPC 2600 includes, without limitation, a number of hardware units for processing tasks and each GPC 2600 includes, without limitation, a pipeline manager 2602, a pre-raster operations unit ("PROP") 2604, a raster engine 2608, a work distribution crossbar ("WDX") 2616, an MMU 2618, one or more Data Processing Clusters ("DPCs") 2606, and any suitable combination of parts.

In at least one embodiment, GPC 2600 is to perform various computational operations, including one or more application programming interfaces (APIs), described above in conjunction with FIGS. 2-7 and/or processes described above in conjunction with FIG. 8. In at least one embodiment, GPC 2600 comprises hardware and/or other components to perform various computational operations and/or APIs described above in conjunction with FIGS. 2-7 and/or processes described above in conjunction with FIG. 8.

In at least one embodiment, operation of GPC 2600 is controlled by pipeline manager 2602. In at least one embodiment, pipeline manager 2602 manages configuration of one or more DPCs 2606 for processing tasks allocated to GPC 2600. In at least one embodiment, pipeline manager 2602 configures at least one of one or more DPCs 2606 to implement at least a portion of a graphics rendering pipeline. In at least one embodiment, DPC 2606 is configured to execute a vertex shader program on a programmable streaming multiprocessor ("SM") 2614. In at least one embodiment, pipeline manager 2602 is configured to route packets received from a work distribution unit to appropriate logical units within GPC 2600 and, in at least one embodiment, some packets may be routed to fixed function hardware units in PROP 2604 and/or raster engine 2608 while other packets may be routed to DPCs 2606 for processing by a primitive engine 2612 or SM 2614. In at least one embodiment, pipeline manager 2602 configures at least one of DPCs 2606 to implement a computing pipeline. In at least one embodiment, pipeline manager 2602 configures at least one of DPCs 2606 to execute at least a portion of a CUDA program.

In at least one embodiment, PROP unit 2604 is configured to route data generated by raster engine 2608 and DPCs 2606 to a Raster Operations ("ROP") unit in a partition unit, such as memory partition unit 2522 described in more detail above in conjunction with FIG. 25. In at least one embodiment, PROP unit 2604 is configured to perform optimizations for color blending, organize pixel data, perform address translations, and more. In at least one embodiment, raster engine 2608 includes, without limitation, a number of fixed function hardware units configured to perform various raster operations and, in at least one embodiment, raster engine 2608 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 2608 comprises fragments to be processed by any suitable entity such as by a fragment shader implemented within DPC 2606.

In at least one embodiment, each DPC 2606 included in GPC 2600 comprise, without limitation, an M-Pipe Controller ("MPC") 2610; primitive engine 2612; one or more SMs 2614; and any suitable combination thereof. In at least one embodiment, MPC 2610 controls operation of DPC 2606, routing packets received from pipeline manager 2602 to appropriate units in DPC 2606. In at least one embodiment, packets associated with a vertex are routed to primitive engine 2612, which is configured to fetch vertex attributes associated with vertex from memory; in contrast, packets associated with a shader program may be transmitted to SM 2614.

In at least one embodiment, SM 2614 comprises, without limitation, a programmable streaming processor that is configured to process tasks represented by a number of threads. In at least one embodiment, SM 2614 is multi-threaded and configured to execute a plurality of threads (e.g., 32 threads) from a particular group of threads concurrently and implements a STMD architecture where each thread in a group of threads (e.g., a warp) is configured to process a different set of data based on same set of instructions. In at least one embodiment, all threads in group of threads execute same instructions. In at least one embodiment, SM 2614 implements a STMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 2614 is described in more detail in conjunction with FIG. 27.

In at least one embodiment, MMU 2618 provides an interface between GPC 2600 and a memory partition unit (e.g., partition unit 2522 of FIG. 25) and MMU 2618 provides translation of virtual addresses into physical addresses, memory protection, and arbitration of memory requests. In at least one embodiment, MMU 2618 provides one or more translation lookaside buffers (TLBs) for performing translation of virtual addresses into physical addresses in memory.

Figure 27:
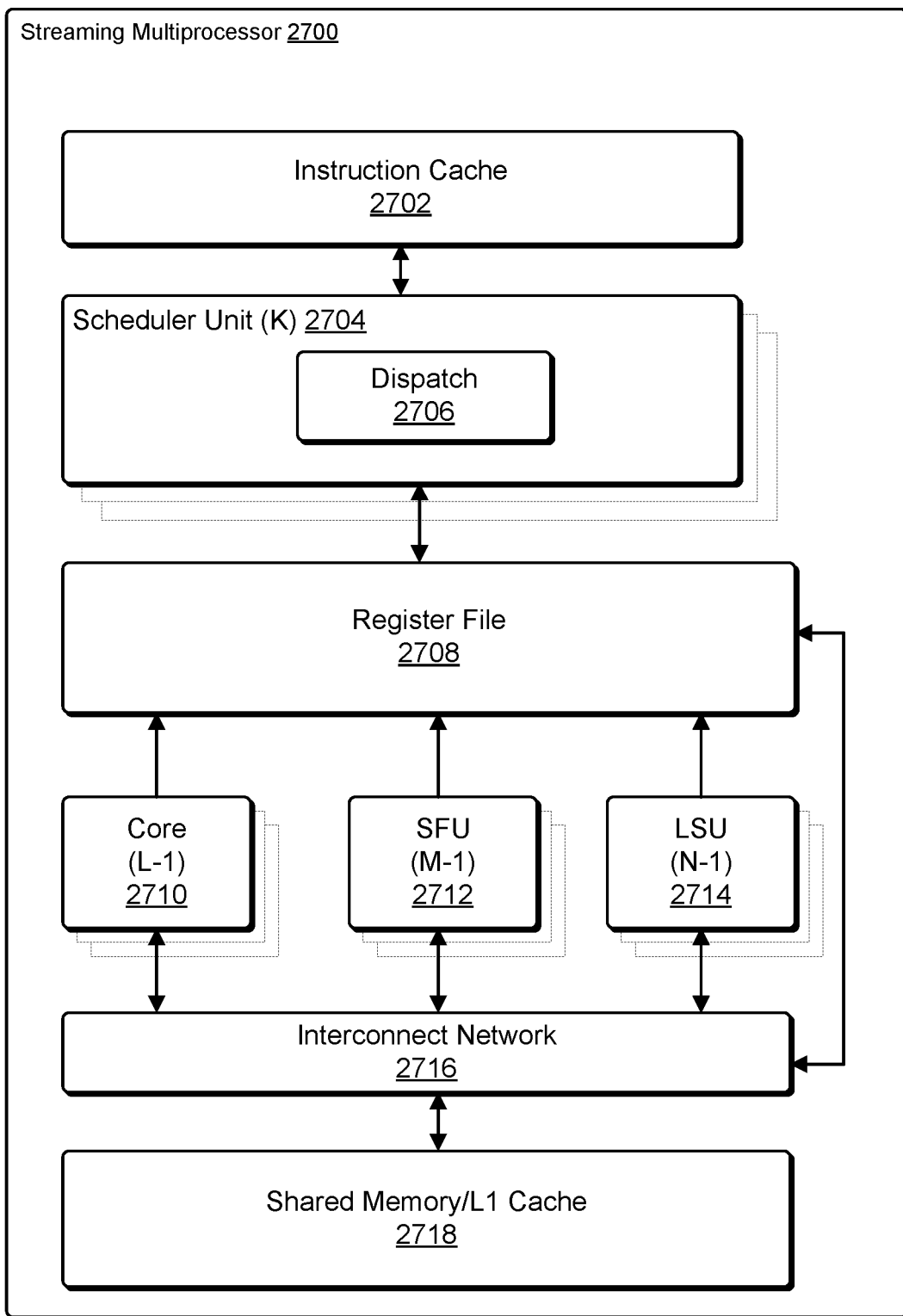
FIG. 27 illustrates a streaming multiprocessor, in accordance with at least one embodiment.

FIG. 27 illustrates a streaming multiprocessor ("SM") 2700, in accordance with at least one embodiment. In at least one embodiment, SM 2700 is SM 2614 of FIG. 26. In at least one embodiment, SM 2700 includes, without limitation, an instruction cache 2702; one or more scheduler units 2704; a register file 2708; one or more processing cores ("cores") 2710; one or more special function units ("SFUs") 2712; one or more LSUs 2714; an interconnect network 2716; a shared memory/L1 cache 2718; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 2700. In at least one embodiment, scheduler unit 2704 receives tasks from a work distribution unit and manages instruction scheduling for one or more thread blocks assigned to SM 2700. In at least one embodiment, scheduler unit 2704 schedules thread blocks for execution as warps of parallel threads, wherein each thread block is allocated at least one warp. In at least one embodiment, each warp executes threads. In at least one embodiment, scheduler unit 2704 manages a plurality of different thread blocks, allocating warps to different thread blocks and then dispatching instructions from a plurality of different cooperative groups to various functional units (e.g., processing cores 2710, SFUs 2712, and LSUs 2714) during each clock cycle.

In at least one embodiment, SM 2700 is to perform various computational operations, including one or more application programming interfaces (APIs), described above in conjunction with FIGS. 2-7 and/or processes described above in conjunction with FIG. 8. In at least one embodiment, SM 2700 comprises hardware and/or other components to perform various computational operations and/or APIs described above in conjunction with FIGS. 2-7 and/or processes described above in conjunction with FIG. 8.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 2706 is configured to transmit instructions to one or more of functional units and scheduler unit 2704 includes, without limitation, two dispatch units 2706 that enable two different instructions from same warp to be dispatched during each clock cycle. In at least one embodiment, each scheduler unit 2704 includes a single dispatch unit 2706 or additional dispatch units 2706.

In at least one embodiment, each SM 2700, in at least one embodiment, includes, without limitation, register file 2708 that provides a set of registers for functional units of SM 2700. In at least one embodiment, register file 2708 is divided between each of the functional units such that each functional unit is allocated a dedicated portion of register file 2708. In at least one embodiment, register file 2708 is divided between different warps being executed by SM 2700 and register file 2708 provides temporary storage for operands connected to data paths of functional units. In at least one embodiment, each SM 2700 comprises, without limitation, a plurality of L processing cores 2710. In at least one embodiment, SM 2700 includes, without limitation, a large number (e.g., 128 or more) of distinct processing cores 2710. In at least one embodiment, each processing core 2710 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2710 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 2710. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A \times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program.

In at least one embodiment, at the CUDA level, a warp-level interface assumes 16×16 size matrices spanning all 32 threads of a warp.

In at least one embodiment, each SM 2700 comprises, without limitation, M SFUs 2712 that perform special functions (e.g., attribute evaluation, reciprocal square root, and like). In at least one embodiment, SFUs 2712 include, without limitation, a tree traversal unit configured to traverse a hierarchical tree data structure. In at least one embodiment, SFUs 2712 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2700. In at least one embodiment, texture maps are stored in shared memory/L1 cache 2718. In at least one embodiment, texture units implement texture operations such as filtering operations using mip-maps (e.g., texture maps of varying levels of detail). In at least one embodiment, each SM 2700 includes, without limitation, two texture units.

In at least one embodiment, each SM 2700 comprises, without limitation, N LSUs 2714 that implement load and store operations between shared memory/L1 cache 2718 and register file 2708. In at least one embodiment, each SM 2700 includes, without limitation, interconnect network 2716 that connects each of the functional units to register file 2708 and LSU 2714 to register file 2708 and shared memory/L1 cache 2718. In at least one embodiment, interconnect network 2716 is a crossbar that can be configured to connect any of the functional units to any of the registers in register file 2708 and connect LSUs 2714 to register file 2708 and memory locations in shared memory/L1 cache 2718.

In at least one embodiment, shared memory/L1 cache 2718 is an array of on-chip memory that allows for data storage and communication between SM 2700 and a primitive engine and between threads in SM 2700. In at least one embodiment, shared memory/L1 cache 2718 comprises, without limitation, 128 KB of storage capacity and is in a path from SM 2700 to a partition unit. In at least one embodiment, shared memory/L1 cache 2718 is used to cache reads and writes. In at least one embodiment, one or more of shared memory/L1 cache 2718, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 2718 enables shared memory/L1 cache 2718 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 2700 to execute a program and perform calculations, shared memory/L1 cache 2718 to communicate between threads, and LSU 2714 to read and write global memory through shared memory/L1 cache 2718 and a memory partition unit. In at least one embodiment, when configured for general purpose parallel computation, SM 2700 writes commands that scheduler unit 2704 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, exemplary software constructs for implementing at least one embodiment.

Figure 28:
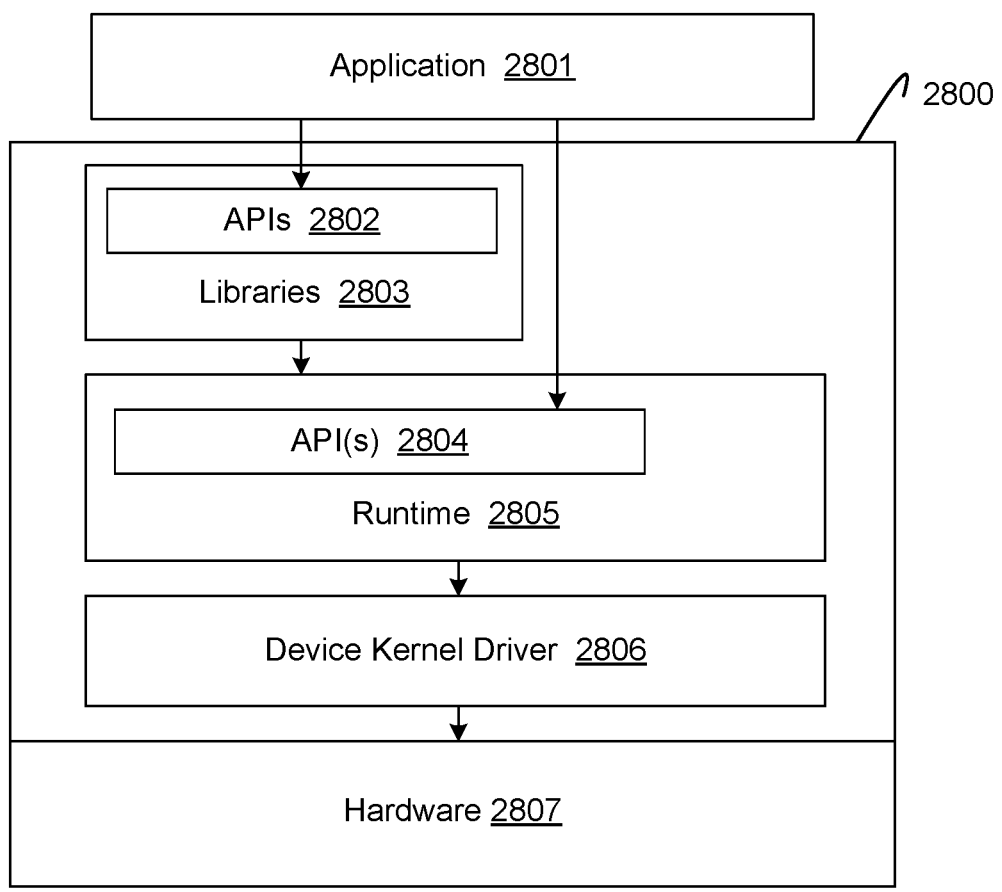
FIG. 28 illustrates a software stack of a programming platform, in accordance with at least one embodiment.

FIG. 28 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, software stack 2800 is to perform various computational operations, including one or more application programming interfaces (APIs), described above in conjunction with FIGS. 2-7 and/or processes described above in conjunction with FIG. 8. In at least one embodiment, software stack 2800 comprises components and/or libraries comprising instructions that, if performed, cause various hardware and/or other components, such as accelerators within heterogeneous processors, to perform various computational operations and/or APIs described above in conjunction with FIGS. 2-7 and/or processes described above in conjunction with FIG. 8.

In at least one embodiment, a software stack 2800 of a programming platform provides an execution environment for an application 2801. In at least one embodiment, application 2801 may include any computer software capable of being launched on software stack 2800. In at least one embodiment, application 2801 may include, but is not limited to, an artificial intelligence ("AI")/machine learning ("ML") application, a high performance computing ("HPC") application, a virtual desktop infrastructure ("VDI"), or a data center workload.

In at least one embodiment, application 2801 and software stack 2800 run on hardware 2807. Hardware 2807 may include one or more GPUs, CPUs, FPGAs, AI engines, and/or other types of compute devices that support a programming platform, in at least one embodiment. In at least one embodiment, such as with CUDA, software stack 2800 may be vendor specific and compatible with only devices from particular vendor(s). In at least one embodiment, such as in with OpenCL, software stack 2800 may be used with devices from different vendors. In at least one embodiment, hardware 2807 includes a host connected to one more devices that can be accessed to perform computational tasks via application programming interface ("API") calls. A device within hardware 2807 may include, but is not limited to, a GPU, FPGA, AI engine, or other compute device (but may also include a CPU) and its memory, as opposed to a host within hardware 2807 that may include, but is not limited to, a CPU (but may also include a compute device) and its memory, in at least one embodiment.

In at least one embodiment, software stack 2800 of a programming platform includes, without limitation, a number of libraries 2803, a runtime 2805, and a device kernel driver 2806. Each of libraries 2803 may include data and programming code that can be used by computer programs and leveraged during software development, in at least one embodiment. In at least one embodiment, libraries 2803 may include, but are not limited to, pre-written code and subroutines, classes, values, type specifications, configuration data, documentation, help data, and/or message templates. In at least one embodiment, libraries 2803 include functions that are optimized for execution on one or more types of devices. In at least one embodiment, libraries 2803 may include, but are not limited to, functions for performing mathematical, deep learning, and/or other types of operations on devices. In at least one embodiment, libraries 2803 are associated with corresponding APIs 2802, which may include one or more APIs, that expose functions implemented in libraries 2803.

In at least one embodiment, application 2801 is written as source code that is compiled into executable code, as discussed in greater detail below in conjunction with FIGS. 33-35. Executable code of application 2801 may run, at least in part, on an execution environment provided by software stack 2800, in at least one embodiment. In at least one embodiment, during execution of application 2801, code may be reached that needs to run on a device, as opposed to a host. In such a case, runtime 2805 may be called to load and launch requisite code on the device, in at least one embodiment. In at least one embodiment, runtime 2805 may include any technically feasible runtime system that is able to support execution of application S01.

In at least one embodiment, runtime 2805 is implemented as one or more runtime libraries associated with corresponding APIs, which are shown as API(s) 2804. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 2804 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 2806 is configured to facilitate communication with an underlying device. In at least one embodiment, device kernel driver 2806 may provide low-level functionalities upon which APIs, such as API(s) 2804, and/or other software relies. In at least one embodiment, device kernel driver 2806 may be configured to compile intermediate representation ("IR") code into binary code at runtime. For CUDA, device kernel driver 2806 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 2806 to compile IR code at runtime.

Figure 29:
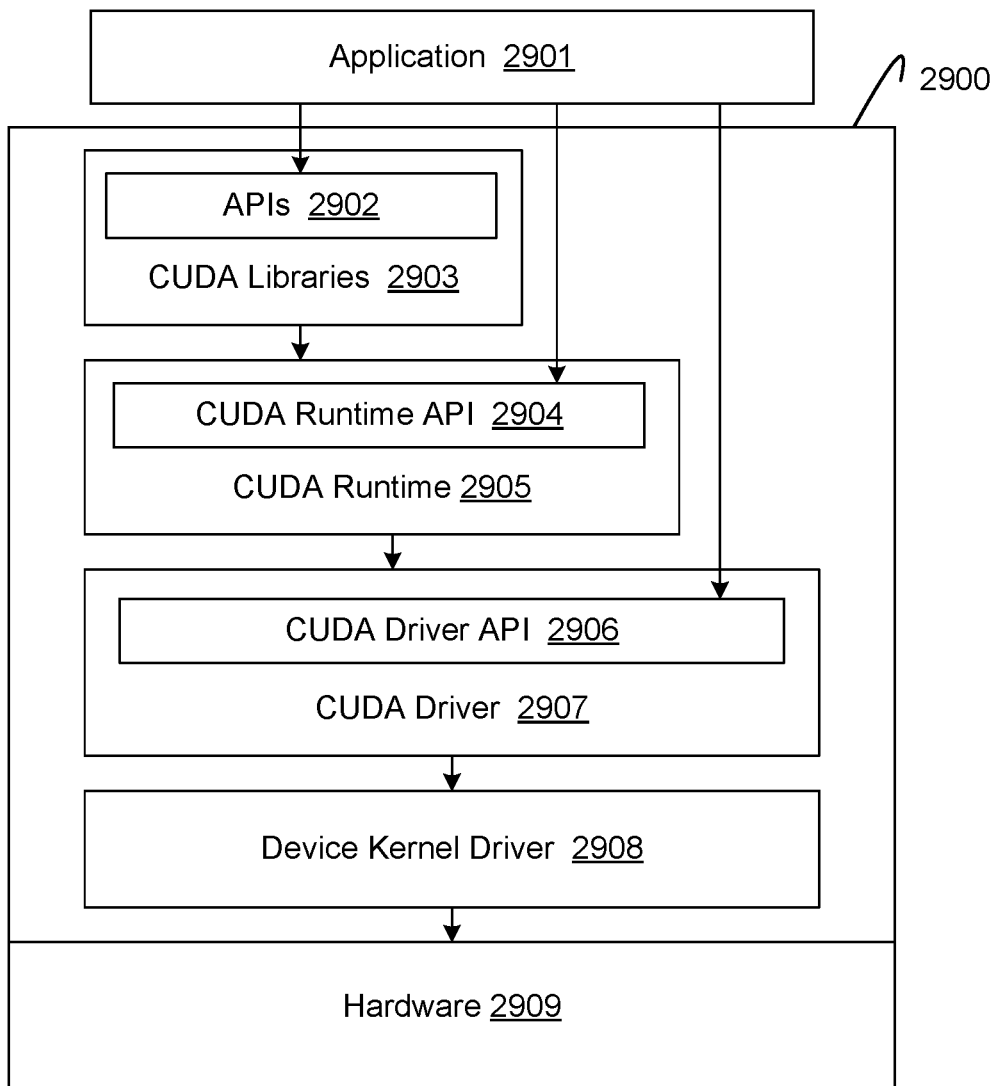
FIG. 29 illustrates a CUDA implementation of a software stack of FIG. 28, in accordance with at least one embodiment.

FIG. 29 illustrates a CUDA implementation of software stack 2800 of FIG. 28, in accordance with at least one embodiment. In at least one embodiment, a CUDA software stack 2900, on which an application 2901 may be launched, includes CUDA libraries 2903, a CUDA runtime 2905, a CUDA driver 2907, and a device kernel driver 2908. In at least one embodiment, CUDA software stack 2900 executes on hardware 2909, which may include a GPU that supports CUDA and is developed by NVIDIA Corporation of Santa Clara, CA.

In at least one embodiment, CUDA software stack 2900 is to perform various computational operations, including one or more application programming interfaces (APIs), described above in conjunction with FIGS. 2-7 and/or processes described above in conjunction with FIG. 8. In at least one embodiment, CUDA software stack 2900 comprises components and/or libraries comprising instructions that, if performed, cause various hardware and/or other components, such as accelerators within heterogeneous processors, to perform various computational operations and/or APIs described above in conjunction with FIGS. 2-7 and/or processes described above in conjunction with FIG. 8.

In at least one embodiment, application 2901, CUDA runtime 2905, and device kernel driver 2908 may perform similar functionalities as application 2801, runtime 2805, and device kernel driver 2806, respectively, which are described above in conjunction with FIG. 28. In at least one embodiment, CUDA driver 2907 includes a library (libcuda.so) that implements a CUDA driver API 2906. Similar to a CUDA runtime API 2904 implemented by a CUDA runtime library (cudart), CUDA driver API 2906 may, without limitation, expose functions for memory management, execution control, device management, error handling, synchronization, and/or graphics interoperability, among other things, in at least one embodiment. In at least one embodiment, CUDA driver API 2906 differs from CUDA runtime API 2904 in that CUDA runtime API 2904 simplifies device code management by providing implicit initialization, context (analogous to a process) management, and module (analogous to dynamically loaded libraries) management. In contrast to high-level CUDA runtime API 2904, CUDA driver API 2906 is a low-level API providing more fine-grained control of the device, particularly with respect to contexts and module loading, in at least one embodiment. In at least one embodiment, CUDA driver API 2906 may expose functions for context management that are not exposed by CUDA runtime API 2904. In at least one embodiment, CUDA driver API 2906 is also language-independent and supports, e.g., OpenCL in addition to CUDA runtime API 2904. Further, in at least one embodiment, development libraries, including CUDA runtime 2905, may be considered as separate from driver components, including user-mode CUDA driver 2907 and kernel-mode device driver 2908 (also sometimes referred to as a "display" driver).

In at least one embodiment, CUDA libraries 2903 may include, but are not limited to, mathematical libraries, deep learning libraries, parallel algorithm libraries, and/or signal/image/video processing libraries, which parallel computing applications such as application 2901 may utilize. In at least one embodiment, CUDA libraries 2903 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 2903 may include deep learning libraries such as a cuDNN library of primitives for deep neural networks and a TensorRT platform for high-performance deep learning inference, among others.

Figure 30:
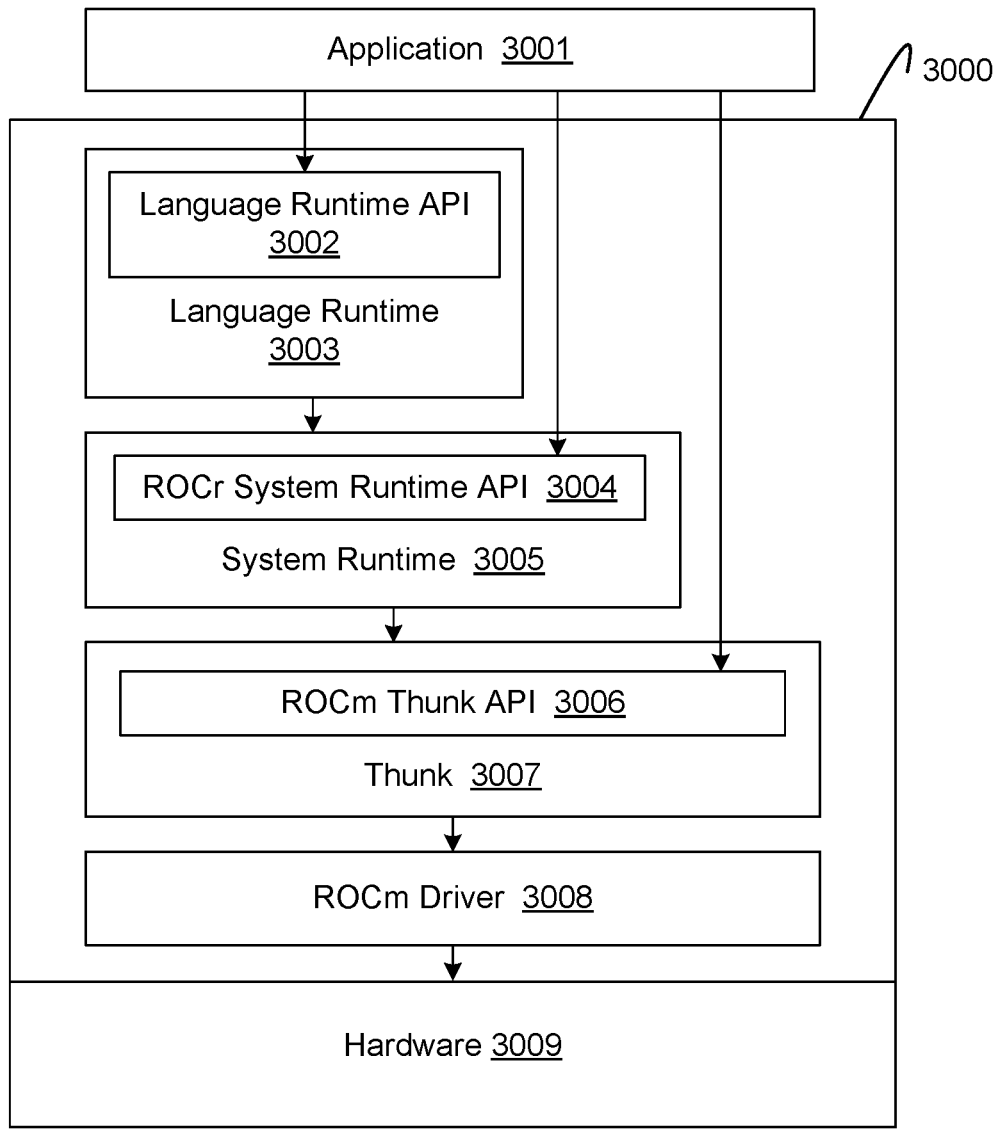
FIG. 30 illustrates a ROCm implementation of a software stack of FIG. 28, in accordance with at least one embodiment.

FIG. 30 illustrates a ROCm implementation of software stack 2800 of FIG. 28, in accordance with at least one embodiment. In at least one embodiment, a ROCm software stack 3000, on which an application 3001 may be launched, includes a language runtime 3003, a system runtime 3005, a thunk 3007, and a ROCm kernel driver 3008. In at least one embodiment, ROCm software stack 3000 executes on hardware 3009, which may include a GPU that supports ROCm and is developed by AMD Corporation of Santa Clara, CA.

In at least one embodiment, ROCm software stack 3000 is to perform various computational operations, including one or more application programming interfaces (APIs), described above in conjunction with FIGS. 2-7 and/or processes described above in conjunction with FIG. 8. In at least one embodiment, ROCm software stack 3000 comprises components and/or libraries comprising instructions that, if performed, cause various hardware and/or other components, such as accelerators within heterogeneous processors, to perform various computational operations and/or APIs described above in conjunction with FIGS. 2-7 and/or processes described above in conjunction with FIG. 8.

In at least one embodiment, application 3001 may perform similar functionalities as application 2801 discussed above in conjunction with FIG. 28. In addition, language runtime 3003 and system runtime 3005 may perform similar functionalities as runtime 2805 discussed above in conjunction with FIG. 28, in at least one embodiment. In at least one embodiment, language runtime 3003 and system runtime 3005 differ in that system runtime 3005 is a language-independent runtime that implements a ROCr system runtime API 3004 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3005, language runtime 3003 is an implementation of a language-specific runtime API 3002 layered on top of ROCr system runtime API 3004, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 2904 discussed above in conjunction with FIG. 29, such as functions for memory management, execution control, device management, error handling, and synchronization, among other things.

In at least one embodiment, thunk (ROCt) 3007 is an interface 3006 that can be used to interact with underlying ROCm driver 3008. In at least one embodiment, ROCm driver 3008 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 2806 discussed above in conjunction with FIG. 28. In at least one embodiment, HSA kernel driver is a driver permitting different types of processors to share system resources more effectively via hardware features.

In at least one embodiment, various libraries (not shown) may be included in ROCm software stack 3000 above language runtime 3003 and provide functionality similarity to CUDA libraries 2903, discussed above in conjunction with FIG. 29. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 31:
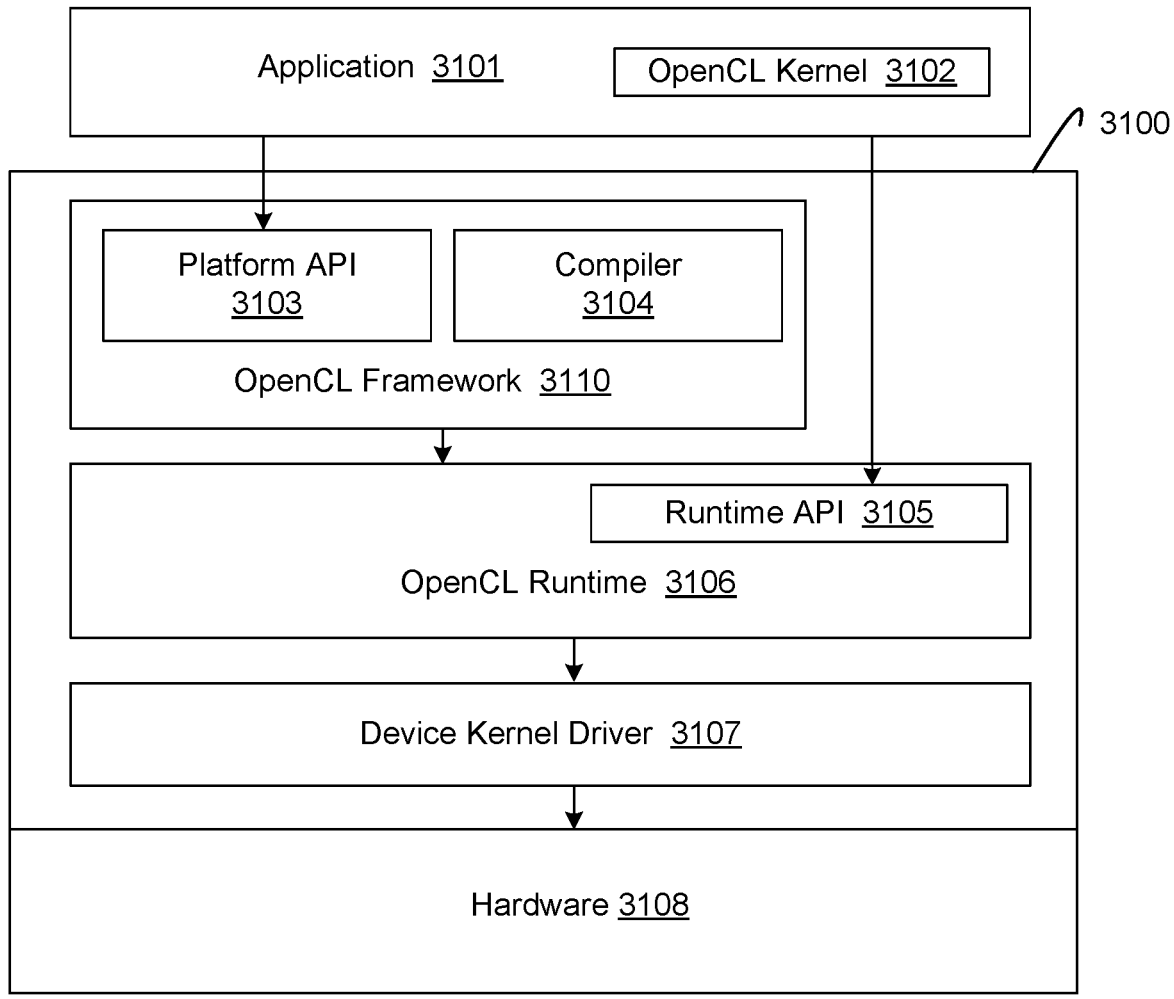
FIG. 31 illustrates an OpenCL implementation of a software stack of FIG. 28, in accordance with at least one embodiment.

FIG. 31 illustrates an OpenCL implementation of software stack 2800 of FIG. 28, in accordance with at least one embodiment. In at least one embodiment, an OpenCL software stack 3100, on which an application 3101 may be launched, includes an OpenCL framework 3110, an OpenCL runtime 3106, and a driver 3107. In at least one embodiment, OpenCL software stack 3100 executes on hardware 2909 that is not vendor-specific. As OpenCL is supported by devices developed by different vendors, specific OpenCL drivers may be required to interoperate with hardware from such vendors, in at least one embodiment.

In at least one embodiment, OpenCL software stack 3100 is to perform various computational operations, including one or more application programming interfaces (APIs), described above in conjunction with FIGS. 2-7 and/or processes described above in conjunction with FIG. 8. In at least one embodiment, OpenCL software stack 3100 comprises components and/or libraries comprising instructions that, if performed, cause various hardware and/or other components, such as accelerators within heterogeneous processors, to perform various computational operations and/or APIs described above in conjunction with FIGS. 2-7 and/or processes described above in conjunction with FIG. 8.

In at least one embodiment, application 3101, OpenCL runtime 3106, device kernel driver 3107, and hardware 3108 may perform similar functionalities as application 2801, runtime 2805, device kernel driver 2806, and hardware 2807, respectively, that are discussed above in conjunction with FIG. 28. In at least one embodiment, application 3101 further includes an OpenCL kernel 3102 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3103 and runtime API 3105. In at least one embodiment, runtime API 3105 uses contexts to manage execution of kernels on devices. In at least one embodiment, each identified device may be associated with a respective context, which runtime API 3105 may use to manage command queues, program objects, and kernel objects, share memory objects, among other things, for that device. In at least one embodiment, platform API 3103 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3104 is also included in OpenCL frame-work 3110. Source code may be compiled offline prior to executing an application or online during execution of an application, in at least one embodiment. In contrast to CUDA and ROCm, OpenCL applications in at least one embodiment may be compiled online by compiler 3104, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

Figure 32:
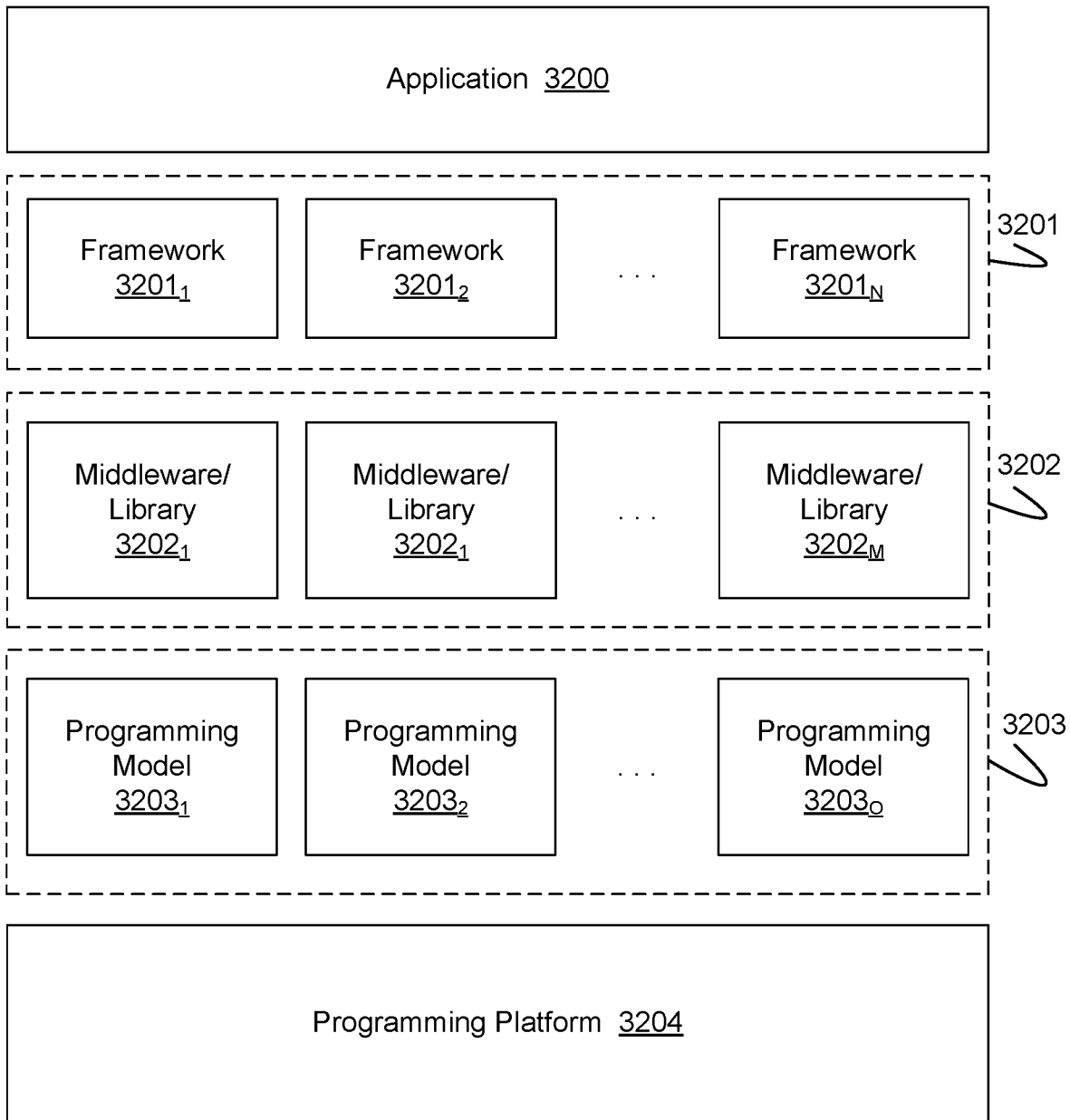
FIG. 32 illustrates software that is supported by a programming platform, in accordance with at least one embodiment.

FIG. 32 illustrates software that is supported by a programming platform, in accordance with at least one embodiment. In at least one embodiment, a programming platform 3204 is configured to support various programming models 3203, middlewares and/or libraries 3202, and frameworks 3201 that an application 3200 may rely upon. In at least one embodiment, application 3200 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 3204 is to perform various computational operations, including one or more application programming interfaces (APIs), described above in conjunction with FIGS. 2-7 and/or processes described above in conjunction with FIG. 8. In at least one embodiment, programming platform 3204 comprises components and/or libraries comprising instructions that, if performed, cause various hardware and/or other components, such as accelerators within heterogeneous processors, to perform various computational operations and/or APIs described above in conjunction with FIGS. 2-7 and/or processes described above in conjunction with FIG. 8.

In at least one embodiment, programming platform 3204 may be one of a CUDA, ROCm, or OpenCL platform described above in conjunction with FIG. 29, FIG. 30, and FIG. 31, respectively. In at least one embodiment, programming platform 3204 supports multiple programming models 3203, which are abstractions of an underlying computing system permitting expressions of algorithms and data structures. Programming models 3203 may expose features of underlying hardware in order to improve performance, in at least one embodiment. In at least one embodiment, programming models 3203 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 3202 provide implementations of abstractions of programming models 3204. In at least one embodiment, such libraries include data and programming code that may be used by computer programs and leveraged during software development. In at least one embodiment, such middlewares include software that provides services to applications beyond those available from programming platform 3204. In at least one embodiment, libraries and/or middlewares 3202 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3202 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 3201 depend on libraries and/or middlewares 3202. In at least one embodiment, each of application frameworks 3201 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 33:
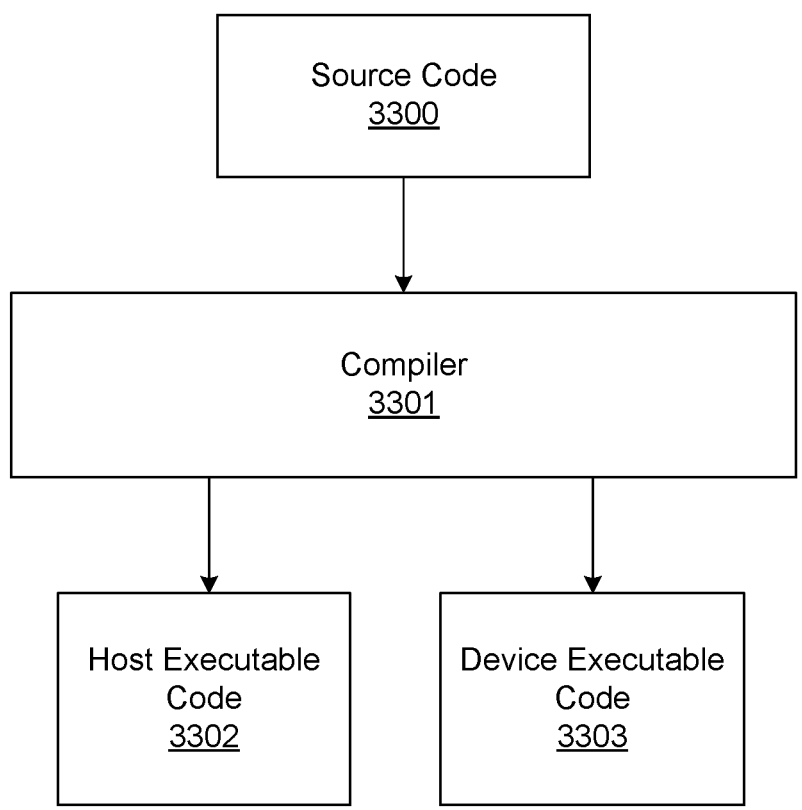
FIG. 33 illustrates compiling code to execute on programming platforms of FIGS. 28-31, in accordance with at least one embodiment.

FIG. 33 illustrates compiling code to execute on one of programming platforms of FIGS. 28-31, in accordance with at least one embodiment. In at least one embodiment, a compiler 3301 receives source code 3300 that includes both host code as well as device code. In at least one embodiment, complier 3301 is configured to convert source code 3300 into host executable code 3302 for execution on a host and device executable code 3303 for execution on a device. In at least one embodiment, source code 3300 may either be compiled offline prior to execution of an application, or online during execution of an application.

In at least one embodiment, source code 3300 may include code in any programming language supported by compiler 3301, such as C++, C, Fortran, etc. In at least one embodiment, source code 3300 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3300 may include multiple source code files, rather than a single-source file, into which host code and device code are separated.

In at least one embodiment, compiler 3301 is configured to compile source code 3300 into host executable code 3302 for execution on a host and device executable code 3303 for execution on a device. In at least one embodiment, compiler 3301 performs operations including parsing source code 3300 into an abstract system tree (AST), performing optimizations, and generating executable code. In at least one embodiment in which source code 3300 includes a single-source file, compiler 3301 may separate device code from host code in such a single-source file, compile device code and host code into device executable code 3303 and host executable code 3302, respectively, and link device executable code 3303 and host executable code 3302 together in a single file, as discussed in greater detail below with respect to FIG. 34.

In at least one embodiment, host executable code 3302 and device executable code 3303 may be in any suitable format, such as binary code and/or IR code. In the case of CUDA, host executable code 3302 may include native object code and device executable code 3303 may include code in PTX intermediate representation, in at least one embodiment. In the case of ROCm, both host executable code 3302 and device executable code 3303 may include target binary code, in at least one embodiment.

Figure 34:
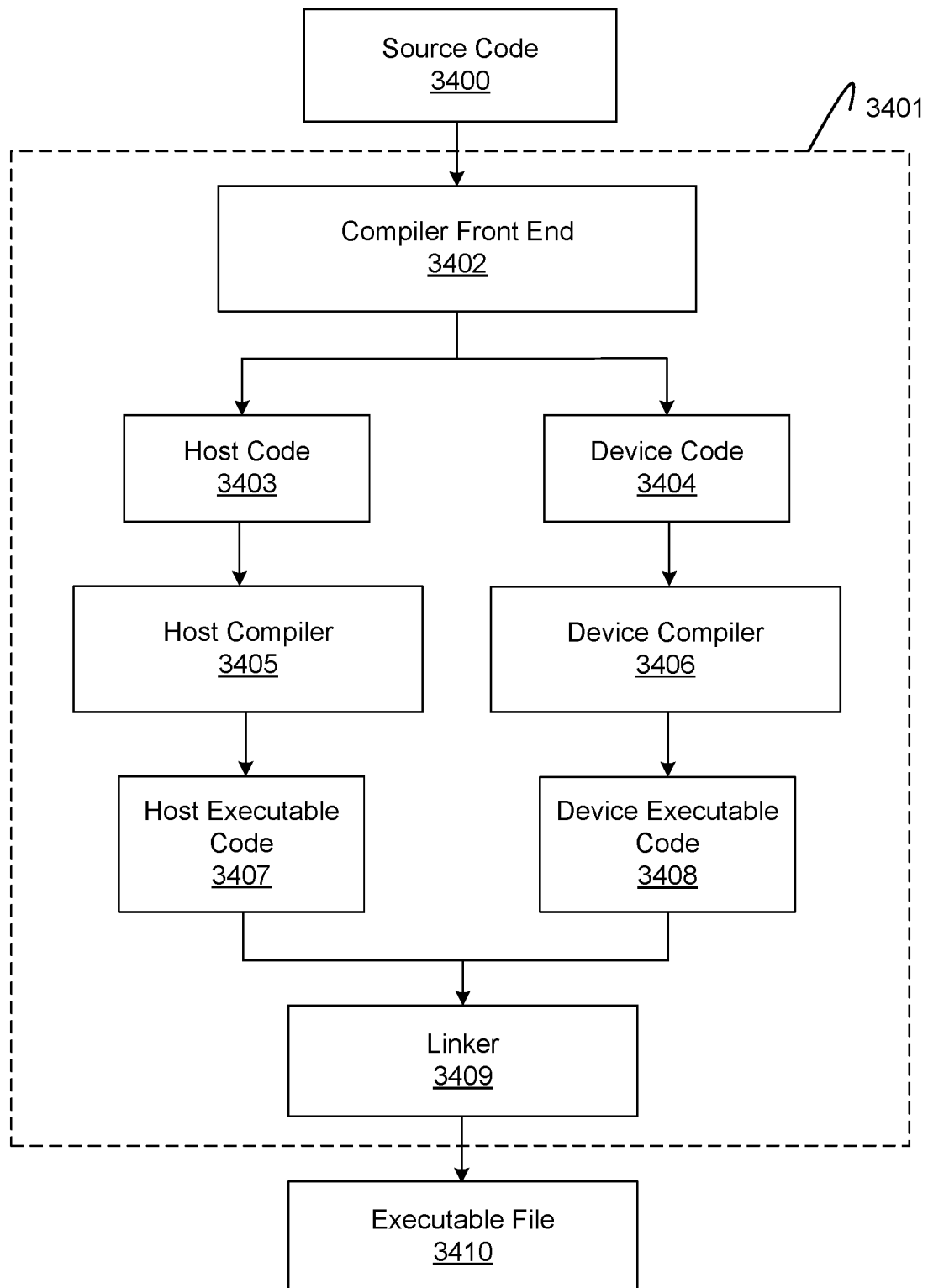
FIG. 34 illustrates in greater detail compiling code to execute on programming platforms of FIGS. 28-31, in accordance with at least one embodiment.

FIG. 34 is a more detailed illustration of compiling code to execute on one of programming platforms of FIGS. 28-31, in accordance with at least one embodiment. In at least one embodiment, a compiler 3401 is configured to receive source code 3400, compile source code 3400, and output an executable file 3410. In at least one embodiment, source code 3400 is a single-source file, such as a .cu file, a .hip.cpp file, or a file in another format, that includes both host and device code. In at least one embodiment, compiler 3401 may be, but is not limited to, an NVIDIA CUDA compiler ("NVCC") for compiling CUDA code in .cu files, or a HCC compiler for compiling HIP code in .hip.cpp files.

In at least one embodiment, compiler 3401 includes a compiler front end 3402, a host compiler 3405, a device compiler 3406, and a linker 3409. In at least one embodiment, compiler front end 3402 is configured to separate device code 3404 from host code 3403 in source code 3400. Device code 3404 is compiled by device compiler 3406 into device executable code 3408, which as described may include binary code or IR code, in at least one embodiment. Separately, host code 3403 is compiled by host compiler 3405 into host executable code 3407, in at least one embodiment. For NVCC, host compiler 3405 may be, but is not limited to, a general purpose C/C++ compiler that outputs native object code, while device compiler 3406 may be, but is not limited to, a Low Level Virtual Machine ("LLVM")-based compiler that forks a LLVM compiler infrastructure and outputs PTX code or binary code, in at least one embodiment. For HCC, both host compiler 3405 and device compiler 3406 may be, but are not limited to, LLVM-based compilers that output target binary code, in at least one embodiment.

Subsequent to compiling source code 3400 into host executable code 3407 and device executable code 3408, linker 3409 links host and device executable code 3407 and 3408 together in executable file 3410, in at least one embodiment. In at least one embodiment, native object code for a host and PTX or binary code for a device may be linked together in an Executable and Linkable Format ("ELF") file, which is a container format used to store object code.

Figure 35:
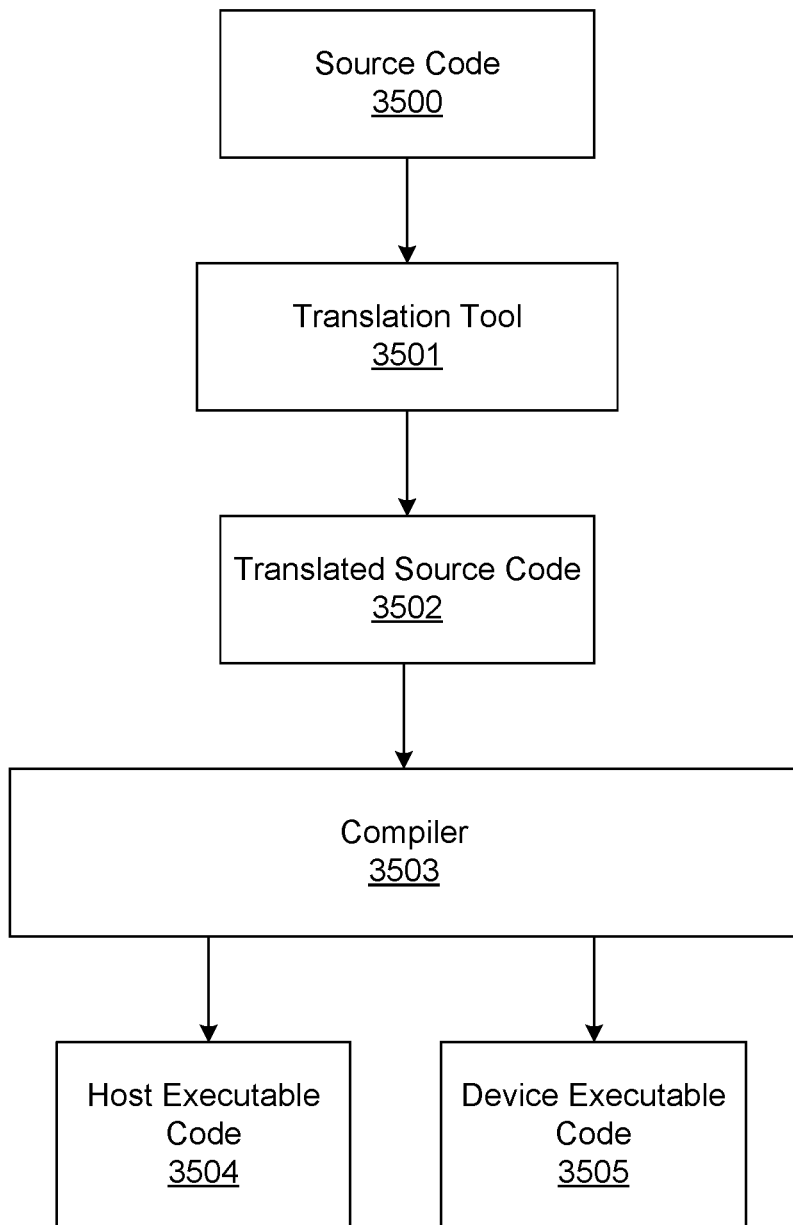
FIG. 35 illustrates translating source code prior to compiling source code, in accordance with at least one embodiment.

FIG. 35 illustrates translating source code prior to compiling source code, in accordance with at least one embodiment. In at least one embodiment, source code 3500 is passed through a translation tool 3501, which translates source code 3500 into translated source code 3502. In at least one embodiment, a compiler 3503 is used to compile translated source code 3502 into host executable code 3504 and device executable code 3505 in a process that is similar to compilation of source code 3300 by compiler 3301 into host executable code 3302 and device executable code 3303, as discussed above in conjunction with FIG. 33.

In at least one embodiment, a translation performed by translation tool 3501 is used to port source 3500 for execution in a different environment than that in which it was originally intended to run. In at least one embodiment, translation tool 3501 may include, but is not limited to, a HIP translator that is used to "hipify" CUDA code intended for a CUDA platform into HIP code that can be compiled and executed on a ROCm platform. In at least one embodiment, translation of source code 3500 may include parsing source code 3500 and converting calls to API(s) provided by one programming model (e.g., CUDA) into corresponding calls to API(s) provided by another programming model (e.g., HIP), as discussed in greater detail below in conjunction with FIGS. 36A-37. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3501 may sometimes be incomplete, requiring additional, manual effort to fully port source code 3500.

Configuring GPUs for General-Purpose Computing

The following figures set forth, without limitation, exemplary architectures for compiling and executing compute source code, in accordance with at least one embodiment.

Figure 36A:
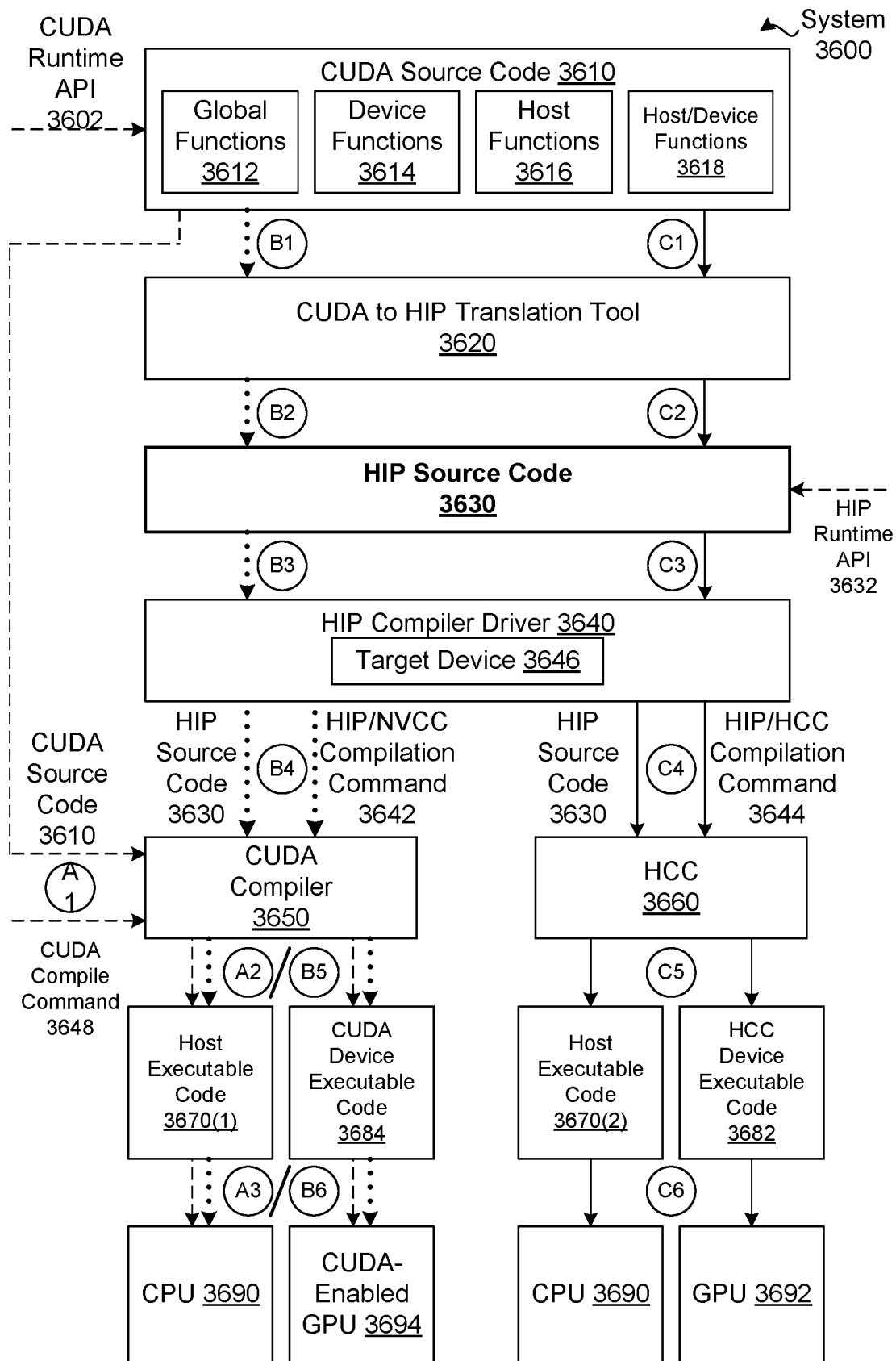
FIG. 36A illustrates a system configured to compile and execute CUDA source code using different types of processing units, in accordance with at least one embodiment.

FIG. 36A illustrates a system 36A00 configured to compile and execute CUDA source code 3610 using different types of processing units, in accordance with at least one embodiment. In at least one embodiment, system 36A00 includes, without limitation, CUDA source code 3610, a CUDA compiler 3650, host executable code 3670(1), host executable code 3670(2), CUDA device executable code 3684, a CPU 3690, a CUDA-enabled GPU 3694, a GPU 3692, a CUDA to HIP translation tool 3620, HIP source code 3630, a HIP compiler driver 3640, an HCC 3660, and HCC device executable code 3682.

In at least one embodiment, CUDA source code 3610 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 3690, GPU 36192, or another GPGPU, etc. In at least one embodiment, host code is source code that, after compilation, is executable on a host. In at least one embodiment, a host is a processor that is optimized for sequential instruction processing, such as CPU 3690.

In at least one embodiment, CUDA source code 3610 includes, without limitation, any number (including zero) of global functions 3612, any number (including zero) of device functions 3614, any number (including zero) of host functions 3616, and any number (including zero) of host/device functions 3618. In at least one embodiment, global functions 3612, device functions 3614, host functions 3616, and host/device functions 3618 may be mixed in CUDA source code 3610. In at least one embodiment, each of global functions 3612 is executable on a device and callable from a host. In at least one embodiment, one or more of global functions 3612 may therefore act as entry points to a device. In at least one embodiment, each of global functions 3612 is a kernel. In at least one embodiment and in a technique known as dynamic parallelism, one or more of global functions 3612 defines a kernel that is executable on a device and callable from such a device. In at least one embodiment, a kernel is executed N (where N is any positive integer) times in parallel by N different threads on a device during execution.

In at least one embodiment, each of device functions 3614 is executed on a device and callable from such a device only. In at least one embodiment, each of host functions 3616 is executed on a host and callable from such a host only. In at least one embodiment, each of host/device functions 3616 defines both a host version of a function that is executable on a host and callable from such a host only and a device version of the function that is executable on a device and callable from such a device only.

In at least one embodiment, CUDA source code 3610 may also include, without limitation, any number of calls to any number of functions that are defined via a CUDA runtime API 3602. In at least one embodiment, CUDA runtime API 3602 may include, without limitation, any number of functions that execute on a host to allocate and deallocate device memory, transfer data between host memory and device memory, manage systems with multiple devices, etc. In at least one embodiment, CUDA source code 3610 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 3602, a CUDA driver API, APIs for any number of CUDA libraries, etc. In at least one embodiment and relative to CUDA runtime API 3602, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 3650 compiles input CUDA code (e.g., CUDA source code 3610) to generate host executable code 3670(1) and CUDA device executable code 3684. In at least one embodiment, CUDA compiler 3650 is NVCC. In at least one embodiment, host executable code 3670(1) is a compiled version of host code included in input source code that is executable on CPU 3690. In at least one embodiment, CPU 3690 may be any processor that is optimized for sequential instruction processing.

In at least one embodiment, CUDA device executable code 3684 is a compiled version of device code included in input source code that is executable on CUDA-enabled GPU 3694. In at least one embodiment, CUDA device executable code 3684 includes, without limitation, binary code. In at least one embodiment, CUDA device executable code 3684 includes, without limitation, IR code, such as PTX code, that is further compiled at runtime into binary code for a specific target device (e.g., CUDA-enabled GPU 3694) by a device driver. In at least one embodiment, CUDA-enabled GPU 3694 may be any processor that is optimized for parallel instruction processing and that supports CUDA. In at least one embodiment, CUDA-enabled GPU 3694 is developed by NVIDIA Corporation of Santa Clara, CA.

In at least one embodiment, CUDA to HIP translation tool 3620 is configured to translate CUDA source code 3610 to functionally similar HIP source code 3630. In a least one embodiment, HIP source code 3630 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 3612, but such a HIP programming language may lack support for dynamic parallelism and therefore global functions 3612 defined in HIP code may be callable from a host only.

In at least one embodiment, HIP source code 3630 includes, without limitation, any number (including zero) of global functions 3612, any number (including zero) of device functions 3614, any number (including zero) of host functions 3616, and any number (including zero) of host/device functions 3618. In at least one embodiment, HIP source code 3630 may also include any number of calls to any number of functions that are specified in a HIP runtime API 3632. In at least one embodiment, HIP runtime API 3632 includes, without limitation, functionally similar versions of a subset of functions included in CUDA runtime API 3602. In at least one embodiment, HIP source code 3630 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 3632, a HIP driver API, APIs for any number of HIP libraries, APIs for any number of ROCm libraries, etc.

In at least one embodiment, CUDA to HIP translation tool 3620 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 3620 converts any number of calls to functions specified in CUDA runtime API 3602 to any number of calls to functions specified in HIP runtime API 3632.

In at least one embodiment, CUDA to HIP translation tool 3620 is a tool known as hipify-perl that executes a text-based translation process. In at least one embodiment, CUDA to HIP translation tool 3620 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 3620.

In at least one embodiment, HIP compiler driver 3640 is a front end that determines a target device 3646 and then configures a compiler that is compatible with target device 3646 to compile HIP source code 3630. In at least one embodiment, target device 3646 is a processor that is optimized for parallel instruction processing. In at least one embodiment, HIP compiler driver 3640 may determine target device 3646 in any technically feasible fashion.

In at least one embodiment, if target device 3646 is compatible with CUDA (e.g., CUDA-enabled GPU 3694), then HIP compiler driver 3640 generates a HIP/NVCC compilation command 3642. In at least one embodiment and as described in greater detail in conjunction with FIG. 36B, HIP/NVCC compilation command 3642 configures CUDA compiler 3650 to compile HIP source code 3630 using, without limitation, a HIP to CUDA translation header and a CUDA runtime library. In at least one embodiment and in response to HIP/NVCC compilation command 3642, CUDA compiler 3650 generates host executable code 3670(1) and CUDA device executable code 3684.

In at least one embodiment, if target device 3646 is not compatible with CUDA, then HIP compiler driver 3640 generates a HIP/HCC compilation command 3644. In at least one embodiment and as described in greater detail in conjunction with FIG. 36C, HIP/HCC compilation command 3644 configures HCC 3660 to compile HIP source code 3630 using, without limitation, an HCC header and a HIP/HCC runtime library. In at least one embodiment and in response to HIP/HCC compilation command 3644, HCC 3660 generates host executable code 3670(2) and HCC device executable code 3682. In at least one embodiment, HCC device executable code 3682 is a compiled version of device code included in HIP source code 3630 that is executable on GPU 3692. In at least one embodiment, GPU 3692 may be any processor that is optimized for parallel instruction processing, is not compatible with CUDA, and is compatible with HCC. In at least one embodiment, GPU 3692 is developed by AMD Corporation of Santa Clara, CA. In at least one embodiment GPU, 3692 is a non-CUDA-enabled GPU 3692.

For explanatory purposes only, three different flows that may be implemented in at least one embodiment to compile CUDA source code 3610 for execution on CPU 3690 and different devices are depicted in FIG. 36A. In at least one embodiment, a direct CUDA flow compiles CUDA source code 3610 for execution on CPU 3690 and CUDA-enabled GPU 3694 without translating CUDA source code 3610 to HIP source code 3630. In at least one embodiment, an indirect CUDA flow translates CUDA source code 3610 to HIP source code 3630 and then compiles HIP source code 3630 for execution on CPU 3690 and CUDA-enabled GPU 3694. In at least one embodiment, a CUDA/HCC flow translates CUDA source code 3610 to HIP source code 3630 and then compiles HIP source code 3630 for execution on CPU 3690 and GPU 3692.

A direct CUDA flow that may be implemented in at least one embodiment is depicted via dashed lines and a series of bubbles annotated A1-A3. In at least one embodiment and as depicted with bubble annotated A1, CUDA compiler 3650 receives CUDA source code 3610 and a CUDA compile command 3648 that configures CUDA compiler 3650 to compile CUDA source code 3610. In at least one embodiment, CUDA source code 3610 used in a direct CUDA flow is written in a CUDA programming language that is based on a programming language other than C++ (e.g., C, Fortran, Python, Java, etc.). In at least one embodiment and in response to CUDA compile command 3648, CUDA compiler 3650 generates host executable code 3670(1) and CUDA device executable code 3684 (depicted with bubble annotated A2). In at least one embodiment and as depicted with bubble annotated A3, host executable code 3670(1) and CUDA device executable code 3684 may be executed on, respectively, CPU 3690 and CUDA-enabled GPU 3694. In at least one embodiment, CUDA device executable code 3684 includes, without limitation, binary code. In at least one embodiment, CUDA device executable code 3684 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 3620 receives CUDA source code 3610. In at least one embodiment and as depicted with bubble annotated B2, CUDA to HIP translation tool 3620 translates CUDA source code 3610 to HIP source code 3630. In at least one embodiment and as depicted with bubble annotated B3, HIP compiler driver 3640 receives HIP source code 3630 and determines that target device 3646 is CUDA-enabled.

In at least one embodiment and as depicted with bubble annotated B4, HIP compiler driver 3640 generates HIP/NVCC compilation command 3642 and transmits both HIP/NVCC compilation command 3642 and HIP source code 3630 to CUDA compiler 3650. In at least one embodiment and as described in greater detail in conjunction with FIG. 36B, HIP/NVCC compilation command 3642 configures CUDA compiler 3650 to compile HIP source code 3630 using, without limitation, a HIP to CUDA translation header and a CUDA runtime library. In at least one embodiment and in response to HIP/NVCC compilation command 3642, CUDA compiler 3650 generates host executable code 3670(1) and CUDA device executable code 3684 (depicted with bubble annotated B5). In at least one embodiment and as depicted with bubble annotated B6, host executable code 3670(1) and CUDA device executable code 3684 may be executed on, respectively, CPU 3690 and CUDA-enabled GPU 3694. In at least one embodiment, CUDA device executable code 3684 includes, without limitation, binary code. In at least one embodiment, CUDA device executable code 3684 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 3620 receives CUDA source code 3610. In at least one embodiment and as depicted with bubble annotated C2, CUDA to HIP translation tool 3620 translates CUDA source code 3610 to HIP source code 3630. In at least one embodiment and as depicted with bubble annotated C3, HIP compiler driver 3640 receives HIP source code 3630 and determines that target device 3646 is not CUDA-enabled.

In at least one embodiment, HIP compiler driver 3640 generates HIP/HCC compilation command 3644 and transmits both HIP/HCC compilation command 3644 and HIP source code 3630 to HCC 3660 (depicted with bubble annotated C4). In at least one embodiment and as described in greater detail in conjunction with FIG. 36C, HIP/HCC compilation command 3644 configures HCC 3660 to compile HIP source code 3630 using, without limitation, an HCC header and a HIP/HCC runtime library. In at least one embodiment and in response to HIP/HCC compilation command 3644, HCC 3660 generates host executable code 3670(2) and HCC device executable code 3682 (depicted with bubble annotated C5). In at least one embodiment and as depicted with bubble annotated C6, host executable code 3670(2) and HCC device executable code 3682 may be executed on, respectively, CPU 3690 and GPU 3692.

In at least one embodiment, after CUDA source code 3610 is translated to HIP source code 3630, HIP compiler driver 3640 may subsequently be used to generate executable code for either CUDA-enabled GPU 3694 or GPU 3692 without re-executing CUDA to HIP translation tool 3620. In at least one embodiment, CUDA to HIP translation tool 3620 translates CUDA source code 3610 to HIP source code 3630 that is then stored in memory. In at least one embodiment, HIP compiler driver 3640 then configures HCC 3660 to generate host executable code 3670(2) and HCC device executable code 3682 based on HIP source code 3630. In at least one embodiment, HIP compiler driver 3640 subsequently configures CUDA compiler 3650 to generate host executable code 3670(1) and CUDA device executable code 3684 based on stored HIP source code 3630.

Figure 36B:
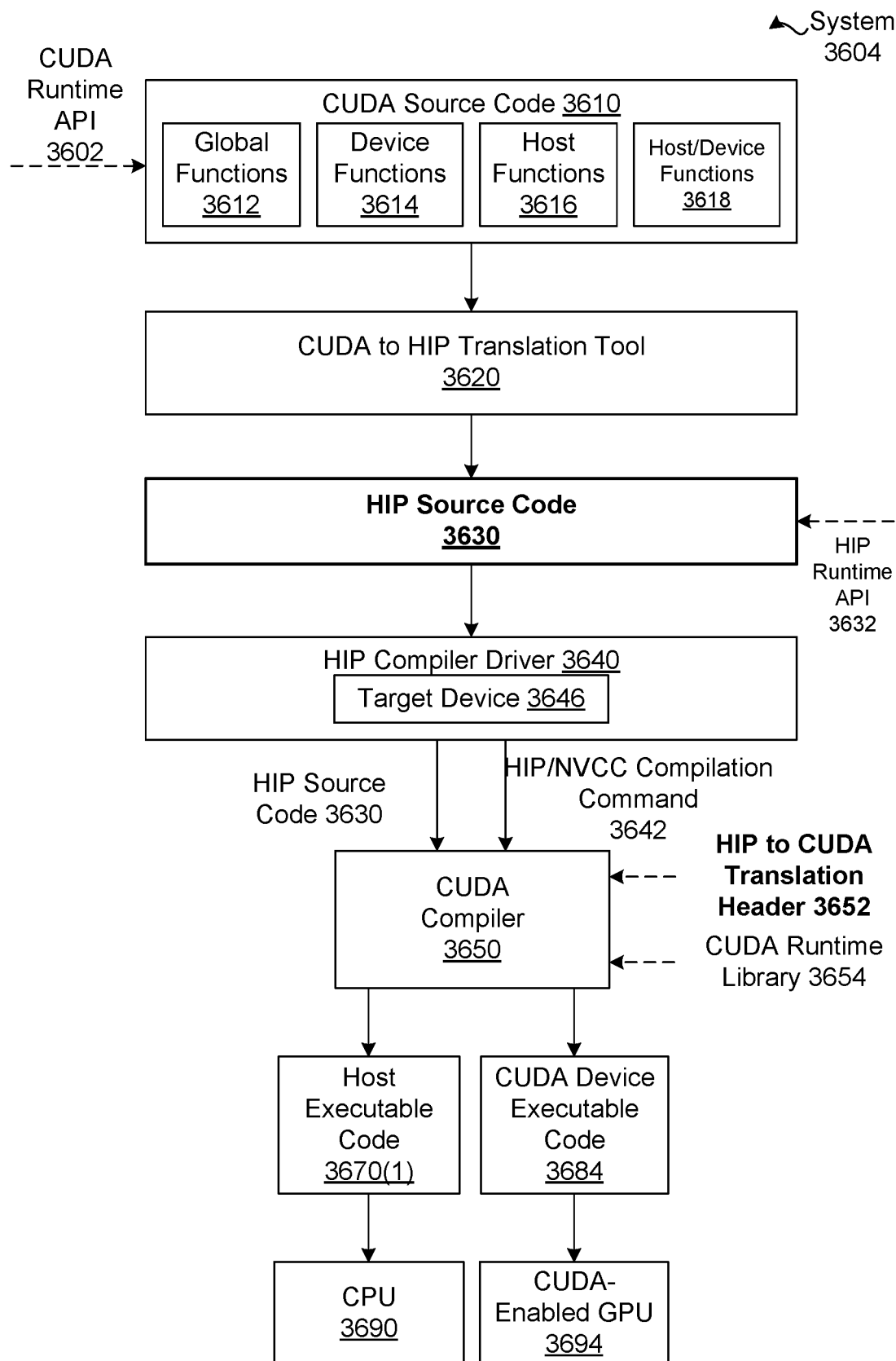
FIG. 36B illustrates a system configured to compile and execute CUDA source code of FIG. 36A using a CPU and a CUDA-enabled GPU, in accordance with at least one embodiment.

FIG. 36B illustrates a system 3604 configured to compile and execute CUDA source code 3610 of FIG. 36A using CPU 3690 and CUDA-enabled GPU 3694, in accordance with at least one embodiment. In at least one embodiment, system 3604 includes, without limitation, CUDA source code 3610, CUDA to HIP translation tool 3620, HIP source code 3630, HIP compiler driver 3640, CUDA compiler 3650, host executable code 3670(1), CUDA device executable code 3684, CPU 3690, and CUDA-enabled GPU 3694.

In at least one embodiment and as described previously herein in conjunction with FIG. 36A, CUDA source code 3610 includes, without limitation, any number (including zero) of global functions 3612, any number (including zero) of device functions 3614, any number (including zero) of host functions 3616, and any number (including zero) of host/device functions 3618. In at least one embodiment, CUDA source code 3610 also includes, without limitation, any number of calls to any number of functions that are specified in any number of CUDA APIs.

In at least one embodiment, CUDA to HIP translation tool 3620 translates CUDA source code 3610 to HIP source code 3630. In at least one embodiment, CUDA to HIP translation tool 3620 converts each kernel call in CUDA source code 3610 from a CUDA syntax to a HIP syntax and converts any number of other CUDA calls in CUDA source code 3610 to any number of other functionally similar HIP calls.

In at least one embodiment, HIP compiler driver 3640 determines that target device 3646 is CUDA-enabled and generates HIP/NVCC compilation command 3642. In at least one embodiment, HIP compiler driver 3640 then configures CUDA compiler 3650 via HIP/NVCC compilation command 3642 to compile HIP source code 3630. In at least one embodiment, HIP compiler driver 3640 provides access to a HIP to CUDA translation header 3652 as part of configuring CUDA compiler 3650. In at least one embodiment, HIP to CUDA translation header 3652 translates any number of mechanisms (e.g., functions) specified in any number of HIP APIs to any number of mechanisms specified in any number of CUDA APIs. In at least one embodiment, CUDA compiler 3650 uses HIP to CUDA translation header 3652 in conjunction with a CUDA runtime library 3654 corresponding to CUDA runtime API 3602 to generate host executable code 3670(1) and CUDA device executable code 3684. In at least one embodiment, host executable code 3670(1) and CUDA device executable code 3684 may then be executed on, respectively, CPU 3690 and CUDA-enabled GPU 3694. In at least one embodiment, CUDA device executable code 3684 includes, without limitation, binary code. In at least one embodiment, CUDA device executable code 3684 includes, without limitation, PTX code and is further compiled into binary code for a specific target device at runtime.

Figure 36C:
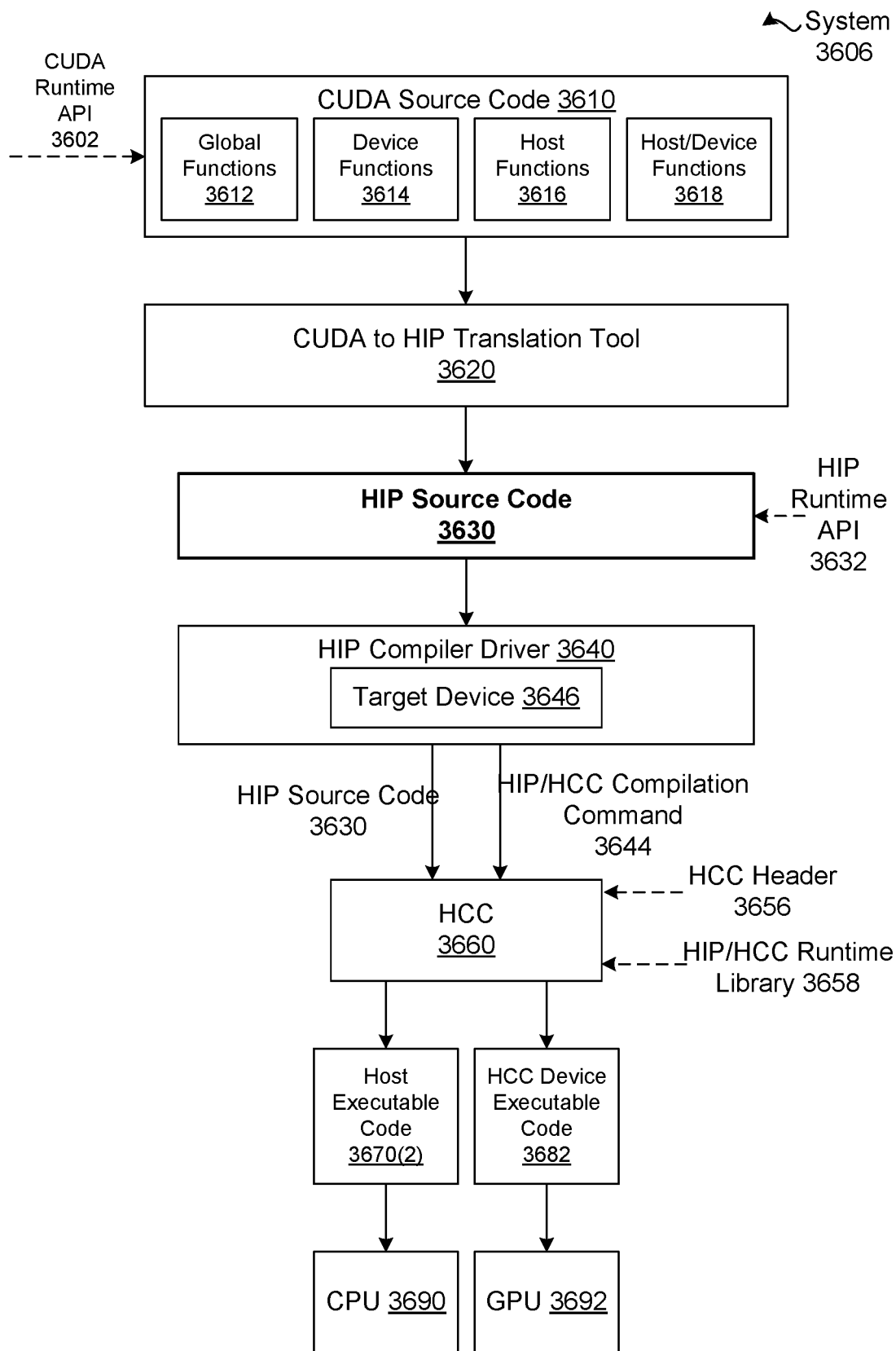
FIG. 36C illustrates a system configured to compile and execute CUDA source code of FIG. 36A using a CPU and a non-CUDA-enabled GPU, in accordance with at least one embodiment.

FIG. 36C illustrates a system 3606 configured to compile and execute CUDA source code 3610 of FIG. 36A using CPU 3690 and non-CUDA-enabled GPU 3692, in accordance with at least one embodiment. In at least one embodiment, system 3606 includes, without limitation, CUDA source code 3610, CUDA to HIP translation tool 3620, HIP source code 3630, HIP compiler driver 3640, HCC 3660, host executable code 3670(2), HCC device executable code 3682, CPU 3690, and GPU 3692.

In at least one embodiment and as described previously herein in conjunction with FIG. 36A, CUDA source code 3610 includes, without limitation, any number (including zero) of global functions 3612, any number (including zero) of device functions 3614, any number (including zero) of host functions 3616, and any number (including zero) of host/device functions 3618. In at least one embodiment, CUDA source code 3610 also includes, without limitation, any number of calls to any number of functions that are specified in any number of CUDA APIs.

In at least one embodiment, CUDA to HIP translation tool 3620 translates CUDA source code 3610 to HIP source code 3630. In at least one embodiment, CUDA to HIP translation tool 3620 converts each kernel call in CUDA source code 3610 from a CUDA syntax to a HIP syntax and converts any number of other CUDA calls in source code 3610 to any number of other functionally similar HIP calls.

In at least one embodiment, HIP compiler driver 3640 subsequently determines that target device 3646 is not CUDA-enabled and generates HIP/HCC compilation command 3644. In at least one embodiment, HIP compiler driver 3640 then configures HCC 3660 to execute HIP/HCC compilation command 3644 to compile HIP source code 3630. In at least one embodiment, HIP/HCC compilation command 3644 configures HCC 3660 to use, without limitation, a HIP/HCC runtime library 3658 and an HCC header 3656 to generate host executable code 3670(2) and HCC device executable code 3682. In at least one embodiment, HIP/HCC runtime library 3658 corresponds to HIP runtime API 3632. In at least one embodiment, HCC header 3656 includes, without limitation, any number and type of interoperability mechanisms for HIP and HCC. In at least one embodiment, host executable code 3670(2) and HCC device executable code 3682 may be executed on, respectively, CPU 3690 and GPU 3692.

Figure 37:
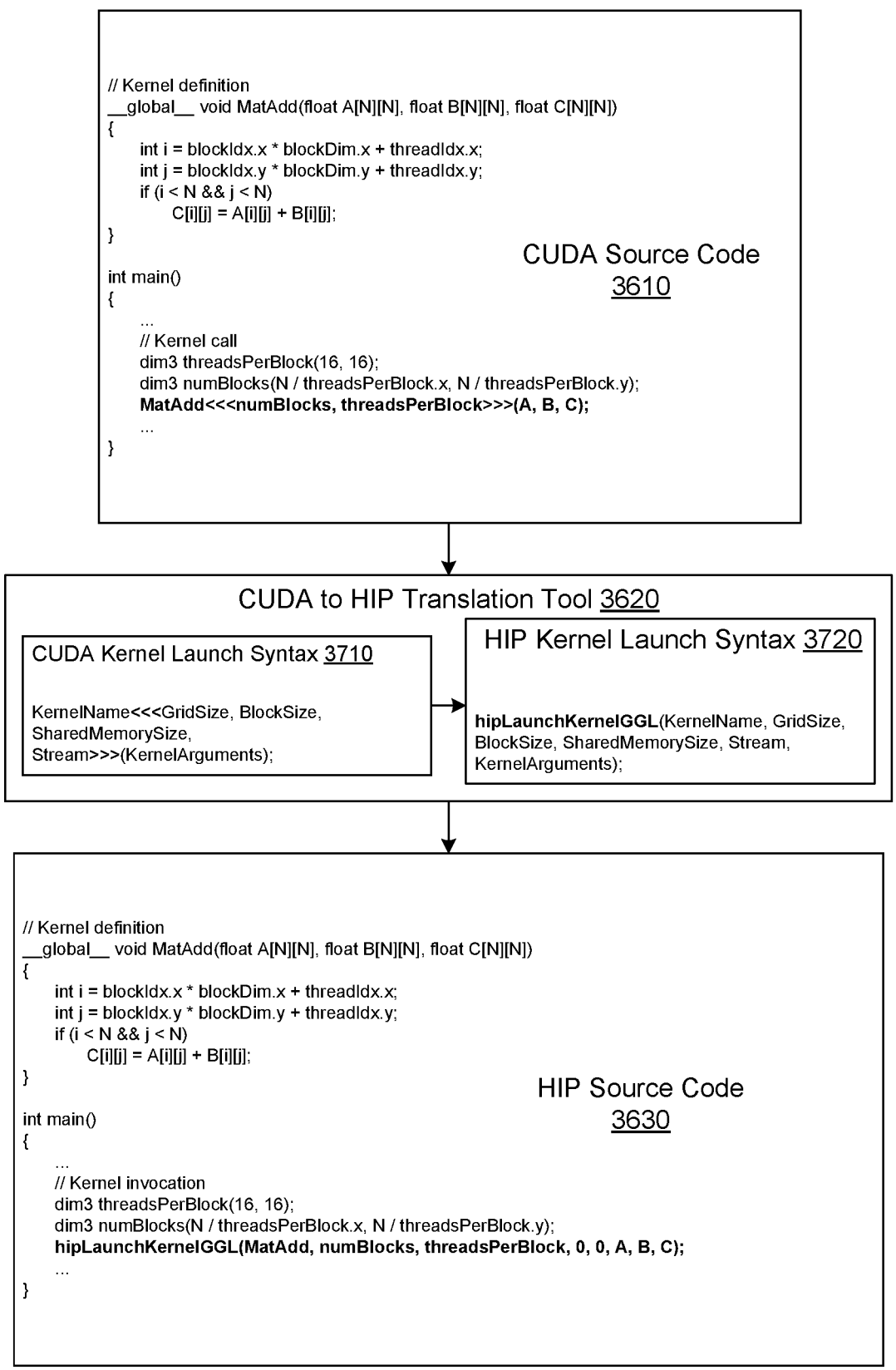
FIG. 37 illustrates an exemplary kernel translated by CUDA-to-HIP translation tool of FIG. 36C, in accordance with at least one embodiment.

FIG. 37 illustrates an exemplary kernel translated by CUDA-to-HIP translation tool 3620 of FIG. 36C, in accordance with at least one embodiment. In at least one embodiment, CUDA source code 3610 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 3610 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 3710. In at least one embodiment, CUDA kernel launch syntax 3710 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 3710 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 3710, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 3710, SharedMemorySize defaults to zero. In at least one embodiment and with respect to CUDA kernel launch syntax 3710, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 3610 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 3710, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 3610 to HIP source code 3630, CUDA to HIP translation tool 3620 translates each kernel call in CUDA source code 3610 from CUDA kernel launch syntax 3710 to a HIP kernel launch syntax 3720 and converts any number of other CUDA calls in source code 3610 to any number of other functionally similar HIP calls. In at least one embodiment, HIP kernel launch syntax 3720 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 3720 as in CUDA kernel launch syntax 3710 (described previously herein). In at least one embodiment, arguments SharedMemorySize and Stream are required in HIP kernel launch syntax 3720 and are optional in CUDA kernel launch syntax 3710.

In at least one embodiment, a portion of HIP source code 3630 depicted in FIG. 37 is identical to a portion of CUDA source code 3610 depicted in FIG. 37 except for a kernel call that causes kernel MatAdd to execute on a device. In at least one embodiment, kernel MatAdd is defined in HIP source code 3630 with the same "_global_" declaration specifier with which kernel MatAdd is defined in CUDA source code 3610. In at least one embodiment, a kernel call in HIP source code 3630 is "hipLaunchKernelGGL(MatAdd, numBlocks, threadsPerBlock, 0, 0, A, B, C);", while a corresponding kernel call in CUDA source code 3610 is "MatAdd<<<numBlocks, threadsPerBlock>>>(A, B, C);".

Figure 38:
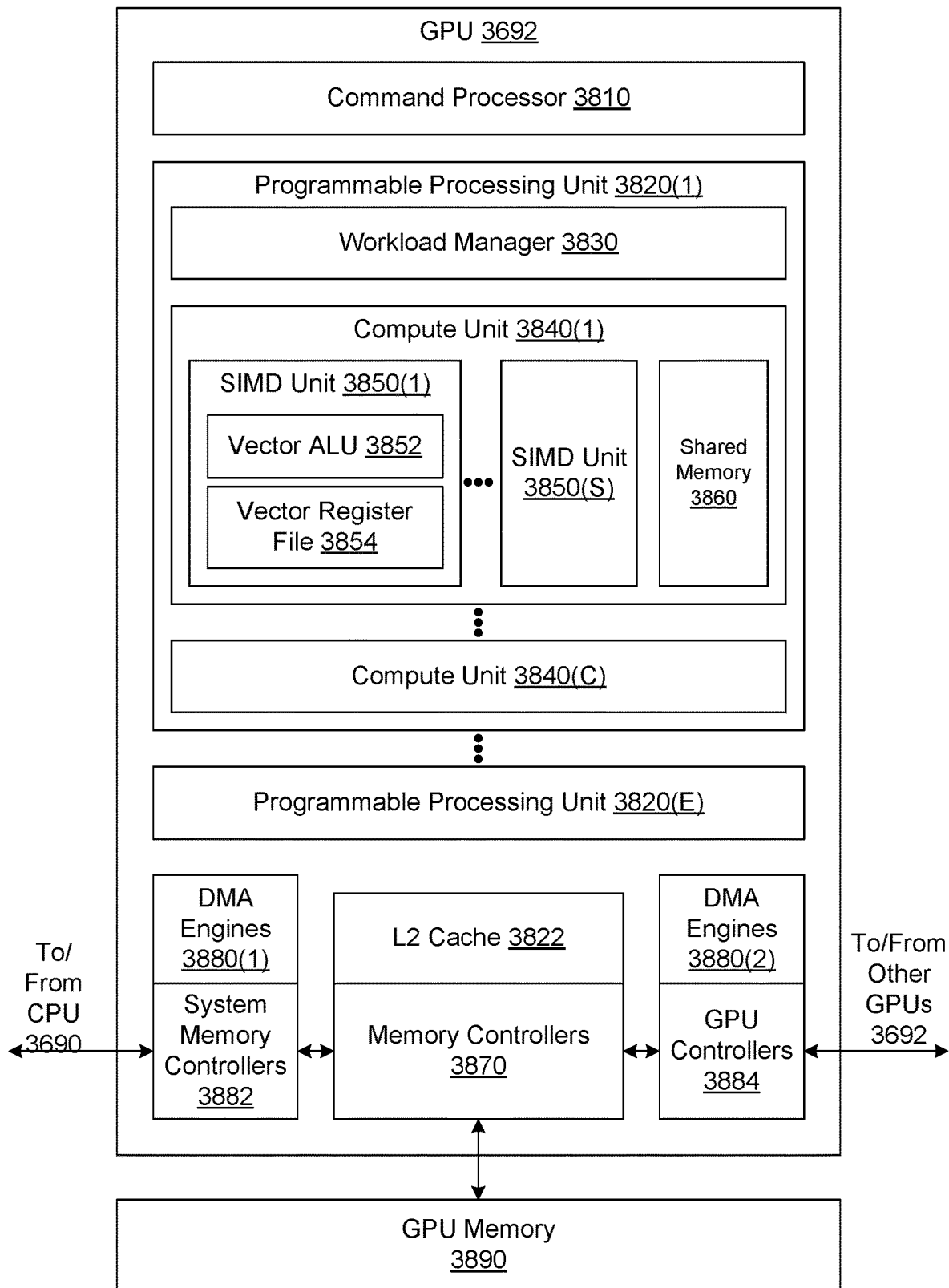
FIG. 38 illustrates non-CUDA-enabled GPU of FIG. 36C in greater detail, in accordance with at least one embodiment.

FIG. 38 illustrates non-CUDA-enabled GPU 3692 of FIG. 36C in greater detail, in accordance with at least one embodiment. In at least one embodiment, GPU 3692 is developed by AMD corporation of Santa Clara. In at least one embodiment, GPU 3692 can be configured to perform compute operations in a highly-parallel fashion. In at least one embodiment, GPU 3692 is configured to execute graphics pipeline operations such as draw commands, pixel operations, geometric computations, and other operations associated with rendering an image to a display. In at least one embodiment, GPU 3692 is configured to execute operations unrelated to graphics. In at least one embodiment, GPU 3692 is configured to execute both operations related to graphics and operations unrelated to graphics. In at least one embodiment, GPU 3692 can be configured to execute device code included in HIP source code 3630.

In at least one embodiment, GPU 3692 includes, without limitation, any number of programmable processing units 3820, a command processor 3810, an L2 cache 3822, memory controllers 3870, DMA engines 3880(1), system memory controllers 3882, DMA engines 3880(2), and GPU controllers 3884. In at least one embodiment, each programmable processing unit 3820 includes, without limitation, a workload manager 3830 and any number of compute units 3840. In at least one embodiment, command processor 3810 reads commands from one or more command queues (not shown) and distributes commands to workload managers 3830. In at least one embodiment, for each programmable processing unit 3820, associated workload manager 3830 distributes work to compute units 3840 included in programmable processing unit 3820. In at least one embodiment, each compute unit 3840 may execute any number of thread blocks, but each thread block executes on a single compute unit 3840. In at least one embodiment, a workgroup is a thread block.

In at least one embodiment, each compute unit 3840 includes, without limitation, any number of SIMD units 3850 and a shared memory 3860. In at least one embodiment, each SIMD unit 3850 implements a SIMD architecture and is configured to perform operations in parallel. In at least one embodiment, each SIMD unit 3850 includes, without limitation, a vector ALU 3852 and a vector register file 3854. In at least one embodiment, each SIMD unit 3850 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3860.

In at least one embodiment, programmable processing units 3820 are referred to as "shader engines." In at least one embodiment, each programmable processing unit 3820 includes, without limitation, any amount of dedicated graphics hardware in addition to compute units 3840. In at least one embodiment, each programmable processing unit 3820 includes, without limitation, any number (including zero) of geometry processors, any number (including zero) of rasterizers, any number (including zero) of render back ends, workload manager 3830, and any number of compute units 3840.

In at least one embodiment, compute units 3840 share L2 cache 3822. In at least one embodiment, L2 cache 3822 is partitioned. In at least one embodiment, a GPU memory 3890 is accessible by all compute units 3840 in GPU 3692. In at least one embodiment, memory controllers 3870 and system memory controllers 3882 facilitate data transfers between GPU 3692 and a host, and DMA engines 3880(1) enable asynchronous memory transfers between GPU 3692 and such a host. In at least one embodiment, memory controllers 3870 and GPU controllers 3884 facilitate data transfers between GPU 3692 and other GPUs 3692, and DMA engines 3880(2) enable asynchronous memory transfers between GPU 3692 and other GPUs 3692.

In at least one embodiment, GPU 3692 includes, without limitation, any amount and type of system interconnect that facilitates data and control transmissions across any number and type of directly or indirectly linked components that may be internal or external to GPU 3692. In at least one embodiment, GPU 3692 includes, without limitation, any number and type of I/O interfaces (e.g., PCIe) that are coupled to any number and type of peripheral devices. In at least one embodiment, GPU 3692 may include, without limitation, any number (including zero) of display engines and any number (including zero) of multimedia engines. In at least one embodiment, GPU 3692 implements a memory subsystem that includes, without limitation, any amount and type of memory controllers (e.g., memory controllers 3870 and system memory controllers 3882) and memory devices (e.g., shared memories 3860) that may be dedicated to one component or shared among multiple components. In at least one embodiment, GPU 3692 implements a cache subsystem that includes, without limitation, one or more cache memories (e.g., L2 cache 3822) that may each be private to or shared between any number of components (e.g., SIMD units 3850, compute units 3840, and programmable processing units 3820).

Figure 39:
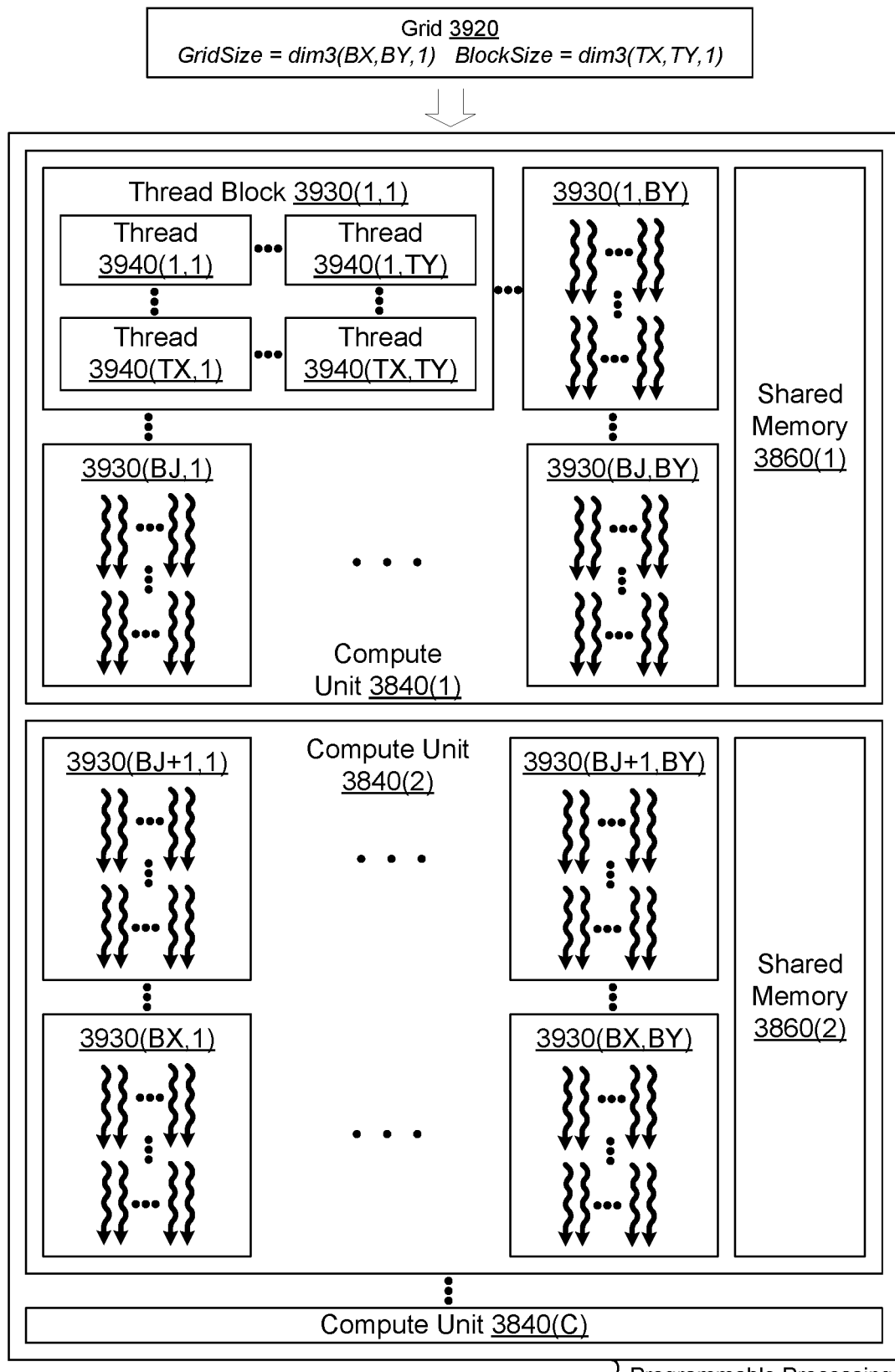
FIG. 39 illustrates how threads of an exemplary CUDA grid are mapped to different compute units of FIG. 38, in accordance with at least one embodiment.

FIG. 39 illustrates how threads of an exemplary CUDA grid 3920 are mapped to different compute units 3840 of FIG. 38, in accordance with at least one embodiment. In at least one embodiment and for explanatory purposes only, grid 3920 has a GridSize of BX by BY by 1 and a BlockSize of TX by TY by 1. In at least one embodiment, grid 3920 therefore includes, without limitation, (BX*BY) thread blocks 3930 and each thread block 3930 includes, without limitation, (TX*TY) threads 3940. Threads 3940 are depicted in FIG. 39 as squiggly arrows.

In at least one embodiment, grid 3920 is mapped to programmable processing unit 3820(1) that includes, without limitation, compute units 3840(1)-3840(C). In at least one embodiment and as shown, (BJ*BY) thread blocks 3930 are mapped to compute unit 3840(1), and the remaining thread blocks 3930 are mapped to compute unit 3840(2). In at least one embodiment, each thread block 3930 may include, without limitation, any number of warps, and each warp is mapped to a different SIMD unit 3850 of FIG. 38.

In at least one embodiment, warps in a given thread block 3930 may synchronize together and communicate through shared memory 3860 included in associated compute unit 3840. For example and in at least one embodiment, warps in thread block 3930(BJ,1) can synchronize together and communicate through shared memory 3860(1). For example and in at least one embodiment, warps in thread block 3930(BJ+1,1) can synchronize together and communicate through shared memory 3860(2).

Figure 40:
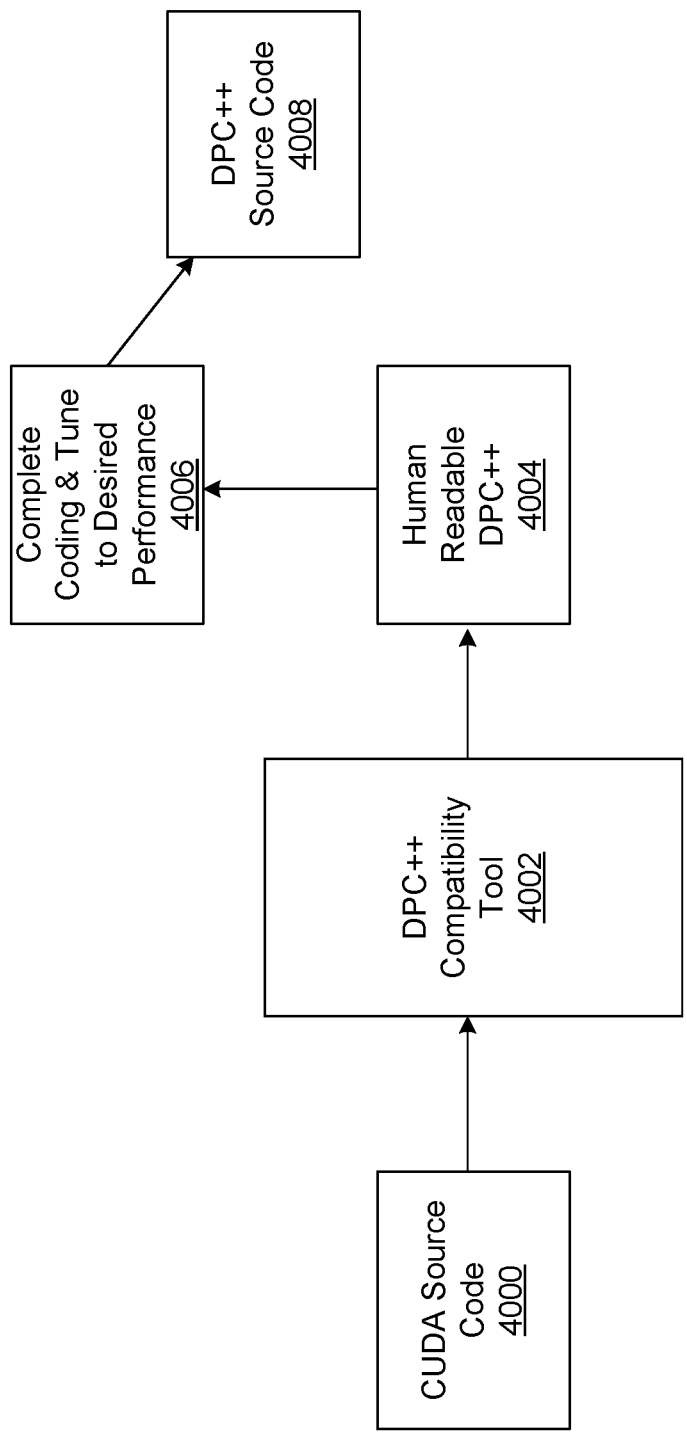
FIG. 40 illustrates how to migrate existing CUDA code to Data Parallel C++ code, in accordance with at least one embodiment.

FIG. 40 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multi-platform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4000 is provided as an input to a DPC++ compatibility tool 4002 to generate human readable DPC++ 4004. In at least one embodiment, human readable DPC++ 4004 includes inline comments generated by DPC++ compatibility tool 4002 that guides a developer on how and/or where to modify DPC++ code to complete coding and tuning to desired performance 4006, thereby generating DPC++ source code 4008.

In at least one embodiment, CUDA source code 4000 is or includes a collection of human-readable source code in a CUDA programming language. In at least one embodiment, CUDA source code 4000 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4000 described in connection with FIG. 40 may be in accordance with those discussed elsewhere in this document.

In at least one embodiment, DPC++ compatibility tool 4002 refers to an executable tool, program, application, or any other suitable type of tool that is used to facilitate migration of CUDA source code 4000 to DPC++ source code 4008. In at least one embodiment, DPC++ compatibility tool 4002 is a command-line-based code migration tool available as part of a DPC++ tool kit that is used to port existing CUDA sources to DPC++. In at least one embodiment, DPC++ compatibility tool 4002 converts some or all source code of a CUDA application from CUDA to DPC++ and generates a resulting file that is written at least partially in DPC++, referred to as human readable DPC++ 4004. In at least one embodiment, human readable DPC++ 4004 includes comments that are generated by DPC++ compatibility tool 4002 to indicate where user intervention may be necessary. In at least one embodiment, user intervention is necessary when CUDA source code 4000 calls a CUDA API that has no analogous DPC++ API; other examples where user intervention is required are discussed later in greater detail.

In at least one embodiment, a workflow for migrating CUDA source code 4000 (e.g., application or portion thereof) includes creating one or more compilation database files; migrating CUDA to DPC++ using a DPC++ compatibility tool 4002; completing migration and verifying correctness, thereby generating DPC++ source code 4008; and compiling DPC++ source code 4008 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4002 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4002 migrates CUDA code (e.g., applications) written in CUDA to DPC++ by generating DPC++ wherever possible. In at least one embodiment, DPC++ compatibility tool 4002 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4002 to migrate CUDA code to DPC++. In at least one embodiment, non-CUDA C++ code and files are migrated as is. In at least one embodiment, DPC++ compatibility tool 4002 generates human readable DPC++ 4004 which may be DPC++ code that, as generated by DPC++ compatibility tool 4002, cannot be compiled by DPC++ compiler and requires additional plumbing for verifying portions of code that were not migrated correctly, and may involve manual intervention, such as by a developer. In at least one embodiment, DPC++ compatibility tool 4002 provides hints or tools embedded in code to help developers manually migrate additional code that could not be migrated automatically. In at least one embodiment, migration is a one-time activity for a source file, project, or application.

In at least one embodiment, DPC++ compatibility tool 40002 is able to successfully migrate all portions of CUDA code to DPC++ and there may simply be an optional step for manually verifying and tuning performance of DPC++ source code that was generated. In at least one embodiment, DPC++ compatibility tool 4002 directly generates DPC++ source code 4008 which is compiled by a DPC++ compiler without requiring or utilizing human intervention to modify DPC++ code generated by DPC++ compatibility tool 4002. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4002. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global___ void VectorAddKernel(float* A, float* B, float* C)
{
    A[threadIdx.x] = threadIdx.x + 1.0f;
    B[threadIdx.x] = threadIdx.x + 1.0f;
    C[threadIdx.x] = A[threadIdx.x] + B[threadIdx.x];
}
int main( )
{
    float *d_A, *d_B, *d_C;
    cudaMalloc(&d_A, VECTOR_SIZE*sizeof(float));
    cudaMalloc(&d_B, VECTOR_SIZE*sizeof(float));
    cudaMalloc(&d_C, VECTOR_SIZE*sizeof(float));
    VectorAddKernel<<<1, VECTOR_SIZE>>>(d_A, d_B, d_C);
    float Result[VECTOR_SIZE] = { };
    cudaMemcpy(Result, d_C, VECTOR_SIZE*sizeof(float),
cudaMemcpy DeviceToHost);
    cudaFree(d_A);
    cudaFree(d_B);
    cudaFree(d_C);
    for (int i=0; i<VECTOR_SIZE; i++ {
        if (i % 16 == 0) {
            printf("\n");
        }
        printf("%f ", Result[i]);
    }
    return 0;
}
```

In at least one embodiment and in connection with CUDA source file presented above, DPC++ compatibility tool 4002 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 4002 converts CUDA thread IDs used to index work elements to SYCL standard addressing for work elements via a local ID as part of migrating CUDA code to DPC++ code. In at least one embodiment, DPC++ code generated by DPC++ compatibility tool 4002 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloco is migrated to a unified shared memory SYCL call malloc_deviceo to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4002. In at least one embodiment, DPC++ compatibility tool 4002 modify CUDA APIs for memory setup and/or host calls to execute kernel on the acceleration device. In at least one embodiment and in connection with CUDA source file presented above, a corresponding human readable DPC++ 4004 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
        sycl::nd_item<3> item_ct1)
{
  A[item_ct1.get_local_id(2)] = item_ct1.get_local_id(2) + 1.0f;
  B[item_ct1.get_local_id(2)] = item_ct1.get_local_id(2) + 1.0f;
  C[item_ct1.get_local_id(2)] =
      A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
     dpct::get_current_device( ),
     dpct::get_default_context( ));
  d_B = (float *)sycl::malloc_device(VECTOR_SIZE * sizeof(float),
     dpct::get_current_device( ),
     dpct::get_default_context( ));
  d_C = (float *)sycl:malloc_device(VECTOR_SIZE * sizeof(float),
     dpct::get_current_device( ),
     dpct::get_default_context( ));
  dpct::get_default_queue_wait( ).submit([&](sycl::handler &cgh) {
    cgh.parallel_for(
       sycl::nd_range<3>(sycl::range<3>(1, 1, 1) *
          sycl::range<3>(1, 1, VECTOR_SIZE) *
          sycl::range<3>(1, 1, VECTOR_SIZE)),
       [=](sycl::nd_items<3> item_ct1) {
         VectorAddKernel(d_A, d_B, d_C, item_ct1);
       });
  });
  float Result[VECTOR_SIZE] = { };
  dpct::get_default_queue_wait( )
    .memcpy(Result, d_C, VECTOR_SIZE * sizeof(float))
    .wait( );
  sycl::free(d_A, dpct::get_default_context( ));
  sycl::free(d_B, dpct::get_default_context( ));
  sycl::free(d_C, dpct::get_default_context( ));
  for (int i=0; i<VECTOR_SIZE; i++ {
    if (i % 16 == 0) {
       printf("\n");
    }
    printf("%f ", Result[i]);
  }
  return 0;
}
```

In at least one embodiment, human readable DPC++ 4004 refers to output generated by DPC++ compatibility tool 4002 and may be optimized in one manner or another. In at least one embodiment, human readable DPC++ 4004 generated by DPC++ compatibility tool 4002 can be manually edited by a developer after migration to make it more maintainable, performance, or other considerations. In at least one embodiment, DPC++ code generated by DPC++ compatibility tool 40002 such as DPC++ disclosed can be optimized by removing repeat calls to get_current_device( ) and/or get default_context( ) for each malloc_deviceo call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4002 replace uses of unified shared memory with accessors. In at least one embodiment, DPC++ compatibility tool 4002 has an option to change how it migrates CUDA code to DPC++ code. In at least one embodiment, DPC++ compatibility tool 4002 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4002; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

At least one embodiment of the disclosure can be described in view of the following clauses:

1. A processor comprising:
    one or more circuits to use an application programming interface (API) to identify one or more error handlers to handle one or more errors from one or more accelerators within a heterogeneous processor.
2. The processor of clause 1, wherein the one or more error handlers comprise one or more instructions that, if performed, cause the one or more circuits to perform one or more computational operations in response to the one or more errors.
3. The processor of clause 1 or 2, wherein the one or more error handlers comprise one or more instructions that, if performed, cause the one or more accelerators within the heterogeneous processor to perform one or more computational operations in response to the one or more errors.

4. The processor of any of clauses 1-3, wherein the one or more error handlers comprise function pointers to indicate one or more computational operations to be performed in response to the one or more errors.
5. The processor of any of clauses 1-4, wherein the one or more errors are to be generated by the one or more accelerators within the heterogeneous processor and one or more other errors are to be generated by one or more other accelerators, and the one or more other errors are to be handled by one or more other error handlers.
6. The processor of any of clauses 1-5, wherein the API is to receive one or more parameters comprising one or more pointers to indicate one or more instructions to be performed in response to the one or more errors.
7. The processor of any of clauses 1-6, wherein the processor is a central processing unit (CPU).
8. A system comprising:
   one or more processors to use an application programming interface (API) to identify one or more error handlers to handle one or more errors from one or more accelerators within a heterogeneous processor.
9. The system of clause 8, wherein the one or more error handlers comprise one or more instructions that, if performed, cause the one or more processors to perform one or more computational operations in response to the one or more errors.
10. The system of clause 8 or 9, wherein the one or more error handlers comprise one or more instructions that, if performed, cause the one or more accelerators within the heterogeneous processor to perform one or more computational operations in response to the one or more errors.
11. The system of any of clauses 8-10, wherein the API is to receive one or more parameters comprising one or more pointers to indicate the one or more error handlers and the one or more error handlers comprise one or more instructions to be performed in response to the one or more errors.
12. The system of any of clauses 8-11, wherein the one or more error handlers are pointers to indicate one or more instructions to be performed in response to the one or more errors.
13. The system of any of clauses 8-12, wherein the one or more errors are to be generated by the one or more accelerators within the heterogeneous processor and one or more other errors are to be generated by one or more other accelerators, and the one or more other errors are to be handled by one or more other error handlers.
14. The system of any of clauses 8-13, wherein the one or more processors comprise a central processing unit (CPU).
15. A method comprising:
   using an application programming interface (API) to identify one or more error handlers to handle one or more errors from one or more accelerators within a heterogeneous processor.
16. The method of clause 15, wherein the one or more error handlers comprise one or more instructions that, if performed, cause one or more computational operations to be performed in response to the one or more errors.
17. The method of clause 15 or 16, further comprising performing, in response to the one or more errors, one or more instructions by the one or more accelerators within the heterogeneous processor.
18. The method of any of clauses 15-17, wherein the one or more error handlers are pointers to indicate one or more instructions to be performed in response to the one or more errors.
19. The method of any of clauses 15-18, wherein, in response to the API, the one or more error handlers are to be registered with a parallel computing environment to handle the one or more errors.
20. The method of any of clauses 15-19, further comprising receiving, by the API, one or more parameters to indicate the one or more error handlers, where the one or more error handlers comprise one or more pointers to one or more instructions to be performed in response to the one or more errors.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:
one or more circuits to use an application programming interface (API) to identify one or more error handlers to handle one or more errors from one or more accelerators within a heterogeneous processor.

2. The processor of claim 1, wherein the one or more error handlers comprise one or more instructions that, if performed, cause the one or more circuits to perform one or more computational operations in response to the one or more errors.

3. The processor of claim 1, wherein the one or more error handlers comprise one or more instructions that, if performed, cause the one or more accelerators within the heterogeneous processor to perform one or more computational operations in response to the one or more errors.

4. The processor of claim 1, wherein the one or more error handlers comprise function pointers to indicate one or more computational operations to be performed in response to the one or more errors.

5. The processor of claim 1, wherein the one or more errors are to be generated by the one or more accelerators within the heterogeneous processor and one or more other errors are to be generated by one or more other accelerators, and the one or more other errors are to be handled by one or more other error handlers.

6. The processor of claim 1, wherein the API is to receive one or more parameters comprising one or more pointers to indicate one or more instructions to be performed in response to the one or more errors.

7. The processor of claim 1, wherein the processor is a central 7, processing unit (CPU).

8. A system comprising:
one or more processors to use an application programming interface (API) to identify one or more error handlers to handle one or more errors from one or more accelerators within a heterogeneous processor.

9. The system of claim 8, wherein the one or more error handlers comprise one or more instructions that, if performed, cause the one or more processors to perform one or more computational operations in response to the one or more errors.

10. The system of claim 8, wherein the one or more error handlers comprise one or more instructions that, if performed, cause the one or more accelerators within the heterogeneous processor to perform one or more computational operations in response to the one or more errors.

11. The system of claim 8, wherein the API is to receive one or more parameters comprising one or more pointers to indicate the one or more error handlers and the one or more error handlers comprise one or more instructions to be performed in response to the one or more errors.

12. The system of claim 8, wherein the one or more error handlers are pointers to indicate one or more instructions to be performed in response to the one or more errors.

13. The system of claim 8, wherein the one or more errors are to be generated by the one or more accelerators within the heterogeneous processor and one or more other errors are to be generated by one or more other accelerators, and the one or more other errors are to be handled by one or more other error handlers.

14. The system of claim 8, wherein the one or more processors comprise a central processing unit (CPU).

15. A method comprising:
using an application programming interface (API) to identify one or more error handlers to handle one or more errors from one or more accelerators within a heterogeneous processor.

16. The method of claim 15, wherein the one or more error handlers comprise one or more instructions that, if performed, cause one or more computational operations to be performed in response to the one or more errors.

17. The method of claim 15, further comprising performing, in response to the one or more errors, one or more instructions by the one or more accelerators within the heterogeneous processor.

18. The method of claim 15, wherein the one or more error handlers are pointers to indicate one or more instructions to be performed in response to the one or more errors.

19. The method of claim 15, wherein, in response to the API, the one or more error handlers are to be registered with a parallel computing environment to handle the one or more errors.

20. The method of claim 15, further comprising receiving, by the API, one or more parameters to indicate the one or more error handlers, where the one or more error handlers comprise one or more pointers to one or more instructions to be performed in response to the one or more errors.

* * * * *